(12) United States Patent
Novek

(10) Patent No.: US 11,796,229 B2
(45) Date of Patent: *Oct. 24, 2023

(54) SYSTEMS AND METHODS FOR HIGH ENERGY DENSITY HEAT TRANSFER

(71) Applicant: SOLVCOR TECHNOLOGIES, LLC, Princeton, NJ (US)

(72) Inventor: Ethan J. Novek, Princeton, NJ (US)

(73) Assignee: SOLVCOR TECHNOLOGIES. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,700

(22) Filed: Feb. 3, 2021

(65) Prior Publication Data
US 2021/0356178 A1 Nov. 18, 2021

Related U.S. Application Data

(63) Continuation-in-part of application No. 16/826,469, filed on Mar. 23, 2020, now Pat. No. 10,948,224.

(60) Provisional application No. 62/969,211, filed on Feb. 3, 2020, provisional application No. 62/969,774, filed on Feb. 4, 2020, provisional application No.
(Continued)

(51) Int. Cl.
F25B 45/00 (2006.01)
F25B 15/00 (2006.01)
C09K 5/06 (2006.01)
C09K 5/10 (2006.01)
F28D 20/02 (2006.01)

(52) U.S. Cl.
CPC ............ F25B 15/002 (2013.01); C09K 5/066 (2013.01); C09K 5/10 (2013.01); F25B 45/00 (2013.01); F28D 20/023 (2013.01)

(58) Field of Classification Search
CPC .... F28D 20/0039; F28D 20/02; F28D 20/028; F28D 2020/0069; F28D 2020/0078; F28D 2020/0082; F28D 2020/0095
See application file for complete search history.

(56) References Cited

U.S. PATENT DOCUMENTS 2,671,713 A 3/1954 Miller et al.
4,283,918 A 8/1981 Mehta
(Continued)

FOREIGN PATENT DOCUMENTS

DE 102006062137 A1 * 7/2008 ............... C08L 23/04
DE 102010040829 A1 * 3/2012 ........... F02B 29/0443
(Continued)

OTHER PUBLICATIONS

International Search Report and Written Opinion dated Jul. 22, 2021 issued in PCT/US2021/16374.
(Continued)

Primary Examiner — Filip Zec
(74) Attorney, Agent, or Firm — Hunton Andrews Kurth LLP

(57) ABSTRACT

The application pertains to, for example, novel processes and systems for heat transfer, refrigeration, energy storage, and various cooling and heating processes. Such processes may include cooling or mixing various liquid-liquid phase transition liquids to release and/or energy. Additionally or alternatively, such processes may include charging and/or discharging thermal storage reservoirs with layered liquids of various temperatures.

15 Claims, 35 Drawing Sheets

Related U.S. Application Data

62/822,501, filed on Mar. 22, 2019, provisional application No. 62/872,851, filed on Jul. 11, 2019, provisional application No. 62/976,398, filed on Feb. 14, 2020, provisional application No. 62/984,394, filed on Mar. 3, 2020, provisional application No. 63/030,966, filed on May 28, 2020, provisional application No. 63/064,290, filed on Aug. 11, 2020.

(56) References Cited

U.S. PATENT DOCUMENTS

| | | |
|---|---|---|
| 4,420,946 A | 12/1983 | Rojey et al. |
| 4,708,812 A | 11/1987 | Hatfield et al. |
| 6,367,268 B1 * | 4/2002 | Paul ............... B60H 1/3235 62/330 |
| 8,109,324 B2 | 2/2012 | Farid et al. |
| 8,117,854 B2 | 2/2012 | Lampe et al. |
| 8,141,636 B2 | 3/2012 | Speirs et al. |
| 9,207,003 B2 | 12/2015 | Said et al. |
| 9,476,648 B2 | 10/2016 | Sun et al. |
| 9,732,264 B2 * | 8/2017 | Suzuki ............... F28D 20/0056 |
| 10,378,830 B2 | 8/2019 | Schierack et al. |
| 10,400,148 B2 | 9/2019 | Novek |
| 10,533,785 B2 * | 1/2020 | Ma ..................... F25B 21/02 |
| 2010/0132384 A1 | 6/2010 | Shiflett et al. |
| 2011/0162829 A1 | 7/2011 | Xiang |
| 2012/0018116 A1 | 1/2012 | Mathur et al. |
| 2013/0000867 A1 | 1/2013 | Szabo et al. |
| 2014/0023853 A1 | 1/2014 | Gueret et al. |
| 2018/0259229 A1 | 9/2018 | Moghaddam et al. |

FOREIGN PATENT DOCUMENTS

| | | |
|---|---|---|
| WO | 2015103199 A1 | 7/2015 |
| WO | 2017058747 A1 | 4/2017 |

OTHER PUBLICATIONS

Int'l Search Report & Written Opinion, dated Jul. 31, 2020 [cited in Parent U.S. Appl. No. 16/826,469, filed Mar. 23, 2020].

Non-Final Office Action dated Feb. 27, 2023 received in U.S. Appl. No. 17/166,658, filed Feb. 2, 2021.

Non-Final Office Action dated May 2, 2023 received in U.S. Appl. No. 18/093,147.

* cited by examiner

SYSTEMS AND METHODS FOR HIGH ENERGY DENSITY HEAT TRANSFER

CROSS-REFERENCE TO RELATED APPLICATIONS

For U.S. purposes, the instant application is a continuation-in-part of U.S. application Ser. No. 16/826,469 filed Mar. 23, 2020, published as US2020/0363108 on Nov. 19, 2020, and allowed on Oct. 31, 2020. U.S. application Ser. No. 16/826,469 claims priority to U.S. provisional application Nos. 62/822,501 filed Mar. 22, 2019; 62/872,851 filed Jul. 11, 2019; 62/976,398 filed Feb. 14, 2020; 62/984,394 filed Mar. 3, 2020 and 62/988,999 filed Mar. 13, 2020. The application also claims priority to U.S. Provisional Application No. 62/969,211 filed Feb. 3, 2020 and U.S. Provisional Application No. 62/969,774 filed Feb. 4, 2020. All of the aforementioned applications are incorporated herein by reference.

FIELD OF THE TECHNOLOGY

The instant application pertains to novel processes and systems for heat transfer, refrigeration, energy storage, and various cooling and heating processes.

BACKGROUND AND SUMMARY

Prior art processes and systems for heating, cooling, heat transfer, refrigeration, and thermal storage are often energy intensive, are inefficient, negatively affect climate change, and/or require expensive, inefficient, and/or relatively ineffective chemicals or equipment. What is needed are cost-effective and efficient processes and/or systems that are more energy efficient, environmentally friendly, and/or offer other benefits. Advantageously, the processes and systems described herein may address at least one up to all of the aforementioned needs and may have even additional benefits.

In some embodiments the instant application pertains to processes for heat transfer. The processes may comprise cooling a liquid-liquid phase transition liquid comprising two liquid phases below an exothermic liquid-liquid phase transition temperature range to form a liquid-liquid phase transition liquid comprising one liquid phase. The one liquid phase may be cooled below a temperature of a solid-liquid phase change to form a composition comprising a solid-liquid slurry. At least a portion of said solid-liquid slurry may be transferred to an application requiring cooling, a heat source, or both.

In another embodiment the application pertains to a process for heat transfer comprising cooling a liquid-liquid phase transition liquid comprising a single phase below an exothermic liquid-liquid phase transition temperature range to form a liquid-liquid phase transition liquid comprising two liquid phases. The liquid-liquid phase transition liquid comprising two liquid phases is cooled below a temperature of a solid-liquid phase change to form a composition comprising a solid-liquid slurry. At least a portion of said solid-liquid slurry may be transferred to an application requiring cooling, a heat source, or both.

In another embodiment the application pertains to a process for producing ice. The process comprises mixing one liquid phase of a liquid-liquid phase transition liquid with another liquid phase of a liquid-liquid phase transition liquid to form an exothermic liquid-liquid phase transition. Heat is removed and the liquid-liquid phase transition liquid is mixed with a phase transition temperature adjustment reagent to form an endothermic liquid-liquid phase transition. At least a portion of the liquid-liquid phase transition liquid comprises water. The endothermic liquid-liquid phase transition reduces the temperature to about the freezing point of water or below to freeze at least a portion of liquid water to form ice.

In another embodiment the application pertains to a process comprising mixing two non-contiguous liquid phases to form an endothermic liquid-liquid phase transition liquid. At least a portion of the endothermic liquid-liquid phase transition liquid comprises water. The temperature is reduced to at or below the freezing point of water such that at least a portion of liquid water freezes to form ice.

In another embodiment the application pertains to a process for thermal storage comprising providing a thermal storage reservoir with a first liquid having a first temperature and a second liquid having a lower temperature than the first liquid. The first liquid and said second liquid are layered within the tank due to a difference in density between said first and second liquid. The density difference is due to a difference in composition, concentration, or both. The thermal storage reservoir is charged by removing at least a portion of said first liquid and adding at least a portion of said second liquid. The added second liquid's temperature is lower than the first liquid. The thermal reservoir is discharged by removing at least a portion of said second liquid and adding at least a portion of said first liquid. The added first liquid's temperature is higher than the second liquid.

In another embodiment the application pertains to a process for thermal storage comprising providing a thermal storage reservoir with a first liquid having a first temperature and a second liquid having a lower temperature than the first liquid. The first liquid and said second liquid are layered within the tank due to a difference in density between said first and second liquid. The density difference is due to a difference in composition, concentration, or both. The thermal storage reservoir is charged by removing at least a portion of said second liquid and adding at least a portion of said first liquid. The added first liquid's temperature is higher than the second liquid. The thermal reservoir is discharged by removing at least a portion of said first liquid and adding at least a portion of said second liquid. The added second liquid's temperature is lower than the first liquid.

DETAILED DESCRIPTION

Figure 1A:
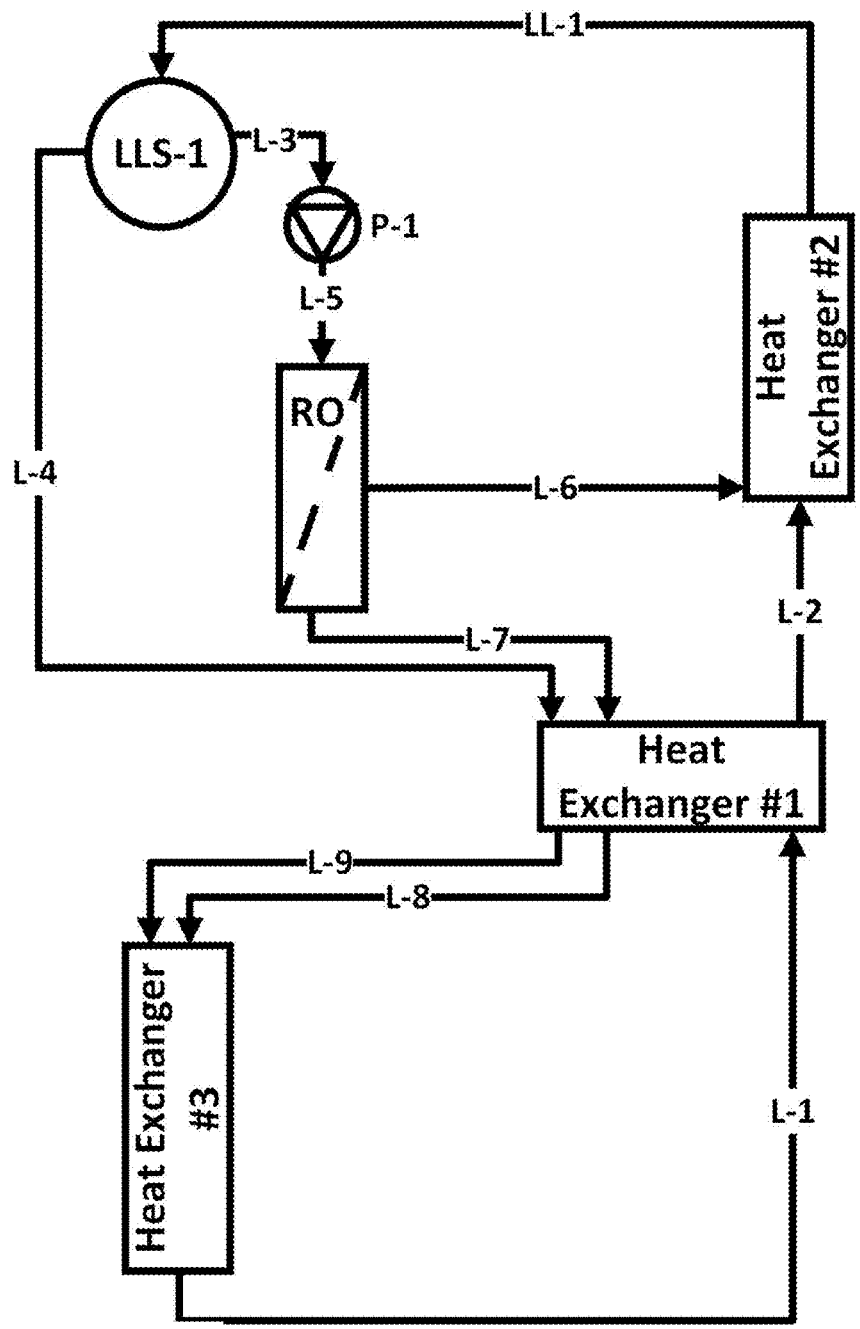
FIG. 1A: Liquid-Liquid Phase Transition Refrigeration Cycle with Mixing Inside Heat Exchanger.

Example Definitions
  Overlapping: Overlapping phase transition or phase change may comprise a phase transition or phase change which occurs at the same temperature in at least a portion of the temperature range of another phase transition or phase change.
  Adjacent or Near: Adjacent temperature phase transition or phase change may comprise a phase transition or phase change temperature range which partially overlaps with the temperature range of another phase transition or phase change and/or may possess a phase transition or phase change temperature range at least partially outside of the temperature range of the other phase transition or phase change. Adjacent temperature phase transition or phase change may comprise a phase transition or phase change temperature range which is different from another phase transition or phase change temperature range by greater than or equal to or less than or a combination thereof, one or more or a combination of the following: 0° C., or 0.5° C., or 1°

C., or 2° C., or 3° C., or 4° C., or 5° C., or 6° C., or 7° C., or 8° C., or 9° C., or 10° C., or 15° C., or 20° C.

Significantly Different from: A phase transition or phase change which occurs at a significantly different temperature than another phase transition or phase change may comprise a phase transition or phase change temperature range which is different from another phase transition or phase change temperature range by greater than or equal to or less than or a combination thereof, one or more or a combination of the following: 0.5° C., or 1° C., or 2° C., or 3° C., or 4° C., or 5° C., or 6° C., or 7° C., or 8° C., or 9° C., or 10° C., or 15° C., or 20° C.

Baseline Specific Heat Capacity: The specific heat capacity of a material excluding enthalpies of phase change or enthalpies of phase transition.

Liquid-Liquid Phase Transition Liquid: A liquid which absorbs or releases heat while remaining at a liquid phase in a manner which deviates from said liquid's baseline specific heat capacity. Alternatively or additionally, a liquid or mixture of liquids which changes in number or composition or distributing of liquid phases in response to changes in stimuli, such as temperature, light, concentration, presence of one or more chemicals, or electromagnetic properties.

Liquid Phase: A liquid state of a material.

Solid-Liquid Phase Change Material: A material which changes from a solid to a liquid or a liquid to a solid at a temperature or temperature range. A material which absorbs or releases heat in deviation from its baseline specific heat capacity in a temperature range while transforming from a solid to a liquid, or from a liquid to a solid.

Solid-Solid Phase Change Material or Solid-Solid Phase Transition Material: A material which absorbs or releases heat in deviation from its baseline specific heat capacity in a temperature range while remaining at a solid phase.

UCST (upper critical solution temperature): A liquid-liquid phase transition which involves an endothermic phase transition when two liquid phases are mixed to form a single liquid phase and/or an exothermic phase transition when a single liquid phase transforms into a multi-liquid phase mixture.

LCST (lower critical solution temperature): A liquid-liquid phase transition which involves an exothermic phase transition when two liquid phases are mixed to form a single liquid phase and/or an endothermic phase transition when a single liquid phase transforms into a multi-liquid phase mixture.

Liquid-Liquid Phase Transition Temperature Adjustment Reagent: A reagent whose presence and/or concentration in a liquid-liquid phase transition liquid influences one or more or a combination of a liquid-liquid phase transition liquid's properties.

Enthalpy of liquid-liquid phase transition temperature range: A temperature range which a liquid-liquid phase transition liquid deviates from its baseline specific heat capacity.

Liquid-liquid phase transition temperature range: May refer to visual or physical liquid-liquid phase transition temperature range, for example, one which can be measured by particle counting method. May refer to enthalpy of liquid-liquid phase transition temperature range, which may refer to the temperature range wherein heat is absorbed or released during a liquid-liquid phase transition, which may be measured using calorimetry. In some liquid-liquids, the temperature range of the enthalpy of liquid-liquid phase transition may be the same or different from the visual or physical liquid-liquid phase transition temperature range. As used herein, if one or more substances are said to be "below" a liquid-liquid phase transition temperature range, then it should be understood that the temperature of the one or more substances is below an upper temperature limit of the liquid-liquid phase transition temperature range and not necessarily below the entirety of the range. That is, the temperature of the one or more substances may be anywhere within the liquid-liquid phase transition temperature range or may be below the lower limit of the liquid-liquid phase transition temperature range. In some cases a liquid-liquid phase transition liquid may be described as comprising two phases and when cooled below a liquid-liquid phase transition temperature range it forms a liquid-liquid phase transition liquid comprising one phase. As used herein, that means at least a portion of the two phases forms one phase. However, in some embodiments the entirety of the two phases may form one phase.

As used herein, if one or more substances are said to be "above" a liquid-liquid phase transition temperature range, then it should be understood that the temperature of the one or more substances is above a lower temperature limit of the liquid-liquid phase transition temperature range and not necessarily above the entirety of the range. That is, the temperature of the one or more substances may be anywhere within the liquid-liquid phase transition temperature range or may be above the higher limit of the liquid-liquid phase transition temperature range. In some cases a liquid-liquid phase transition liquid may be described as comprising two phases and when heated above a liquid-liquid phase transition temperature range it forms a liquid-liquid phase transition liquid comprising one phase. As used herein, that means at least a portion of the two phases forms one phase. However, in some embodiments the entirety of the two phases may form one phase.

Non-Contiguously Separate Heat Exchanger: A heat exchanger which heat exchanges two or more materials while ensuring said two or more materials are physically separate or not in direct contact during heat exchanging.

Adiabatic Temperature Change of the Enthalpy of a Liquid-Liquid Phase Transition: The change in temperature of a liquid-liquid phase transition liquid when undergoing a liquid-liquid phase transition from beginning to completion, or within a desired temperature range, or both when no heat is added or removed during said liquid-liquid phase transition. In some instances, an adiabatic temperature change of a liquid-liquid phase transition liquid may be calculated by multiplying a liquid-liquid phase transition liquid's baseline specific heat capacity by its enthalpy of liquid-liquid phase transition.

Single liquid phase combined solution: Solution comprising at least a portion a single liquid phase comprising the essential reagents for a liquid-liquid phase transition liquid.

Process Requiring Heating: May comprising a process which needs to be heated, or a heat sink, or cooling source, or a cooling system, or a heat removal process, or a combination thereof.

Process Requiring Cooling: May comprising a process which needs to be cooled, or a heat source, or a heating system, or a heating process, or a combination thereof.

Warm: A temperature higher than 'cold'.

Cold or Cool: A temperature lower than 'warm'.

Concentration: The mass or volume or a combination thereof percentage in a material or mixture Composition: The concentration and/or type of reagents in a material or mixture Adiabatic Temperature Rise or Adiabatic Temperature Fall: The change in temperature of a phase transition or phase change or reacting or a combination thereof material when undergoing a phase transition or phase change from beginning to completion, or within a desired temperature range, or both when no heat is added or removed during said phase transition or phase change. In some instances, an adiabatic temperature change of a material may be calculated by multiplying a material's baseline specific heat capacity by its enthalpy of liquid-liquid phase transition.

Mixing: "Mixing" as used herein includes both passive and active mixing. That is, mixing may include simply allowing two or more substances or liquids to mix without added energy.

Most applications employing heat transfer or thermal storage or both can benefit from greater heat capacity or greater specific heat capacity. Improving heat capacity may increase energy efficiency, reduce required flow rates, reduce required mass, reduce required size, and/or make previously thermodynamically impossible processes possible. In applications where chilled water possesses insufficient cooling capacity, slurries of ice and water are employed in the art to increase effective heat capacity. Ice-water slurries have several challenges and limitations. Due to the challenges of ice-water slurries, applications have been limited to that where enhanced heat capacity is absolutely required. Example applications where enhanced heat capacity are essential include, for example, organ cooling, cryosurgery, organ transplants, mine cooling, and thermal energy storage. Even in applications where enhanced heat capacity is essential, the challenges and limitations of ice-water slurries have limited the potential effectiveness of these applications. For example, ice-water slurries only have enhanced heat capacity at the temperature of the freezing point of ice, or 0° C. In cryosurgery and organ cooling, for example, the freezing point of the ice can be too cold for the cryosurgery and organ cooling and can lead to organ damage and uneven cooling. In cryosurgery and organ cooling, for example, the solid ice crystals in the ice-water slurries can lead to organ damage and may limit its applicability. In thermal energy storage, for example, the ice can clump and limit heat transfer efficiency. In thermal energy storage, for example, ice-water slurries only have enhanced heat capacity at the temperature of the freezing point of ice, or about 0° C., which can reduce COP or efficiency when 0° C. is below the required temperature of an application, such as thermal storage. In mines and other applications which may require long distance pumping, ice-water slurries can only have a limited concentration of ice due to pumping challenges which occur at higher ice concentrations. There is a significant need for solid-free liquids with heat capacity greater than water. There is also a significant need for slurries with even greater heat capacity, or broader temperature ranges of enhanced heat capacity, or more flexible temperature ranges of enhanced heat capacity, or a combination thereof.

High enthalpy of liquid-liquid phase transition liquid-liquid phase transition liquids, which may be introduced herein, may act as a replacement for ice-water slurries. For example, non-toxic, biologically safe, high enthalpy of liquid-liquid phase transition liquid-liquid phase transition liquids may be employed in biological applications. In, for example, cryosurgery, organ cooling, and organ storage, non-toxic, biologically safe, high enthalpy of liquid-liquid phase transition liquid-liquid phase transition liquids may enable optimal temperature cooling by matching the temperature range of the enthalpy of liquid-liquid phase transition with the optimal temperature for cryosurgery, organ cooling, or organ storage. In, for example, cryosurgery, organ cooling, cryopreservation, and organ storage, non-toxic, biologically safe, high enthalpy of liquid-liquid phase transition liquid-liquid phase transition liquids may enable more evenly distributed cooling due to, for example superior flow characteristics and control over the initiation of an enthalpy of liquid-liquid phase transition. For example, in mine cooling, liquid-liquid phase transition liquids may possess superior flow characteristics, better pumpability, increased energy efficiency, and greater heat capacity.

Due to the unprecedented properties and capabilities of high enthalpy of liquid-liquid phase transition liquid-liquid phase transition liquids, new applications may be realized. For example, high enthalpy of liquid-liquid phase transition liquid-liquid phase transition liquids may be employed as a replacement for water or chilled water in HVAC and process cooling or heating systems, which may increase efficiency, or reduce CAPEX, or reduce required size, or reduce required flow rates, or unleash new capabilities. For example, high enthalpy of liquid-liquid phase transition liquid-liquid phase transition liquids may be employed instead of or in addition to chilled water or ice or PCMs, which may, for example, increase energy density, reduce delta-T, increase efficiency, increase longevity, enable custom design temperature ranges, adjustable or tunable temperature ranges, enable new storage configurations, enable new storage gradients, unleash new capabilities, or result in other benefits. For example, high enthalpy of liquid-liquid phase transition liquid-liquid phase transition liquids may be employed instead of or in addition to chilled water or antifreeze in electric vehicle cooling, or battery cooling, or charging cable cooling, or electronics cooling, or a combination thereof. For example, high enthalpy of liquid-liquid phase transition liquid-liquid phase transition liquids may be employed instead of or in addition to refrigerants, or chilled water, or antifreeze, or ice-water slurries, or a combination thereof in cold storage, or food cooling, or food storage, or cold chain, or thermal storage, or heating, or cooling, or a combination thereof.

In some embodiments, high enthalpy of phase transition liquid-liquid phase transition liquids may enable new capabilities in cooling or heating control and targeted cooling or heating. For example, a liquid-liquid phase transition composition may be transferred to an application as two or more separate liquid phases, which may be non-contiguously separate. Upon mixing the two or more separate liquid phases, an enthalpy of liquid-liquid phase transition may occur, which may absorb or release heat. Mixing may occur in a specific location where cooling or heating may be required. Advantageously, the high enthalpy of phase transition liquid-liquid phase transition liquid may remain at a liquid phase throughout an enthalpy of phase transition, which may enable applications where changes in physical state of matter (such as from solid to liquid or liquid to gas) may be problematic. For example, in some biological cooling applications, remaining at a constant state of matter and/or density may be beneficial to, for example, minimize potential damage to tissues or organs. In some embodiments, mixing of the two or more separate liquid phases may result in the formation of a single liquid phase or less liquid phases. In some embodiments, mixing of the two or more separate liquid phases may result in the formation of two or more liquid phases with different ratios of reagents.

In some embodiments, solid-liquid phase change materials may be combined with high enthalpy of phase transition liquid-liquid phase transition liquids. For example, high enthalpy of phase transition liquid-liquid phase transition liquids may reduce or eliminate the concentration of or need for ice in a heat transfer media or thermal storage media, in applications, which may include, but are not limited to, for example, mine cooling, cold chain, or thermal storage. For example, ice—high enthalpy of phase transition liquid-liquid phase transition liquids may possess a greater total heat capacity compared to an ice-water slurry. For example, if the ratio of liquid to ice is the same, the heat capacity of a high enthalpy of phase transition liquid-liquid phase transition liquid mixed with ice will significantly exceed the heat capacity of a water-ice slurry.

Below is a table comparing the required ice concentration to achieve a certain heat capacity in an ice—water mixture vs. an ice—high enthalpy of liquid-liquid phase transition liquid in a 0-15° C. temperature range. While the liquid-liquid phase transition liquid employed in the present application is not particularly critical and may vary depending upon the desired application and other factors, the high enthalpy of liquid-liquid phase transition liquid employed in the present example is referred to as 'EXAMPLE LIQUID'. EXAMPLE LIQUID has an enthalpy of phase transition of about 33.62 kJ/kg solution occurring primarily between 5° C. to 15° C. As shown in the below table, significantly less ice or lower concentrations of ice may be required in ice—high enthalpy of liquid-liquid phase transition liquid mixtures than in ice—water mixtures to achieve the same total heat capacity.

| Compositions and Amounts to Achieve Each Total Heat Capacity in a 0° C.-15° C. Temperature Range | | | | |
|---|---|---|---|---|
| Total Heat Capacity in 0° C.-15° C. | Water or Ice + Water Slurry | | EXAMPLE LIQUID or Ice + EXAMPLE LIQUID Slurry | |
| | Ice | Water | Ice | EXAMPLE LIQUID |
| 63 kJ/kg | 0 kg | 1 kg | 0 kg | 0.652 kg |
| 96.62 kJ/kg | 0.101 kg | 0.899 kg | 0 kg | 1 kg |
| 129.71 kg/kg | 0.2 kg | 0.8 kg | 0.099 kg | 0.901 kg |

Below is a table comparing the total heat capacity of ice—liquid slurries with the same concentration of ice in a 0-15° C. temperature range, specifically comparing ice-water slurries with ice—high enthalpy of liquid-liquid phase transition liquid slurries. The high enthalpy of liquid-liquid phase transition liquid employed in the present example is referred to as 'EXAMPLE LIQUID and has an enthalpy of phase transition of about 33.62 kJ/kg solution occurring primarily between 5° C. to 15° C. As shown in the below table, significantly greater total heat capacity may be achieved with the same ice concentrations in an ice—high enthalpy of liquid-liquid phase transition liquid slurries vs. ice—water slurries. As shown in the below table, 10% ice in EXAMPLE LIQUID has the same total heat capacity as 20% ice in water in the temperature range of 0-15° C.

| Total Heat Capacity (0-15° C.) Water vs. SolvCor Liquid #213 at Different Ice Concentrations | | |
|---|---|---|
| Ice Concentration (wt %) | Water | EXAMPLE LIQUID |
| 0% | 63 kJ/kg | 96.62 kJ/kg |
| 10% | 96.39 kJ/kg | 129.98 kJ/kg |
| 20% | 129.75 kJ/kg | 163.34 kJ/kg |

In some embodiments, a solid-liquid phase change material may be combined with a high enthalpy of phase transition liquid-liquid phase transition to create a composition wherein the temperature of the solid-liquid phase change overlaps with the temperature range of the enthalpy phase transition of the liquid-liquid phase transition. For example, a liquid-liquid phase transition liquid with an enthalpy of phase transition in a certain temperature range may be mixed with a solid-liquid phase change material with a solid-liquid phase change within that temperature range. For example, in some embodiments, a solid liquid phase change material may comprise a different reagent or composition than the reagents or compositions comprising the liquid-liquid phase transition liquid, wherein the temperature of said solid-liquid phase change is overlapping with the temperature range of the enthalpy of phase transition of the liquid-liquid phase transition. For example, in some embodiments, a component of a liquid-liquid phase transition liquid composition may possess a solid liquid phase change, wherein the temperature of said solid-liquid phase change is overlapping to the temperature range of the enthalpy of phase transition of the liquid-liquid phase transition. There may be multiple benefits to a composition which possesses a solid-liquid phase change and enthalpy of liquid-liquid phase transition in an overlapping temperature range. Said benefits may include, but are not limited to, one or more or a combination of the following:

For example, the heat capacity in the overlapping temperature range may significantly exceed the heat capacity of a solid-liquid phase change material slurry alone or a liquid-liquid phase transition liquid alone.

For example, in applications, where the solid-liquid phase change material concentration in a liquid slurry is limited, due to, for example, clumping or pumping challenges, combining a high enthalpy of phase transition liquid-liquid phase transition liquid with a solid-liquid phase change material with overlapping enthalpies of phase transition may enable greater heat capacity or specific heat capacity or both without increasing the concentration of solid-liquid phase change material.

For example, a high enthalpy of phase transition liquid-liquid phase transition liquid combined with a solid-liquid phase change material with overlapping temperatures of enthalpy of phase transition may advantageously possess a redundancy. The solid-liquid phase change and liquid-liquid phase transition may possess independent or unrelated mechanisms by which their enthalpies of phase transition occur. Said independent or unrelated mechanisms may mean some phase transitions or phase changes may occur under conditions which other phase transitions or phase changes may not occur. For example, some phase transitions or phase changes may be sensitive to other factors, such as agitation, light, or sound, which may influence on phase transition or phase change differently than another phase transition or phase change. For example, some phase transitions or phase changes may be capable of supercooling or superheating, while some other phase transitions or phase changes may be less capable of supercooling or superheating. For example, the phase transition or phase change of one mechanism may facilitate the phase transition or phase change of another mechanism, which may, for example, prevent supercooling or superheating.

For example, one phase transition or phase change may facilitate the initiation of another or separate phase transition or phase change. For example, the occurrence of a liquid-liquid phase transition may help facilitate the initiation or heat transfer or both to enable a solid-liquid phase change. For example, the occurrence of a solid-liquid phase change may help facilitate the initiation or heat transfer or both to enable a liquid-liquid phase transition. For example, solid-liquid phase changes may enable liquid-liquid phase transitions to mix or may function to facilitate mixing. For example, liquid-liquid phase transitions may enable nucleation or mixing to facilitate a solid-liquid phase change. For example, in environments without, for example, significant external agitation, the initiation of one phase transition or phase change may facilitate the initiation of another phase transition or phase change.

For example, the ultra-high practical specific heat capacity may enable greater heat transfer and greater energy density, which may enable smaller or more efficient systems.

For example, the convective heat transfer of both the liquid-liquid phase transition and solid-liquid phase change may enhance heat transfer coefficient or improve other heat transfer properties.

For example, the latent heat of the liquid-liquid phase transition and the solid-liquid phase change may enhance heat transfer coefficient or improve other heat transfer properties.

For example, a composition which possesses a solid-liquid phase change and enthalpy of liquid-liquid phase transition in an overlapping temperature range may be employed to prevent a process from operating below or above a certain temperature.

In some embodiments, a solid-liquid phase change material may be combined with a high enthalpy of phase transition liquid-liquid phase transition liquid to create a composition wherein the temperature of the solid-liquid phase change is near or adjacent to the temperature range of the enthalpy phase transition of the liquid-liquid phase transition. For example, a liquid-liquid phase transition liquid with an enthalpy of phase transition in a certain temperature range may be mixed with a solid-liquid phase change material with a solid-liquid phase change temperature adjacent to said certain temperature range. For example, in some embodiments, a solid liquid phase change material may comprise a different reagent or composition than the reagents or compositions comprising the liquid-liquid phase transition liquid, wherein the temperature of said solid-liquid phase change is adjacent to the temperature range of the enthalpy of phase transition of the liquid-liquid phase transition. For example, in some embodiments, a component of a liquid-liquid phase transition liquid composition may possess a solid liquid phase change, wherein the temperature of said solid-liquid phase change is adjacent to the temperature range of the enthalpy of phase transition of the liquid-liquid phase transition. There may be multiple benefits to a composition which possesses a solid-liquid phase change and enthalpy of liquid-liquid phase transition in adjacent temperature ranges. Said benefits may include, but are not limited to, one or more or a combination of the following:

- For example, the total heat capacity in the temperature ranges of the adjacent phase transitions and/or phase changes may significantly exceed the heat capacity of a solid-liquid phase change material slurry alone or a liquid-liquid phase transition liquid alone.
- For example, the temperature range of greater effective specific heat capacity may be greater than that of a solid-liquid phase change material alone, or solid-liquid phase change material slurry alone, or a liquid-liquid phase transition liquid alone.
- For example, in applications where the solid-liquid phase change material concentration in a liquid slurry is limited, due to, for example, clumping or pumping challenges, combining a high enthalpy of phase transition liquid-liquid phase transition liquid with a solid-liquid phase change material with adjacent temperature enthalpies of phase transition may enable greater heat capacity or specific heat capacity or both without increasing the concentration of solid-liquid phase change material.
- For example, a high enthalpy of phase transition liquid-liquid phase transition liquid combined with a solid-liquid phase change material with adjacent temperatures of enthalpy of phase transition may advantageously possess a redundancy. The solid-liquid phase change and liquid-liquid phase transition may possess independent or unrelated mechanisms by which their enthalpies of phase transition occur. Said independent or unrelated mechanisms may mean some phase transitions or phase changes may occur under conditions which other phase transitions or phase changes may not occur. For example, some phase transitions or phase changes may be sensitive to other factors, such as agitation, light, or sound, which may influence on phase transition or phase change differently than another phase transition or phase change. For example, some phase transitions or phase changes may be capable of supercooling or superheating, while some other phase transitions or phase changes may be less capable of supercooling or superheating. For example, the phase transition or phase change of one mechanism may facilitate the phase transition or phase change of another mechanism, which may, for example, prevent supercooling or superheating.
- For example, one phase transition or phase change may facilitate the initiation of another or separate phase transition or phase change. For example, the occurrence of a liquid-liquid phase transition may help facilitate the initiation or heat transfer or both to enable a solid-liquid phase change. For example, the occurrence of a solid-liquid phase change may help facilitate the initiation or heat transfer or both to enable a liquid-liquid phase transition. For example, solid-liquid phase changes may enable liquid-liquid phase transitions to mix or may function to facilitate mixing. For example, liquid-liquid phase transitions may enable nucleation or mixing to facilitate a solid-liquid phase change. For example, in environments without, for example, significant external agitation, the initiation of one phase transition or phase change may facilitate the initiation of another phase transition or phase change.

For example, the ultra-high practical specific heat capacity may enable greater heat transfer and greater energy density, which may enable smaller or more efficient systems.

For example, the convective heat transfer of both the liquid-liquid phase transition and solid-liquid phase change may enhance heat transfer coefficient or improve other heat transfer properties.

For example, the latent heat of the liquid-liquid phase transition and the solid-liquid phase change may enhance heat transfer coefficient or improve other heat transfer properties.

For example, a composition which possesses a solid-liquid phase change and enthalpy of liquid-liquid phase transition in an adjacent temperature range may be employed to prevent a process from operating below or above a certain temperature.

For example, may enable the creation of thermal storage systems with greater temperature flexibility, or broader operating temperature range, or both. For example, a thermal storage system may store heat or 'cool' in the temperature range of a liquid-liquid phase transition, which, in some embodiments, may have an adjustable temperature range of enthalpy of phase transition or a broad temperature range of an enthalpy of phase transition or both. It is important to note thermal storage may also refer to thermal storage media, which may include heat transfer media and heat transfer applications.

If one of the applications for the thermal storage is 'cold' thermal storage and the enthalpy of phase transition temperature of the liquid-liquid phase transition liquid is a higher temperature than the solid-liquid phase change temperature, it may be more energy efficient for the thermal storage process to store 'cold' in the temperature range of the liquid-liquid phase transition enthalpy of phase transition, and, only when necessary or desirable, store 'cold' in the temperature range of the solid-liquid phase change. Even if a thermal storage stores in the temperature range of the solid-liquid phase change, the ability to store cold in the higher temperature range of the liquid-liquid phase transition enthalpy of phase transition may increase the energy efficiency or COP of a cooling system.

If one of the applications for the thermal storage is 'cold' thermal storage and the enthalpy of phase transition temperature of the liquid-liquid phase transition liquid is a lower temperature than the solid-liquid phase change temperature, it may be more energy efficient for the thermal storage process to store in the temperature range of the solid-liquid phase change, and, only when necessary or desirable, store 'cold' in the temperature range of the enthalpy of phase transition of the liquid-liquid phase transition. Even if a thermal storage stores in the 'cold' temperature range of the enthalpy of phase transition of the liquid-liquid phase transition, the ability to store cold in the higher temperature range of the solid liquid phase change may increase the energy efficiency or COP of a cooling system.

If one of the applications for the thermal storage is 'warm' thermal storage and the enthalpy of phase transition temperature of the liquid-liquid phase transition liquid is a lower temperature than the solid-liquid phase change temperature, it may be more energy efficient for the thermal storage process to store heat in the temperature range of the liquid-liquid phase transition enthalpy of phase transition, and, only when necessary or desirable, store heat in the temperature range of the solid-liquid phase change. Even if a thermal storage stores in the temperature range of the solid-liquid phase change, the ability to store heat in the lower temperature range of the liquid-liquid phase transition enthalpy of phase transition may increase the energy efficiency or COP of a heating system.

If one of the applications for the thermal storage is 'warm' thermal storage and the enthalpy of phase transition temperature of the liquid-liquid phase transition liquid is a higher temperature than the solid-liquid phase change temperature, it may be more energy efficient for the thermal storage process to store heat in the temperature range of the solid-liquid phase change, and, only when necessary or desirable, store heat in the temperature range of the enthalpy of phase transition of the liquid-liquid phase transition. Even if a thermal storage stores in the temperature range of the enthalpy of phase transition of the liquid-liquid phase transition, the ability to store heat in the lower temperature range of the solid liquid phase change may increase the energy efficiency or COP of a cooling system.

In some embodiments, a thermal storage system comprising a high enthalpy of phase transition liquid-liquid phase transition liquid and a solid-liquid phase change liquid may possess an adjustable enthalpy of phase transition or phase change temperature. For example, the high enthalpy of phase transition liquid-liquid phase transition liquid may be adjusted by, for example, adjusting the concentration or composition of one or more reagents. For example, if the solid-liquid phase change material is insoluble in the liquid-liquid phase transition liquid under at least some conditions, said solid-liquid phase change material may be separated and/or removed and/or replaced with a solid-liquid phase change material with a phase change temperature overlapping with or adjacent to the temperature of the enthalpy of phase transition of the high enthalpy of phase transition liquid-liquid phase transition liquid. Adjustments in phase transition or phase change temperature may be in response to changes in required design temperature, such as, for example, including, but not limited to, one or more or a combination of the following: changes in weather, changes in seasons, or changing process requirements.

In some embodiments, a solid-liquid phase change material may be combined with a high enthalpy of phase transition liquid-liquid phase transition liquid to create a composition wherein the temperature of the solid-liquid phase change is significantly different from the temperature range of the enthalpy phase transition of the liquid-liquid phase transition. For example, a liquid-liquid phase transition liquid with an enthalpy of phase transition in a certain temperature range may be mixed with a solid-liquid phase change material with a solid-liquid phase change temperature significantly different from said certain temperature range. For example, in some embodiments, a solid-liquid phase change material may comprise a different reagent or composition than the reagents or compositions comprising the liquid-liquid phase transition liquid, wherein the temperature of said solid-liquid phase change is significantly different from the temperature range of the enthalpy of phase transition of the liquid-liquid phase transition. For example, in some embodiments, a component of a liquid-liquid phase transition liquid composition may possess a solid-liquid phase change, wherein the temperature of said solid-liquid phase change is significantly different from the temperature range of the enthalpy of phase transition of the liquid-liquid phase transition. There may be multiple benefits to a composition which possesses a solid-liquid phase change and enthalpy of liquid-liquid phase transition in adjacent temperature ranges. Said benefits may include, but are not limited to, one or more or a combination of the following:

For example, the total heat capacity phase transitions and/or phase changes may significantly exceed the heat capacity of a solid-liquid phase change material slurry alone or a liquid-liquid phase transition liquid alone.

For example, the temperature range of greater effective specific heat capacity may be greater than that of a solid-liquid phase change material alone, or solid-liquid phase change material slurry alone, or a liquid-liquid phase transition liquid alone.

For example, in applications where the solid-liquid phase change material concentration in a liquid slurry is limited, due to, for example, clumping or pumping challenges, combining a high enthalpy of phase transition liquid-liquid phase transition liquid with a solid-liquid phase change material with significantly different temperature enthalpies of phase transition may enable greater heat capacity or specific heat capacity or both without increasing the concentration of solid-liquid phase change material.

For example, a high enthalpy of phase transition liquid-liquid phase transition liquid combined with a solid-liquid phase change material with significantly different temperatures of enthalpy of phase transition may advantageously possess a redundancy. The solid-liquid phase change and liquid-liquid phase transition may possess independent or unrelated mechanisms by which their enthalpies of phase transition occur. Said independent or unrelated mechanisms may mean some phase transitions or phase changes may occur under conditions which other phase transitions or phase changes may not occur. For example, some phase transitions or phase changes may be sensitive to other factors, such as agitation, light, or sound, which may influence on phase transition or phase change differently than another phase transition or phase change. For example, some phase transitions or phase changes may be capable of supercooling or superheating, while some other phase transitions or phase changes may be less capable of supercooling or superheating. For example, the phase transition or phase change of one mechanism may facilitate the phase transition or phase change of another mechanism, which may, for example, prevent supercooling or superheating.

For example, one phase transition or phase change may facilitate the initiation of another or separate phase transition or phase change. For example, the occurrence of a liquid-liquid phase transition may help facilitate the initiation or heat transfer or both to enable a solid-liquid phase change. For example, the occurrence of a solid-liquid phase change may help facilitate the initiation or heat transfer or both to enable a liquid-liquid phase transition. For example, solid-liquid phase changes may enable liquid-liquid phase transitions to mix or may function to facilitate mixing. For example, liquid-liquid phase transitions may enable nucleation or mixing to facilitate a solid-liquid phase change. For example, in environments without, for example, significant external agitation, the initiation of one phase transition or phase change may facilitate the initiation of another phase transition or phase change.

For example, the ultra-high practical specific heat capacity may enable greater heat transfer and greater energy density, which may enable smaller or more efficient systems.

For example, the convective heat transfer of both the liquid-liquid phase transition and solid-liquid phase change may enhance heat transfer coefficient or improve other heat transfer properties.

For example, the latent heat of the liquid-liquid phase transition and the solid-liquid phase change may enhance heat transfer coefficient or improve other heat transfer properties.

For example, a composition which possesses a solid-liquid phase change and enthalpy of liquid-liquid phase transition in significantly different temperature ranges may be employed to prevent a process from operating below or above a certain temperature.

For example, may enable the creation of thermal storage systems with greater temperature flexibility, or broader operating temperature range, or both.

For example, may enable the creation of distinct and/or redundant temperature boundaries for a process. For example, may ensure or facilitate a process operation within certain temperature range and/or may enable distinct temperature boundaries with phase transition materials with distinct/separate phase change properties or characteristics.

For example, lithium ion batteries operate best in an optimal or desired temperature range, which is generally from 5° C. to 45° C., although room temperature is generally considered an ideal temperature for lithium ion batteries. An example thermal storage system for a lithium ion battery system may involve a high enthalpy of phase transition liquid-liquid phase transition near 45° C. and a solid-liquid phase change near 5° C. An example thermal storage system for a lithium ion battery system may involve a high enthalpy of phase transition liquid-liquid phase transition near room temperature and a solid-liquid phase change near 45° C. or near 5° C.

In some embodiments, a process may be designed to employ a heat transfer medium comprising both a high enthalpy of phase transition liquid-liquid phase transition liquid and a solid-liquid phase change material. In some embodiments, a process may be designed to cool the heat transfer medium with two or more cooling sources or cooling processes or cooling steps. For example, in some embodiments, a cooling source or a cooling process or cooling step may be employed to cool the heat transfer medium a within an enthalpy of phase transition temperature range of the high enthalpy of phase transition liquid-liquid phase transition liquid and another cooling source or cooling process or cooling step may be employed to cool the heat transfer medium within a solid-liquid phase change temperature.

For example, it may be desirable, for example, to employ different or distinct cooling sources or cooling processes for the high enthalpy of phase transition liquid-liquid phase transition liquid than the solid-liquid phase change, if, for example, the phase transition and/or phase change temperatures or temperature ranges are adjacent, or significantly different, or both.

For example, in some embodiments, a high enthalpy of liquid-liquid phase transition liquid may possess an enthalpy of phase transition at a higher temperature range than a solid-liquid phase change. It may be desirable to cool in the temperature range of the enthalpy of phase transition of the liquid-liquid phase transition liquid using a cooling source or cooling process which is lower cost, or requires less electrical energy, or less valuable energy, or a combination thereof, than the cooling source or cooling process of the solid-liquid phase change temperature range. For example, said cooling sources or cooling processes with lower cost, or requiring less electrical energy, or less valuable energy, or a combination thereof may include, but are not limited to, one or more or a combination of the following: higher coefficient of performance cooling, or lower heat exchange delta-T cooling, or ocean water cooling, or lake water cooling, or evaporative cooled water cooling, or deep ocean water cooling, or air cooling. The present example may be advantageous, for example, including, but not limited to, in embodiments where the high enthalpy of liquid-liquid phase transition liquid has an enthalpy of phase transition temperature range greater than 0° C. and the solid-liquid phase change has a phase change temperature near 0° C.

For example, in some embodiments, a high enthalpy of liquid-liquid phase transition liquid may possess an enthalpy of phase transition at a lower temperature range than a solid-liquid phase change. It may be desirable to cool in the temperature range of the solid-liquid phase change using a cooling source or cooling process which is lower cost, or requires less electrical energy, or less valuable energy, or a combination thereof, than the cooling source or cooling process of the liquid-liquid phase transition enthalpy of phase transition. For example, said cooling sources or cooling processes with lower cost, or requiring less electrical energy, or less valuable energy, or a combination thereof may include, but are not limited to, one or more or a combination of the following: higher coefficient of performance cooling, or lower heat exchange delta-T cooling, or ocean water cooling, or lake water cooling, or evaporative cooled water cooling, or deep ocean water cooling, or air cooling.

For example, different cooling sources or cooling processes or cooling steps or a combination thereof may be employed for cooling in the liquid-liquid phase transition enthalpy of phase transition temperature range than in the solid-liquid phase change temperature range due to, for example, different requirements or characteristics of cooling the heat transfer medium during a liquid-liquid phase transition than during a solid-liquid phase change. For example, during an enthalpy of liquid-liquid phase transition, it may be desirable for the heat transfer medium to be mixing or, if there are multiple liquid phases present, it may be desirable for the liquid phase to be adequately dispersed within the heat transfer medium. For example, an enthalpy of liquid-liquid phase transition may occur with the heat transfer medium entirely at a liquid phase, which may enable heat transfer in narrower channels, or tighter heat exchangers, or may enable better pumpability or a combination thereof. For example, a solid-liquid phase change may involve the presence of solids in the heat transfer medium, which may involve certain requirements to prevent clogging, or scaling, or ensure appropriate particle size, or a combination thereof during cooling.

For example, in the temperature range of a liquid-liquid phase transition enthalpy of phase transition, the heat transfer medium may be cooled with chilled water, and in the temperature range of a solid-liquid phase change, the heat transfer medium may be cooled with a vacuum chiller or a jacketed heat exchanger or a direct contact heat exchanger or a combination thereof.

For example, in some embodiments, a liquid-liquid phase transition medium may be cooled by a cooling process or cooling source, and then said liquid-liquid phase transition medium may be contacted with or heat exchanged with a solid-liquid phase change material, wherein the solid-liquid phase change material at least partially undergoes a phase change. In some embodiments a liquid-liquid phase transition liquid may be employed as a heat transfer medium to facilitate the cooling or heating of a solid-liquid phase change material.

For example, in some embodiments, the same cooling source or cooling process may be employed for cooling in the temperature ranges of the enthalpy of phase transition of the liquid-liquid phase transition liquid and the temperature of the solid-liquid phase change, however the cooling source or cooling process may cool the heat transfer medium in two distinct steps which may be optimized or designed for the requirements of the liquid-liquid phase transition or solid-liquid phase change or both.

In some embodiments, a process may be designed to employ a heat transfer medium comprising both a high enthalpy of phase transition liquid-liquid phase transition liquid and a solid-liquid phase change material. In some embodiments, a process may be designed to heat the heat transfer medium with two or more heat sources or heating processes or heating steps. For example, in some embodiments, a heat source or a heating process or heating step may be employed to heat the heat transfer medium a within an enthalpy of phase transition temperature range of the high enthalpy of phase transition liquid-liquid phase transition liquid and another heating source or heating process may be employed to heat the heat transfer medium within a solid-liquid phase change temperature.

For example, it may be desirable, for example, to employ different or distinct heating sources or heating processes or heating steps for the high enthalpy of phase transition liquid-liquid phase transition liquid than the solid-liquid phase change material, if, for example, the phase transition and/or phase change temperatures or temperature ranges are adjacent, or significantly different, or both.

For example, in some embodiments, a high enthalpy of liquid-liquid phase transition liquid may possess an enthalpy of phase transition at a lower temperature range than a solid-liquid phase change. It may be desirable to heat in the temperature range of the enthalpy of phase transition of the liquid-liquid phase transition liquid using a heat source or heating process or heating step which is lower cost, or requires less electrical energy, or less valuable energy, or a combination thereof, than the heat source or heating process or heating step of the solid-liquid phase change temperature range. For example, said heat source or heating process or heating step with lower cost, or requiring less electrical energy, or less valuable energy, or a combination thereof may include, but are not limited to, one or more or a combination of the following: higher coefficient of performance heating, or lower heat exchange delta-T heating, or waste heat, or air heating, or warm water heating.

For example, in some embodiments, a high enthalpy of liquid-liquid phase transition liquid may possess an enthalpy of phase transition at a higher temperature range than a solid-liquid phase change material. It may be desirable to heat in the temperature range of the solid-liquid phase change using a heat source, or heating process, or heating step which is lower cost, or requires less electrical energy, or less valuable energy, or a combination thereof, than the heat source or heating process or heating step of the liquid-liquid phase transition enthalpy of phase transition. For example, said heat sources or cooling processes or heating steps with lower cost, or requiring less electrical energy, or less valuable energy, or a combination thereof may include, but are not limited to, one or more or a combination of the following: higher coefficient of performance heating, or lower heat exchange delta-T heating, or waste heat, or air heating, or warm water heating.

For example, different heat sources or heating processes or heating steps or a combination thereof may be employed for heating in the liquid-liquid phase transition enthalpy of phase transition temperature range than in the solid-liquid phase change temperature range due to, for example, different requirements or characteristics of heating the heat transfer medium during a liquid-liquid phase transition than during a solid-liquid phase change. For example, during an enthalpy of liquid-liquid phase transition, it may be desirable for the heat transfer medium to be mixing or, if there are multiple liquid phases present, it may be desirable for the liquid phase to be adequately dispersed within the heat transfer medium. For example, an enthalpy of liquid-liquid phase transition may occur with the heat transfer medium at a liquid phase, which may enable heat transfer in narrower channels, or tighter heat exchangers, or may enable better pumpability or a combination thereof. For example, a solid-liquid phase change may involve the presence of solids in the heat transfer medium, which may involve certain requirements to prevent clogging, or scaling, or ensure appropriate particle size, or a combination thereof during cooling.

For example, in the temperature range of a liquid-liquid phase transition enthalpy of phase transition, the heat transfer medium may be heated with a heat exchanger, and in the temperature range of a solid-liquid phase change, the heat transfer medium may be heated with steam or a direct contact heat exchanger or a jacketed heat exchanger.

For example, in some embodiments, a liquid-liquid phase transition medium may be heated by a heat source, or heating process, or heating step, and then said liquid-liquid phase transition medium may be contacted with or heat exchanged with a solid-liquid phase change material, wherein the solid-liquid phase change material at least partially undergoes a phase change. In some embodiments a liquid-liquid phase transition liquid may be employed as a heat transfer medium to facilitate the heating or cooling of a solid-liquid phase change material.

For example, in some embodiments, the same heat source, or heating process, or heating step may be employed for heating in the temperature ranges of the enthalpy of phase transition of the liquid-liquid phase transition liquid and the temperature of the solid-liquid phase change, however the heat source, or heating process, or heating step may heat the heat transfer medium in two distinct steps, which may be optimized or designed for the requirements of the liquid-liquid phase transition or solid-liquid phase change or both.

In some embodiments, a process may be designed to employ a heat transfer medium comprising both a high enthalpy of phase transition liquid-liquid phase transition liquid and a solid-liquid phase change material. In some embodiments, the sources, or processes, or steps employed to heat or cool the heat transfer medium may be the same for cooling or heating in the temperature range of the enthalpy of liquid-liquid phase transition and the temperature of the solid-liquid phase change. In some embodiments, applicable heat transfer mediums may comprise overlapping phase transition and phase change temperature ranges, or adjacent phase transition and phase change temperature ranges, or significantly different phase transition and phase change temperature ranges. It may be desirable for the sources, or processes, or steps employed to heat or cool the heat transfer medium to meet requirements of liquid-liquid phase transitions, solid-liquid phase changes, and handling solid-liquid slurries.

In some embodiments, a heat transfer medium or thermal storage medium or both may comprise a solid-liquid phase change material combined with a high enthalpy of phase transition liquid-liquid phase transition liquid. In some embodiments, the solid-liquid phase change material may be insoluble in the liquid-liquid phase transition liquid. For example, in some embodiments, the liquid-liquid phase transition liquid may comprise an aqueous composition and the solid-liquid phase change material may be insoluble in water or in the aqueous composition or both. For example, the solid-liquid phase change material may comprise a paraffin or hydrophobic material. For example, in some embodiments, the liquid-liquid phase transition liquid may comprise a non-aqueous composition and the solid-liquid phase change material may be an ionic material or an aqueous composition or insoluble in the non-aqueous composition or a combination thereof.

In some embodiments, a heat transfer process may employ a heat transfer medium comprising a mixture of a liquid-liquid phase transition liquid and a solid-liquid phase change material, wherein the solid-liquid phase change material is insoluble in the liquid-liquid phase transition liquid. In some embodiments, a process may be configured to add or remove at least a portion of the solid-liquid phase change material from the heat transfer medium. For example, at least a portion of solid-liquid phase change material may be added to the heat transfer medium. For example, at least a portion of solid-liquid phase change material may be added to the heat transfer medium when additional heat capacity is required or desired in the temperature range of the phase change of a solid-liquid phase change material or when process requirements change to enable to presence of solid-liquid phase change material or the presence of greater concentrations of solid-liquid phase change material or a combination thereof. In some embodiments, the solid-liquid phase change material may be added at a liquid phase, or at a solid phase, or both to the heat transfer medium. For example, at least a portion of solid-liquid phase change material may be removed from a heat transfer medium. For example, at least a portion of solid-liquid phase change material may be removed from the heat transfer medium when additional heat capacity is no longer required or desired in the temperature range of the phase change of a solid-liquid phase change material or when process requirements change to disincentivize the presence of solid-liquid phase change material or the presence of certain concentrations of solid-liquid phase change material or a combination thereof. In some embodiments, the solid-liquid phase change material may be removed at a liquid phase, or at a solid phase, or both to the heat transfer medium.

For example, in some embodiments, at least a portion of a solid-liquid phase change material may be removed or changed or replaced or substituted or a combination thereof. For example, solid-liquid phase change material may be removed or changed or replaced or substituted or a combination thereof to adjust the temperature ranges of enhanced heat capacity in the heat transfer medium. For example, a solid-liquid phase change material with a phase change at one temperature may be replaced with a solid-liquid phase change material with a phase change at another temperature. For example, a solid-liquid phase change material with a phase change at 10° C. may be replaced with a solid-liquid phase change material with a phase change at 20° C. due to changes in system design temperature or changes in conditions or changes in system requirements or a combination thereof. It may be desirable for changes in concentration or type of solid-liquid phase change material to be reversible. In some embodiments, it may be desirable for changes in the phase change temperature of a solid-liquid phase change material in a heat transfer medium to coincide with changes in the temperature of the enthalpy of phase transition of a liquid-liquid phase transition liquid or vise versa. In some embodiments, it may be desirable for changes in the phase change temperature of a solid-liquid phase change material in a heat transfer medium to be unrelated to changes in the temperature of the enthalpy of phase transition of a liquid-liquid phase transition liquid or vise versa. In some embodiments, it may be desirable for changes in the phase change temperature of a solid-liquid phase change material in a heat transfer medium and changes in the enthalpy of phase transition temperature of a liquid-liquid phase change liquid to be determined by, for example, including, but not limited to, one or more or a combination of the following: changes in process design requirements, changes in process design requirements, changes in system needs, changes in conditions, an algorithm, desires, biases, system constraints, changes in system constraints, or a combination thereof.

In some embodiments, solid-liquid phase change material may be removed from at least a portion of a heat transfer medium to enable adjustments to a liquid-liquid phase transition liquid. For example, the concentration of one or more reagents in a liquid-liquid phase transition liquid may be adjusted to, for example, including, but not limited to, one or more or a combination of the following: adjust liquid-liquid phase transition temperature, or adjust enthalpy of phase transition temperature range, or adjust solubility, or adjust viscosity, or adjust longevity, or adjust compatibility. For example, adjusting the concentration of one or more reagents in a liquid-liquid phase transition liquid may require a separations process, such as membrane based process, which may desirably operate without or with minimal presence of solids or high viscosity fluids or both, to, for example, prevent or minimize clogging or scaling.

In some embodiments, separation of at least a portion of solid-liquid phase change material from a heat transfer media may be conducted with one or more or a combination of processes. For example, if at least a portion of the solid-liquid phase change material is at a solid phase, a solid-liquid separation device, such as a filter or rotary filter or centrifuge or a combination thereof, may be employed. For example, if at least a portion of the solid-liquid phase change material is at a liquid phase, it may be desirable to employ, including, but not limited to, one or more or a combination of the following separations: liquid-liquid separation, or separation using different properties, or separation using density, or separation using decanting, or separation using centrifuge, or separation using hydrophilicity, or separation using hydrophobicity, or separation using viscosity, or separation using cooling, or separation using heating, or separation using electrostatic properties, or separation using coalescer, or separation using adhesion properties. In some embodiments, it may be desirable to for at least a portion of the components or composition of a liquid-liquid phase transition liquid, or one or two or more liquid phases of a liquid-liquid phase transition liquid, or a combination thereof to have a substantially different density than the density of an insoluble or partially soluble or both solid-liquid phase change material. Substantially different density of two or more liquid phases may comprise a density difference sufficient for at least one of said two more liquid phases to be separated from another liquid phase or other phases by a density-based separation process. For example, in some embodiments, the density of one or more liquid phases of a high enthalpy of phase transition liquid-liquid phase transition composition may be greater than or equal to 0.92 kg/L and the density of a solid-liquid phase change material may be less than or equal to 0.91 kg/L.

In some embodiments, separation or removal of a solid-liquid phase change material from a heat transfer medium may be conducted by a different process than the process for adding solid-liquid phase change material to a heat transfer medium. In some embodiments, separation or removal of a solid-liquid phase change material from a heat transfer medium may be conducted by the same or similar process to the process for adding solid-liquid phase change material to a heat transfer medium.

In some embodiments, adding solid-liquid phase change material to a heat transfer medium may involve adding solid-liquid phase change material at a solid phase, or a liquid phase, or both.

For example, in some embodiments, adding solid-liquid phase change material may involve adding solid-liquid phase change material at a liquid phase. It may be desirable to add at a liquid phase due to, including, but not limited to, easier control, the ability to control the amount added, ability to add without presence of air, easier transfer, easier storage, prevention of clogging, better dispersibility, better control of droplet or particle size, or a combination thereof.

For example, in some embodiments, adding solid-liquid phase change material may involve adding solid-liquid phase change material at a liquid phase. In some embodiments, processes of adding solid-liquid phase change material may involve heating solid-liquid phase change material to ensure it is at a liquid phase before adding or transferring or both to the heat transfer media. In some embodiments, adding solid-liquid phase change material may involve heating a liquid phase solid-liquid phase change material before adding to a heat transfer medium, to, for example, reduce viscosity or increase dispersibility or both.

For example, in some embodiments, adding solid-liquid phase change material to a heat transfer medium may involve dispersion or facilitating dispersion. For example, it may be desirable for a solid-liquid phase change material to be dispersed in a heat transfer media to, for example, facilitate pump-ability, or prevent clogging, or prevent scaling, or facilitate the formation of particle suspension, or to facilitate the formation of a colloidal system, or to facilitate the formation of a colloidal suspension, or prevent aggregation of solid-liquid phase change material, or a combination thereof. For example, it may be desirable to add solid-liquid phase change material at a liquid phase, or solid phase, or both at a desired particle size or particle size range. For example, a process for adding solid-liquid phase change material may add the solid-liquid phase change material as a solid in a specific particle size or size range. For example, a process for adding solid-liquid phase change material may add the solid-liquid phase change material at a liquid phase in a specific particle size or particle size range, and the solid-liquid phase change material particles may phase change into a solid phase particle in the heat transfer medium or while in contact with the heat transfer medium. For example, a process for adding solid-liquid phase change material may add the solid-liquid phase change material as a liquid in a specific particle or droplet size or size range, which may remain a liquid phase in the heat transfer medium.

In some embodiments, heat transfer process or thermal storage process or both may employ systems and/or methods to help ensure solid-liquid phase change material may be adequately dispersed, or dispersed in desired particle or droplet size ranges or a combination thereof in the heat transfer media.

For example, a process may employ, including, but not limited to, mixers, or baffles, or packing material, or dispersant material, or dispersants, or spray devices, or perforated devices, or turbulent devices, or electrostatic devices, or a combination thereof.

For example, the addition of a solid-liquid phase change material to a heat transfer medium may employ mixers, or baffles, or packing material, or dispersant material, or dispersants, or spray devices, or perforated devices, or turbulent devices, or electrostatic devices, or a combination thereof.

For example, a process may employ physical, or electrical, or physio-chemical systems and/or methods of modifying the zetapotential of one or more or a combination of components of a heat transfer medium.

In some embodiments, a heat transfer medium may comprise reagents which facilitate solid-liquid phase change material dispersion, or help ensure solid-liquid phase change material is dispersed in appropriate particle or droplet size ranges, or a combination thereof, which may include, but are not limited to, one or more or a combination of the following: dispersants, or suspension chemicals, or stabilizing agents, or stabilizers, chemicals which facilitate a stable suspension, or suspension stabilizer chemicals, or chemicals which facilitate an at least partially stable suspension, or anti-agglomeration agents, or chemicals which facilitate the formation of colloidal particles, or a combination thereof. Systems and/or methods may be employed to monitor and/or adjust the concentration of reagents which facilitate solid-liquid phase change material dispersion, or help ensure solid-liquid phase change material is dispersed in appropriate particle or droplet size ranges, or a combination thereof.

In some embodiments, systems and/or methods for monitoring particle size, or particle suspension stability, or a combination thereof may be employed. For example, systems and/or methods for monitoring particle size, or particle suspension stability, or a combination thereof may include, but are not limited to, one or more or a combination of the following: light scattering methods, or particle count methods, or particle counters, or Coulter counter, or particle size distribution measuring devices, or laser scattering techniques, or diffraction techniques, or algorithms, or imaging systems, or viscosity measurements, or pumping power measurements. In some embodiments, one or more systems and/or methods for monitoring particle size, or particle suspension stability, or a combination thereof may communicate with, including, but not limited to, one or more or a combination of the following: one or more systems and/or methods for adjusting or facilitating particle dispersion or suspension, or adding or removing reagents, or a combination thereof.

In some embodiments, the concentration of one or more or all reagents in a heat transfer medium, or a heat transfer process, or thermal storage process, or a combination thereof may be adjustable.

In some embodiments, a heat transfer medium may comprise more than one enthalpy of liquid-liquid phase transition temperature range. In some embodiments, it may be desirable to employ a different cooling source, or a cooling process, or cooling step in one enthalpy of liquid-liquid phase transition temperature range than in another or different enthalpy of liquid-liquid phase transition temperature range. In some embodiments, it may be desirable to employ the same cooling source, or a cooling process, or cooling step in one enthalpy of liquid-liquid phase transition temperature range as another or different enthalpy of liquid-liquid phase transition temperature range. In some embodiments, it may be desirable to employ a different heat source, or a heating process, or heating step in one enthalpy of liquid-liquid phase transition temperature range than in another or different enthalpy of liquid-liquid phase transition temperature range. In some embodiments, it may be desirable to employ the same heating source, or a heating process, or heating step in one enthalpy of liquid-liquid phase transition temperature range as another or different enthalpy of liquid-liquid phase transition temperature range.

In some embodiments, a heat transfer medium may comprise more than one solid-liquid phase change material. In some embodiments, it may be desirable to employ a different cooling source, or a cooling process, or cooling step in the phase change temperature range of one solid-liquid phase change material than in the phase change temperature range of another solid-liquid phase change material. In some embodiments, it may be desirable to employ the same cooling source, or a cooling process, or cooling step in the phase change temperature range of one solid-liquid phase change material as the phase change temperature range of another solid-liquid phase change material. In some embodiments, it may be desirable to employ a different heat source, or a heating process, or heating step in the phase change temperature range of one solid-liquid phase change material than in the phase change temperature range of another solid-liquid phase change material. In some embodiments, it may be desirable to employ the same heat source, or a heating process, or heating step in the phase change temperature range of one solid-liquid phase change material as the phase change temperature range of another solid-liquid phase change material.

In some embodiments, a heat transfer medium may comprise two or more solid-liquid phase change materials. For example, in some embodiments, one solid-liquid phase change material in the heat transfer medium may possess a solid-liquid phase change temperature different than another solid-liquid phase change material in the heat transfer medium. For example, in some embodiments, one solid-liquid phase change material may be soluble in a liquid phase of a heat transfer medium and another solid-liquid phase change material may be insoluble in a liquid phase of a heat transfer medium. For example, in some embodiments, one solid-liquid phase change material may comprise a reagent in a liquid-liquid phase transition liquid and another solid-liquid phase change material may be insoluble in at least one liquid phase of a liquid-liquid phase transition liquid. For example, in some embodiments, one solid-liquid phase change material may comprise a reagent in a liquid-liquid phase transition liquid and another solid-liquid phase change material may be insoluble in a liquid-liquid phase transition liquid. For example, a heat transfer medium may comprise a liquid-liquid phase transition liquid comprising at least a portion water and another solid-liquid phase change material which may be insoluble in water. For example, a heat transfer medium may comprise a liquid-liquid phase transition liquid comprising at least a portion water and another solid-liquid phase change material which may be insoluble in water, such as a paraffin material or hydrophobic material. For example, a heat transfer medium may comprise a liquid-liquid phase transition liquid comprising at least a portion water, wherein water comprises a first solid-liquid phase change material, and a second solid-liquid phase change material, which may be insoluble in water, such as a paraffin material or hydrophobic material.

In some embodiments, a solid-liquid phase change material may be at least partially removed from a heat transfer medium before or when operating in a solid-liquid phase change temperature of another solid-liquid phase change material. In some embodiments, a first solid-liquid phase change material may be at least partially removed from a heat transfer medium before or when operating in a solid-liquid phase change temperature of a second solid-liquid phase change material, when said second solid-liquid phase change material possesses a solid-liquid phase change temperature lower than the solid-liquid phase change temperature of the first solid-liquid phase change material. For example, if a second solid-liquid phase change material possesses a lower solid-liquid phase change temperature than a first solid-liquid phase change material, then at least a portion of said first solid-liquid phase change material may be removed from a heat transfer medium before or while a heat transfer medium is operating near or at or less than the solid-liquid phase change temperature of said first solid-liquid phase change material. For example, if a paraffin is a first solid-liquid phase change material and water is a second solid-liquid phase change material, and said water possesses a lower solid-liquid phase change temperature than said paraffin, then at least a portion of said paraffin may be removed from a heat transfer medium before or while a heat transfer medium is operating near or at or less than the solid-liquid phase change temperature of water. In some embodiments, more than one solid-liquid phase change material may be soluble in a liquid phase of a heat transfer medium. For example, if both a first and second solid-liquid phase change material is soluble in a liquid phase of a heat transfer medium, and said first solid-liquid phase change material possesses a greater solid-liquid phase change temperature than said second solid-liquid phase change material, it may be desirable to remove at least a portion of said first solid-liquid phase change material from a heat transfer media before or while operating in the solid-liquid phase change temperature of the second solid-liquid phase change. It may be desirable to at least partially remove one solid-liquid phase change material from a heat transfer medium before or while a heat transfer medium is operating in the phase change temperature of another solid-liquid phase change material present in the heat transfer medium to, for example, including, but not limited to, one or more or a combination of the following: minimize the concentration of solids in the heat transfer medium, or preventing clogging, or maximize pumpability, or reduce practical viscosity, or prevent undesirable or unintended agglomeration, or prevent undesirable or unintended aggregation, or maximize baseline specific heat capacity.

In some embodiments, a heat transfer medium may comprise a solid-solid phase transition material, or a liquid-liquid phase transition material, or a solid-liquid phase change material, or a combination thereof. In embodiments employing a solid-solid phase transition material, it may be desirable for the solid-solid phase transition material to be insoluble in the liquid phase or liquid phases of a heat transfer medium. In embodiments employing a solid-solid phase transition material, it may be desirable for the solid-solid phase transition material to be insoluble in the high enthalpy of liquid-liquid phase transition liquid-liquid phase transition liquid in the heat transfer medium. In some embodiments employing solid-solid phase transition material, it may be desirable for said solid-solid phase transition material to comprise colloidal partials, or a suspension in a heat transfer medium. In some embodiments employing solid-solid phase transition material, it may be desirable for a process to be capable of separating or removing solid-solid phase transition material, or adding or replacing solid-solid phase transition material, or a combination thereof to or from a heat transfer medium.

In some embodiments, the concentration of one or more reagents in a heat transfer medium may be adjusted by freezing at least a portion of one reagent and separating solid phase from the remaining liquid phase. For example, a liquid-liquid phase transition liquid may comprise at least a portion of water. At least a portion of said water may be frozen and separated, which may adjust the relative concentration of one or more or a combination of water and/or other reagents in a heat transfer medium.

In some embodiments, a heat transfer medium may comprise a thermal storage medium in a thermal storage process.

In some embodiments, a solid-liquid phase change material may be insoluble under certain conditions and may be soluble under certain other conditions. For example, water may comprise a solid-liquid phase change material and water may be soluble in at least one liquid phase of a liquid-liquid phase transition liquid in a heat transfer medium above the freezing point of water in said liquid-liquid phase transition liquid, and water may be at least partially insoluble at or below the freezing point of water in said liquid-liquid phase transition liquid.

In some embodiments, a heat transfer medium may comprise a thermal storage medium in a thermal storage process. In some embodiments, a heat transfer medium may comprise a thermal storage medium in a thermal storage process and a heat transfer medium in a heat transfer process.

In some embodiments, a thermal storage reservoir may employ a heat transfer medium comprising a liquid-liquid phase transition liquid and a solid-liquid phase change material. In some embodiments, a portion of a heat transfer medium may be employed for heat transfer and a portion of a heat transfer medium may be employed for thermal storage. For example, heat transfer to and from a thermal storage reservoir may be conducted using a liquid-liquid phase transition liquid component of the heat transfer medium, while the thermal storage reservoir may employ both solid-liquid phase change and/or liquid-liquid phase transition components of the heat transfer medium. For example, in some embodiments, a portion of liquid-liquid phase transition liquid may be separated from a portion solid-liquid phase change material before or while said portion of liquid-liquid phase transition liquid is transferred from the thermal storage for heat transfer to, for example, an application requiring cooling or heating, or a cooling source or heating source, or a combination thereof. Embodiments employing both solid-liquid phase change material and liquid-liquid phase transition liquid in a thermal storage reservoir, while employing a liquid-liquid phase transition liquid for heat transfer, may benefit from the greater energy density or heat capacity provided by the presence of a solid-liquid phase change material in a heat transfer medium, without or while minimizing the potential challenges of the presence of solids during transfer to or from a thermal storage reservoir, such as, including, but not limited to, clogging in channels, pipes, or heat exchangers.

In some embodiments, a thermal storage reservoir may employ a heat transfer medium comprising a high enthalpy of phase transition liquid-liquid phase transition liquid. In some embodiments, for example, one liquid phase of a liquid-liquid phase transition liquid may be employed for heat transfer to and from the thermal storage reservoir, while a thermal storage reservoir may contain two or more or all liquid phases of a liquid-liquid phase transition liquid. It may be desirable to employ only one liquid phase of a liquid-liquid phase transition liquid for heat transfer to or from a thermal storage reservoir, due to, for example, including, but not limited to, one or more or a combination of the following: one or more liquid phases possessing a high viscosity, or one or more liquid phases or reagents being incompatible or less compatible with a part outside of a thermal storage reservoir, or compatibility, or one or more liquid phases possessing a superior heat transfer coefficient, or potential corrosion or degradation. A desired liquid phase may be separated from other liquid phases in a heat transfer medium before or while transferring from a thermal storage reservoir by employing, for example, one or more or a combination of liquid-liquid separation systems and/or methods described herein or one or more or a combination of liquid-liquid separation systems and/or methods in the art.

In some embodiments, a thermal storage reservoir may comprise a liquid-liquid phase change material, or a solid-liquid phase change material, or a liquid, or a solid-solid phase change material, or a combination thereof. In some embodiments, it may be desirable for heat transfer to and/or from a thermal storage reservoir to be conducted using a fluid, such as a liquid or a gas or both. In some embodiments, a fluid employed for heat transfer to and/or from a thermal storage reservoir may comprise a component of thermal storage medium employed in a thermal storage reservoir, and may comprise, for example, a liquid-liquid phase transition liquid, or a component of a liquid-liquid phase transition liquid, or a liquid, or solid-liquid phase change material, or a combination thereof.

In some embodiments, a fluid employed for heat transfer to and/or from a thermal storage reservoir may comprise a fluid insoluble in one or more or all reagents in a thermal storage medium. In some embodiments, a fluid employed for heat transfer to and/or from a thermal storage reservoir may comprise a fluid insoluble in one or more or all reagents in a thermal storage medium when the thermal storage reservoir or thermal storage medium or both is operating at or near or below the temperature range of a solid-liquid phase change, a solid-solid phase change, or both. For example, a fluid employed for heat transfer to and/or from a thermal storage reservoir may comprise a liquid or gas or both which may be insoluble in one or more or all reagents in a thermal storage medium, wherein said liquid is directly contacted with at least a portion of said thermal storage medium, or heterogeneously mixed with at least a portion of said thermal storage medium, or a combination thereof during heat transfer or heat exchanger. For example, said fluid may comprise a gas-liquid phase transition fluid, which may cool a thermal storage reservoir by entering the heat transfer reservoir as a liquid and boiling to form a gas and exiting as a gas, or may heat a thermal storage reservoir by entering the heat transfer reservoir as a gas and condensing to form a liquid and exiting gas a liquid, or a combination thereof. For example, said fluid may comprise a refrigerant, such as butane or fluorinated compound or both, and said solid-liquid phase change material may comprise water/ice and/or said thermal storage medium may further comprise a liquid-liquid phase transition liquid. Said fluid may enable greater heat transfer rates at higher solid concentrations in a thermal storage reservoir, which may enable greater energy density thermal storage, or more energy efficient thermal storage, or a combination thereof.

In some embodiments, liquid-liquid phase transition liquids may be employed to generate solid-liquid phase changes. For example, in some embodiments, two or more non-contiguously separate liquid phases of a UCST liquid-liquid phase transition liquid may be mixed at or below a liquid-liquid phase transition temperature and the resulting endothermic phase transition may facilitate the formation of a solid phase in a solid-liquid phase change. For example, in some embodiments, two or more non-contiguously separate liquid phases of a UCST liquid-liquid phase transition liquid may be mixed at or below a liquid-liquid phase transition temperature and the resulting endothermic phase transition may result in the formation of ice. For example, in some embodiments, two or more non-contiguously separate liquid phases of a LCST liquid-liquid phase transition liquid may be mixed at or below a liquid-liquid phase transition temperature and the resulting exothermic phase transition may facilitate the melting of a solid phase in a solid-liquid phase change. For example, in some embodiments, two or more non-contiguously separate liquid phases of a LCST liquid-liquid phase transition liquid may be mixed at or below a liquid-liquid phase transition temperature and the resulting exothermic phase transition may result in the melting of at least a portion of ice. For example, in some embodiments, a composition comprising a phase transition temperature adjustment may be mixed with a liquid-liquid phase transition liquid and a resulting endothermic phase transition may facilitate the formation of a solid phase in a solid-liquid phase change. For example, in some embodiments, a composition comprising a phase transition temperature adjustment may be mixed with a liquid-liquid phase transition liquid and a resulting endothermic phase transition may result in the formation of ice. For example, in some embodiments, a composition comprising a phase transition temperature adjustment may be mixed with a liquid-liquid phase transition liquid and a resulting exothermic phase transition may facilitate the melting of a solid phase in a solid-liquid phase change.

A phase transition temperature adjustment reagent may comprise a reagent which changes the enthalpy of liquid-liquid phase transition temperature range, or liquid-liquid phase transition temperature range, or both. In some embodiments, changes to the concentration of a phase transition temperature adjustment reagent may influence the temperature range, or enthalpy, or both of a liquid-liquid phase transition. In some embodiments, the presence of or lack of presence of a phase transition temperature adjustment reagent may dictate the formation of or absence of a liquid-liquid phase transition or enthalpy of phase transition or both. For example, in some embodiments, the introduction of or addition of or presence of a phase transition temperature adjustment reagent may trigger the formation of an endothermic or exothermic liquid-liquid phase transition. In some embodiments, a phase transition temperature adjustment reagent may comprise, including, but not limited to, one or more or a combination of the following: a salt, or a sugar, or a sugar alcohol, or sugar substitute, or mannitol, or maltodextrin, or sucrose. In some embodiments, it may be desirable for the concentration of a phase transition temperature adjustment reagent to be adjustable using a membrane based process, or using distillation, or a combination thereof.

Some embodiments may involve a process for manufacturing or generating ice or another solid-liquid phase change by employing liquid-liquid phase transition liquids, or concentration adjustment processes or separation processes, or phase transition temperature adjustment reagents, or a combination thereof. For example, some embodiments may involve making ice or ice-slurries by mixing liquid-liquid phase transition liquids and/or phase transition temperature adjustment reagents to generate an endothermic enthalpy of phase transition, which may result in the formation of ice. For example, in some embodiments, a process may involve a refrigeration cycle, which may involve forming an endothermic liquid-liquid phase transition by adding a phase transition temperature adjustment reagent to a liquid-liquid phase transition liquid, which may result in the formation of at least a portion of a solid in a solid-liquid phase change, and subsequently separating a phase transition temperature adjustment reagent to regenerate a liquid-liquid phase transition liquid and restart the process. For example, in some embodiments, a process may involve a refrigeration cycle, which may involve mixing a liquid-liquid phase transition liquid with a phase transition temperature adjustment reagent to form an endothermic liquid-liquid phase transition and/or form at least a portion of a solid in a solid-liquid phase change; separating at least a portion of said solid; separating or removing at least a portion of said phase transition temperature adjustment reagent from at least one liquid phase of a liquid-liquid phase transition liquid; and mixing liquid-liquid phase transition liquid phases, which may result in the formation of an exothermic liquid-liquid phase transition, and/or cooling or heat exchanging said liquid-liquid phase transition liquid or liquid phases with a heat sink or a combination thereof. For example, in some embodiments, a process may involve a refrigeration cycle, which may involve one or more or a combination of the following: mixing a two or more liquid phases to form an endothermic liquid-liquid phase transition and/or form at least a portion of a solid in a solid-liquid phase change; adjusting the concentration of a reagent in one or more liquid phases; forming an exothermic liquid-liquid phase transition and/or cooling or heat exchanging said liquid-liquid phase transition liquid or liquid phases with a heat sink or a combination thereof.

Some embodiments may involve a process for manufacturing or generating ice or another solid-liquid phase change by employing liquid-liquid phase transition liquids, or concentration adjustment processes or separation processes, or phase transition temperature adjustment reagents, or a combination thereof. In some embodiments, liquid-liquid phase transition liquids may be employed in a liquid-liquid phase transition refrigeration cycle to cool a solid-liquid phase change material at or below a solid-liquid phase change temperature or to form at least a portion of a solid phase. For example, it may be advantageous to employ a liquid-liquid phase transition to facilitate the freezing or solid-liquid phase change to form a solid or ice production due to, for example, the ability to form a solid phase in a direct contact heat exchange or within the same solution as the liquid-liquid phase transition or both. For example, it may be advantageous to employ a liquid-liquid phase transition to facilitate the freezing or solid-liquid phase change to form a solid or ice production due to, for example, the ability to form a solid phase without the need for a non-contiguously separated heat exchange or without a gas-liquid phase transition or both.

In some embodiments, the exothermic liquid-liquid phase transition of a liquid-liquid phase transition refrigeration cycle may be cooled (e.g. heat sink) at a temperature near the freezing point of a solid-liquid phase change material and an endothermic liquid-liquid phase transition may be employed to cool the solid-liquid phase change material at or below its freezing point to facilitate the formation of at least a portion solid phase solid-liquid phase change material. A temperature near the freezing point of a solid-liquid phase change material may be a temperature within the adiabatic temperature change of an enthalpy of liquid-liquid phase transition. In some embodiments, a solid-liquid phase change material may be a reagent within a liquid-liquid phase transition liquid. In some embodiments, the exothermic liquid-liquid phase transition may be cooled to a temperature near the freezing point of a solid-liquid phase change material using heat sink or cooling source which may be low cost or may require less electricity or less valuable energy. For example, in some embodiments, the exothermic liquid-liquid phase transition may be cooled with cold ocean water, water from deep ocean, or cold lake water, or cold liquid water, or chilled water, or evaporatively cooled water, or air, or a combination thereof, which may be at a temperature near the freezing point of water in some embodiments where water may be the solid-liquid phase change material. In some embodiments, the exothermic liquid-liquid phase transition may be cooled to a temperature near the freezing point of a solid-liquid phase change material using a refrigeration cycle, which may include, but is not limited to, one or more or a combination of the following: a vapor compression refrigeration cycle, or a solid-liquid phase change refrigeration cycle, or a gas-liquid phase change refrigeration cycle, or an absorption refrigeration cycle, or a thermoelectric device, or a Peltier device, or a liquid-liquid phase transition refrigeration cycle. If desired, some of the embodiments described herein can produce ice or other solid-liquid phase change by formation within a solution and/or without a countercurrent heat exchanger and/or without a non-contiguously separate heat exchanger.

In some embodiments, the exothermic liquid-liquid phase transition of a liquid-liquid phase transition refrigeration cycle may be cooled (e.g. heat sink) at a temperature and an endothermic liquid-liquid phase transition may be employed to cool the solid-liquid phase change material at or below its freezing point to facilitate the formation of at least a portion solid phase solid-liquid phase change material. In some embodiments, the exothermic liquid-liquid phase change may be cooled at a temperature which is different from the freezing point temperature of the solid-liquid phase change material by a temperature difference greater than the adiabatic temperature change of the enthalpy of a liquid-liquid phase transition. To enable the refrigeration cycle to move heat across a temperature difference greater than the adiabatic temperature change of the enthalpy of a liquid-liquid phase transition, a counter-current heat exchanger may be employed to create at least two temperature zones. For example, one temperature zone may operate near the temperature of a heat sink and another temperature zone may operate near the temperature of the solid-liquid phase change. In some embodiments, a 'near' temperature may be a temperature within the adiabatic temperature change of an enthalpy of liquid-liquid phase transition. The present embodiment may be advantageous due to, including, but not limited to, the ability to produce ice or other solid solid-liquid phase change material without gas phase refrigerants, or the ability to produce ice or other solid solid-liquid phase change material with a working fluid which comprises at least a portion said solid-liquid phase change material, or a combination thereof. If desired, embodiment is capable of having one non-contiguously separate heat exchanger.

In some embodiments, a liquid-liquid phase transition temperature adjustment reagent may comprise a reagent in the liquid-liquid phase transition liquid which possesses at least some influence over the temperature range, or enthalpy, or a combination thereof of a liquid-liquid phase transition. In some embodiments, a liquid-liquid phase transition temperature adjustment reagent may comprise a reagent in the liquid-liquid phase transition liquid wherein changing the concentration of said reagent in the liquid-liquid phase transition liquid changes the temperature range, or enthalpy, or a combination thereof of a liquid-liquid phase transition.

In some embodiments, the freezing point of a solid-liquid phase change material may be different when dissolved in a heat transfer medium than as an isolated reagent. For example, if water is a solid-liquid phase change material in an embodiment, the freezing point of liquid water when said liquid water is dissolved in a liquid-liquid phase transition liquid may be different than the freezing point of pure liquid water. For example, if water is a solid-liquid phase change material in an embodiment, the freezing point of liquid water when said liquid water is dissolved in a liquid-liquid phase transition liquid may be a lower temperature than the freezing point of pure liquid water due to, for example, colligative properties.

In some embodiments, the freezing point of a solid-liquid phase change material may be practically the same when dissolved in a heat transfer medium than as an isolated reagent. For example, in some embodiments, a liquid-liquid phase transition liquid may comprise an emulsion or possess emulsive properties, wherein the freezing point of a solid-liquid phase change material dissolved in said liquid-liquid phase transition liquid phase possess a freezing point practically the same as the freezing point of the solid-liquid phase change material as an isolated reagent.

In some embodiments, a liquid-liquid phase transition liquid, or a phase transition temperature adjustment reagent, or a combination thereof may be mixed within a heat exchanger. Mixing within a heat exchanger or initiating an enthalpy of liquid-liquid phase transition within a heat exchanger or a combination thereof may be beneficial due to, for example, including but not limited to, one or more or a combination of the following: latent heat in the enthalpy of phase transition improving heat transfer properties, or latent heat in the enthalpy of phase transition improving heat transfer coefficient, or ability to transfer the full latent heat of an enthalpy of phase transfer phase transition, or improved convective heat transfer properties from the formation of new or different liquid phases, or improved convective heat transfer properties from the motion of liquids during the formation of new liquid phases, or improved heat transfer coefficient.

Some embodiments may pertain to systems and methods for liquid-liquid phase transitioning thermal storage. Some embodiments of the present invention may possess the advantages of ice thermal storage and chilled water thermal storage, without the disadvantageous of both technologies.

For example, some embodiments of the present invention may possess significantly greater energy density than chilled water. For example, some embodiments may possess an energy density, or a specific heat capacity, or both of, including, but not limited to, one or more or a combination of the following: greater than 110% relative to water, or greater than 120% relative to water, or greater than 130% relative to water, or greater than 140% relative to water, or greater than 150% relative to water, or greater than 160% relative to water, or greater than 170% relative to water, or greater than 180% relative to water, or greater than 190% relative to water, or greater than 200% relative to water, or greater than 210% relative to water, or greater than 220% relative to water, or greater than 230% relative to water, or greater than 240% relative to water, or greater than 250% relative to water, or greater than 300% relative to water, or greater than 400% relative to water, or greater than 500% relative to water, or greater than 600% relative to water. In some embodiments, greater energy density may translate into a smaller land footprint or volumetric footprint or mass footprint or a combination thereof for the same amount of thermal storage capacity.

Advantageously, some embodiments may possess greater energy density, or possess other beneficial properties, or possess a combination thereof. Other beneficial properties may include, but are not limited to, one or more or a combination of the following:

The thermal storage medium may exist entirely at a liquid phase at a relatively low viscosity.
  By existing entirely at a liquid phase, the thermal storage medium may be directly heat exchanged with an application requiring cooling, eliminating the need for additional heat exchangers and the associated approach temperatures.
Some liquid-liquid phase transition materials comprise over 70 wt % water
  By comprising mostly water, liquid-liquid phase transitioning liquids may continue to possess water's other beneficial thermal properties, such as high thermal conductivity and low cost
The liquid-liquid phase transition temperature or the temperature range of an enthalpy of phase transition may be adjusted to match the appropriate supply and return temperature ranges.
In some embodiments, the thermal storage media may be cooled to the same temperature as normally required by a chiller (4.4° C.-5.6° C.)
In some embodiments, the thermal storage media may be cooled to a higher supply temperature than ARI standard chilled water (for example: greater than the 4.4° C., or greater than 5.6° C., or greater than 6.6° C.), which may reduce energy consumption required in chilling.
In some embodiments, the thermal storage media may be cooled to a supply temperature below normal supply temperatures (for example: less than 4.4° C.). This may be possible due to, for example, some of the present embodiments generating a density difference due to the difference in concentration of certain reagents, or the difference in density of one or more liquid phases in a liquid phase transition liquid, or a combination thereof rather than, for example, due to changes in the density of a liquid due to temperature. Cooling below 3.8° C. may further increase energy density or operating temperature range or both compared to prior art chilled water thermal storage.

It is important to note that prior art chilled water systems cannot cool to less than 3.8° C. because water is most dense at about 3.8° C. and the thermocline in prior art chilled water systems is due to temperature induced density differences.

Similar, equivalent, or better heat transfer properties, such as thermal conductivity, compared to water In some embodiments, the thermal storage media may be low cost In some embodiments, the thermal storage media may be non-toxic and/or low toxicity and/or non-volatile Some embodiments may enable greater temperature/ greater supply temperature chilled water storage, while achieving the same thermal storage energy density as a conventional chilled water system. For example, an example liquid-liquid phase transition solution may store about 35 kJ per kg of solution with an 8° C. supply temperature and 12.8° C. return temperature, the same amount of energy stored in chilled water with a 4.4° C. supply temperature and 12.8° C. return temperature. Advantageously, the greater supply temperature chilled water storage may increase the energy efficiency of a chiller or cooling process by reducing the temperature difference between heat sink and heat source that needs to be generated by a chiller. For every 1° F. reduction in the temperature difference between heat sink and heat source, the energy efficiency of a chiller may increase by about 2.08%. 8° C.–4.4° C.=3.6° C. or 6.48° F., thus the present embodiment in the preset example may increase the energy efficiency of a chiller employed in a thermal storage system by 13.48%.

Some embodiments may involve a process for thermal storage employing liquid-liquid phase transitioning liquids. An example embodiment may comprise a storage tank with temperature layers. An example embodiment may comprise a storage tank with different temperature layers, wherein each temperature layer possesses a different density because it comprises a different composition, or concentration, or both. An example embodiment may comprise a storage tank with liquid layers possessing different temperature, wherein the temperature layers are due to the density difference between the liquid phases because each liquid phase possesses a difference composition, or concentration, or both, and thus has a different density. An example embodiment may comprise a storage tank with temperature stratification or a thermocline, wherein the temperature stratification is due to the density difference due to differences in composition, or concentration, or both of each liquid phase. In an example embodiment, a 'charged' or cold or supply temperature liquid may comprise the middle layer, a greater density 'discharged' or warm or return temperature liquid may comprise the bottom layer, and a lesser density 'discharged' or warm or return temperature liquid may comprise the top layer. In some embodiments, said 'charged' or cold or supply temperature liquid may comprise an LCST liquid-liquid phase transitioning liquid at a single liquid phase combined solution state and may comprise an organic and water. In some embodiments, said greater density 'discharged' or warm or return temperature liquid may comprise water or an aqueous phase comprising mostly water. In some embodiments, said lesser density 'discharged' or warm or return temperature liquid may comprise an organic or mostly organic liquid phase. The two or more layers may be separated inside a single tank due to density differences. Alternatively or additionally, the two or more layers may be separate or non-contiguously separate by a barrier or floating barrier between the layers.

The present embodiment may utilize a liquid-liquid phase transition to create a more effectively thermally stratified or thermocline thermal storage tank. Said more effective thermal stratification or thermocline may be driven by the density of the constituent liquids rather than, for example, changes in density solely due to temperature. Said thermal stratification may be more effective in, including, but not limited to, one or more or a combination of the following of ways:

Greater density difference between liquid layers or liquid layers of different temperatures or both, especially compared to, for example, solely temperature driven thermoclines or stratification.

In some embodiments, greater density difference between liquid layers may enable a floating barrier between 'more dense' and 'less dense' layers. Because the density difference may be more defined and/or liquid layers may exist with a defined liquid-liquid interface and/or liquid layers may possess a defined density difference, a floating barrier may be designed such that it is less dense than a more dense layer and more dense than a less dense layer. Said floating barrier may be located between one or more of liquid-liquid interfaces or enable separation between liquid phases, which may minimize contact and/or mixing between liquid phases and/or minimizing, for example, thermal losses or loss of enthalpy of phase transition.

In some embodiments, greater density difference between liquid layers may enable a defined liquid-liquid interface between liquid layers, such as cold and warm layers. Even without a barrier or floating barrier, a defined liquid-liquid interface and/or the associated surface tension may minimize mixing between liquid phases and reduce thermal losses compared to a solely temperature driven thermocline. It also may reduce the number or cost of thermocouples or other temperature devices located throughout the tank Layers may be mutually insoluble at the supply and return temperature In some embodiments, the density of different liquid layers may be customizable, or adjustable, or a combination thereof.

The temperature layers and composition of temperature layers may be customizable to, for example, the specific needs of an application. For example, in some embodiments, the density of layers and their associated temperature may be disconnected from typical trends for thermocline. For example, in some embodiments, a lesser temperature layer or the 'colder' layer may be a top layer. For example, a colder layer may exist or be stored at a temperature below 4° C. while maintaining a controlled stratification or density difference between one or more layers, or colder and warmer layers, or a combination thereof.

Some embodiments may enable effective temperature stratification to exist in smaller volume tanks because, for example, including, but not limited to, one or more or a combination of the following:

Density of liquid layers may be driven by compositional or concentration related properties Layers may be separated by a liquid-liquid interface Layers may be separated by a floating barrier The charge state of thermal storage be determined by the location of a liquid-liquid interface or a floating barrier In some embodiments, a floating barrier may comprise a solid. In some embodiments, a floating barrier may comprise a liquid. In some embodiments, a floating barrier may comprise a liquid which is insoluble or mostly insoluble in the liquid phases above and below said floating barrier.

Advantageously, there are multiple configurations or designs for achieving effective density stratification in a thermal storage device using liquid-liquid phase transitions. For example, configurations may include, but are not limited to, one or more or a combination of the following:

Combined Solution Top Layer—Water Liquid Phase Bottom Layer:

Example Brief Description: The top layer may comprise a solution comprising a mixture of phase transitioning liquid (for example: 'concentrate' or non-water component or 'organic') and water aqueous layer. In a LCST liquid-liquid phase transition system, said top layer solution may be the 'cold solution' or 'cold layer', or, in a chiller or cooling process, the 'supply side'. In a UCST liquid-liquid phase transition system, said top solution may be the 'warm solution' or 'warm layer', or, in a chiller or cooling process, the 'return side'. The bottom layer may comprise mostly water. The bottom layer may be more dense than the top layer due to the density of water alone or due to the density of additional high density reagents which may adhere or remain dissolved in the water layer.

In, for example, a cooling thermal storage process with a LCST phase transition, discharging cold thermal storage may involve heat exchanging a portion of the cold combined solution top layer (which may be considered 'supply') with a load requiring cooling. During heat exchanging, said cold thermal storage liquid may undergo a liquid-liquid phase transition into two or more liquid phases. One or more of said liquid phases may comprise mostly water, while one or more of said liquids phases may comprise mostly non-water reagents or organic reagents. The mostly water liquid phase may be transferred to the main storage tank and may be stored as the 'warm' or 'return' layer, which may comprise the bottom layer. The non-water or organic liquid phase may be stored in a separate storage tank.

Water Liquid Phase Top Layer—Combined Solution Bottom Layer:

Example Brief Description: The top layer may comprise mostly water. The top layer may be less dense than the bottom layer due to the density of water alone or due to the density of additional low density reagents which may adhere or remain dissolved in the water layer. The bottom layer may comprise a solution comprising a mixture of phase transitioning liquid (for example: 'concentrate' or non-water component or 'organic') and water aqueous layer. In a LCST liquid-liquid phase transition system, said bottom layer solution may be the 'cold solution' or 'cold layer', or, in a chiller or cooling process, the 'supply side'. In a UCST liquid-liquid phase transition system, said bottom solution may be the 'warm solution' or 'warm layer', or, in a chiller or cooling process, the 'return side'.

In, for example, a cooling thermal storage process with a LCST phase transition, discharging cold thermal storage may involve heat exchanging a portion of the cold combined solution bottom layer (which may be considered 'supply') with a load requiring cooling. During heat exchanging, said cold thermal storage liquid may undergo a liquid-liquid phase transition into two or more liquid phases. One or more of said liquid phases may comprise mostly water, while one or more of said liquids phases may comprise mostly non-water reagents or organic reagents. The mostly water liquid phase may be transferred to the main storage tank and may be stored as the 'warm' or 'return' layer, which may comprise the top layer. The non-water reagents or organic liquid phase may be stored in a separate storage tank.

Non-Water Concentrate Top Layer—Combined Solution Middle Layer—Water Liquid Phase Bottom Layer:

Example Brief Description: The top layer may comprise a liquid phase comprising mostly non-water reagents or organic liquid phase. The middle layer may comprise a combination of non-water reagent(s) and water. The bottom layer may comprise a liquid phase comprising mostly water. In a LCST version of the present embodiment, the middle layer may comprise the 'cold solution' or, in a chiller or cold storage, the 'supply', and the top layer and bottom layer may comprise the 'warm solution' or, in a chiller or cold storage, the return. In a UCST version of the present embodiment, the middle layer may comprise the 'warm solution' or, in a chiller or cold storage, the 'return', and the top layer and bottom layer may comprise the 'cold solution' or, in a chiller or cold storage, the 'return'.

In, for example, a cooling thermal storage process with a LCST phase transition, discharging cold thermal storage may involve heat exchanging a portion of the cold combined solution middle layer (which may be considered 'supply') with a load requiring cooling. During heat exchanging, said cold thermal storage liquid may undergo a liquid-liquid phase transition into two or more liquid phases. One or more of said liquid phases may comprise mostly water, while one or more of said liquids phases may comprise mostly non-water reagents or organic reagents. The mostly water liquid phase may be transferred to the main storage tank and may be stored as a 'warm' or 'return' layer, which may comprise the bottom layer. The mostly non-water reagents or organic liquid phase may be transferred to the main storage tank and may be stored as a 'warm' or 'return' layer, which may comprise the top layer.

Water Liquid Phase Top Layer—Combined Solution Middle Layer—Non-Water Concentrate Bottom Layer:

Example Brief Description: The top layer may comprise a liquid phase comprising mostly water. The middle layer may comprise a combination of non-water reagent(s) and water. The bottom layer may comprise a liquid phase comprising mostly non-water reagents or organic liquid phase. In a LCST version of the present embodiment, the middle layer may comprise the 'cold solution' or, in a chiller or cold storage, the 'supply', and the top layer and bottom layer may comprise the 'warm solution' or, in a chiller or cold storage, the return. In a UCST version of the present embodiment, the middle layer may comprise the 'warm solution' or, in a chiller or cold storage, the 'return', and the top layer and bottom layer may comprise the 'cold solution' or, in a chiller or cold storage, the 'return'.

In, for example, a cooling thermal storage process with a LCST phase transition, discharging cold thermal storage may involve heat exchanging a portion of the cold combined solution middle layer (which may be considered 'supply') with a load requiring cooling. During heat exchanging, said cold thermal storage liquid may undergo a liquid-liquid phase transition into two or more liquid phases. One or more of said liquid phases may comprise mostly water, while one or more of said liquids phases may comprise mostly non-water reagents or organic reagents. The mostly water liquid phase may be transferred to the main storage tank and may be stored as a 'warm' or 'return' layer, which may comprise the top layer. The mostly non-water reagents or organic liquid phase may be transferred to the main storage tank and may be stored as a 'warm' or 'return' layer, which may comprise the bottom layer.

Non-Water Concentrate Top Layer—Water Liquid Phase Bottom Layer:
  Example Brief Description: The top layer may comprise a liquid phase comprising mostly non-water reagents or organic liquid phase. The bottom layer may comprise a liquid phase comprising mostly water. Combined solution may be stored in a separate tank or may be added to the presently described tank.

Water Liquid Phase Top Layer—Non-Water Concentrate Bottom Layer:
  Example Brief Description: The top layer may comprise a liquid phase comprising mostly water. The bottom layer may comprise a liquid phase comprising mostly non-water reagents or organic liquid phase. In the present embodiment, combined solution may be stored in a separate tank or may be added to the presently described tank.

Non-Water Concentrate Top Layer—Combined Solution Bottom Layer:
  Example Brief Description: The top layer may comprise a liquid phase comprising mostly non-water reagents or organic reagents. The bottom layer may comprise a combination of non-water reagent(s) and water. In the present embodiment, liquid phase comprising mostly water may be stored in a separate tank or may be added to the presently described tank.

Combined Solution Top Layer—Non-Water Concentrate Bottom Layer:
  Example Brief Description: The top layer may comprise a combination of non-water reagent(s) and water. The bottom layer may comprise a liquid phase comprising mostly non-water reagents or organic reagents. In the present embodiment, liquid phase comprising mostly water may be stored in a separate tank or may be added to the presently described tank.

Note: Water may be provided as an example solvent liquid in a liquid-liquid phase transition liquid composition. Other solvent liquids may be employed instead of or in addition to water. For example, a liquid-liquid phase transition composition may employ a non-water reagent as a solvent liquid, such as, for example, including, but not limited to, ammonia, or alcohols, or organic solvents, or liquid sulfur dioxide, or liquid $CO_2$, or hydrophobic liquids, or hydrophilic liquids, or oils, or hydrocarbons or a combination thereof.

Advantageously, due to, for example, the density difference being potentially greater or more defined than the temperature driven density difference of water, the temperature layers may be separated by a barrier, which may include, but is not limited to, one or more or a combination of the following: submersed liner, or planar surface, or non-similar liquid layer, or other barrier. Said barrier may be more dense than the less dense temperature layer and less dense than the more dense temperature layer, which may allow the barrier to float between the two temperature layers. Said barrier may rise or fall in height as liquid is added or removed from the lower density or higher density layers. Said barrier or 'floating barrier' may be advantageous because, for example, it may reduce mixing between, for example, the cold thermal storage layer and the warm thermal storage layer, which may reduce energy losses during thermal storage.

Advantageously, because the density difference may be driven by the constituent reagents of the liquid rather than the temperature difference, the 'cold' temperature may be as low as the freezing point of a liquid while maintaining temperature stratification or thermocline. In chilled water based thermal storage, chilled water is most dense at 4° C., and, as a result, the coldest the water can be cooled to is 4° C. because otherwise a thermocline with the coldest liquid on the bottom would not exist. Advantageously, embodiments of the present invention may be possess even further greater energy storage capacity, in addition to the enthalpy of liquid-liquid phase transition, by allowing the colder liquid to be cooled to near the freezing point of a liquid, while having minimal impact on the density difference between warmer and colder layers. This may enable even greater cooling storage energy density. For example, based on the baseline specific heat capacity of EXAMPLE LIQUID, 4° K of additional heat capacity may comprise 16 kJ/kg greater total thermal storage energy density.

Its important to note liquid-liquid phase transitioning liquid may undergo a partial liquid-liquid phase transition after a heat exchange. It may be desirable to recirculate the liquid-liquid phase transitioning solution over multiple passes. It may be desirable to recirculate the liquid-liquid phase transitioning liquid over multiple passes through a heat exchange until the solution has reached the temperature where it is sufficiently phase transitioned before, for example, separating constituent liquid phases.

| Metric | Chilled Water | Ice (100%) | EXAMPLE LIQUID |
|---|---|---|---|
| Phase of Thermal Storage | Liquid | Liquid to Solid | Liquid to Liquid-Liquid |
| Energy Density of Thermal Storage (kJ/kg) (Greater is Better) | 35 (with 4.44° C. Supply and 12.8° C. Return) | 152.2 | 60 (with 4.44° C. Supply and 12.8° C. Return) |
| Energy Density of Thermal Storage (kJ/liter) (Greater is Better) | 35 (with 4.44° C. Supply and 12.8° C. Return) | 140 | 60 (with 4.44° C. Supply and 12.8° C. Return) |
| Energy Density of Thermal Storage (kJ/liter) (with 8° C. Supply and 12.8° C. Return) | 20 | N/A | 35 |

-continued

| Metric | Chilled Water | Ice (100%) | EXAMPLE LIQUID |
|---|---|---|---|
| Energy Density of Thermal Storage (kJ/liter) (Greater is Better) (with 0° C. Supply and 12.8° C. Return) | Not Possible | N/A | 76 |
| Volume of Unit Relative to Chilled Water (Lesser is Better) | 1 | 0.25 | 0.58 |
| Chiller Energy Efficiency (Coefficient of Performance, or COP) (Greater is Better) | 5.0-5.9 (with 4.44° C. Supply and 12.8° C. Return) | 2.5-4.1 | 5.0-5.9 (with 4.44° C. Supply and 12.8° C. Return) |
| Chiller Energy Efficiency (Coefficient of Performance, or COP) (Greater is Better) | 5.0-5.9 (with 4.44° C. Supply and 12.8° C. Return) | 2.5-4.1 | 5.67-6.70 (with 8° C. Supply and 12.8° C. Return) |

Some embodiments may involve, for example, an HVAC Chiller with liquid-liquid phase transfer heat transfer liquid transfer heat between the thermal load side heat exchanger and the evaporator side heat exchanger. CAPEX may be reduced due to significantly lower liquid flow rate required to transfer the same amount of heat, which may enable, for example, smaller pipe diameter, and/or smaller heat exchangers, and/or smaller pumps.

Some embodiments may involve, for example, an HVAC Chiller with liquid-liquid phase transfer heat transfer liquid transfer heat between the thermal load side heat exchanger and the evaporator side heat exchanger. Energy consumption of the refrigeration cycle/compressor may be reduced by, for example, 8.3-15.400 due to, for example, smaller required temperature rise. A liquid-liquid phase transition liquid may be retrofitted into a pre-existing HVAC chiller, such as, for example, substituting chilled water for a liquid-liquid phase transitioning liquid and/or may include various devices or methods described herein for facilitating said retrofit.

Some embodiments may involve, for example, a district heating system with a liquid-liquid phase transitioning heat transfer liquid. Heat transfer capacity may be increased by, for example, 3700, due to enthalpy of liquid-liquid phase transition, enabling larger capacity of district heating network or district heating network expansion. Mixing devices may be employed in one or more sections with multi-liquid phase mixtures if desired.

Some embodiments may involve a district heating system with a liquid-liquid phase transitioning heat transfer liquid. In some embodiments, the temperature difference between heat supply and return may be reduced to, for example, 22° C. from, for example, 35° C., while transferring the same amount of heat as a water-based system with a 35° C. temperature difference. Supply temperature may also be reduced from 80° C. to 67° C., enabling the use of lower temperature heat and less heat transfer losses.

Some embodiments may involve a district heating or cooling process with a liquid-liquid phase transition heat transfer medium transferring heat at a lower temperature than the temperature of heat delivered by the heat transfer medium at the point of use. In some embodiments, liquid-liquid phase transitioning liquids may be separated into their two or more constituent liquid phases, which each liquid phase transferred as a separate liquid stream. The separated liquid phases may be transferred at a temperature, for example, 50° C., which may be less than the liquid-liquid phase transitioning temperature of the liquid-liquid phase transitioning liquid which both liquid phases are combined. When the separated liquid streams are mixed, the temperature of the combined liquids may rise, for example, to 80° C. due to the enthalpy of dissolution/mixing, supplying heat at 80° C. at the applications using the heat. By being able to transport higher temperature heat with a lower temperature liquid (for example: 50° C. liquid temperature during transport, while providing 80° C. at the point of heat delivery), the present figure may be able to transport heat with significantly less heat transfer losses, enabling, for example, longer distance district heating networks or district heating networks in colder climates or larger capacity district heating networks.

Some embodiments may involve a district heating or cooling process with a liquid-liquid phase transitioning liquid with thermal transport independent of temperature variation with lower temperature operation. In some embodiments, heat may be transferred in separated liquid streams, each with a temperature of, for example, 20° C. When the separated liquid streams are mixed, the temperature of the combined liquid solution rises to 50° C. due to the enthalpy of dissolution/mixing, supplying heat at a greater than temperature, for example 50° C., at the applications using the heat. By being able to transport higher temperature heat with a lower temperature liquid (for example: 50° C. heat with 20° C. liquid), the present figure may be able to transport heat with significantly less heat transfer losses, enabling, for example, longer distance district heating networks, or district heating networks in colder climates, or larger capacity district heating networks, or a combination thereof.

Liquid-liquid phase transition heat transfer has the potential to significantly increase the heat transfer capacity of a district heating or cooling network, or reduce the CAPEX of a district heating or cooling network, or increase the efficiency of a district heating or cooling network, or a combination thereof. Some embodiments may enable liquid-liquid phase transition heat transfer to transfer of heat or 'cold' independent of temperature variation during thermal transport. Some embodiments may enable a district heating or 'cooling' network with a liquid-liquid phase transition liquid which has a phase transition temperature appreciably higher or lower than the operating temperature of the district heating or 'cooling' network or the temperature of transport of the heat transfer medium.

Some embodiments enable the phase transition of a liquid at a temperature significantly above the temperature in a district heating network or significantly below the temperature in a district cooling network, while enabling the liquid to be transported in the district heating or cooling network at the desired temperature range of the network. This may enable, for example, significant heat to be transported in an enthalpy of phase transition without requiring the temperature of the network to match the phase transition temperature of the liquid. Additionally, by operating at the temperature of the district heating network, thermal losses to the surroundings may be minimized due to a smaller temperature difference between the temperature of the network and the temperature of the outside surroundings compared to the temperature difference of the liquid-liquid phase transition temperature and the temperature of the outside surroundings.

In some embodiments, the liquid-liquid phase transition may occur at a temperature above the boiling point of one or more components in the solution. Some embodiments may enable the phase transition to occur in a temperature range above the boiling point of one or more components, while enabling the district heating network to transport the heat in a temperature range below the boiling point of one or more components or in a temperature range where the pipeline does not require pressure resistance or significant pressure resistance.

Some embodiments may enable the phase transition of a liquid at a temperature significantly above the temperature in a district heating network or significantly below the temperature in a district cooling network, while enabling the liquid to be transported in the district heating or cooling network at or near the temperature of the surrounding environment (for example: ambient temperature conditions). Said embodiments may enable the transport of heat or cool with minimal or no thermal losses to the surrounding environment because, for example, the temperature of the heat transfer liquids transferring heat is close to the temperature of the surrounding environment (minimal or no delta T between the temperature of the heat transfer liquid and the surrounding environment).

For example, in some embodiments, a 'cold' liquid-liquid phase transition liquid heat transfer medium comprising a single liquid phase may be an input liquid to a heating process. Said input liquid may enter a heat exchanger where it is heat exchanged with output liquids. Said heat exchange may preheat said input liquid to, for example, a temperature near a liquid-liquid phase transition temperature range of said input liquid. Said preheated input liquid may be heated to a temperature or near an enthalpy of liquid-liquid phase transition temperature. Said preheated input liquid may be further heated to a temperature at or above a liquid-liquid phase transition temperature range or enthalpy of liquid-liquid phase transition temperature range or a combination thereof, where the liquid may undergo an endothermic liquid-liquid phase transition into a multi-liquid phase mixture. For purposes of this example, said endothermic liquid-liquid phase transition may form a multi-liquid phase mixture comprise two liquid phases. Said multi-liquid phase mixture may be separated using a liquid-liquid separation process into two non-contiguous liquid streams, wherein each liquid stream may comprise a liquid phase. Said two non-contiguous liquid streams may be transferred out of the heating process through a heat exchanger, where said two non-contiguous liquid streams may comprise output liquids and wherein said output liquids heat exchange with said input liquid. Said output liquids may exit the heating process at a temperature near the temperature of the input liquid. For example, said output liquids may exit the heating process at a temperature equal to the temperature of the input liquid plus the delta T of the heat exchanger. Said output liquids may be mixed at an application requiring heating, wherein heat is supplied by, for example, the enthalpy of liquid-liquid phase transition. Alternatively, or additionally, said output liquids may be stored in a thermal storage tank, wherein, for example said thermal storage may store heat independent of temperature of the liquids. Said non-contiguous liquids may enter a counter current heat exchanger at an application requiring heating, wherein heat is supplied by, for example, the enthalpy of liquid-liquid phase transition, and/or, wherein the temperature of heat supplied may be greater than the temperature of the output liquids plus the adiabatic temperature change of an enthalpy of liquid-liquid phase transition. In some embodiments, it may be important for said output liquids to be non-contiguously separate liquid phases to prevent the two liquid phases from mixing and/or undergoing an exothermic liquid-liquid phase transition during cooling or transfer to an application requiring heating.

For example, in some embodiments, a 'warm' liquid-liquid phase transition liquid heat transfer medium comprising a single liquid phase may be an input liquid to a cooling process. Said input liquid may enter a heat exchanger where it is heat exchanged with output liquids. Said heat exchange may precool said input liquid to, for example, a temperature near a liquid-liquid phase transition temperature range of said input liquid. Said precooled input liquid may be cooled to a temperature or near an enthalpy of liquid-liquid phase transition temperature. Said precooled input liquid may be further cooled to a temperature at or below a liquid-liquid phase transition temperature range or enthalpy of liquid-liquid phase transition temperature range or a combination thereof, where the liquid may undergo an exothermic liquid-liquid phase transition into a multi-liquid phase mixture. For purposes of this example, said exothermic liquid-liquid phase transition may form a multi-liquid phase mixture comprise two liquid phases. Said multi-liquid phase mixture may be separated using a liquid-liquid separation process into two non-contiguous liquid streams, wherein each liquid stream may comprise a liquid phase. Said two non-contiguous liquid streams may be transferred out of the cooling process through a heat exchanger, where said two non-contiguous liquid streams may comprise output liquids and wherein said output liquids heat exchange with said input liquid. Said output liquids may exit the heating process at a temperature near the temperature of the input liquid. For example, said output liquids may exit the heating process at a temperature equal to the temperature of the input liquid minus the delta T of the heat exchanger. Said output liquids may be mixed at an application requiring cooling, wherein cooling is supplied by, for example, the enthalpy of liquid-liquid phase transition. Alternatively, or additionally, said output liquids may be stored in a thermal storage tank, wherein, for example said thermal storage may store 'cool' independent of temperature of the liquids. Said non-contiguous liquids may enter a counter current heat exchanger at an application requiring cooling, wherein cooling is supplied by, for example, the enthalpy of liquid-liquid phase transition, and/or, wherein the temperature of cool supplied may be less than the temperature of the output liquids minus the adiabatic temperature change of an enthalpy of liquid-liquid phase transition. In some embodiments, it may be important for said output liquids to be non-contiguously separate liquid phases to prevent the two liquid phases from mixing and/or undergoing an endothermic liquid-liquid phase transition during heating or transfer to an application requiring cooling.

In some embodiments, a district heating system may transfer a liquid-liquid phase transition liquid comprising two liquid non-contiguous liquid phases at a temperature below a liquid-liquid phase transition temperature range, then, at an application requiring heating, mix the two liquid phases to generate an exothermic liquid-liquid phase transition and provide heat to an application requiring heating at a temperature significantly greater than said transfer temperature. In some embodiments, adiabatic heating may be created by a heat exchanging process, which may enable the temperature of heat provided at an application requiring heating to be greater than the sum of the liquid transfer temperature plus the adiabatic temperature rise. For example, an example system may involve:

1. Heating a liquid-liquid phase transition liquid comprising a single liquid phase to a temperature at or above a liquid-liquid phase transition temperature range to form an endothermic liquid-liquid phase transition and a mixture comprising two liquid phases.

2. Separating said two liquid phases using a liquid-liquid separation process, forming two streams comprising two non-contiguous liquid phases.
3. Heat-exchanging said two non-contiguous liquid phases with a cool single liquid phase solution entering the heat source location, which may cool said two non-contiguous liquid phases.
4. Transferring said cool two non-contiguous liquid phases from a heat source location to the location of an application requiring heating.
5. Heat-exchanging said cool two non-contiguous liquid phases with a warm single liquid phase solution exiting the application requiring heating location, which may pre-heat said two non-contiguous liquid phases.
6. Mixing said pre-heated non-contiguous liquid phases to form an exothermic liquid-liquid phase transition, which may result in a warm single liquid phase combined solution.
7. The following are the options for step 7:
   a. Option A: If the temperature after mixing is less than the desired temperature for the application requiring heating, said warm single liquid phase combined solution may bypass heat exchanging with an application requiring heating to enable an adiabatic temperature increase until the temperature of the liquid increases to the desired setpoint temperature due to, for example, adiabatic heating.
   b. Option B: If the temperature after mixing is less than the desired temperature for the application requiring heating, a portion of said warm single liquid phase combined solution may heat exchange with an application requiring heating, although if may be desirable for the application requiring heating to remove less heat than the heat generated by the enthalpy of liquid-liquid phase transition. By removing less heat than the heat generated by the enthalpy of liquid-liquid phase transition, at least a portion of adiabatic heating may occur.
   c. Option C: If the temperature after mixing is near or equal to or greater than the desired temperature for the application requiring heating, said warm single liquid phase combined solution may heat exchange with an application requiring heating, providing heat to said application requiring heating.
8. Heat-exchanging the warm single liquid phase solution from step 7 with said cool two non-contiguous liquid phases, which may result in the formation of cool single liquid phase solution exiting the application requiring heating location. The present step may be the same as step 5, except from the perspective of the warm single liquid phase solution exiting the application requiring heating location.
9. Transferring said cool single liquid phase solution exiting the application requiring heating location to the heat source location.
10. Heat-exchanging said cool single liquid phase solution with warm two non-contiguous liquid phases exiting a heat source location, which may pre-heat said single liquid phase solution. The present step may be the same as step 3, except from the perspective of the cool single liquid phase solution entering the heat source location.

In some embodiments, a district cooling system may transfer a liquid-liquid phase transition liquid comprising two liquid non-contiguous liquid phases at a temperature greater than a liquid-liquid phase transition temperature range, then, at an application requiring cooling, mix the two liquid phases to generate an endothermic liquid-liquid phase transition and provide cooling to an application requiring cooling at a temperature significantly less than said transfer temperature. In some embodiments, adiabatic cooling may be created by a heat exchanging process, which may enable the temperature of cooling provided at an application requiring cooling to be greater than the difference of the liquid transfer temperature minus the adiabatic temperature fall. For example, an example system may involve: 1. Cooling liquid-liquid phase transition liquid comprising a single liquid phase to a temperature at or below a liquid-liquid phase transition temperature range to form an exothermic liquid-liquid phase transition and a mixture comprising two liquid phases.
2. Separating said two liquid phases using a liquid-liquid separation process, forming two streams comprising two non-contiguous liquid phases.
3. Heat-exchanging said two non-contiguous liquid phases with a warm single liquid phase solution entering the cooling source location, which may heat said two non-contiguous liquid phases, forming warm two non-contiguous liquid phases.
4. Transferring said warm two non-contiguous liquid phases from a cooling source location to the location of an application requiring cooling.
5. Heat-exchanging said warm two non-contiguous liquid phases with a cold single liquid phase solution exiting the application requiring cooling location, which may pre-cool said two non-contiguous liquid phases.
6. Mixing said pre-cooled non-contiguous liquid phases to form an endothermic liquid-liquid phase transition, which may result in a cold single liquid phase combined solution.
7. The following are the options for step 7:
   a. Option A: If the temperature after mixing is greater than the desired temperature for the application requiring cooling, said cold single liquid phase combined solution may bypass heat exchanging with an application requiring cooling to enable an adiabatic temperature decrease until the temperature of the liquid decreases to the desired setpoint temperature due to, for example, adiabatic cooling.
   b. Option B: If the temperature after mixing is greater than the desired temperature for the application requiring cooling, a portion of said cold single liquid phase combined solution may heat exchange with an application requiring cooling, although if may be desirable for the application requiring cooling to add less heat than the heat absorbed by the enthalpy of liquid-liquid phase transition. By adding less heat than the heat absorbed by the enthalpy of liquid-liquid phase transition, at least a portion of adiabatic cooling may occur.
   c. Option C: If the temperature after mixing is near or equal to or less than the desired temperature for the application requiring cooling, said cold single liquid phase combined solution may heat exchange with an application requiring cooling, removing heat from said application requiring cooling.
8. Heat-exchanging the cold single liquid phase solution from step 7 with said warm two non-contiguous liquid phases, which may result in the formation of warm single liquid phase solution exiting the application requiring cooling location. The present step may be the same as step 5, except from the perspective of the cold single liquid phase solution exiting the application requiring cooling location.

9. Transferring said warm single liquid phase solution exiting the application requiring cooling location to the cold source location.
10. Heat-exchanging said warm single liquid phase solution with cold two non-contiguous liquid phases exiting a cold source location, which may pre-cool said single liquid phase solution. The present step may be the same as step 3, except from the perspective of the warm single liquid phase solution entering the heat source location.

In some embodiments, adiabatic heating may enable a liquid-liquid phase transition liquid to provide heat to an application requiring heating at a temperature much greater than the temperature which the liquid-liquid phase transition liquid is transferred to the application requiring heating. For example, in some embodiments, providing heat at a temperature much greater than the temperature which the liquid-liquid phase transition liquid is transferred to the application requiring heating may involve a counter-current heat exchange process and a selective exothermic adiabatic liquid-liquid phase transition process. A selective exothermic adiabatic liquid-liquid phase transition process may involve forming an exothermic liquid-liquid phase transition without removing heat or while removing less heat than the enthalpy of a liquid-liquid phase transition or both. A selective exothermic adiabatic liquid-liquid phase transition process may involve allowing an exothermic liquid-liquid phase transition to increase the temperature of a liquid-liquid phase liquid and allowing said liquid-liquid phase liquid to exit a process through a counter-current heat exchanger at a higher temperature than the immediately preceding liquid-liquid phase transition liquid exiting the counter-current heat exchanger. A selective exothermic adiabatic liquid-liquid phase transition process may be considered 'selective' because, for example, the process may adjust the portion of an exothermic liquid-liquid phase transition undergoing a adiabatic liquid-liquid phase transition depending on various factors, which may include, but are not limited to, temperature requirement of a process requiring heating, or temperature of liquid-liquid phase transition liquid, or enthalpy of liquid-liquid phase transition, or heat exchange efficiency, or a combination thereof.

A counter-current heat exchange process may involve recovering at least a portion of the specific heat, or heat, or heat capacity of liquid-liquid phase transitioning liquids entering and/or exiting an application requiring heating to enable the heat provided to application requiring heating to be resulting from the enthalpy of a liquid-liquid phase transition. In some embodiments, a counter-current heat exchange process may involve a counter-current heat exchange of two cold non-contiguous liquid phases entering an application requiring heating and a warm single liquid phase solution exiting an application requiring heating.

If the temperature of the liquid-liquid phase transition liquid exiting the application requiring heating increases, the temperature of the two non-contiguous liquid phases entering the application requiring heating may increase after counter-current heat exchanging by the same temperature increase, which may result in a higher temperature provided to the application requiring heating if desired. The temperature of a liquid-liquid phase transition liquid exiting the application requiring heating may be increased by an exothermic adiabatic liquid-liquid phase transition.

In some embodiments, a liquid-liquid phase transition liquid comprising non-contiguous liquid phases are mixed to form an exothermic liquid-liquid phase transition and/or are allowed to adiabatically increase in temperature. In some embodiments, until a desired temperature is reached, minimal heat may be removed from the process, or the process may be insulated, or a combination thereof to facilitate, for example, adiabatic heating.

If the adiabatic temperature rise of an enthalpy of liquid-liquid phase transition is greater than the heat transfer temperature difference in a counter current heat exchanger, the temperature of the liquid will continue to increase until one or more or a combination of the following occur:
  The temperature of the mixed liquids reaches or approaches a liquid-liquid phase transition temperature range of a liquid; or
  Heat is removed from the liquid is at a rate greater than the rate of heat generated from the liquid-liquid phase transition minus heat exchange losses and the heat exchanger temperature difference.

In some embodiments, adiabatic cooling may enable a liquid-liquid phase transition liquid to provide cooling to an application requiring cooling at a temperature much lower than the temperature which the liquid-liquid phase transition liquid is transferred to the application requiring cooling. For example, in some embodiments, providing cooling at a temperature much lower than the temperature which the liquid-liquid phase transition liquid is transferred to the application requiring cooling may involve a counter-current heat exchange process and a selective endothermic adiabatic liquid-liquid phase transition process. A selective endothermic adiabatic liquid-liquid phase transition process may involve forming an endothermic liquid-liquid phase transition without adding heat or while adding less heat than the enthalpy of a liquid-liquid phase transition or both. A selective endothermic adiabatic liquid-liquid phase transition process may involve allowing an endothermic liquid-liquid phase transition to decrease the temperature of a liquid-liquid phase liquid and allowing said liquid-liquid phase liquid to exit a process through a counter-current heat exchanger at a lower temperature than the immediately preceding liquid-liquid phase transition liquid exiting the counter-current heat exchanger. A selective endothermic adiabatic liquid-liquid phase transition process may be considered 'selective' because, for example, the process may adjust the portion of an endothermic liquid-liquid phase transition undergoing an adiabatic liquid-liquid phase transition depending on various factors, which may include, but are not limited to, temperature requirement of a process requiring cooling, or temperature of liquid-liquid phase transition liquid, or enthalpy of liquid-liquid phase transition, or heat exchange efficiency, or a combination thereof.

A counter-current heat exchange process may involve recovering at least a portion of the specific heat, or heat, or heat capacity of liquid-liquid phase transitioning liquids entering and/or exiting an application requiring cooling to enable the cooling provided to application requiring cooling to be resulting from the enthalpy of a liquid-liquid phase transition. In some embodiments, a counter-current heat exchange process may involve a counter-current heat exchange of two warm non-contiguous liquid phases entering an application requiring cooling and a cold single liquid phase solution exiting an application requiring cooling.

If the temperature of the liquid-liquid phase transition liquid exiting the application requiring cooling decreases, the temperature of the two non-contiguous liquid phases entering the application requiring cooling may decrease after counter-current heat exchanging by the same temperature decrease, which may result in a lower temperature provided to the application requiring cooling if desired. The temperature of a liquid-liquid phase transition liquid exiting the application requiring cooling may be decreased by an endothermic adiabatic liquid-liquid phase transition.

In some embodiments, a liquid-liquid phase transition liquid comprising non-contiguous liquid phases are mixed to form an endothermic liquid-liquid phase transition and/or are allowed to adiabatically decrease in temperature. In some embodiments, until a desired temperature is reached, minimal heat may be added to the process, or the process may be insulated, or a combination thereof to facilitate, for example, adiabatic cooling.

If the adiabatic temperature fall of an enthalpy of liquid-liquid phase transition is greater than the heat transfer temperature difference in a counter current heat exchanger, the temperature of the liquid will continue to decrease until one or more or a combination of the following occur:

The temperature of the mixed liquids reaches or approaches a liquid-liquid phase transition temperature range of a liquid; or Heat is added to the liquid at a rate greater than the rate of heat absorbed by the liquid-liquid phase transition minus heat exchange losses and the heat exchanger temperature difference.

In some embodiments and some compositions, a mixing device may be beneficial to, for example, including, but not limited to, prevent solutions at a multi-liquid phase state from having one or more liquid phases undesirably accumulate or the liquid phases from undesirably fully layering during heat transfer.

In some embodiments, a coating may be applied to a pipe, or other equipment, or a combination thereof which ensures said pipe or other equipment is compatible with at least one liquid phase of a liquid-liquid phase transition liquid.

Some embodiments may employ sensors to monitor the viscosity of a heat transfer medium.

Some embodiments may employ sensors or process for monitoring the concentration of one or more reagents.

Some embodiments may employ sensors or process for monitoring degradation of one or more or a combination of reagents.

Some embodiments may employ processes for monitoring, or adding, or adjusting, or a combination thereof alkalinity or reserve alkalinity of a liquid-liquid phase transition liquid, or a heat transfer medium, or a combination thereof.

Some embodiments may employ processes for monitoring, or adding, or adjusting, or a combination thereof corrosion inhibitors, or degradation inhibitors, or oxygen scavengers, or a combination thereof in a liquid-liquid phase transition liquid, or a heat transfer medium, or a combination thereof.

Some embodiments may involve a process to regenerate and/or recycle one or more or a combination of reagents in a heat transfer medium. For example, a heat transfer medium may become contaminated, which may result in changes in liquid-liquid phase transitioning properties and/or solid-liquid phase transition properties and/or other heat transfer properties, and/or compatibility. Contaminants may be separated or removed. Alternatively or additionally, one or more or a combination of reagents may be, at least in part, separated, purified, or treated, and then combined in the appropriate ratios to form a desired liquid-liquid phase transitioning composition.

Some embodiments may relate to higher temperature thermal storage (for example: greater than room temperature, for example, greater than 25° C., or greater than 30° C., greater than 40° C., or greater than 50° C., or greater than 75° C., or greater than 100° C.). Some embodiments may relate to lower temperature thermal storage systems, both for cold or heat storage (for example: less than room temperature, for example, less than 25° C., or less than 15° C., or less than 10° C., or less than 5° C., or less than 0° C., or less than −5° C.).

Some embodiments may relate to thermal storage systems which exploit outdoor temperature variation, for example, diurnal or periodic temperature variation or weather or climate driven temperature variation, to absorb/store or release heat to reduce energy consumption, increase energy efficiency of heat pumps or chillers or air conditioners, and reduce stress on energy infrastructure, such as electricity grids or natural gas distribution networks.

Some embodiments may involve thermal storage which may act as an optimized intermediary between the outdoor environment or outdoor temperatures and the thermal demands of a heat pump or an air conditioner or a chiller. For example, for air conditioners or chillers, the thermal storage may store 'cold' or reject heat to the outside environment when the temperature of the outside environment is cooler than the temperature of the thermal storage and/or when the outside environment is appreciably colder than a calculated temperature based on weather predictions and patterns and/or when it is desirable based on one or more variables, such as weather forecasts, current and predicted demands on energy infrastructure, cost of energy, or other factors. For example, for air conditioners or chillers, the thermal storage may absorb heat or provide cooling to an air conditioner or a chiller or another thermal load when the temperature of the outside environment is warmer than the temperature of the thermal storage and/or when the outside environment is appreciably warmer than a calculated temperature based on weather predictions and patterns and/or when it is desirable based on one or more variables, such as weather forecasts, current and predicted demands on energy infrastructure, cost of energy, or other factors. For example, for heat pumps, the thermal storage may store heat from the outside environment when the temperature of the outside environment is hotter than the temperature of the thermal storage and/or when the outside environment is appreciably hotter than a calculated temperature based on weather predictions and patterns and/or when it is desirable based on one or more variables, such as weather forecasts, current and predicted demands on energy infrastructure, cost of energy, or other factors. For example, for heat pumps, the thermal storage may release heat to a heat pump or another thermal load when the temperature of the outside environment is colder than the temperature of the thermal storage and/or when the outside environment is appreciably colder than a calculated temperature based on weather predictions and patterns and/or when it is desirable based on one or more variables, such as weather forecasts, current and predicted demands on energy infrastructure, cost of energy, or other factors. The presently described embodiments may function as a less capital-intensive alternative to geothermal ground loops.

Some embodiments may involve or further comprise high energy density thermal storage batteries which may employ the enthalpy of fusion of water into ice as a heat source to provide a significant low cost relatively warm energy source for heat pumps during subzero Celsius weather and may provide a relatively inexpensive means to ensure heat pumps are universally more energy efficient, even in colder climates.

In some embodiments, thermal storage may act as a dispatchable source of heating or cooling, wherein the heat or 'cold' being dispatched is at a temperature which can be readily utilized by an application requiring heating or an application requiring cooling and, if desired, may be readily utilized without a further refrigeration cycle, chiller, or heat pump. For example, for cooling systems, the temperature released by the thermal storage may be at or below the desired temperature of the application requiring cooling. For example, for heating systems, the temperature released by the thermal storage may be at or above the desired temperature of the application requiring heating. The presently described type of embodiment may require operation of a cold source or a chiller or a refrigeration cycle or a heater or a heat pump to generate the desired temperatures during the charging of the thermal storage device. Charging or discharging may be conducted according to the optimization of one or more variables. For example, to minimize energy consumption, charging may be conducted when the temperature difference between the outdoor temperature and the desired thermal storage temperature is relatively minimal (maximizing coefficient of performance) and discharging may be conducted when the temperature difference between the outdoor temperature and the desired thermal storage temperature is relatively greater. For example, to minimize costs or grid stress or prevent curtailment events, charging may be conducted when the cost of electricity or natural gas or other energy source is lesser or when there is excess electricity on the grid and discharging may be conducted when the cost of electricity or natural gas or other energy source is greater or when the energy grid is constrained.

Some embodiments may involve a mixing process which may operate even when the heat transfer system is not operating to prevent an uneven distribution of liquid-liquid phase transition reagents in a heat transfer process, due to, for example, liquid-liquid separation and layering.

Some embodiments may involve adjusting the phase transition temperature of the liquid-liquid phase transitioning liquid when an application requiring cooling and/or heating switches from requiring cooling to heating, or from requiring heating to cooling, or changes operating temperature ranges, or a combination thereof.

In some embodiments, when an application requiring heat transfer is not in operation or is temporarily not in operation or is off or is at an off state, a liquid-liquid phase transitioning heat transfer liquid may continue to be pumped or mixed periodically or continuously to, for example, ensure a desired distribution of liquid-liquid phase transitioning regents, for example, especially where a liquid-liquid phase transition liquid is at a multi-liquid phase state. Alternatively or additionally, liquid-liquid phase transitioning liquids may be temporarily removed from the heat transfer system and/or may be temporarily displaced with, for example air or nitrogen or inert gas and/or may be stored in a tank or a thermal storage tank. Said temporarily removed liquids may be stored in a storage vessel. Said vessel may be periodically mixed or continuously mixed or mixed before the addition of liquid-liquid phase transitioning liquid to a heat transfer application. Said mixing may be employed to ensure that an even distribution of reagents or the desired distribution of reagents are in the liquid-liquid phase transition heat transfer system or heat transfer liquid. By ensuring the desired distribution of reagents in a liquid-liquid phase transitioning heat transfer liquid, the heat transfer liquid may perform optimally and achieve its necessary heat transfer performance, which may include, but is not limited to, for example, one or more or a combination of the following: enthalpy of phase transition, temperature range of phase transition, and viscosity. Alternatively or additionally, said storage vessel may be maintained at a temperature where the solution is a single liquid phase combined solution or at a state where one liquid phase is significantly greater in mass or volume than other liquid phase(s). If desired, said liquid-liquid phase transitioning liquid in said vessel may be returned to said heat transferring system and may displace gases. Advantageously, said liquid-liquid phase transitioning heat transfer liquids may be returned to the heat transfer system at a state wherein the reagents are evenly distributed or at a desired distribution, which may allow for a more seamless restart or return to operation.

Some embodiments may involve a process for pre-mixing, or pre-heating, or pre-cooling or a combination thereof a liquid-liquid phase transition heat transfer liquid before or while adding or retrofitting or installing said liquid-liquid heat transfer liquid into an application. The presently described embodiments may be, for example, beneficial for HVAC technicians and/or other personnel or machines involved with installing or retrofitting or substituting in a liquid-liquid phase transitioning liquid or other heat transfer medium described herein in a heat transfer system. The present device may be portable. The present device may be modular. The present device may be internally or self powered, or externally powered, or a combination thereof. For example, the present device may be powered by, for example, including, but not limited to, one or more or a combination of the following: electricity from on-board batteries, or electricity from an electrical grid, or powered by compressed air, or powered by pneumatic means, or powered by a liquid fuel powered generator, or powered by a liquid fuel powered engine, or powered by a combustion driven engine, or powered by a reduction—oxidation reaction.

Data center cooling may employ higher temperature liquid-liquid phase transitions and higher temperature evaporator side heat exchangers compared to human occupied building HVAC air conditioning because computers may operate effectively at higher temperatures and humidity than human comfort levels. For example, some data centers operate with an air temperature 80-90 F, as some computers or servers can operate effectively while being cooling at this temperature. Heat transfer mediums may be engineered to possess a liquid-liquid phase transition, or solid-liquid phase transition, or both in the temperature range appropriate for data center cooling in applications involving data center cooling.

Some embodiments may involve cooling a liquid-liquid phase transition heat transfer liquid to below the temperature range of a liquid-liquid phase transition before or while adding the heat transfer liquid to a system. The present step or process may facilitate the installation process or retrofit process or manufacturing process by, for example, ensuring the proper composition is being added to the system and minimal losses of one or more reagents during transfer. For example, by adding the liquid-liquid phase transitioning liquid as a nearly fully mixed or fully homogenous composition or a composition with relatively evenly distributed reagents, it may prevent the accumulation or separation of relatively viscous or dense reagents, if any.

Some embodiments may involve preheating a liquid-liquid phase transition heat transfer liquid to above the temperature of a liquid-liquid phase transition or solid-liquid phase transition or both before adding to a system. The present step or process may facilitate a installation process or retrofit process or manufacturing process by, for example, ensuring the proper composition is being added to the system and minimal losses of one or more reagents during transfer. For example, by adding the liquid-liquid phase transitioning liquid as a nearly fully mixed or fully homogenous composition or a composition with relatively evenly distributed reagents, it may prevent the accumulation of relatively viscous or dense reagents, if any.

Some embodiments may involve premixing a liquid-liquid phase transition heat transfer liquid to ensure the reagents/components are appropriately distributed. The presently described embodiments may be especially applicable if the liquid-liquid phase transitioning liquid is at a multi-liquid phase state. The present step or process may facilitate the installation process or retrofit process or manufacturing process by, for example, ensuring the proper composition is being added to the system and minimal losses of one or more reagents during transfer. For example, by installing a liquid-liquid phase transitioning liquid as a nearly fully mixed or fully homogenous composition or a composition with relatively evenly distributed reagents, it may prevent the accumulation of relatively viscous or dense reagents, if any.

Some embodiments may involve heat exchanging or employing liquid-liquid phase transitioning liquids directly with or in for example including, but not limited to, one or more or a combination of the following: a condenser side, an evaporative cooling tower side, or air an cooled heat exchanger. In some embodiments, at least a portion of a liquid-liquid phase transition liquid heat transfer medium may be employed directly in a process comprising a vapor-gap membrane, or pervaporation membrane, or membrane distillation membrane, or gas liquid contact membrane, or gas liquid contactor with separation or barrier to minimize non-water liquid losses or losses of non-gaseous components, or a combination thereof. Some embodiments may allow water to evaporate from a liquid-liquid phase transitioning liquid, which may facilitate cooling, without or with minimal or with less losses of non-volatile or less volatile or components at a non-gaseous or liquid or solid state.

Some embodiments may employ processes for monitoring the concentration of one or more reagents in a heat transfer medium and/or monitor the pH of a heat transfer medium.

EXAMPLE FIGURE KEYS

Figure 1B:
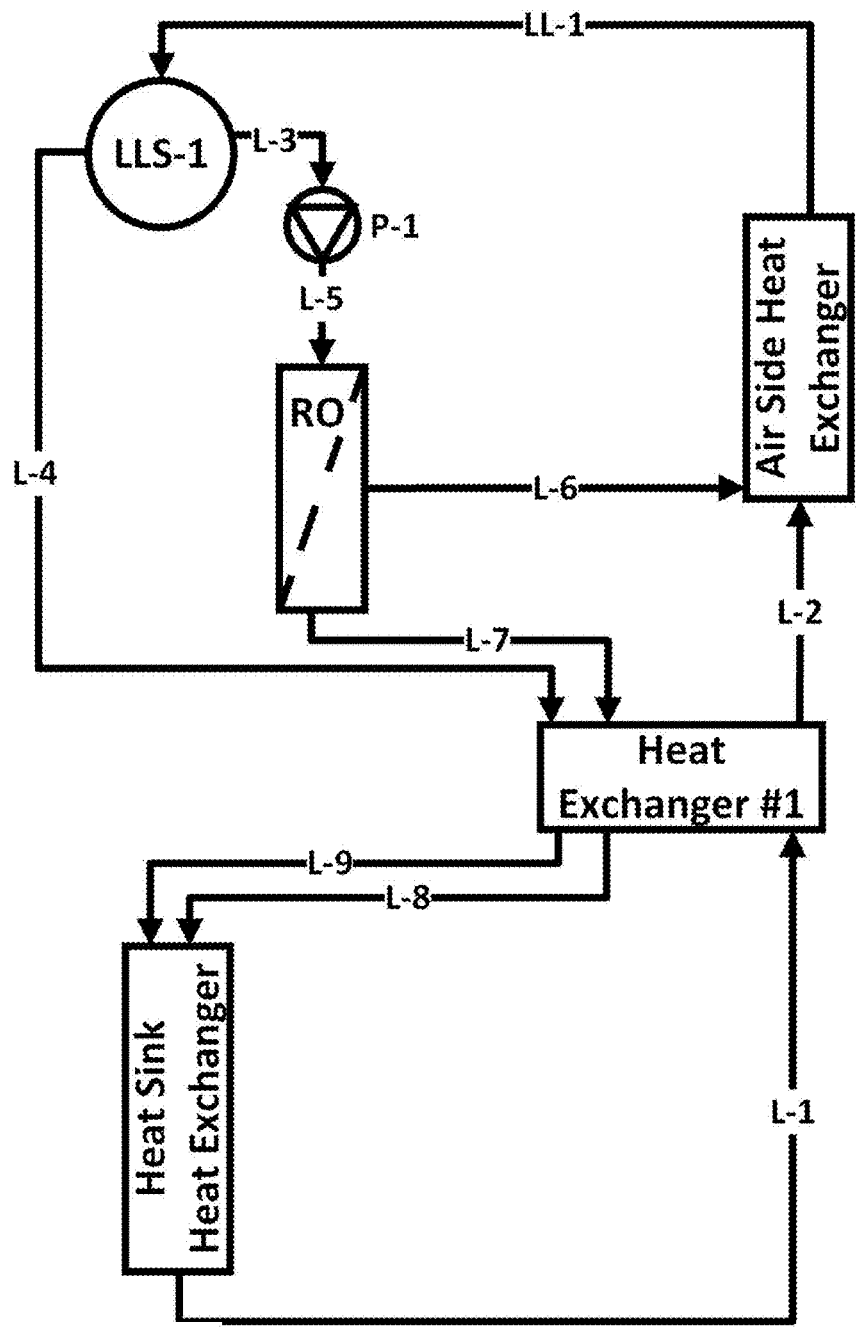
FIG. 1B: Liquid-Liquid Phase Transition Refrigeration Cycle with Mixing Inside Air Side Heat Exchanger and Heat Sink Heat Exchanger.

| FIGS. 1A, 1B | |
|---|---|
| L-1 | 'Warm' single liquid phase combined solution. |
| Heat Exchanger #2 | A heat sink or heat source heat exchanger. In some embodiments, may comprise a heat exchanger with an application requiring cooling or a heat source. Heat exchanger may be configured to mix liquid phases or conduct a liquid-liquid phase transition or both within the heat exchanger, which may result in more efficient heat transfer or higher performing heat transfer. |
| L-2 | 'Cold' single liquid phase combined solution. |
| LL-1 | May comprise a multi-liquid phase mixture, which may comprise a liquid-liquid phase transition temperature phase transition temperature adjustment reagent and a liquid-liquid phase transition composition. May comprise a multi-liquid phase mixture produced from an endothermic liquid-liquid phase transition. |
| LLS-1 | A liquid-liquid separation process. May comprise a process to separation a multi-liquid phase mixture into two or more non-contiguous liquid phases. May, involve, for example, including, but not limited to, density or coalescing or a combination thereof based separation. May include, but is not limited to, one or more or a combination of liquid-liquid separation systems and/or methods described herein or known in the art. |
| L-3 | May comprise a single liquid phase separated from a multi-liquid phase mixture by a liquid-liquid separation process. In some embodiments, may comprise a dilute solution comprising phase transition temperature adjustment reagent. In some embodiments, may comprise a dilute aqueous solution comprising phase transition temperature adjustment reagent. |
| P-1 | A pump or a high pressure pump |
| L-4 | May comprise a single liquid phase separated from a multi-liquid phase mixture by a liquid-liquid separation process. In some embodiments, may comprise a reagent or combination of reagents which may comprise at least a portion of a liquid-liquid phase transition liquid composition. In some embodiments, may comprise a mostly organic liquid phase, or mostly ionic-liquid liquid phase, or a combination thereof. |
| L-5 | May be the same as L-3, although may be higher pressure. |
| RO | A phase transition temperature or enthalpy of phase transition temperature adjustment process, or solubility adjustment process, or concentration adjustment process. May comprise a separation process, which may be employed to adjust the concentration of a phase transition temperature adjustment reagent and/or regenerate a liquid phase with a lower concentration of phase transition temperature adjustment reagent. In some embodiments, may comprise a membrane-based process, such as reverse osmosis, or nanofiltration, or ultrafiltration, or membrane distillation, or high pressure reverse osmosis, or high pressure nanofiltration, or organic solvent nanofiltration, or a combination thereof. |
| L-6 | May comprise a retentate or concentrate solution resulting from a separation process. May comprise a concentrated phase transition temperature adjustment reagent solution. In some embodiments, may comprise a concentrated solution comprising phase transition temperature adjustment reagent. In some embodiments, may comprise a concentrated aqueous solution comprising phase transition temperature adjustment reagent. |
| L-7 | May comprise a permeate solution resulting from a separation process. May comprise a liquid with lower, or significantly lower, or practically no concentration of phase transition temperature adjustment reagent relative to L-5. In some embodiments, may comprise aqueous solution or water with lower, or significantly lower, or practically no concentration of phase transition temperature adjustment reagent relative to L-5. |

| FIGS. 1A, 1B | |
|---|---|
| Heat Exchanger #1 | A counter current heat exchanger. May heat exchange two non-contiguous liquid phases with one single liquid phase combined solution. May enable the formation of two 'temperature zones', which may enable a liquid-liquid phase transition liquid based system to operate with a temperature difference greater than an adiabatic temperature change of an enthalpy of liquid-liquid phase transition. |
| L-8 | May comprise a 'warm' liquid of the same composition of L-7, which may be at a higher temperature than L-7. May comprise L-7 after heat exchanging in a counter-current heat exchanger. |
| L-9 | May comprise a 'warm' liquid of the same composition of L-4, which may be at a higher temperature than L-4. May comprise L-4 after heat exchanging in a counter-current heat exchanger |
| Heat Exchanger #3 | A heat sink or heat source heat exchanger. In some embodiments, may comprise a heat exchanger with a heat sink or application requiring heating. Heat exchanger may be configured to mix liquid phases or conduct a liquid-liquid phase transition or both within the heat exchanger, which may result in more efficient heat transfer or higher performing heat transfer. |
| L-1 | May comprise a single liquid combined solution. May comprise a single liquid phase combined solution, which may have resulted from the mixing and/or heat exchange in Heat Exchanger #3. May comprise a single liquid phase combined solution which may have resulted from an exothermic liquid-liquid phase transition from the mixing of L-8 and L-9. |
| Air Side Heat Exchanger | An air handler heat exchanger or air heat exchanger which may heat exchange air with a liquid-liquid phase transition liquid. A liquid-liquid phase transition liquid may undergo an enthalpy of phase transition within the air side heat exchanger. May be employed to heat or cooled air. For example, in some embodiments, may involve forming an endothermic liquid-liquid phase transition within an air side heat exchanger, which may facilitate heat transfer. |
| Heat Sink Heat Exchanger | A heat exchanger which may heat exchange a liquid-liquid phase transition liquid with a heat sink or application requiring heating. A liquid-liquid phase transition liquid may undergo an enthalpy of phase transition within the heat sink heat exchanger. For example, in some embodiments, may involve forming an exothermic liquid-liquid phase transition within a heat sink heat exchanger, which may facilitate heat transfer. |

Figure 2A:
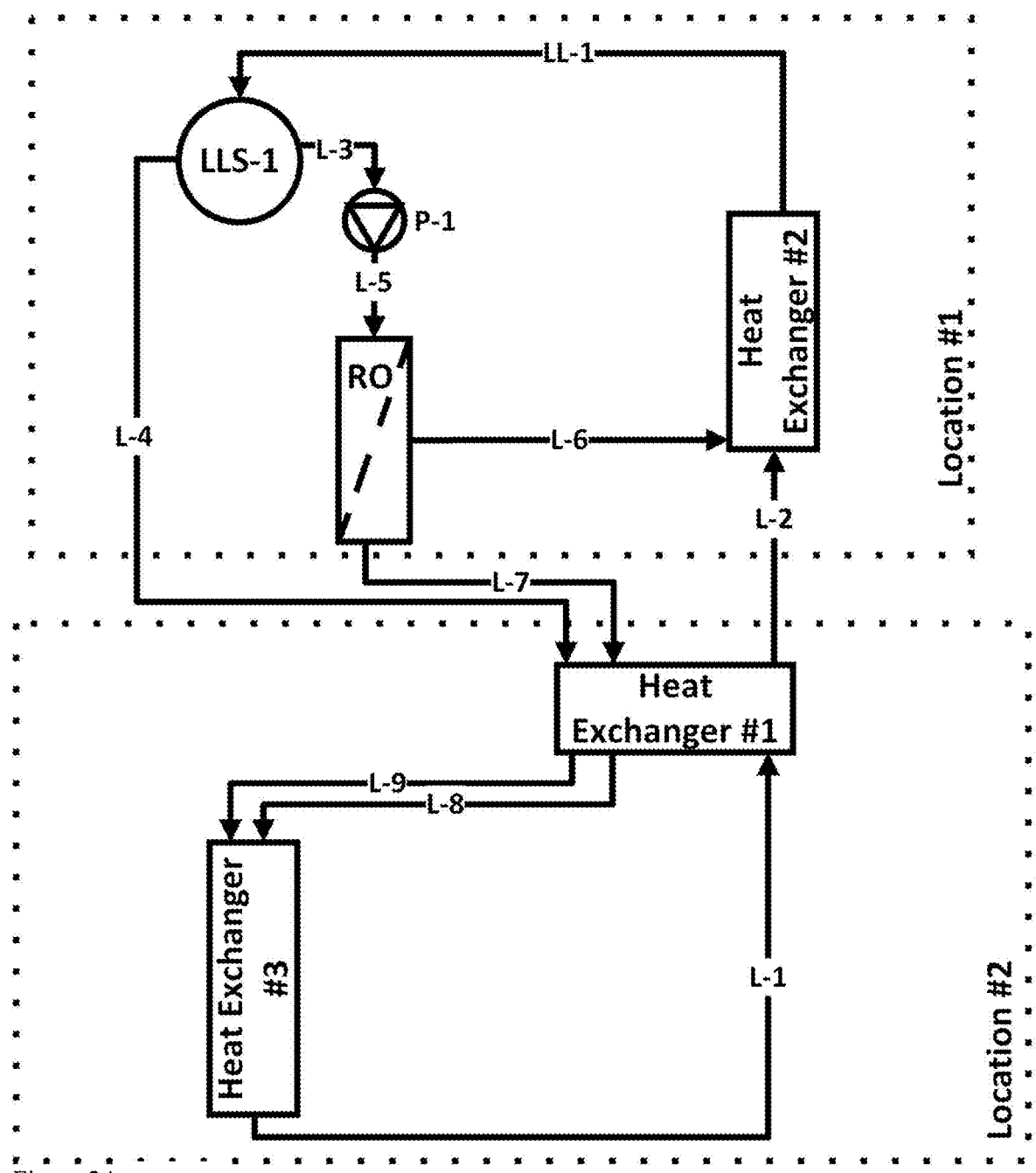
FIG. 2A: Liquid-Liquid Phase Transition Refrigeration Cycle with Endothermic Liquid-Liquid Phase Transition and Exothermic Liquid-Liquid Phase Transition Conducted in Separate Locations.

| FIG. 2A (same as FIG. 1, except the following) | |
|---|---|
| L-2 | 'Cold' single liquid phase combined solution. May be transferred a relatively long distance to between Location #2 and Location #1. |
| L-7 | May comprise a permeate solution resulting from a separation process. May comprise a liquid with lower, or significantly lower, or practically no concentration of phase transition temperature adjustment reagent relative to L-5. In some embodiments, may comprise aqueous solution or water with lower, or significantly lower, or practically no concentration of phase transition temperature adjustment reagent relative to L-5. May be transferred a relatively long distance between Location #1 and Location #2. |
| L-4 | May comprise a single liquid phase separated from a multi-liquid phase mixture by a liquid-liquid separation process. In some embodiments, may comprise a reagent or combination of reagents which may comprise at least a portion of a liquid-liquid phase transition liquid composition. In some embodiments, may comprise a mostly organic liquid phase, or mostly ionic-liquid liquid phase, or a combination thereof. May be transferred a relatively long distance between Location #1 and Location #2. |
| Location #1 | May comprise components relatively close to each other and relatively far from components in Location #2. |
| Location #2 | May comprise components relatively close to each other and relatively far from components in Location #1. |

Figure 2B:
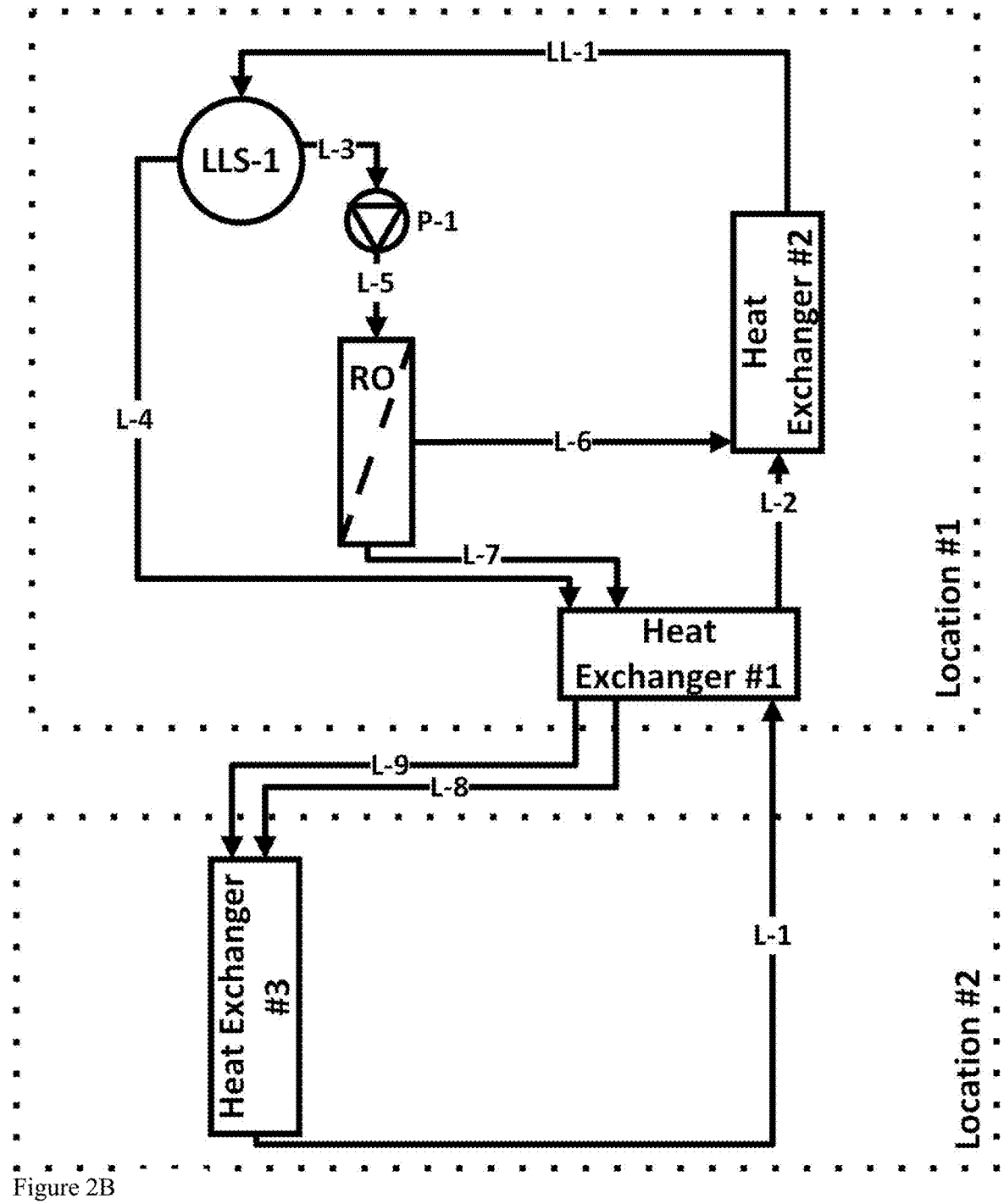
FIG. 2B: Liquid-Liquid Phase Transition Refrigeration Cycle with Endothermic Liquid-Liquid Phase Transition and Exothermic Liquid-Liquid Phase Transition Conducted in Separate Locations.

| FIG. 2B (same as FIG. 1, except the following) | |
|---|---|
| L-1 | May comprise a single liquid combined solution. May comprise a single liquid phase combined solution, which may have resulted from the mixing and/or heat exchange in Heat Exchanger #3. May comprise a single liquid phase combined solution which may have resulted from an exothermic liquid-liquid phase transition from the mixing of L-8 and L-9. May be transferred a relatively long distance to between Location #2 and Location #1. |

| FIG. 2B (same as FIG. 1, except the following) | |
|---|---|
| L-8 | May comprise a 'warm' liquid of the same composition of L-7, which may be at a higher temperature than L-7. May comprise L-7 after heat exchanging in a counter-current heat exchanger. May be transferred a relatively long distance between Location #1 and Location #2. |
| L-9 | May comprise a 'warm' liquid of the same composition of L-7, which may be at a higher temperature than L-7. May comprise L-7 after heat exchanging in a counter-current heat exchanger. May be transferred a relatively long distance between Location #1 and Location #2. |
| Location #1 | May comprise components relatively close to each other and relatively far from components in Location #2. |
| Location #2 | May comprise components relatively close to each other and relatively far from components in Location #1. |

Figure 3:
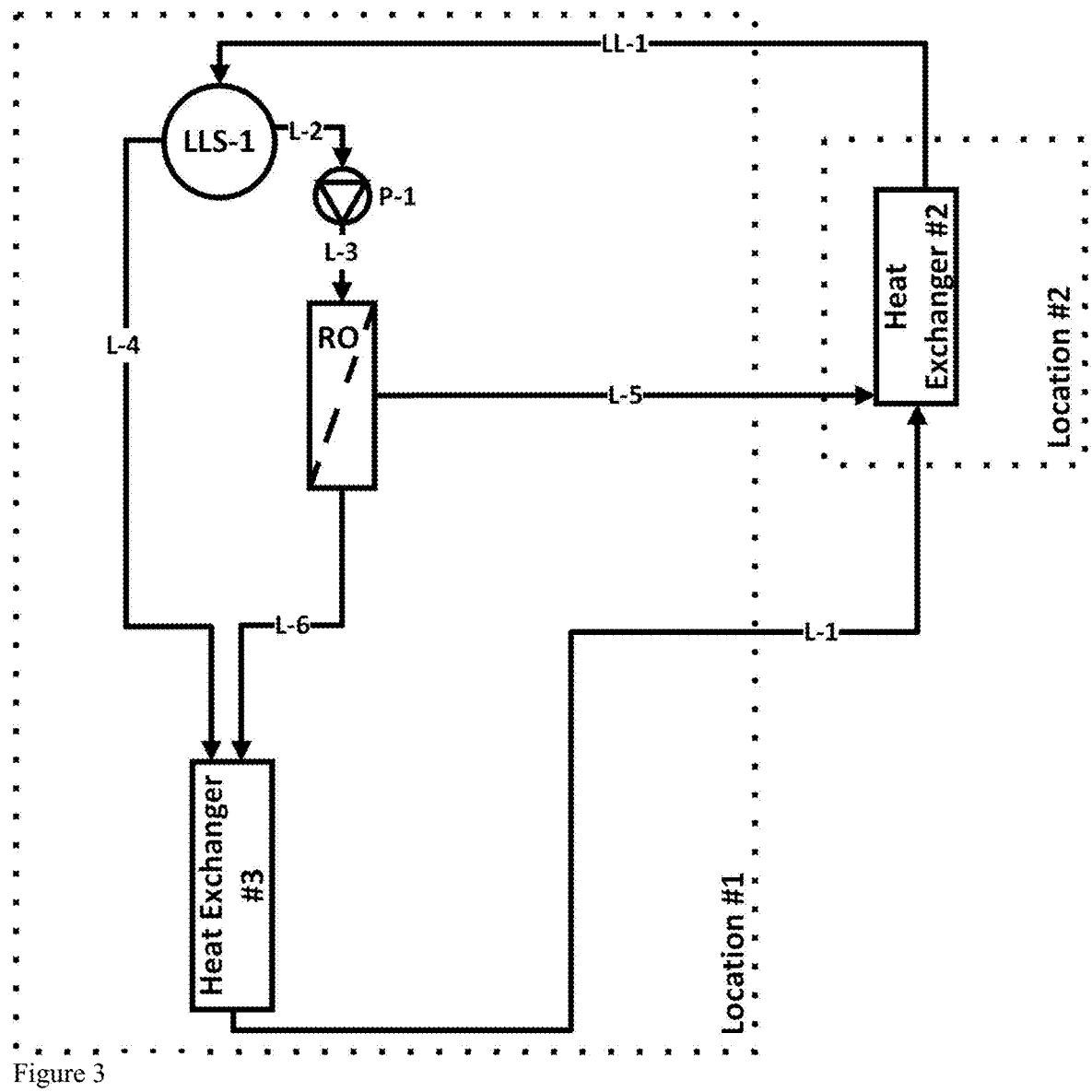
FIG. 3: Liquid-Liquid Phase Transition Refrigeration Cycle with Endothermic Liquid-Liquid Phase Transition and Exothermic Liquid-Liquid Phase Transition Conducted in Separate Locations.

| FIG. 3 | |
|---|---|
| L-1 | Single liquid phase combined solution. May comprise single liquid phase combined solution after an exothermic liquid-liquid phase transition inside Heat Exchanger #3. May be transferred a relatively long distance to between Location #1 and Location #2. |
| Heat Exchanger #2 | A heat sink or heat source heat exchanger. In some embodiments, may comprise a heat exchanger with an application requiring cooling or a heat source. Heat exchanger may be configured to mix liquid phases or conduct a liquid-liquid phase transition or both within the heat exchanger, which may result in more efficient heat transfer or higher performing heat transfer. In some embodiments, an endothermic liquid-liquid phase transition may occur in Heat Exchanger #2. Heat Exchanger #2 may be located in Location #2. |
| LL-1 | May comprise a multi-liquid phase mixture, which may comprise a liquid-liquid phase transition temperature phase transition temperature adjustment reagent and a liquid-liquid phase transition composition. May comprise a multi-liquid phase mixture produced from an endothermic liquid-liquid phase transition. May be transferred a relatively long distance to between Location #2 and Location #1. |
| LLS-1 | A liquid-liquid separation process. May comprise a process to separation a multi-liquid phase mixture into two or more non-contiguous liquid phases. May, involve, for example, including, but not limited to, density or coalescing or a combination thereof based separation. May include, but is not limited to, one or more or a combination of liquid-liquid separation systems and/or methods described herein or known in the art. |
| L-2 | May comprise a single liquid phase separated from a multi-liquid phase mixture by a liquid-liquid separation process. In some embodiments, may comprise a dilute solution comprising phase transition temperature adjustment reagent. In some embodiments, may comprise a dilute aqueous solution comprising phase transition temperature adjustment reagent. |
| P-1 | A pump or a high pressure pump |
| L-3 | May be the same as L-2, although may be higher pressure. |
| L-4 | May comprise a single liquid phase separated from a multi-liquid phase mixture by a liquid-liquid separation process. In some embodiments, may comprise a reagent or combination of reagents which may comprise at least a portion of a liquid-liquid phase transition liquid composition. In some embodiments, may comprise a mostly organic liquid phase, or mostly ionic-liquid liquid phase, or a combination thereof. |
| RO | A phase transition temperature or enthalpy of phase transition temperature adjustment process, or solubility adjustment process, or concentration adjustment process. May comprise a separation process, which may be employed to adjust the concentration of a phase transition temperature adjustment reagent and/or regenerate a liquid phase with a lower concentration of phase transition temperature adjustment reagent. In some embodiments, may comprise a membrane-based process, such as reverse osmosis, or nanofiltration, or ultrafiltration, or membrane distillation, or high pressure reverse osmosis, or high pressure nanofiltration, or organic solvent nanofiltration, or a combination thereof. |
| L-5 | May comprise a retentate or concentrate solution resulting from a separation process. May comprise a concentrated phase transition temperature adjustment reagent solution. In some embodiments, may comprise a concentrated solution comprising phase transition temperature adjustment reagent. In some embodiments, may comprise a concentrated aqueous solution comprising phase transition temperature adjustment reagent. |
| L-6 | May comprise a permeate solution resulting from a separation process. May comprise a liquid with lower, or significantly lower, or practically no concentration of phase transition temperature adjustment reagent relative to L-3. In some embodiments, may comprise aqueous solution or water with lower, or significantly lower, or practically no concentration of phase transition temperature adjustment reagent relative to L-3. |

FIG. 3

| | |
|---|---|
| Heat Exchanger #3 | A heat sink or heat source heat exchanger. In some embodiments, may comprise a heat exchanger with a heat sink or application requiring heating. Heat exchanger may be configured to mix liquid phases or conduct a liquid-liquid phase transition or both within the heat exchanger, which may result in more efficient heat transfer or higher performing heat transfer. In some embodiments, an exothermic liquid-liquid phase transition may occur within Heat Exchanger #3. |
| Location #1 | May comprise components relatively close to each other and relatively far from components in Location #2. |
| Location #2 | May comprise components relatively close to each other and relatively far from components in Location #1. |

Figure 4:
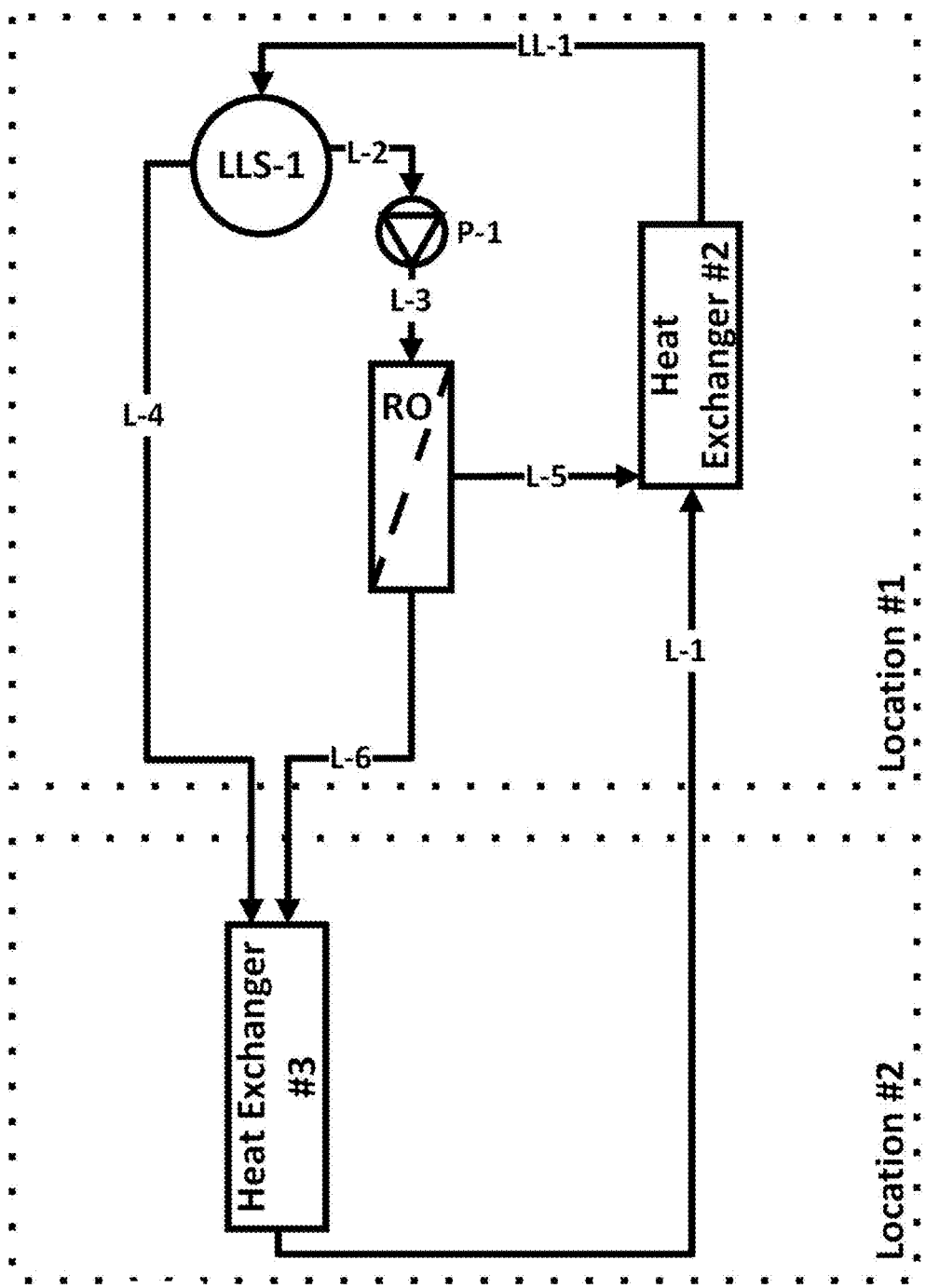
FIG. 4: Liquid-Liquid Phase Transition Refrigeration Cycle with Endothermic Liquid-Liquid Phase Transition and Exothermic Liquid-Liquid Phase Transition Conducted in Separate Locations.
Figure 5:
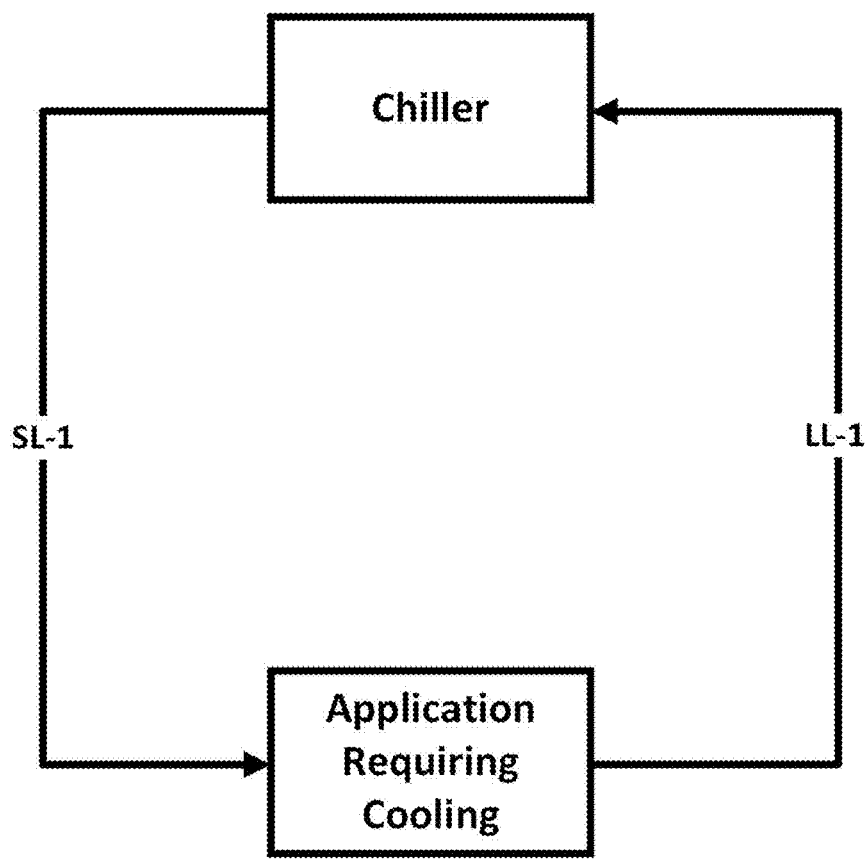
FIG. 5: Cooling Process Employing Heat Transfer Medium Comprising Liquid-Liquid Phase Transition Liquid and Solid-liquid phase change Material.

FIG. 4 (Same as FIG. 3 Except the Following)

| | |
|---|---|
| L-4 | Same as FIG. 3, except L-4 may be transferred a relatively long distance to between Location #1 and Location #2. |
| L-6 | Same as FIG. 3, except L-6 may be transferred a relatively long distance to between Location #1 and Location #2. |
| Heat Exchanger #3 | Same as FIG. 3, except located in Location #2. |
| Location #1 | May comprise components relatively close to each other and relatively far from components in Location #2. |
| Location #2 | May comprise components relatively close to each other and relatively far from components in Location #1. |

FIG. 5

| | |
|---|---|
| LL-1 | A multi-liquid phase mixture heat transfer medium comprising a liquid-liquid phase transition liquid. May be at a temperature above at least a portion of a liquid-liquid phase transition temperature range. May be at a temperature above a solid-liquid phase change temperature. May comprise 'warm' return heat transfer medium. May comprise liquid-liquid phase transition liquid wherein one or more reagents in the liquid-liquid phase transition liquid or dissolved in the liquid-liquid phase transition liquid may comprise a solid-liquid phase change material. |
| Chiller | A heat exchanger or process for cooling or removing heat from the heat transfer medium. In some embodiments, may be configured to be compatible with liquid-liquid phase transition liquid, solid-liquid phase change material, or a combination thereof. |
| SL-1 | A solid-liquid slurry. May comprise a heat transfer medium comprising a liquid-liquid phase transition liquid as a single liquid phase combined solution below at least a portion of a liquid-liquid phase transition temperature range and a solid-liquid phase change material with at least a portion at a solid phase. |
| Application Requiring Cooling | A heat exchanger or process which may be cooled or have heat removed by the heat transfer medium. A heat exchanger or process which may heat the heat transfer medium. May comprise an application requiring cooling which may benefit from the greater heat capacity and/or other improved heat transfer properties of a heat transfer medium possessing both a liquid-liquid phase transition and a solid-liquid phase change. |

FIG. 6A

| | |
|---|---|
| LL-1 | A multi-liquid phase mixture heat transfer medium comprising a liquid-liquid phase transition liquid. May be at a temperature above at least a portion of a liquid-liquid phase transition temperature range. May be at a temperature above a solid-liquid phase change temperature. May comprise 'warm' return heat transfer medium. May comprise liquid-liquid phase transition liquid wherein one or more reagents in the liquid-liquid phase transition liquid or dissolved in the liquid-liquid phase transition liquid may comprise a solid-liquid phase change material. |
| Heat Exchanger #1 | A heat exchanger or process for cooling a heat transfer medium to below at least a portion of a liquid-liquid phase transition temperature range or an enthalpy of liquid-liquid phase transition temperature range. In some embodiments, Heat Exchanger #1 may cool the heat transfer medium to a temperature below at least a portion of a liquid-liquid phase transition |

Figure 6A:
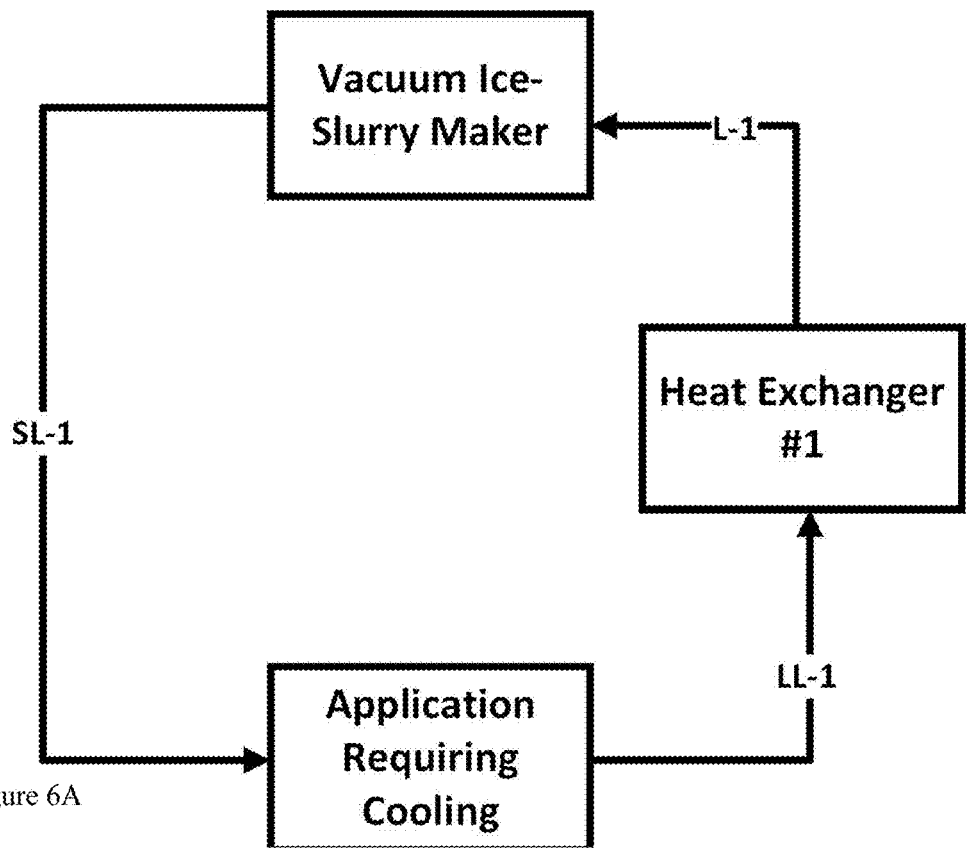
FIG. 6A: Cooling Process with Heat Transfer Medium Comprising Liquid-Liquid Phase Transition Liquid and Solid-liquid phase change Material wherein Cooling in the Temperature Range of Enthalpy of Liquid-Liquid Phase Transition and Cooling in the Temperature Range of Solid-liquid phase change are Conducted as Separate Steps
Figure 6B:
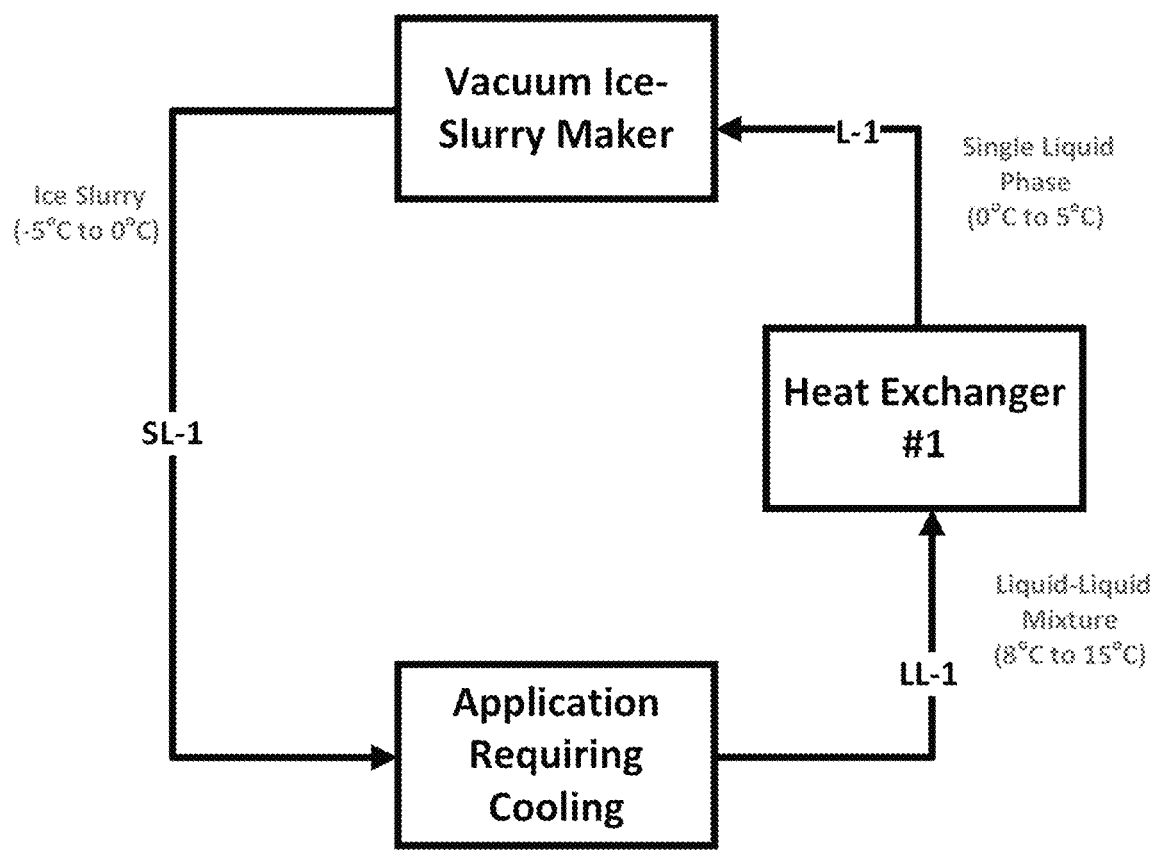
FIG. 6B: Cooling Process with Heat Transfer Medium Comprising Liquid-Liquid Phase Transition Liquid and Solid-liquid phase change Material wherein Cooling in the Temperature Range of Enthalpy of Liquid-Liquid Phase Transition and Cooling in the Temperature Range of Solid-liquid phase change are Conducted as Separate Steps with Example Temperatures and Heat Transfer Medium States of an Example Embodiments.

| | FIG. 6A |
|---|---|
| | temperature range or an enthalpy of liquid-liquid phase transition temperature range and above a solid-liquid phase change temperature of a solid-liquid phase change material in the heat transfer medium. |
| L-1 | A heat transfer medium at a temperature below at least a portion of a liquid-liquid phase transition temperature range or an enthalpy of liquid-liquid phase transition temperature range and above a solid-liquid phase change temperature of a solid-liquid phase change material in the heat transfer medium. L-1 may be transferred between a heat exchanger or cooling process configured to cool liquid phase or a liquid-liquid phase transition liquid and a cooling process configured to form at least a portion of a solid phase in a solid-liquid phase change or form a solid - liquid slurry. |
| Vacuum Ice Slurry Maker | A process for produce a solid-liquid slurry from a liquid phase solution. In some embodiments, an vacuum chiller or evaporation based chilled or mechanical vapor compression chiller may be employed to cool a liquid phase solution into a solid-liquid phase mixture. For example, if one or more or a combination of reagents in a liquid-liquid phase transition liquid possess a vapor pressure, a vacuum chiller may be employed to produce a solid-liquid phase slurry. For example, in some embodiments, a liquid-liquid phase transition medium may comprise at least a portion water and a vacuum chiller may enable the formation of a solid-liquid mixture. May involve cooling a heat transfer medium at a temperature below at least a portion of a liquid-liquid phase transition temperature range or enthalpy of liquid-liquid phase transition temperature range to a temperature at or below a solid-liquid phase change temperature of, for example, a solid-liquid phase change material in a heat transfer medium. |
| SL-1 | A solid-liquid slurry. May comprise a heat transfer medium comprising a liquid-liquid phase transition liquid as a single liquid phase combined solution below at least a portion of a liquid-liquid phase transition temperature range and a solid-liquid phase change material with at least a portion at a solid phase. |
| Application Requiring Cooling | A heat exchanger or process which may be cooled or have heat removed by the heat transfer medium. A heat exchanger or process which may heat the heat transfer medium. May comprise an application requiring cooling which may benefit from the greater heat capacity and/or other improved heat transfer properties of a heat transfer medium possessing both a liquid-liquid phase transition and a solid-liquid phase change. |

Figure 7:
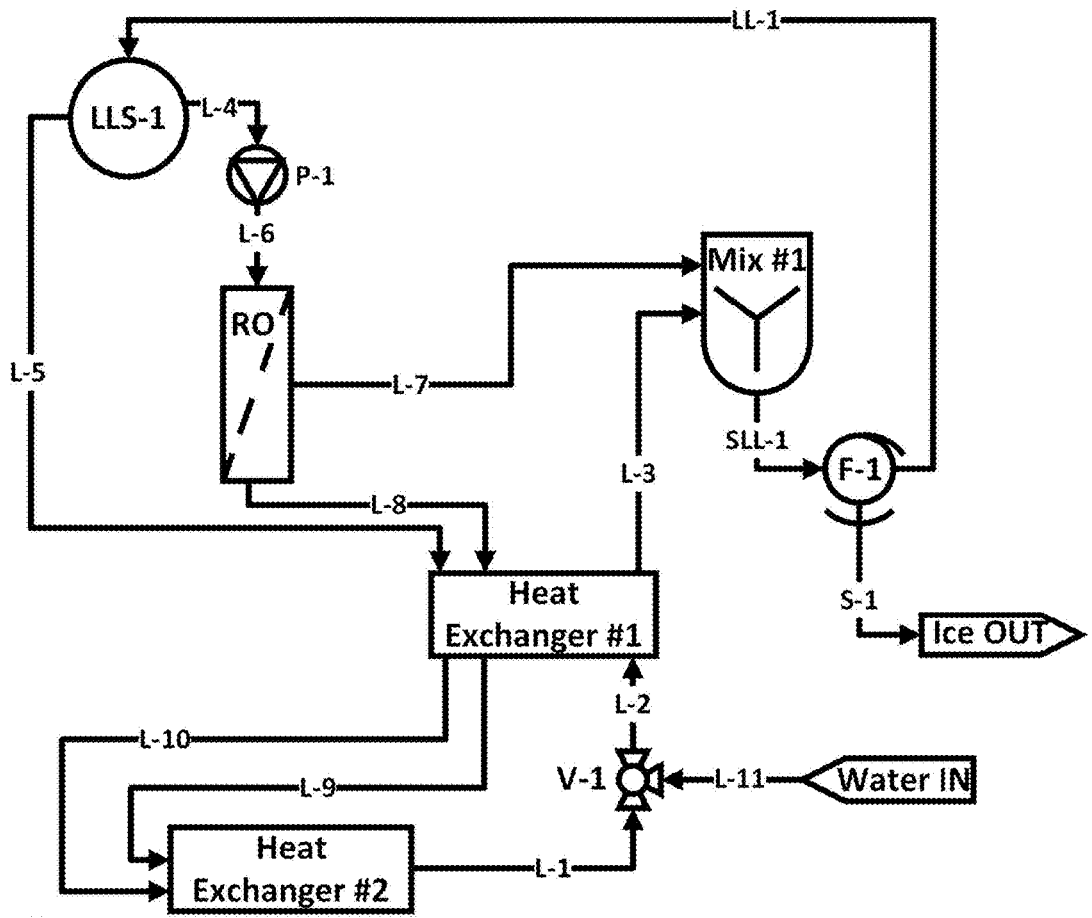
FIG. 7: Liquid-Liquid Phase Transition Refrigeration Cycle Process for Ice Making with Temperature Zones

| | FIG. 7 |
|---|---|
| LL-1 | A multi-liquid phase mixture heat transfer medium comprising a liquid-liquid phase transition liquid. May comprise a heat transfer medium after at least a portion of solid-liquid phase change material is separated following an endothermic liquid-liquid phase transition. May comprise a liquid-liquid phase transition liquid separated from a solid-liquid separation process. May comprise a liquid-liquid phase transition liquid with at least one liquid phase comprising at least a portion of a liquid-liquid phase transition temperature adjustment reagent. |
| LLS-1 | A liquid-liquid separation process, which may separate a multi-liquid phase mixture into two or more non-contiguous liquid phases. May, involve, for example, including, but not limited to, density or coalescing or a combination thereof based separation. May include, but is not limited to, one or more or a combination of liquid-liquid separation systems and/or methods described herein or known in the art. |
| L-4 | May comprise a single liquid phase separated from a multi-liquid phase mixture by a liquid-liquid separation process. In some embodiments, may comprise a dilute solution comprising phase transition temperature adjustment reagent. In some embodiments, may comprise a dilute aqueous solution comprising phase transition temperature adjustment reagent. |
| L-5 | May comprise a single liquid phase separated from a multi-liquid phase mixture by a liquid-liquid separation process. In some embodiments, may comprise a reagent or combination of reagents which may comprise at least a portion of a liquid-liquid phase transition liquid composition. In some embodiments, may comprise a mostly organic liquid phase, or mostly ionic-liquid liquid phase, or a combination thereof. |
| P-1 | A pump or a high pressure pump. |
| L-6 | May be the same as L-4, although may be higher pressure. |
| RO | A phase transition temperature or enthalpy of phase transition temperature adjustment process, or solubility adjustment process, or concentration adjustment process. May comprise a separation process, which may be employed to adjust the concentration of a phase transition temperature adjustment reagent and/or regenerate a liquid phase with a lower concentration of phase transition temperature adjustment reagent. In some embodiments, may comprise a membrane-based process, such as reverse osmosis, or nanofiltration, |

-continued

| FIG. 7 | |
|---|---|
| | or ultrafiltration, or membrane distillation, or high pressure reverse osmosis, or high pressure nanofiltration, or organic solvent nanofiltration, or a combination thereof. |
| L-7 | May comprise a retentate or concentrate solution resulting from a separation process. May comprise a concentrated phase transition temperature adjustment reagent solution. In some embodiments, may comprise a concentrated solution comprising phase transition temperature adjustment reagent. In some embodiments, may comprise a concentrated aqueous solution comprising phase transition temperature adjustment reagent. |
| L-8 | May comprise a permeate solution resulting from a separation process. May comprise a liquid with lower, or significantly lower, or practically no concentration of phase transition temperature adjustment reagent relative to L-6. In some embodiments, may comprise aqueous solution or water with lower, or significantly lower, or practically no concentration of phase transition temperature adjustment reagent relative to L-6. |
| Heat Exchanger #1 | A counter current heat exchanger. May heat exchange two non-contiguous liquid phases with one single liquid phase combined solution. May enable the formation of two 'temperature zones', which may enable a liquid-liquid phase transition liquid based system to operate with a temperature difference greater than an adiabatic temperature change of an enthalpy of liquid-liquid phase transition. |
| L-9 | May comprise a 'warm' liquid of the same composition of L-8, which may be at a higher temperature than L-8. May comprise L-8 after heat exchanging in a counter-current heat exchanger. |
| L-10 | May comprise a 'warm' liquid of the same composition of L-5, which may be at a higher temperature than L-5. May comprise L-5 after heat exchanging in a counter-current heat exchanger |
| Heat Exchanger #2 | A heat sink or heat source heat exchanger. In some embodiments, may comprise a heat exchanger with a heat sink or application requiring heating. Heat exchanger may be configured to mix liquid phases or conduct a liquid-liquid phase transition or both within the heat exchanger, which may result in more efficient heat transfer or higher performing heat transfer. |
| L-1 | May comprise a single liquid combined solution. May comprise a single liquid phase combined solution, which may have resulted from the mixing and/or heat exchange in Heat Exchanger #2. May comprise a single liquid phase combined solution which may have resulted from an exothermic liquid-liquid phase transition from the mixing of L-9 and L-10. |
| V-1 | A valve or inlet or mixing channel or a combination thereof. May represent water, or other solid-liquid phase change material, being added to, for example, makeup water or other solid-liquid phase change material removed in other parts of the process. May represent liquid water or liquid solid-liquid phase change material being added to the process or heat transfer medium. |
| L-11 | May comprise water or other solid-liquid phase change material added to the process or added to the heat transfer medium or both. May comprise an amount of water or other solid-liquid phase change material equal to the amount of water or other solid-liquid phase change material removed from the process or heat transfer medium. In some embodiments, may comprise melted solid-liquid phase change material or 'warm' return solid-liquid phase change material. |
| L-2 | Heat transfer medium after the addition of water or other solid-liquid phase change material. |
| L-3 | May comprise the same composition as L-2, except at a lower temperature. May be transferred between a counter current heat exchanger and an endothermic mixing process. |
| Mix #1 | A process for mixing a liquid-liquid phase transition liquid to form an endothermic liquid-liquid phase transition. The process may be configured such that the temperatures of the input components are at a temperature near the freezing point of a solid-liquid phase change material. In some embodiments, may involve facilitating or forming a solid phase or a solid-liquid slurry. In some embodiments, may involve mixing a liquid-liquid phase transition liquid with a phase transition temperature adjusting reagent, which may result in the formation of an endothermic liquid-liquid phase transition. |
| SLL-1 | A mixture of a solid phase and a multi-liquid phase mixture in a solid-liquid slurry or a solid-liquid-liquid slurry. May comprise at least a portion a solid phase. |
| F-1 | A solid-liquid separation process. May comprise, including, but not limited to, a centrifuge, or filter, or solid-liquid separation process known in the art, or a combination thereof. |
| S-1 | A separated solid phase. May comprise solid phase of a solid-liquid phase change material produced by an endothermic liquid-liquid phase transition and/or separated from a liquid-liquid phase change liquid. In some embodiments, may comprise a separated or concentrated solid-liquid slurry. |

Figure 8:
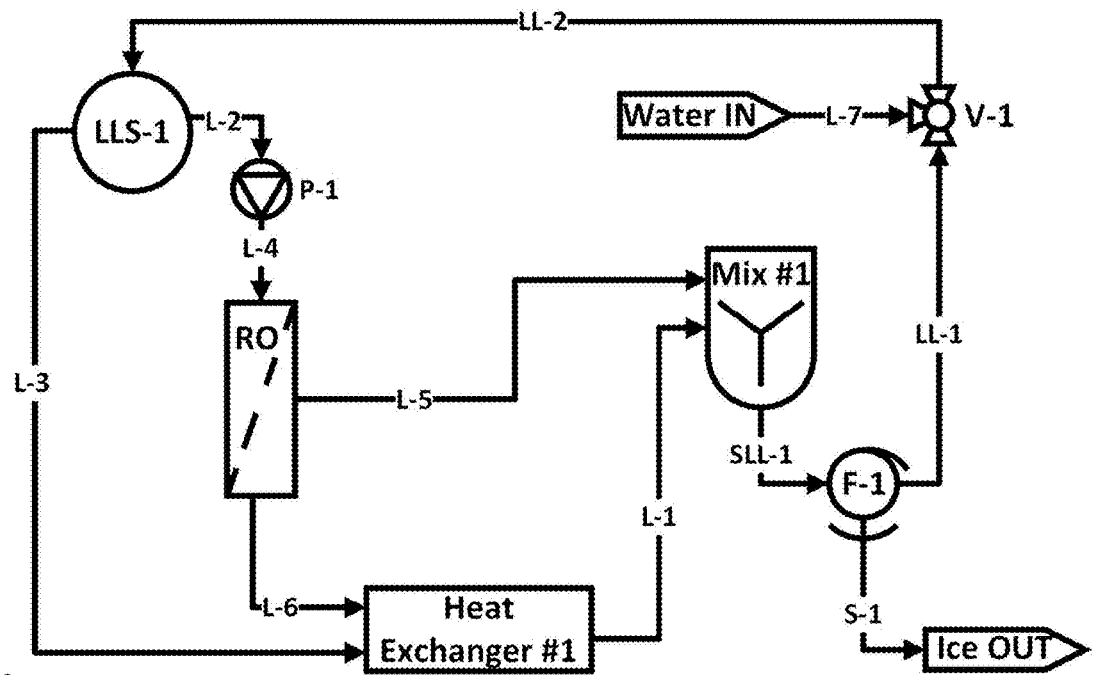
FIG. 8: Liquid-Liquid Phase Transition Refrigeration Cycle Process for Ice Making.

| | FIG. 8 |
|---|---|
| LL-1 | A multi-liquid phase mixture heat transfer medium comprising a liquid-liquid phase transition liquid. May comprise a heat transfer medium after at least a portion of solid-liquid phase change material is separated following an endothermic liquid-liquid phase transition. May comprise a liquid-liquid phase transition liquid separated from a solid-liquid separation process. May comprise a liquid-liquid phase transition liquid with at least one liquid phase comprising at least a portion of a liquid-liquid phase transition temperature adjustment reagent. |
| V-1 | A valve or inlet or mixing channel or a combination thereof. May represent water, or other solid-liquid phase change material, being added to, for example, makeup water or other solid-liquid phase change material removed in other parts of the process. May represent liquid water or liquid solid-liquid phase change material being added to the process or heat transfer medium. |
| L-7 | May comprise water or other solid-liquid phase change material added to the process or added to the heat transfer medium or both. May comprise an amount of water or other solid-liquid phase change material equal to the amount of water or other solid-liquid phase change material removed from the process or heat transfer medium. In some embodiments, may comprise melted solid-liquid phase change material or 'warm' return solid-liquid phase change material. |
| LL-2 | A multi-liquid phase mixture after the addition of water or other solid-liquid phase change material. |
| LLS-1 | A liquid-liquid separation process, which may separate a multi-liquid phase mixture into two or more non-contiguous liquid phases. May, involve, for example, including, but not limited to, density or coalescing or a combination thereof based separation. May include, but is not limited to, one or more or a combination of liquid-liquid separation systems and/or methods described herein or known in the art. |
| L-2 | May comprise a single liquid phase separated from a multi-liquid phase mixture by a liquid-liquid separation process. In some embodiments, may comprise a dilute solution comprising phase transition temperature adjustment reagent. In some embodiments, may comprise a dilute aqueous solution comprising phase transition temperature adjustment reagent. |
| P-1 | A pump or a high pressure pump. |
| L-4 | May be the same as L-2, although may be higher pressure. |
| L-3 | May comprise a single liquid phase separated from a multi-liquid phase mixture by a liquid-liquid separation process. In some embodiments, may comprise a reagent or combination of reagents which may comprise at least a portion of a liquid-liquid phase transition liquid composition. In some embodiments, may comprise a mostly organic liquid phase, or mostly ionic-liquid liquid phase, or a combination thereof. |
| RO | A phase transition temperature or enthalpy of phase transition temperature adjustment process, or solubility adjustment process, or concentration adjustment process. May comprise a separation process, which may be employed to adjust the concentration of a phase transition temperature adjustment reagent and/or regenerate a liquid phase with a lower concentration of phase transition temperature adjustment reagent. In some embodiments, may comprise a membrane-based process, such as reverse osmosis, or nanofiltration, or ultrafiltration, or membrane distillation, or high pressure reverse osmosis, or high pressure nanofiltration, or organic solvent nanofiltration, or a combination thereof. |
| L-5 | May comprise a retentate or concentrate solution resulting from a separation process. May comprise a concentrated phase transition temperature adjustment reagent solution. In some embodiments, may comprise a concentrated solution comprising phase transition temperature adjustment reagent. In some embodiments, may comprise a concentrated aqueous solution comprising phase transition temperature adjustment reagent. |
| L-6 | May comprise a permeate solution resulting from a separation process. May comprise a liquid with lower, or significantly lower, or practically no concentration of phase transition temperature adjustment reagent relative to L-4. In some embodiments, may comprise aqueous solution or water with lower, or significantly lower, or practically no concentration of phase transition temperature adjustment reagent relative to L-4. |
| Heat Exchanger #1 | A heat sink or heat source heat exchanger. In some embodiments, may comprise a heat exchanger with a heat sink or application requiring heating. Heat exchanger may be configured to mix liquid phases or conduct a liquid-liquid phase transition or both within the heat exchanger, which may result in more efficient heat transfer or higher performing heat transfer. |
| L-1 | May comprise a single liquid combined solution. May comprise a single liquid phase combined solution, which may have resulted from the mixing and/or heat exchange in Heat Exchanger #1. May comprise a single liquid phase combined solution which may have resulted from an exothermic liquid-liquid phase transition from the mixing of L-3 and L-6. |
| SLL-1 | A mixture of a solid phase and a multi-liquid phase mixture in a solid-liquid slurry or a solid-liquid-liquid slurry. May comprise at least a portion a solid phase. |
| F-1 | A solid-liquid separation process. May comprise, including, but not limited to, a centrifuge, or filter, or solid-liquid separation process known in the art, or a combination thereof. |

-continued

| FIG. 8 | |
|---|---|
| S-1 | A separated solid phase. May comprise solid phase of a solid-liquid phase change material produced by an endothermic liquid-liquid phase transition and/or separated from a liquid-liquid phase change liquid. In some embodiments, may comprise a separated or concentrated solid-liquid slurry. |

Figure 11A:
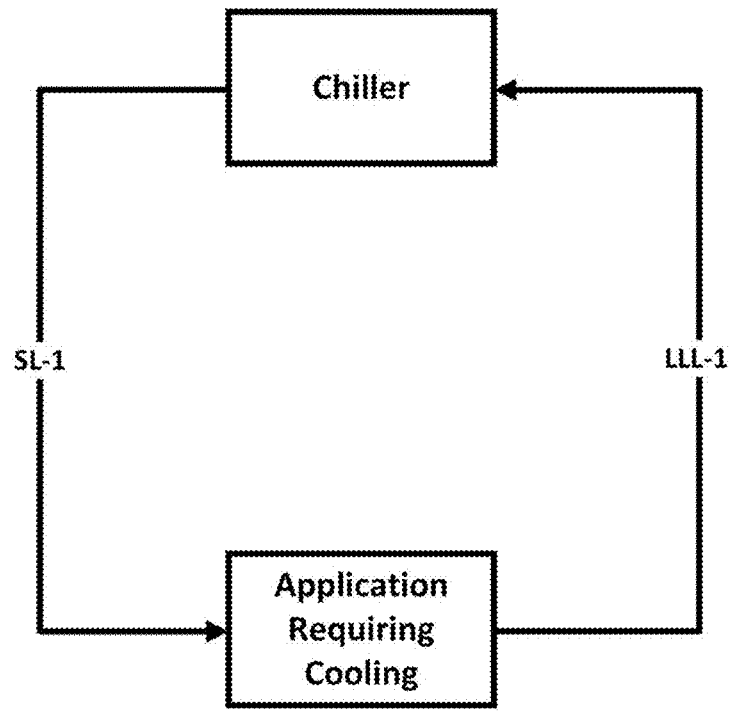
FIG. 11A: Cooling Process Employing Heat Transfer Medium Comprising Liquid-Liquid Phase Transition Liquid and Insoluble Solid-liquid phase change Material.
Figure 11B:
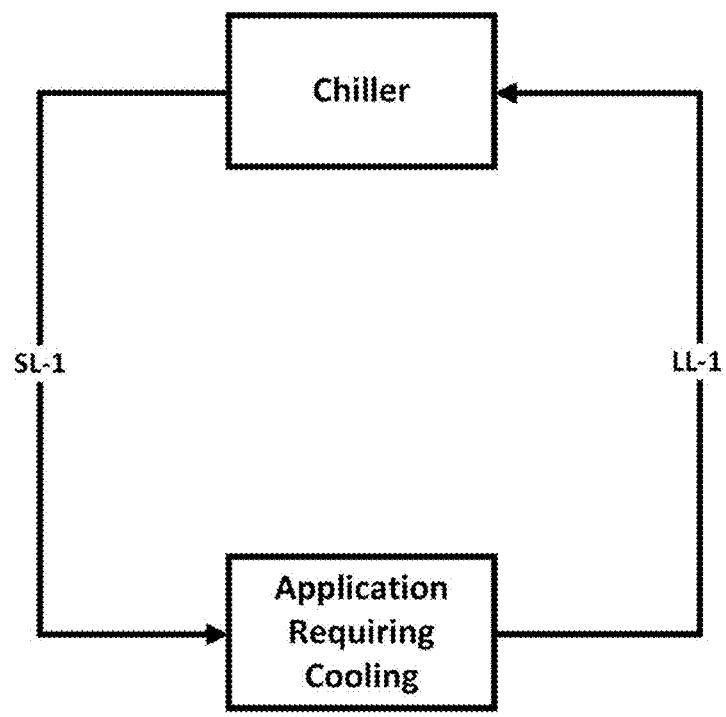
FIG. 11B: Cooling Process Employing Heat Transfer Medium Comprising Liquid-Liquid Phase Transition Liquid and Soluble Solid-liquid phase change Material.

| FIGS. 11A, 11B | |
|---|---|
| LLL-1 | A multi-liquid phase mixture heat transfer medium comprising a liquid-liquid phase transition liquid. May be at a temperature above at least a portion of a liquid-liquid phase transition temperature range. May be at a temperature above a solid-liquid phase change temperature. May comprise 'warm' return heat transfer medium. In some embodiments, may comprise a heat transfer medium comprising a liquid-liquid phase transition liquid and a solid-liquid phase change material at least partially insoluble in said liquid-liquid phase transition liquid. |
| LL-1 | A multi-liquid phase mixture heat transfer medium comprising a liquid-liquid phase transition liquid. May be at a temperature above at least a portion of a liquid-liquid phase transition temperature range. May be at a temperature below at least a portion of a liquid-liquid phase transition temperature range. May be at a temperature above a solid-liquid phase change temperature. May comprise 'warm' return heat transfer medium. In some embodiments, may comprise a heat transfer medium comprising a liquid-liquid phase transition liquid and a solid-liquid phase change material at least partially insoluble in said liquid-liquid phase transition liquid. |
| Chiller | A heat exchanger or process for cooling or removing heat from the heat transfer medium. In some embodiments, may be configured to be compatible with liquid-liquid phase transition liquid, solid-liquid phase change material, or a combination thereof. |
| SL-1 | A solid-liquid slurry. May comprise a heat transfer medium comprising a liquid-liquid phase transition liquid as a single liquid phase combined solution below at least a portion of a liquid-liquid phase transition temperature range and a solid-liquid phase change material with at least a portion at a solid phase. |
| Application Requiring Cooling | A heat exchanger or process which may be cooled or have heat removed by the heat transfer medium. A heat exchanger or process which may heat the heat transfer medium. May comprise an application requiring cooling which may benefit from the greater heat capacity and/or other improved heat transfer properties of a heat transfer medium possessing both a liquid-liquid phase transition and a solid-liquid phase change. |

40

Figure 11C:
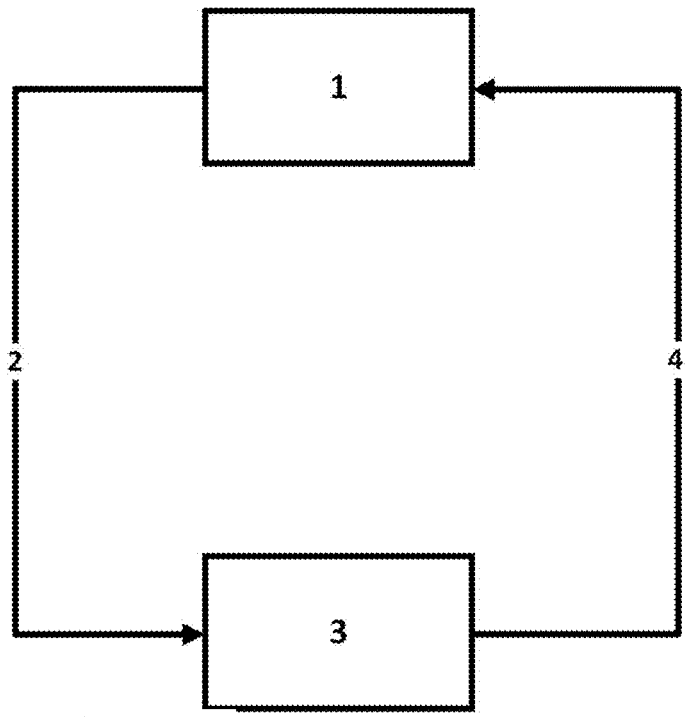
FIG. 11C: Heating or Cooling Process Employing Heat Transfer Medium Comprising Liquid-Liquid Phase Transition Liquid, or Solid-liquid phase change Material, or Liquid, or Solid-Solid Phase Transition Material, or a Combination Thereof.

| FIGS. 11C | |
|---|---|
| 1 | A process requiring heating or a process requiring cooling or both. In some embodiments, may change between being a process requiring heating and a process requiring cooling and/or may reversibly change between being a process requiring heating and a process requiring cooling. |
| 2 | A heat transfer medium. Make comprise a 'cooler' temperature heat transfer medium than '4'. In some embodiments, may comprise a solid-liquid slurry, or solid-liquid-liquid slurry, or a single liquid phase solution , or a solid-liquid-liquid-liquid slurry, or a solid, or a solid-solid-liquid slurry, or a liquid-liquid-liquid mixture, or a liquid-liquid mixture, or a multi-liquid phase mixture, or a combination thereof. |
| 3 | A process requiring heating or a process requiring cooling or both. In some embodiments, may change between being a process requiring heating and a process requiring cooling and/or may reversibly change between being a process requiring heating and a process requiring cooling. |
| 4 | A heat transfer medium. Make comprise a 'cooler' temperature heat transfer medium than '4'. In some embodiments, may comprise a solid-liquid slurry, or solid-liquid-liquid slurry, or a single liquid phase solution , or a solid-liquid-liquid-liquid slurry, or a solid, or a solid-solid-liquid slurry, or a liquid-liquid-liquid mixture, or a liquid-liquid mixture, or a multi-liquid phase mixture, or a combination thereof. |

Figure 12A:
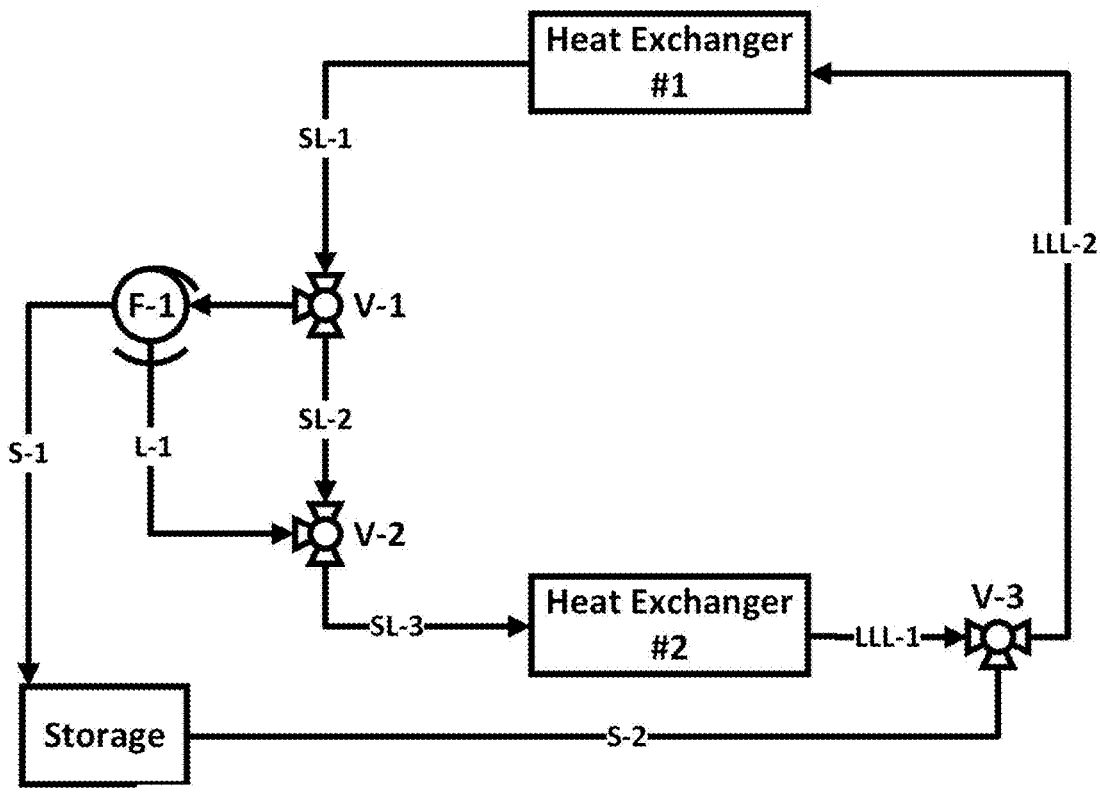
FIG. 12A: Heat Transfer Process with Heat Transfer Medium Comprising Liquid-Liquid Phase Transition Liquid and Solid-Liquid Phase Change Material with Adjustable Concentration of Solid-Liquid Phase Change Material showing Embodiment with a portion of Solid-Liquid Phase Change Material being Removed from the Heat Transfer Medium.
Figure 12B:
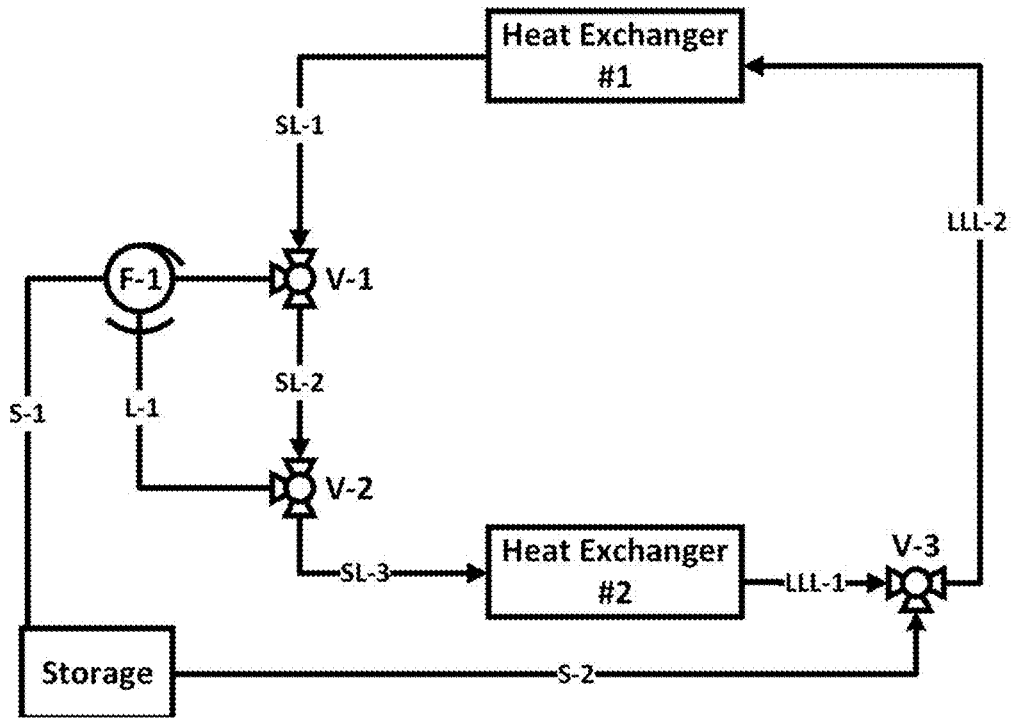
FIG. 12B: Heat Transfer Process with Heat Transfer Medium Comprising Liquid-Liquid Phase Transition Liquid and Solid-Liquid Phase Change Material with Adjustable Concentration of Solid-Liquid Phase Change Material showing Embodiment with a portion of Solid-Liquid Phase Change Material being Added to the Heat Transfer Medium.

| FIGS. 12A, 12B | |
|---|---|
| SL-1 | A solid-liquid slurry. May comprise a heat transfer medium comprising a liquid-liquid phase transition liquid as a single liquid phase combined solution below at least a portion of a liquid-liquid phase transition temperature range and a solid-liquid phase change material with at least a portion at a solid phase. |
| V-1 | A valve or transfer channel or a combination thereof. May be employed to remove at least a portion of heat transfer medium from a heat transfer loop to, for example, adjust the concentration of solid-liquid phase change material, or change the solid-liquid phase change, or change composition or phase transition temperature of liquid-liquid phase transition liquid, or change the concentration of liquid-liquid phase transition liquid, or a combination thereof. |
| F-1 | A solid-liquid separation process. May be employed to separate at least a portion of solid phase solid-liquid phase change material from a heat transfer medium comprising a solid-liquid mixture. |
| L-1 | A liquid phase comprising a liquid phase of a solid-liquid slurry after separating at least a portion of solid phase from said solid-liquid slurry. |
| S-1 | At least a portion of solid-liquid phase change material separated in F-1. May comprise solid phase, or liquid phase, or both. |
| Storage | May comprise a storage mechanism for one or more solid-liquid phase change materials. In some embodiments, may store one type of solid-liquid phase change material. In some embodiments, may storage more than one time of solid liquid phase change material. May store solid-liquid phase change material as a solid, or a liquid, or both. |
| S-2 | May comprise solid-liquid phase change material transferred between storage and a heat transfer loop. |
| SL-2 | May comprise heat transfer medium, excluding any heat transfer medium removed in V-1. |
| V-2 | A valve or transfer channel or a combination thereof. May be employed to add heat transfer medium to a main heat transfer loop after said heat transfer medium has undergone a concentration adjustment. For example, may add heat transfer medium which comprises a lower concentration of solid-liquid phase change material than the heat transfer medium in SL-2. For example, may add heat transfer medium which comprises a greater concentration of solid-liquid phase change material than heat transfer medium in SL-2. |
| SL-3 | A heat transfer medium in a heat transfer loop after one or more concentration adjustment steps. In some instances, may comprise heat transfer medium with a diluted or lower concentration of solid-liquid phase change material. In some instances, the heat transfer medium in a heat transfer loop may bypass concentration adjustment steps. May comprise a solid-liquid slurry or a liquid or a combination thereof. |
| Heat Exchanger #2 | A heat exchanger or process which may be cooled or have heat removed by the heat transfer medium. A heat exchanger or process which may heat the heat transfer medium. In some embodiments, may comprise an application requiring cooling which may benefit from the greater heat capacity and/or other improved heat transfer properties of a heat transfer medium possessing both a liquid-liquid phase transition and a solid-liquid phase change. |
| LLL-1 | A multi-liquid phase mixture. May comprise 'warm' heat transfer medium. May comprise a heat transfer medium with both solid-liquid phase change material and liquid-liquid phase transition liquid at a liquid phase. May comprise a heat transfer medium at a temperature above a solid-liquid phase change temperature and/or a liquid-liquid phase transition temperature. Solid-liquid phase change material may be at least partially insoluble in at least one of the liquid phases of a liquid-liquid phase transition liquid under at least some conditions. May comprise two or more liquid phases of a liquid-liquid phase transition liquid and/or one or more liquid phases of a solid-liquid phase change liquid and/or a mixture thereof. |
| V-3 | A valve or transfer channel or a combination thereof. May be employed to add solid-liquid phase change material to a heat loop or a heat transfer medium. In some embodiments, may be located before Heat Exchanger #2 (e.g. added to SL-3). |
| LLL-2 | A heat transfer medium in a heat transfer loop after one or more concentration adjustment steps. In some instances, the heat transfer medium in a heat transfer loop may bypass concentration adjustment steps. May comprise a heat transfer medium after a step adding solid-liquid phase change material. May comprise a liquid phase, a solid phase or both. May comprise a heat transfer medium after bypassing a step for adding solid-liquid phase change material. |
| Heat Exchanger #1 | A heat exchanger or process which may be heated or may remove heat from a heat transfer medium. A heat exchanger or process which may cool the heat transfer medium. In some embodiments, may comprise a application requiring heating or a heat sink or a chiller which may benefit from the greater heat capacity and/or other improved heat transfer properties of a heat transfer medium possessing both a liquid-liquid phase transition and a solid-liquid phase change. |

Figure 13A:
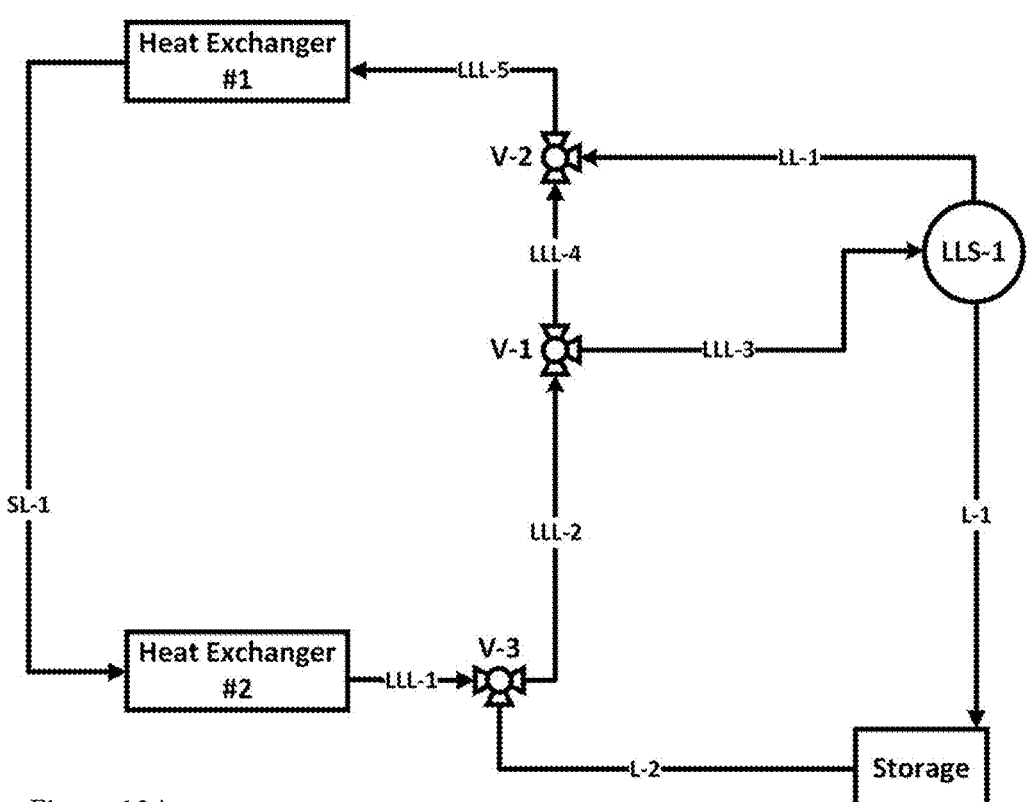
FIG. 13A: Heat Transfer Process with Heat Transfer Medium Comprising Liquid-Liquid Phase Transition Liquid and Solid-Liquid Phase Change Material with Adjustable Concentration of Solid-Liquid Phase Change Material showing Embodiment with a portion of Solid-Liquid Phase Change Material being Removed at a Liquid Phase from the Heat Transfer Medium.
Figure 13B:
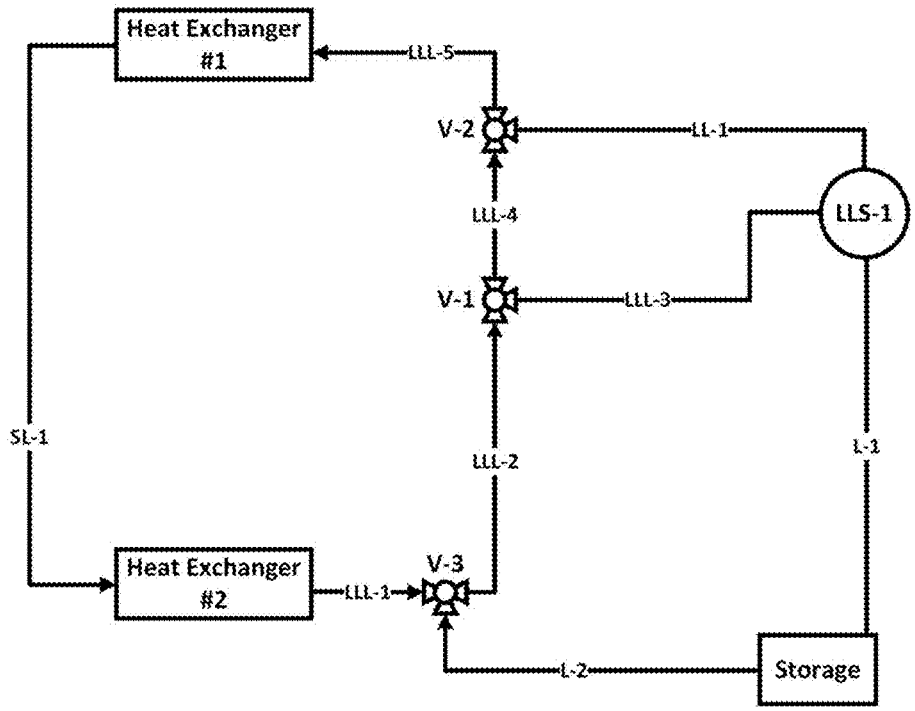
FIG. 13B: Heat Transfer Process with Heat Transfer Medium Comprising Liquid-Liquid Phase Transition Liquid and Solid-Liquid Phase Change Material with Adjustable Concentration of Solid-Liquid Phase Change Material showing Embodiment with a portion of Solid-Liquid Phase Change Material being Added at a Liquid Phase to the Heat Transfer Medium.

| | FIGS. 13A, 13B |
|---|---|
| LLL-5 | A heat transfer medium in a heat transfer loop after one or more concentration adjustment steps. In some instances, the heat transfer medium in a heat transfer loop may bypass concentration adjustment steps. A heat transfer medium in a heat transfer loop after one or more concentration adjustment steps. In some instances, may comprise heat transfer medium with a diluted or lower concentration of solid-liquid phase change material. May comprise a multi-liquid phase mixture. May comprise a multi-liquid phase mixture below a liquid-liquid phase transition temperature, or a solid-liquid phase change temperature, or both. |
| Heat Exchanger #1 | A heat exchanger or process which may be heated or may remove heat from a heat transfer medium. A heat exchanger or process which may cool the heat transfer medium. In some embodiments, may comprise a application requiring heating or a heat sink or chiller which may benefit from the greater heat capacity and/or other improved heat transfer properties of a heat transfer medium possessing both a liquid-liquid phase transition and a solid-liquid phase change. |
| SL-1 | A solid-liquid slurry. May comprise a heat transfer medium comprising a liquid-liquid phase transition liquid as a single liquid phase combined solution below at least a portion of a liquid-liquid phase transition temperature range and a solid-liquid phase change material with at least a portion at a solid phase. |
| Heat Exchanger #2 | A heat exchanger or process which may be cooled or have heat removed by the heat transfer medium. A heat exchanger or process which may heat the heat transfer medium. In some embodiments, may comprise an application requiring cooling which may benefit from the greater heat capacity and/or other improved heat transfer properties of a heat transfer medium possessing both a liquid-liquid phase transition and a solid-liquid phase change. |
| LLL-1 | A multi-liquid phase mixture. May comprise 'warm' heat transfer medium. May comprise a heat transfer medium with both solid-liquid phase change material and liquid-liquid phase transition liquid at a liquid phase. May comprise a heat transfer medium at a temperature above a solid-liquid phase change temperature and/or a liquid-liquid phase transition temperature. Solid-liquid phase change material may be at least partially insoluble in at least one of the liquid phases of a liquid-liquid phase transition liquid under at least some conditions. May comprise two or more liquid phases of a liquid-liquid phase transition liquid and/or one or more liquid phases of a solid-liquid phase change liquid and/or a mixture thereof. |
| V-3 | A valve or transfer channel or a combination thereof. May be employed to add solid-liquid phase change material to a heat loop or a heat transfer medium. May add solid-liquid phase change liquid to a heat transfer loop or heat transfer medium at a liquid phase. |
| LLL-2 | A heat transfer medium in a heat transfer loop after one or more concentration adjustment steps. A heat transfer medium after a step involving the addition of a solid-liquid phase change material. A heat transfer medium after bypassing a step involving the addition of a solid-liquid phase change material. |
| V-1 | A valve or transfer channel or a combination thereof. May be employed to remove at least a portion of heat transfer medium from a heat transfer loop to, for example, adjust the concentration of solid-liquid phase change material, or change the solid-liquid phase change, or change composition or phase transition temperature of liquid-liquid phase transition liquid, or change the concentration of liquid-liquid phase transition liquid, or a combination thereof. |
| LLL-4 | May comprise heat transfer medium, excluding any heat transfer medium removed in V-1. |
| V-2 | A valve or transfer channel or a combination thereof. May be employed to add liquid-liquid phase transition liquid to a heat loop or a heat transfer medium. May add solid-liquid phase change liquid to a heat transfer loop or heat transfer medium at a liquid phase. |
| LLL-3 | May comprise heat transfer medium removed from a heat transfer loop. May undergo one or more or a combination of separations. |
| LLS-1 | A liquid-liquid separation process. May be employed to separate one or more liquid-liquid phase transition liquid phases from one or more solid-liquid phase transition liquid or solid phases. May involve a one or more step process. |
| LL-1 | May comprise a heat transfer medium comprising liquid-liquid phase transition liquid. May comprise a heat transfer medium comprising liquid-liquid phase transition liquid with at least a portion of solid-liquid phase change liquid separated or removed. May comprise liquid-liquid phase transition liquid at a single liquid phase combined solution state, or a multi-liquid phase mixture state, or a combination thereof. May comprise liquid-liquid phase transition liquid transferred to a heat transfer loop. |
| L-1 | May comprise solid-liquid phase change material separated from a heat transfer medium by a liquid-liquid separation process, or a solid-liquid separation process, or a combination thereof. May comprise liquid phase solid-liquid phase change material. |

-continued

| FIGS. 13A, 13B | |
|---|---|
| Storage | May comprise a storage mechanism for one or more solid-liquid phase change materials. In some embodiments, may store one type of solid-liquid phase change material. In some embodiments, may storage more than one time of solid liquid phase change material. May store solid-liquid phase change material as a liquid, a solid, or both. |
| L-2 | May comprise solid-liquid phase change material transferred between storage and a heat transfer loop. |

Figure 14:
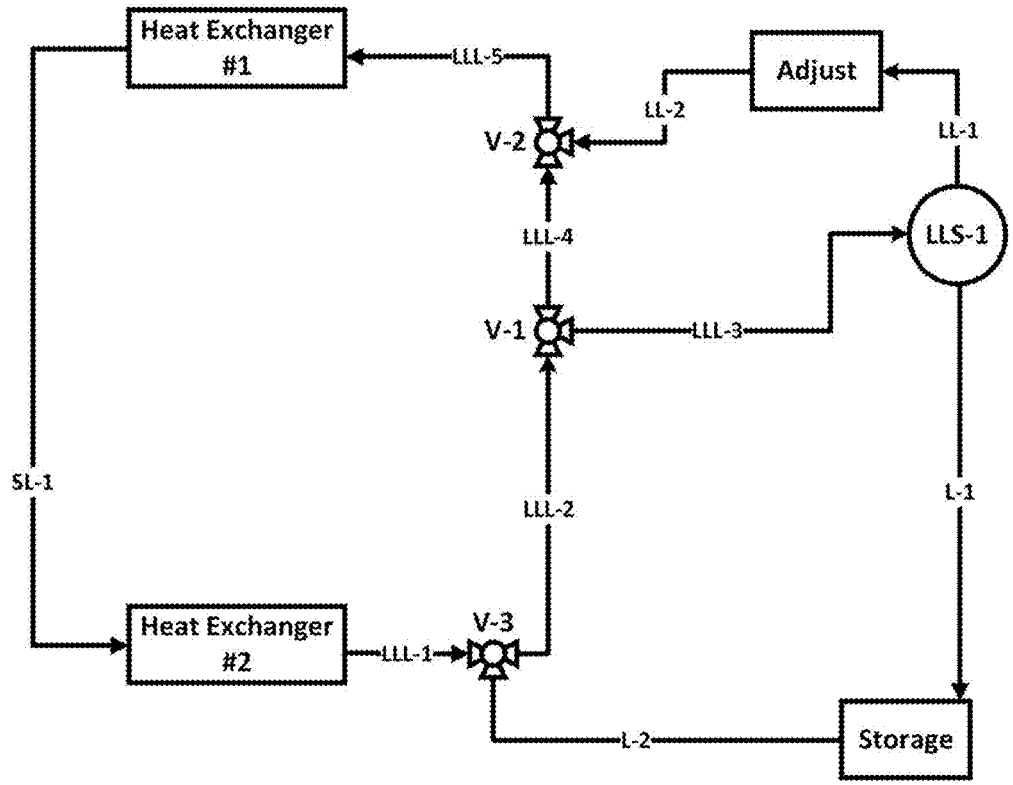
FIG. 14: Heat Transfer Process with Heat Transfer Medium Comprising Liquid-Liquid Phase Transition Liquid and Solid-Liquid Phase Change Material showing Solid-Liquid Phase Change Material being Removed before Adjustment of the Liquid-Liquid Phase Transition Liquid.

| FIG. 14 (Same as FIG. 13, except the following) | |
|---|---|
| LL-1 | May comprise a heat transfer medium comprising liquid-liquid phase transition liquid. May comprise a heat transfer medium comprising liquid-liquid phase transition liquid with at least a portion of solid-liquid phase change liquid separated or removed. May comprise liquid-liquid phase transition liquid at a single liquid phase combined solution state, or a multi-liquid phase mixture state, or a combination thereof. May comprise liquid-liquid phase transition liquid transferred to an adjustment step. |
| Adjust | A process for adjusting the liquid-liquid phase transition temperature of a liquid-liquid phase transition liquid, or adjusting the composition of a liquid-liquid phase transition liquid, or adjusting the concentration of one or more reagents of a liquid-liquid phase transition liquid, or a combination thereof. |
| LL-2 | May comprise a heat transfer medium comprising liquid-liquid phase transition liquid. May comprise a heat transfer medium comprising liquid-liquid phase transition liquid after an adjustment step. May comprise liquid-liquid phase transition liquid at a single liquid phase combined solution state, or a multi-liquid phase mixture state, or a combination thereof. May comprise liquid-liquid phase transition liquid transferred to a heat transfer loop. |

Figure 15:
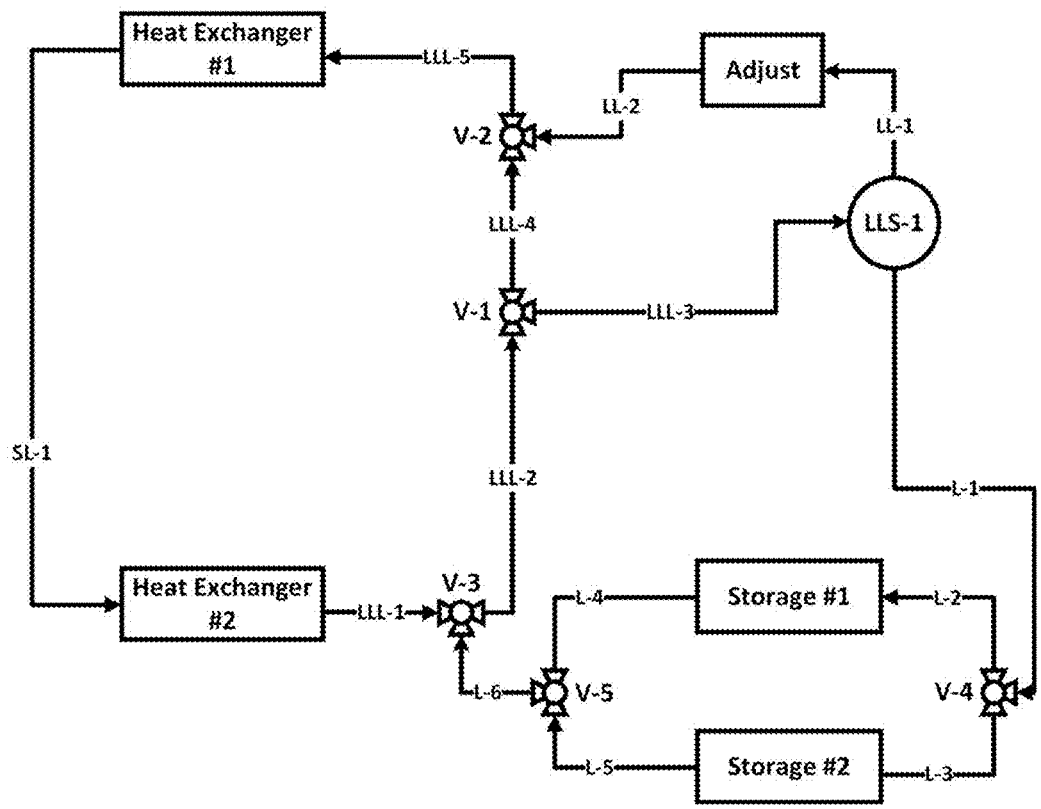
FIG. 15: Heat Transfer Process with Heat Transfer Medium Comprising Liquid-Liquid Phase Transition Liquid and Solid-Liquid Phase Change Material showing Replacement of One Solid-Liquid Phase Change Material with a Different Solid-Liquid Phase Change Material and Adjustment of the Liquid-Liquid Phase Transition Liquid.

| FIG. 15 (Same as FIG. 14, except the following) | |
|---|---|
| L-1 | May comprise solid-liquid phase change material separated from a heat transfer medium by a liquid-liquid separation process, or a solid-liquid separation process, or a combination thereof. May comprise liquid phase solid-liquid phase change material. |
| V-4 | A valve or transfer channel or a combination thereof. May be employed to direct solid-liquid phase change material to an appropriate storage process or storage container. For example, V-4 may transfer solid-liquid phase transition material to a storage process or storage container with the same type of solid-liquid phase transition material, or the same solid-liquid phase change temperature, or compatible solid-liquid phase change materials, or a combination thereof. |
| L-2 | A solid-liquid phase change material transferred to one or more storage processes or storage containers. |
| L-3 | A solid-liquid phase change material transferred to one or more storage processes or storage containers. |
| Storage #1 | One or more storage processes or storage containers for storing a solid-liquid phase change material. |
| Storage #2 | One or more storage processes or storage containers for storing a solid-liquid phase change material. |
| L-4 | A solid-liquid phase change material transferred from one or more storage processes or storage containers. |
| L-5 | A solid-liquid phase change material transferred from one or more storage processes or storage containers. |
| V-5 | A valve or transfer channel or a combination thereof. May be employed to direct solid-liquid phase change material from an appropriate storage to a heat transfer loop or heat transfer medium. |
| L-6 | Solid-liquid phase change material added to a heat transfer loop or heat transfer medium when addition of solid-liquid change material is desired. |

Figure 22:
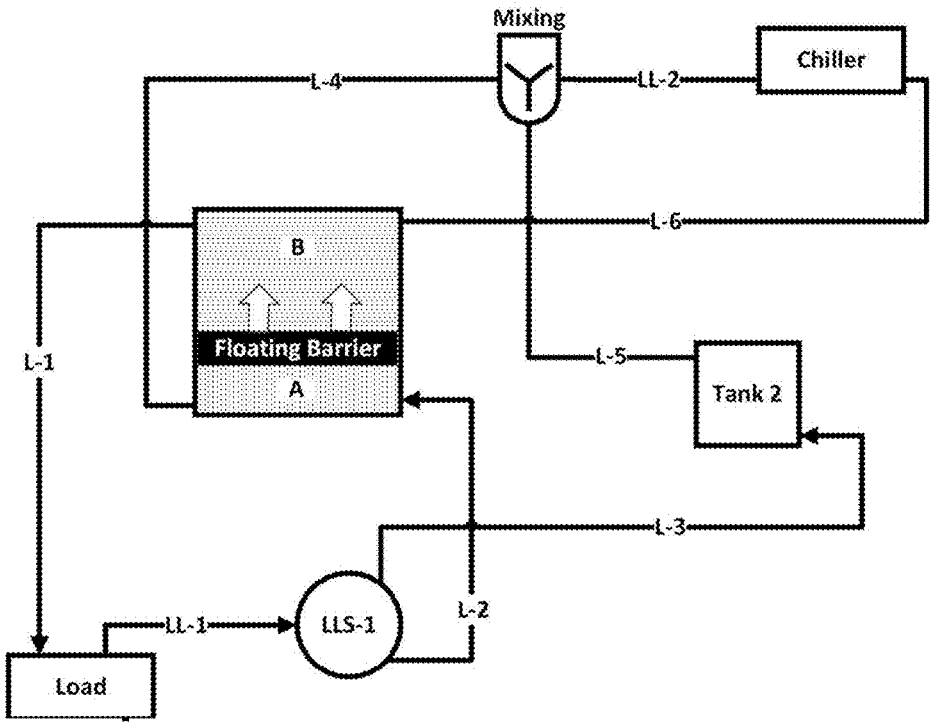
FIG. 22: A thermal storage process with two liquid phases stored in one tank and another liquid phase stored in a separate tank and a warm liquid as a bottom layer with a floating barrier between two liquid phases in one of the tanks.
Figure 23:
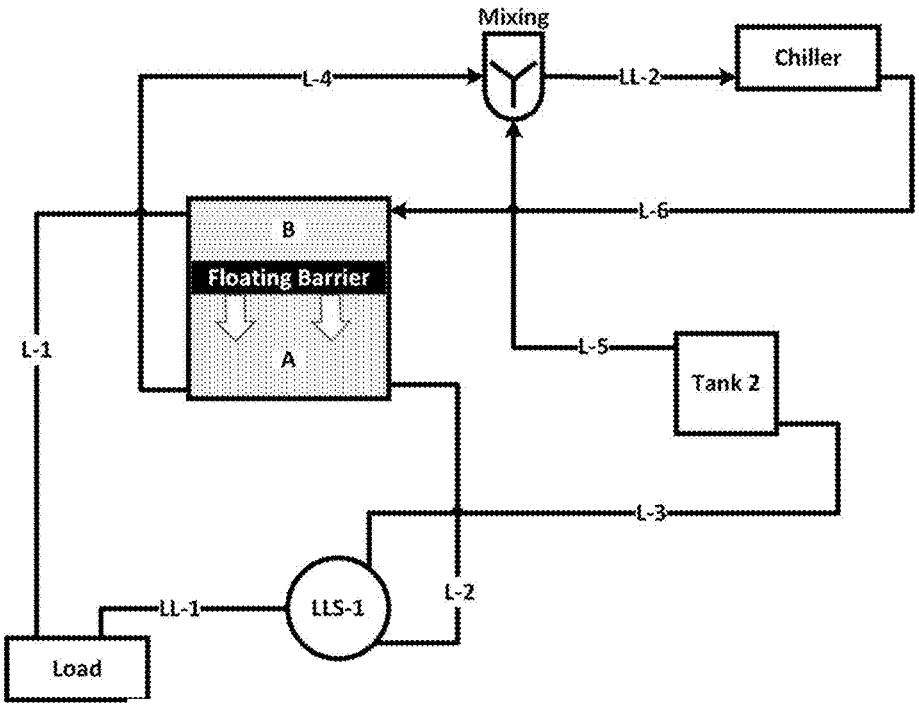
FIG. 23: A thermal storage process with two liquid phases stored in one tank and another liquid phase stored in a separate tank and a warm liquid as a bottom layer with a floating barrier between two liquid phases in one of the tanks.
Figure 24:
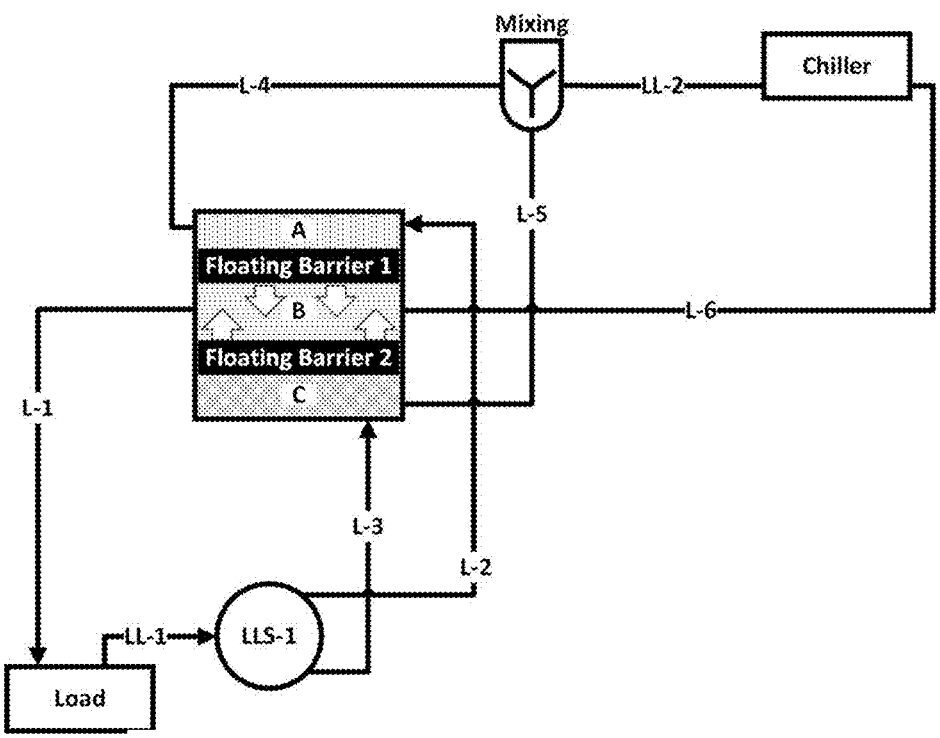
FIG. 24: A thermal storage process with three liquid phases stored in one tank a first warm liquid as a top layer, a second warm liquid as a bottom layer, and a cold liquid as a middle layer, with a floating barrier at each interface.
Figure 25:
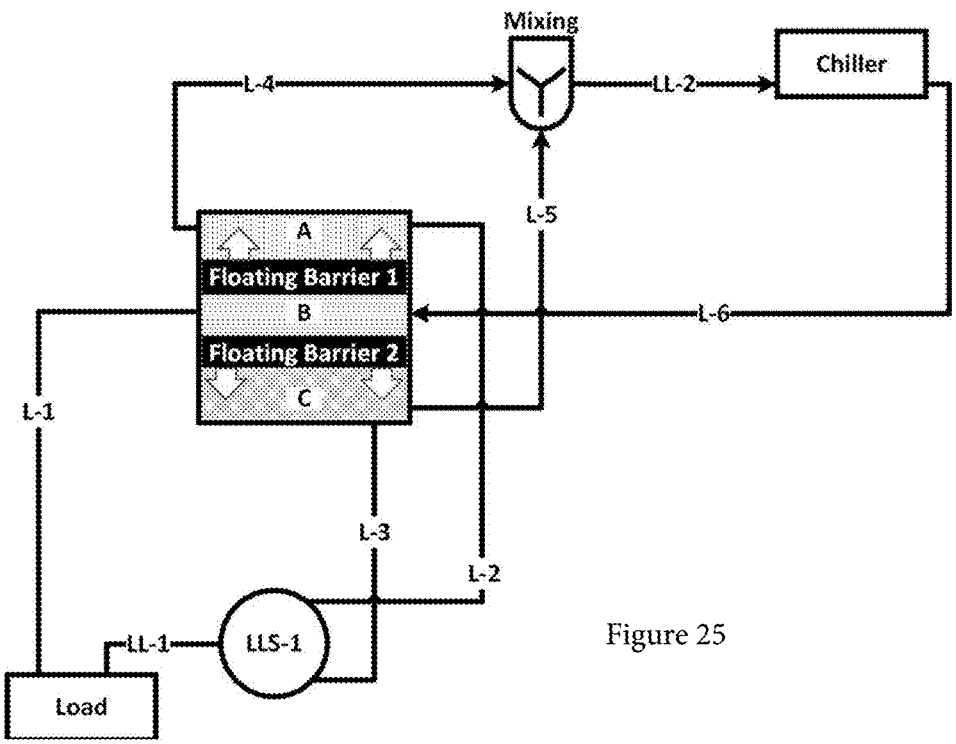
FIG. 25: A thermal storage process with three liquid phases stored in one tank a first warm liquid as a top layer, a second warm liquid as a bottom layer, and a cold liquid as a middle layer, with a floating barrier at each interface.
Figure 26:
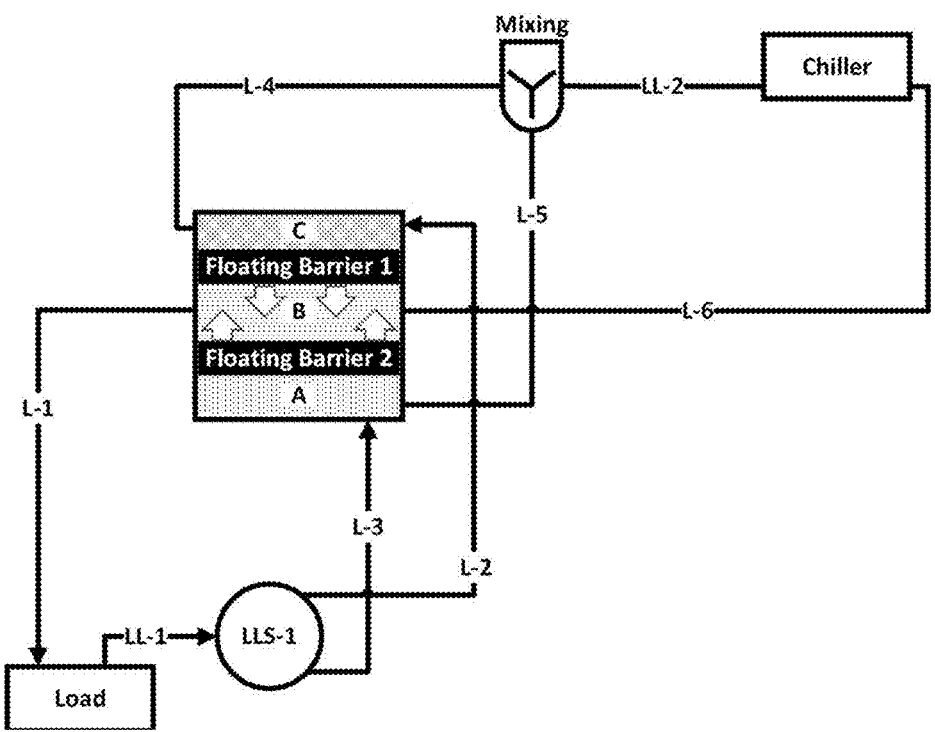
FIG. 26: A thermal storage process with three liquid phases stored in one tank a second warm liquid as a top layer, a first warm liquid as a bottom layer, and a cold liquid as a middle layer, with a floating barrier at each interface.
Figure 27:
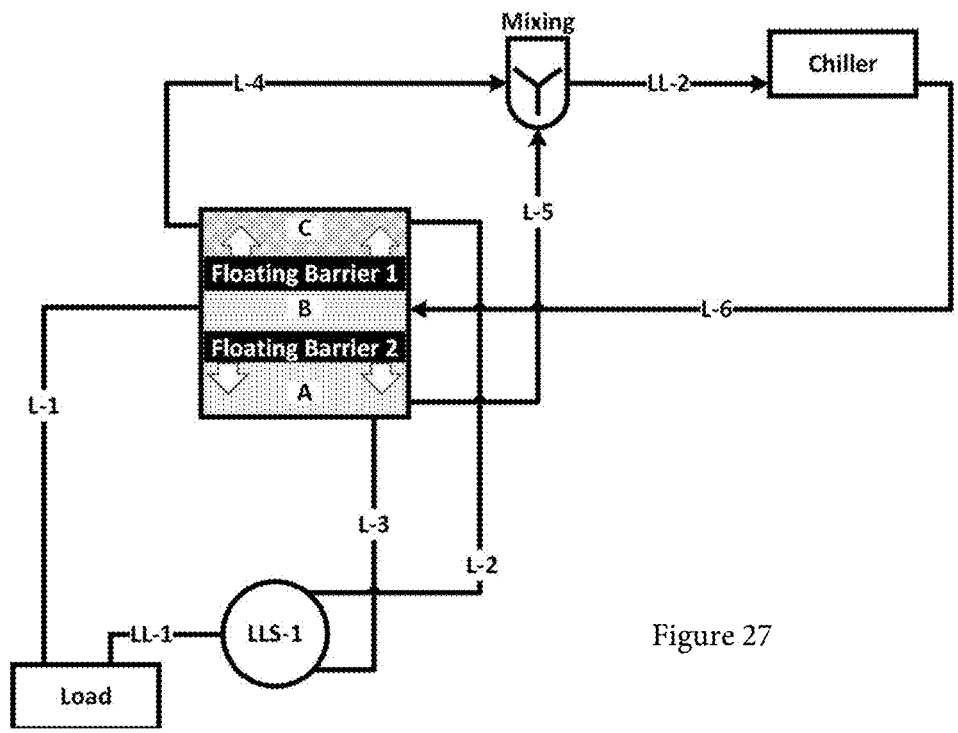
FIG. 27: A thermal storage process with three liquid phases stored in one tank a second warm liquid as a top layer, a first warm liquid as a bottom layer, and a cold liquid as a middle layer, with a floating barrier at each interface.
Figure 28:
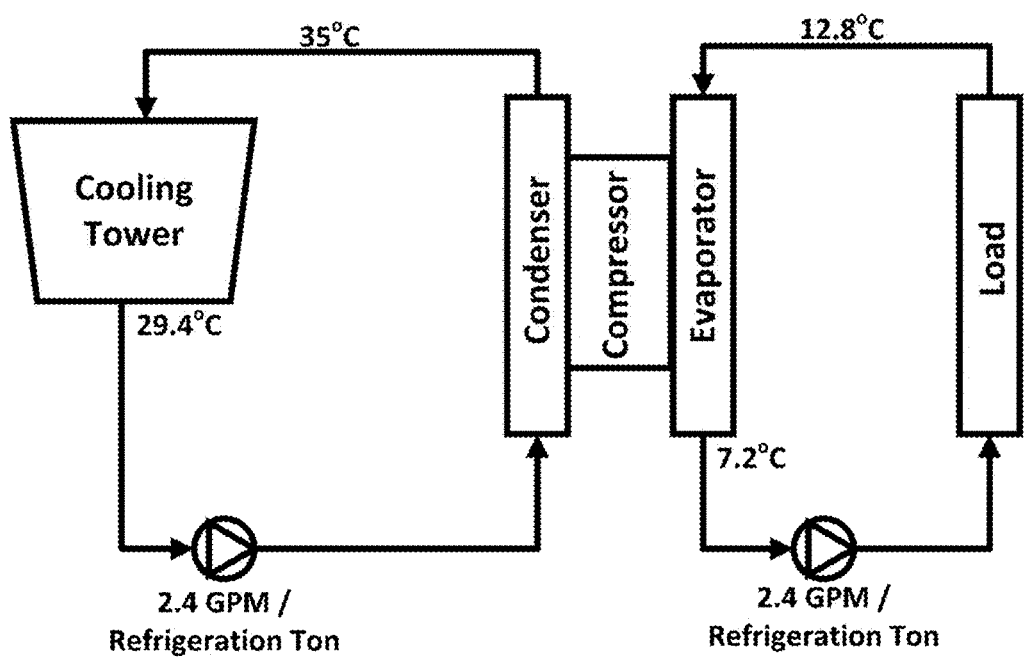
FIG. 28: An HVAC Chiller.
Figure 29:
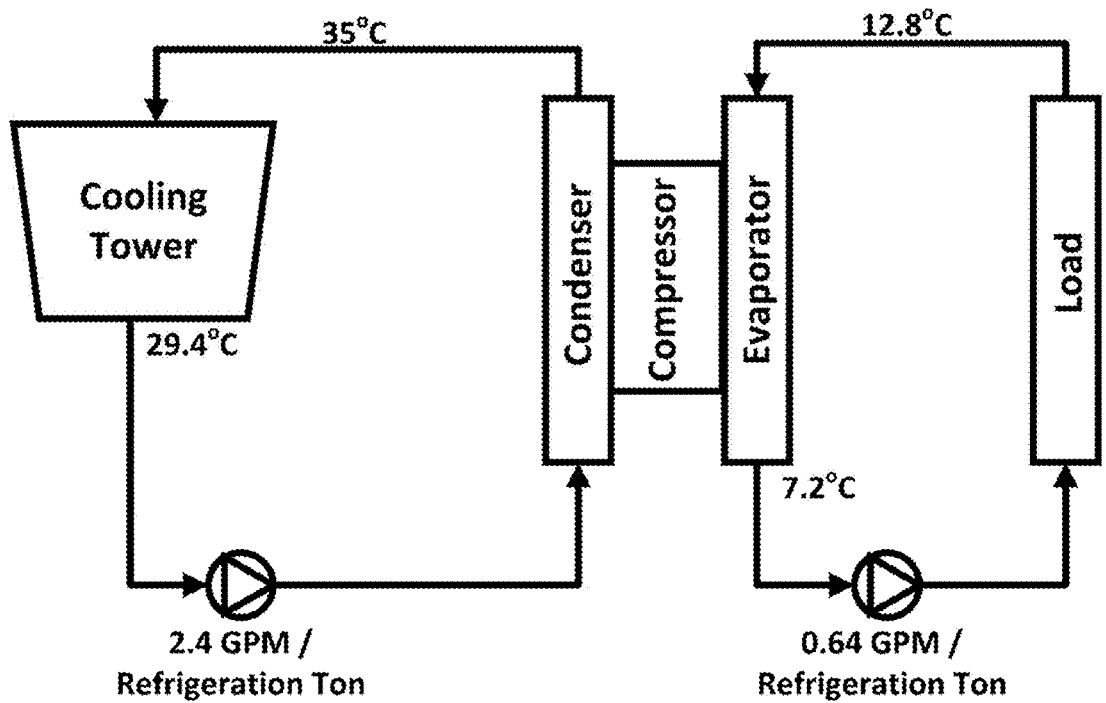
FIG. 29: An HVAC Chiller with liquid-liquid phase transfer heat transfer liquid transfer heat between the thermal load side heat exchanger and the evaporator side heat exchanger.
Figure 30:
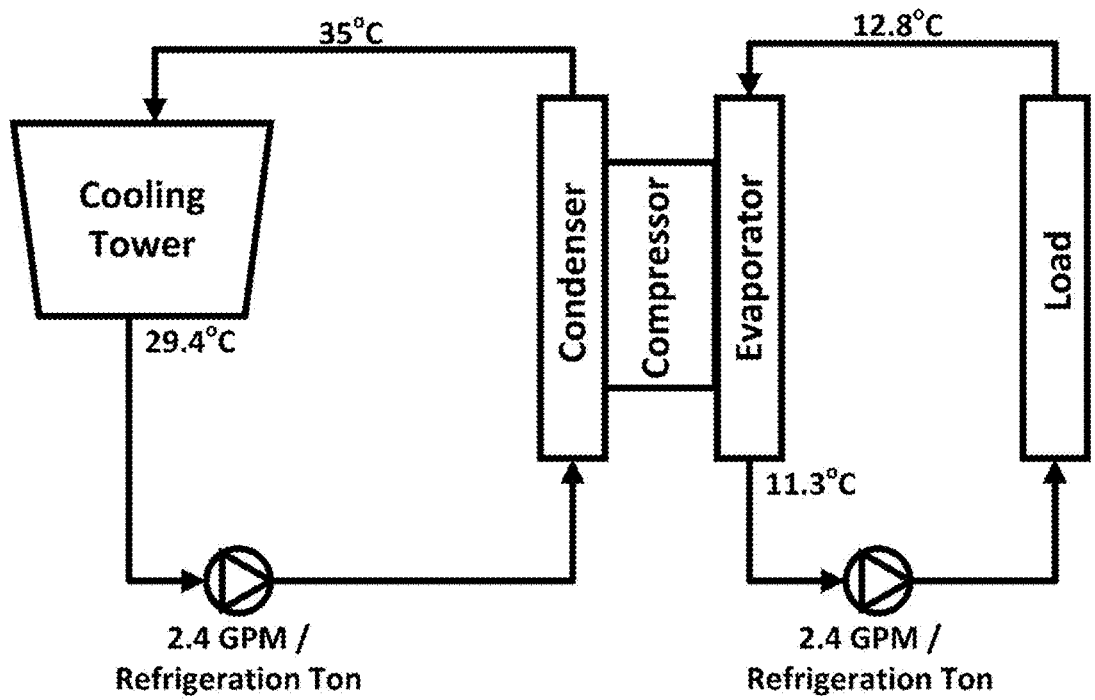
FIG. 30: An HVAC Chiller with liquid-liquid phase transfer heat transfer liquid transfer heat between the thermal load side heat exchanger and the evaporator side heat exchanger.
Figure 31:
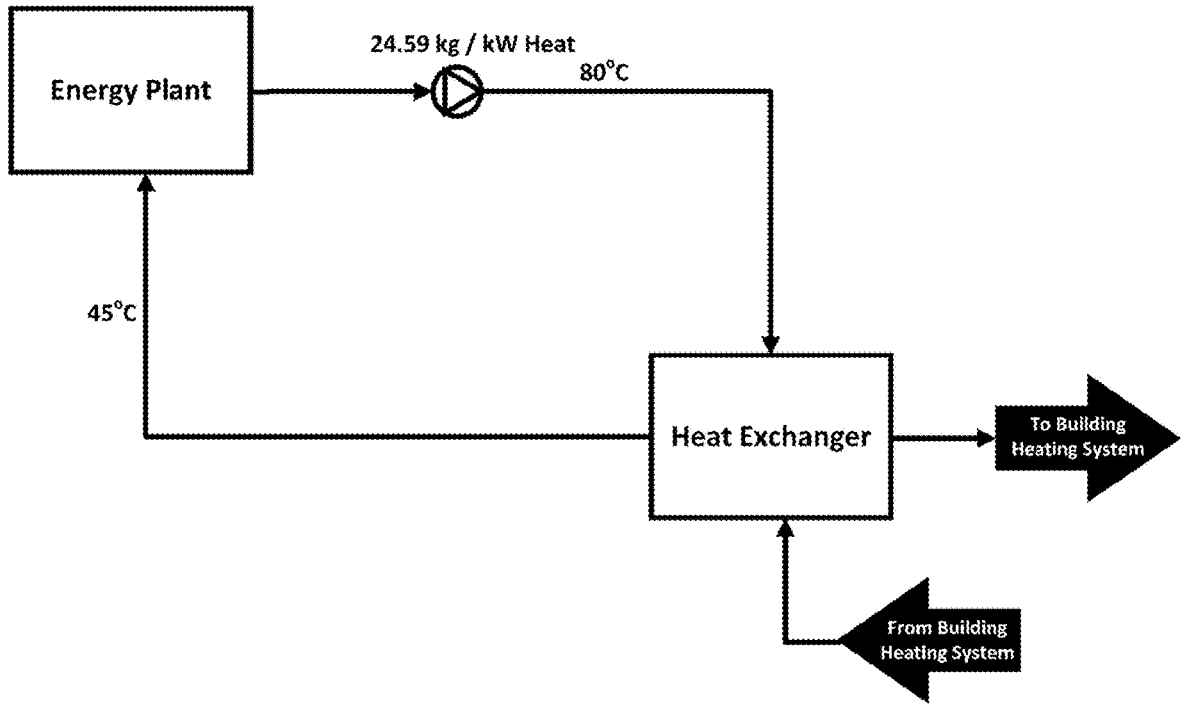
FIG. 31: A district heating system with a 35° C. temperature difference between heat supply and heat return.
Figure 32:
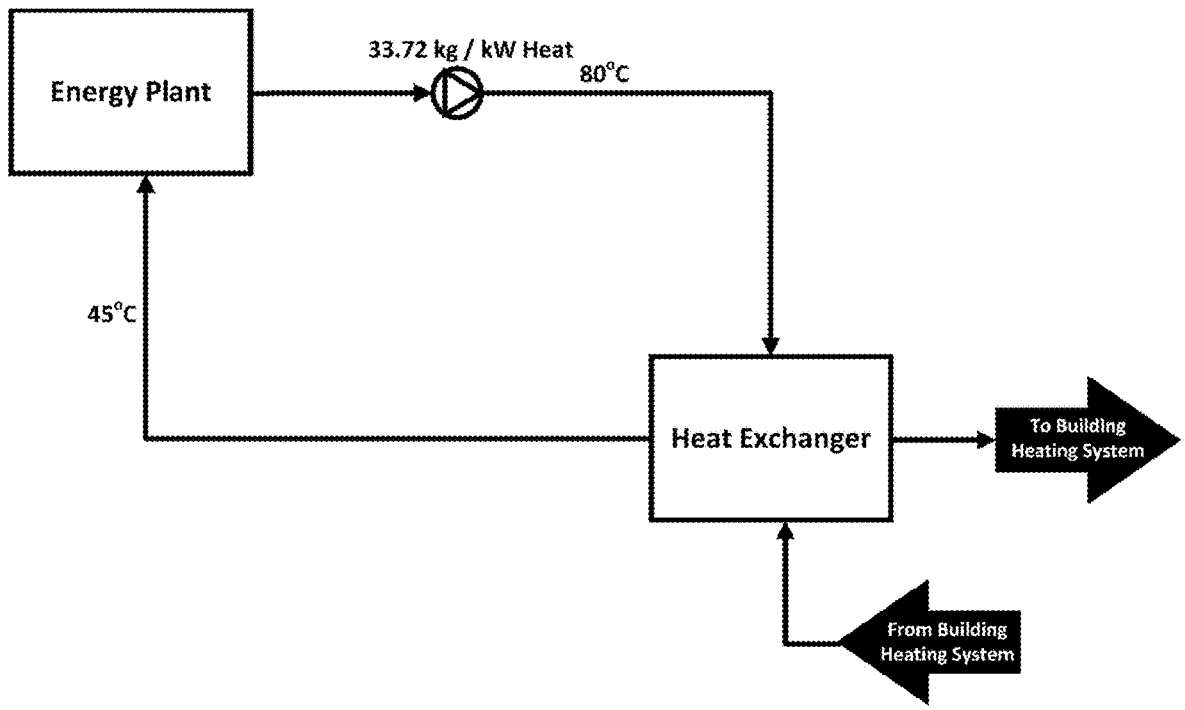
FIG. 32: A district heating system with a liquid-liquid phase transitioning heat transfer liquid with example temperatures.
Figure 33:
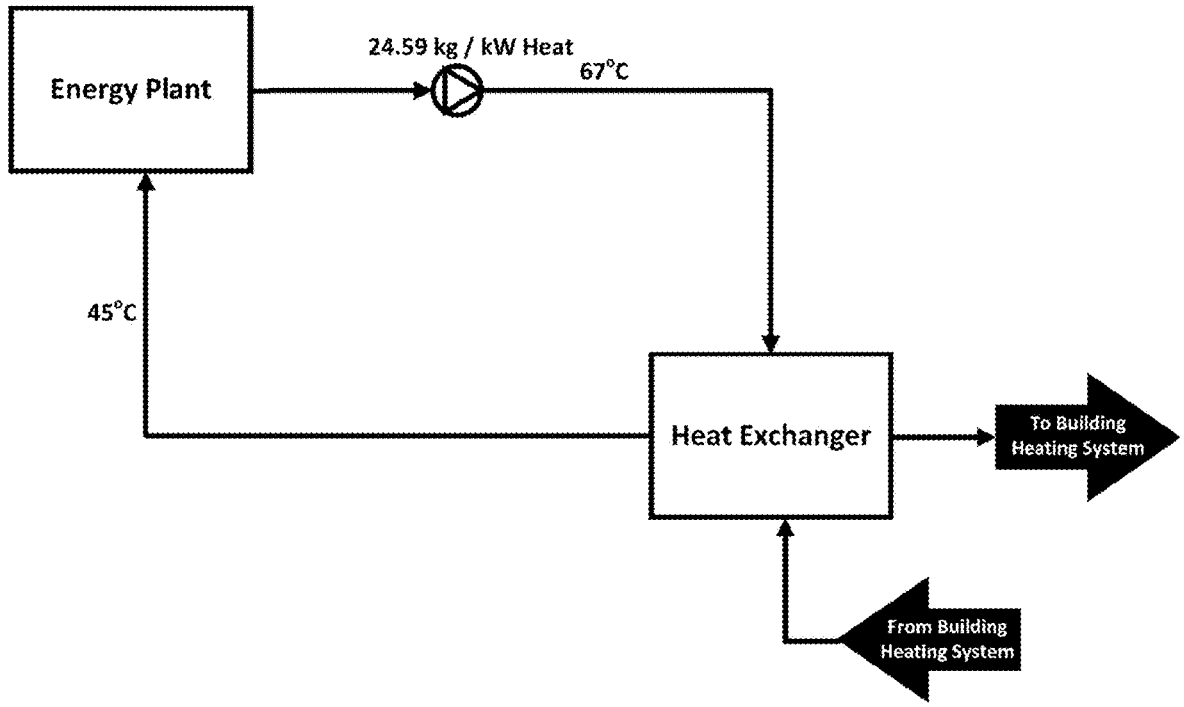
FIG. 33: A district heating system with a liquid-liquid phase transitioning heat transfer liquid.
Figure 34:
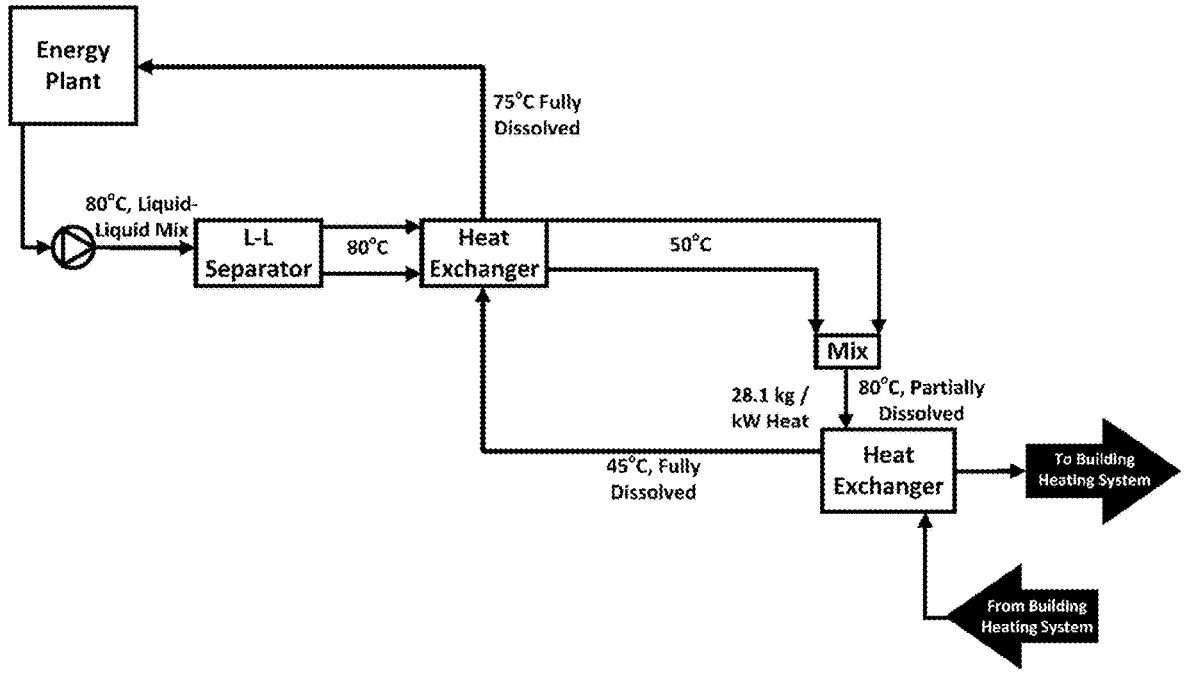
FIG. 34: A district heating or cooling process with a liquid-liquid phase transition heat transfer medium transferring heat at a lower temperature than the temperature of heat delivered by the heat transfer medium at the point of use with example temperatures.
Figure 35:
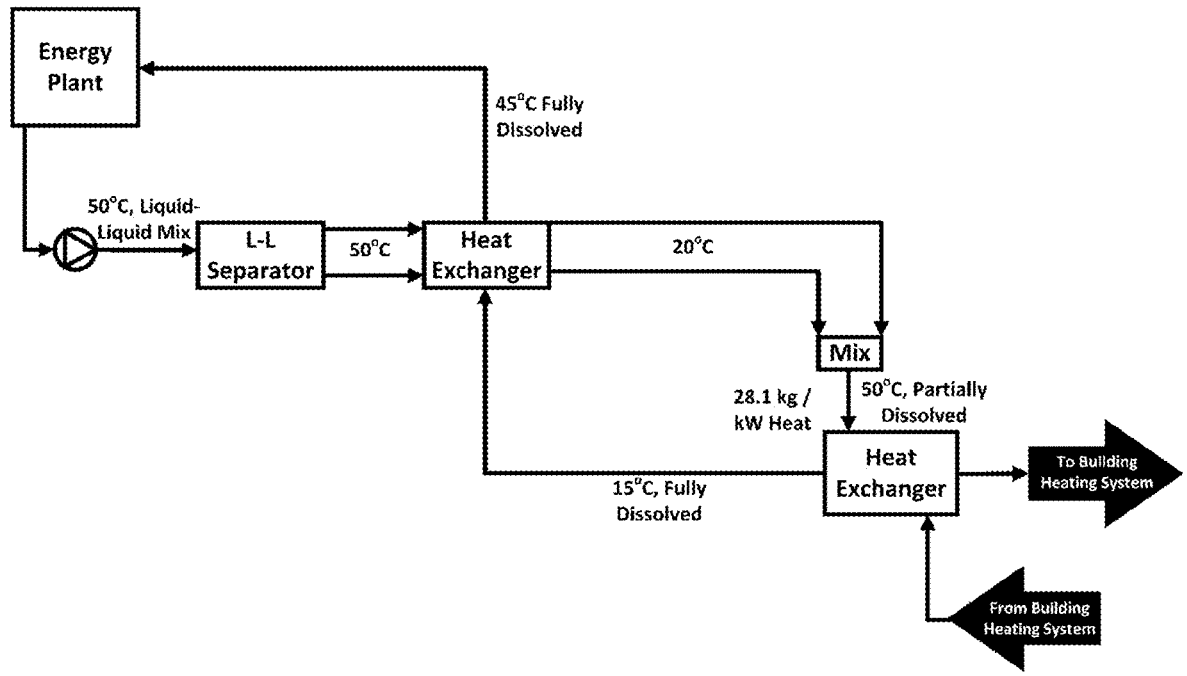
FIG. 35: A district heating or cooling process with a liquid-liquid phase transitioning liquid with thermal transport independent of temperature variation with lower temperature operation.

| FIGS. 16-27 | |
|---|---|
| ID | Description |
| L-1 | L-1 may comprise a 'supply' solution. L-1 may comprise combined liquid phase solution. In embodiments for cold thermal storage or chilled thermal storage, L-1 may comprise the 'supply' chilled liquid. May comprise a combination of non-water reagent(s) and water. May comprise at least a portion of single liquid phase combined solution or may comprise primarily a combination of non-water reagents, which may possess a LCST or UCST phase transition temperature, dissolved in water. If L-1 possesses a LCST, it may be desirable to be below the temperature or below at least a portion of the temperature range of the liquid-liquid phase transition. |
| Load | The 'Load' may comprise the application requiring cooling or heating or a demand source for cooling or heat. The Load may be satisfied by, for example, discharging thermal storage to provide the cooling or heating demanded by the Load. For example, the Load may comprise a building requiring cooling. L-1 may heat exchange with the Load, providing, for example, cooling to said load, while resulting in warmer LL-1 output. |
| LL-1 | LL-1 may comprise L-1 after heat exchanging with the Load. In embodiments involving chilling or cooling or cold storage, LL-1 may comprise a warm multi-liquid phase mixture (warm relative to L-1), following the removal of heat from the Load. As L-1 heats up during heat exchange with the Load, L-1 may undergo a liquid-liquid phase transition, which may absorb heat and enhance specific heat capacity and/or heat transfer. LL-1 may undergo further heating or recirculation or further heat transfer use or other use or treatment before liquid-liquid separation in LLS-1. |
| LLS-1 | LLS-1 may comprise a liquid-liquid separation device, which may be employed to separate at least a portion of the constituent liquid phases of LL-1 into non-contiguously separate liquid phases. For example, LL-1 may comprise two liquid phases and LLS-1 may separate said two constituent liquid phases into two separate liquid streams, wherein each stream may contain a different liquid phases or mostly one of the two liquid phases. LLS-1 may comprise one or more or a combination of liquid-liquid separation devices, which may include, but are not limited to, one or more or a combination of the following: decanter, centrifuge, coalescer, or other liquid-liquid separation devices known in the art. |
| L-2 | In FIGS. 16, 17, 18, 19, 20, 21, 22, 23, 24, and 25, L-2 may comprise a mostly water liquid phase, which may have been a component of LL-1 before liquid-liquid separation in LLS-1. In FIGS. 26 and 27, L-2 may comprise a mostly non-water liquid phase or a mostly organic liquid phase, which may have been a component of LL-1 before liquid-liquid separation in LLS-1. |
| L-3 | In FIGS. 16, 17, 18, 19, 20, 21, 22, 23, 24, and 25, L-3 may comprise a mostly non-water liquid phase or a mostly organic liquid phase, which may have been a component of LL-1 before liquid-liquid separation in LLS-1. In FIGS. 26 and 27, L-3 may comprise a mostly water liquid phase, which may have been a component of LL-1 before liquid-liquid separation in LLS-1. |
| Tank 1 | Tank 1 may comprise a container or storage vessel for the thermal storage liquids. Tank 1 may exhibit a temperature stratification or thermocline. The temperature stratification or thermocline may be generated due to density differences driven by the density of reagents comprising each liquid phase or due to temperature driven density differences or a combination thereof. Tank 1 may also contain floating barriers or other forms of barriers to facilitate separation between layers which may be present within Tank 1. Tank 1 possess temperature stratification or thermocline or layers even without solid barriers between layers. |
| Tank 2 | Tank 2 may comprise a container or storage vessel for the thermal storage liquids. Tank 2 may be employed to store a mostly non-water liquid phase separately from a mostly water liquid phase and/or a combined solution liquid phase. |
| L-4 | In FIGS. 16, 17, 18, 19, 20, 21, 22, 23, 24, and 25, L-4 may comprise a mostly water liquid phase, which may have been previously stored or may have been removed from Tank 1. In FIGS. 26 and 27, L-4 may comprise a mostly non-water liquid phase, which may have been previously stored or may have been removed from Tank 1. L-4 may exist at or near a desired 'supply' temperature. |
| L-5 | In FIGS. 16, 17, 18, 19, 20, 21, 22, 23, 24, and 25, L-5 may comprise a mostly non-water liquid phase. In FIGS. 26 and 27, L-5 may comprise a mostly water liquid phase, which may have been previously stored or may have been removed from Tank 1. In FIGS. 16-23, L-5 may have been previously stored or may have been removed from Tank 2. In FIGS. 24 and 25, L-5 may have been previously stored or may have been removed from Tank 1. L-5 may exist at or near a desired 'supply' temperature. |

| | FIGS. 16-27 |
|---|---|
| ID | Description |
| Mixing | 'Mixing' may comprise one or more or a combination of devices for mixing two or more liquid phases. 'Mixing' may involve mixing L-4 and L-5 to form LL-2. Mixing devices may include, but are not limited to, one or more or a combination of the following: static mixer, pump, stirred vessel, continuous stirred reactor, inline mixer, or other mixing or merging devices known in the art. Mixing may exist or may be conducted at or near a desired 'supply' temperature. |
| LL-2 | LL-2 may comprise a multi-liquid phase mixture, which may result from mixing L-4 and L-5 in 'Mixing'. LL-2 may exist at or near a desired 'supply' temperature. |
| Chiller | A source of thermal energy for 'charging' the thermal storage. May comprise a chiller for embodiments involving chilled liquid thermal storage or cooling or cooling thermal storage. May comprise a heater or heat pump for embodiments involving heated liquid thermal storage or heating or heating thermal storage. |
| L-6 | L-6 may comprise supply solution. L-6 may comprise at least a portion a single liquid phase combined solution or a combined solution, which may have originated from LL-2. L-6 may comprise LL-2 after a liquid-liquid phase transition which may have occurred due to heat transfer or change in liquid temperature, during, for example, heat exchange with 'Chiller'. L-6 may exist at or near a desired 'return' temperature. |
| Liquid 'A' | Liquid 'A' may comprise a liquid phase comprising mostly water. Liquid 'A' may be stored at or near a 'return' temperature. Liquid 'A' is labeled 'A' in FIGS. 20-27 and may also be represented by a vertical line background/pattern. |
| Liquid 'B' | Liquid 'B' may comprise a liquid phase comprising at least a portion combined solution or single liquid phase combined solution. Liquid 'B' may comprise a combination of Liquid 'A' and Liquid 'C'. Liquid 'B' may be stored at or near a 'supply' temperature. Liquid 'B' is labeled 'B' in FIGS. 20-27 and may also be represented by a horizontal line background/pattern. |
| Liquid 'C' | Liquid 'C' may comprise a liquid phase comprising mostly non-water reagents. Liquid 'C' may be stored at or near a 'return' temperature. Liquid 'C' is labeled 'C' in FIGS. 20-27 and may also be represented by a cross diamond background/pattern. |
| Floating Barrier | 'Floating barrier' may comprise a separator or separation or barrier or material or device to, for example, minimize contact or liquid-liquid mixing or heat transfer between colder and warmer layers or layers of different compositions or a combination thereof within a thermocline or stratified thermal storage tank. It may be desirable for the floating barrier to be less dense than one or more layers of greater density (which may enable the floating barrier to float) and more dense than one or more layers of lesser density. The floating barrier may have desirable hydrophobicity or hydrophilicity or other affinity or other properties or a combination thereof. Said properties may be advantageously employed to optimize separation between liquid layers or minimize thermal losses or mixing within a thermal storage tank. |
| Floating Barrier 1 | Floating Barrier 1 may be a floating barrier located between two liquid layers or liquid phases. |
| Floating Barrier 2 | Floating Barrier 2 may be a floating barrier located between two liquid layers or liquid phases. |

Figure 36A:
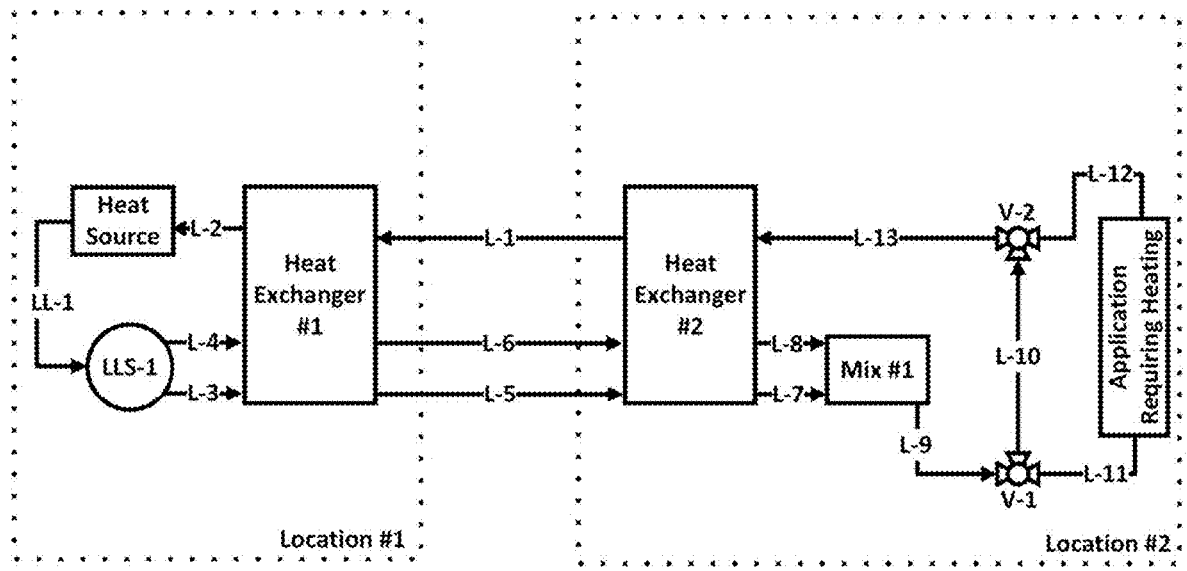
FIG. 36A: A district heating process employing a liquid-liquid phase transition liquid heat transfer medium with heat transfer independent of distance and/or temperature of heat transfer medium during transfer. The figure shows the embodiment undergoing adiabatic heating.
Figure 36B:
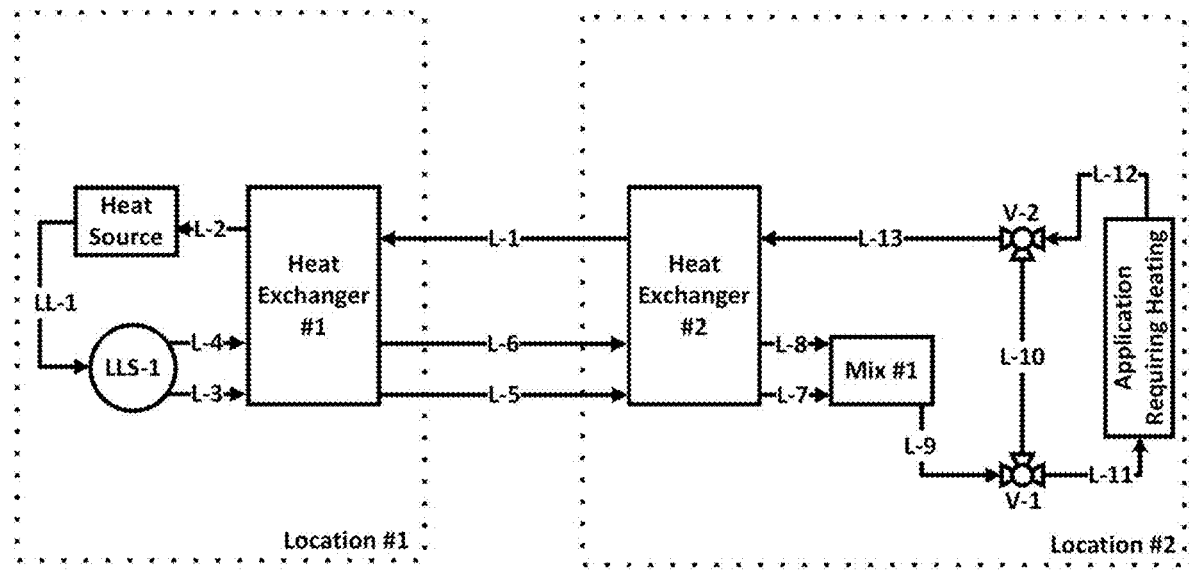
FIG. 36B: A district heating process employing a liquid-liquid phase transition liquid heat transfer medium with heat transfer independent of distance and/or temperature of heat transfer medium during transfer. The figure shows the embodiment providing heat to an application requiring heating.

| | FIGS. 36A, 36B |
|---|---|
| ID | Description |
| L-1 | L-1 may comprise a liquid-liquid phase transition liquid comprising at least a portion a single liquid phase combined solution. L-1 may be at a temperature below a liquid-liquid phase transition temperature range. L-1 may comprise a liquid-liquid phase transition liquid with at least a partially expended exothermic enthalpy of liquid-liquid phase transition. L-1 may be at a colder temperature than one or more liquids in Location #1 and/or Location #2. L-1 may be transferred between Location #2 and Location #1. L-1 may comprise L-13 after counter current heat exchanger with L-5 and L-6. |
| Heat Exchanger #1 | Heat Exchanger #1 may comprise a countercurrent heat exchanger which may heat exchange a 'cold' single steam liquid with 'warm' countercurrent streams comprising two or more non-contiguously separate liquid streams. Heat Exchanger #1 may recover at least a portion of the specific heat or heat capacity or non-latent heat of the liquid-liquid phase transition liquid to, for example, minimize net energy consumption related to heating up or cooling down a liquid-liquid phase transition liquid and maximize the proportion of heat stored in the latent heat of an enthalpy of liquid-liquid phase transition. |

-continued

| FIGS. 36A, 36B | |
|---|---|
| ID | Description |
| L-2 | L-2 may comprise a liquid-liquid phase transition liquid comprising at least a portion a single liquid phase combined solution. L-2 may comprise a pre-heated liquid-liquid phase transition liquid. In some embodiments, L-2 may be at a temperature adjacent to or overlapping with an enthalpy of liquid-liquid phase transition temperature range. L-2 may comprise a multi-liquid phase mixture which may have underwent at least a portion of an endothermic liquid-liquid phase transition during a heat exchange with L-3 and L-4. L-2 may comprise a multi-liquid phase mixture which may have underwent at least a portion of an endothermic liquid-liquid phase transition, although L-2 may possess additional latent endothermic liquid-liquid phase transition or may be at a temperature within a liquid-liquid phase transition temperature range, although may not be at or above the higher end limit of a liquid-liquid phase transition temperature range, or a combination thereof. |
| Heat Source | Heat source may comprise a heat source or application requiring cooling or both. May comprise a process providing heat to a liquid-liquid phase transition liquid. May comprise a process to heat a liquid-liquid phase transition liquid to a temperature within or above a liquid-liquid phase transition temperature range to enable or facilitate an endothermic liquid-liquid phase transition. May comprise a process to provide heat or energy or both to facilitate the formation of an endothermic liquid-liquid phase transition in a liquid-liquid phase transition liquid. |
| LL-1 | LL-1 may comprise a liquid-liquid phase transition liquid comprising a multi-liquid phase mixture which may comprise two or more liquid phases. LL-1 may comprise a liquid-liquid phase transition liquid above at least a portion of a liquid-liquid phase transition temperature range. LL-1 may comprise a liquid-liquid phase transition liquid above at least a portion of a LCST liquid-liquid phase transition temperature range. |
| LLS-1 | LLS-1 may comprise a process for separating two or more liquid phases or a liquid-liquid separation device. LLS-1 may comprise a centrifuge, or a decanter, or a coalescer, or a separation process described herein, or liquid-liquid separation processes known in the art, or a combination thereof. |
| L-3 | L-3 may comprise a liquid phase or reagents or a combination thereof of a liquid-liquid phase transition liquid. L-3 may comprise a liquid phase separated from a liquid-liquid phase transition liquid. L-3 may comprise a liquid phase of a liquid-liquid phase transition liquid, which may have been separated from said liquid-liquid phase transition liquid at a temperature above at least a portion of a liquid-liquid phase transition temperature range. The liquid-liquid phase transition liquid from which L-3 may have been separated may comprise two or more liquid phases and/or may comprise two or more liquid phases when at a temperature above at least a portion of a liquid-liquid phase transition temperature range. In some embodiments, at least a portion of L-3 may be non-contiguously separate from L-4. |
| L-4 | L-4 may comprise a liquid phase or reagents or a combination thereof of a liquid-liquid phase transition liquid. L-4 may comprise a liquid phase separated from a liquid-liquid phase transition liquid. L-4 may comprise a liquid phase of a liquid-liquid phase transition liquid, which may have been separated from said liquid-liquid phase transition liquid at a temperature above at least a portion of a liquid-liquid phase transition temperature range. The liquid-liquid phase transition liquid from which L-4 may have been separated may comprise two or more liquid phases and/or may comprise two or more liquid phases when at a temperature above at least a portion of a liquid-liquid phase transition temperature range. In some embodiments, at least a portion of L-4 may be non-contiguously separate from L-3. |
| L-5 | L-5 may comprise L-3 after a counter current heat exchanger with L-1. L-5 may comprise a liquid phase or reagents or a combination thereof of a liquid-liquid phase transition liquid. L-5 may be at a colder temperature than one or more liquids in Location #1 and/or Location #2. L-5 may be transferred between Location #1 and Location #2. |
| L-6 | L-6 may comprise L-4 after a counter current heat exchanger with L-1. L-6 may comprise a liquid phase or reagents or a combination thereof of a liquid-liquid phase transition liquid. L-6 may be at a colder temperature than one or more liquids in Location #1 and/or Location #2. L-6 may be transferred between Location #1 and Location #2. |
| Heat Exchanger #2 | Heat Exchanger #2 may comprise a countercurrent heat exchanger which may heat exchange a 'warm' single steam liquid with 'cold' countercurrent streams comprising two or more non-contiguously separate liquid streams. Heat Exchanger #2 may recover at least a portion of the specific heat or heat capacity or non-latent heat of the liquid-liquid phase transition liquid to, for example, minimize net energy consumption related to heating up or cooling down a liquid-liquid phase transition liquid, or maximize the proportion of heat stored in the latent heat of an enthalpy of liquid-liquid phase transition provided to an application requiring heating, or enable the liquid-liquid phase transition liquid |

FIGS. 36A, 36B

| ID | Description |
|---|---|
|  | to rise to or operate at a temperature desired for an application requiring heating, or enable the liquid-liquid phase transition liquid to rise to or operate at a temperature near or adjacent to at least a portion of the limits of an enthalpy of liquid-liquid phase transition temperature range. |
| L-7 | L-7 may comprise L-5 after a countercurrent heat exchange with L-13. L-7 may comprise a liquid phase or reagents or a combination thereof of a liquid-liquid phase transition liquid. In some embodiments, L-7 may be at a temperature adjacent to or overlapping with an enthalpy of liquid-liquid phase transition temperature range of the liquid-liquid phase transition liquid which may form if L-7 and L-8 are mixed. |
| L-8 | L-8 may comprise L-6 after a countercurrent heat exchange with L-13. L-8 may comprise a liquid phase or reagents or a combination thereof of a liquid-liquid phase transition liquid. In some embodiments, L-8 may be at a temperature adjacent to or overlapping with an enthalpy of liquid-liquid phase transition temperature range of the liquid-liquid phase transition liquid which may form if L-7 and L-8 are mixed. |
| Mix #1 | Mix #1 may comprise a process for combining L-7 and L-8. L-7 and L-8 may combine in Mix #1 to form an exothermic liquid-liquid phase transition and/or at least a portion of a single liquid phase combined solution, such as L-9. Mix #1 may be at least partially insulated to enable said exothermic liquid-liquid phase transition to be conducted as an adiabatic process. The temperature of L-9 may be greater than the temperature of L-7 and L-8 due to, for example, adiabatic temperature change. Mix #1 may comprise one or more or a combination of active and/or passive mixing processes described herein or known in the art. In some embodiments, Mix #1 may mix L-7 and L-8 to form a multi-liquid phase solution at or above a portion of a liquid-liquid phase transition temperature range. |
| L-9 | L-9 may comprise at least a portion a single liquid phase combined solution. In some embodiments, L-9 may be at a temperature equal to about the adiabatic temperature change plus the mean temperature of L-7 and L-8. L-9 may be transferred from Mix #1 to V-1. In some embodiments, L-9 may comprise a multi-liquid phase mixture which may later undergo, for example, at least a portion of exothermic liquid-liquid phase transition in a heat exchange with an application requiring heating. In some embodiments, L-9 may comprise a multi-liquid phase mixture with latent exothermic enthalpy of liquid-liquid phase transition. |
| V-1 | V-1 may comprise a process for flow control, or flow directing, or a combination thereof. If, for example, L-9 is at or above a desired temperature for heating an application requiring heating and an application requiring heating currently requires heating, V-1 may transfer L-9 (which may comprise L-11 upon transfer) to said application requiring heating. If, for example, L-9 is at or above a desired temperature for heating an application requiring heating and an application requiring heating currently does not require heating, V-1 may transfer L-9 (which may comprise L-11 upon transfer) to said application requiring heating or V-1 may transfer L-9 (which may comprise L-10 upon transfer) to V-2 to bypass an application requiring heating, or a combination thereof. If, for example, L-9 is below a desired temperature for heating an application requiring heating, V-1 may transfer L-9 (which may comprise L-10 upon transfer) to V-2 to bypass an application requiring heating and/or enable adiabatic heating. |
| L-10 | L-10 may comprise L-9 bypassing an application requiring heating. L-10 may be transferred between V-1 and V-2. Bypassing, as represented by L-10, may enable adiabatic heating by preventing or minimizing the removal of heat from a liquid-liquid phase transition liquid, which may enable the liquid-liquid phase transition liquid to rise in temperature due to, for example, at least a portion of adiabatic heating and/or rise in temperature to reach a desired temperature for an application requiring heating. |
| L-11 | L-11 may comprise L-9 being transferred to an application requiring heating. In some embodiments, L-12 may be at a lower temperature than L-11 due to the heat removed by an application requiring heating. In some embodiments, L-12 may be at a lower temperature than L-11 due to the heat removed by an application requiring heating. In some embodiments, L-11 may comprise a multi-liquid phase mixture which may undergo, for example, at least a portion of exothermic liquid-liquid phase transition in heat exchange with an application requiring heating. L-11 may be transferred between V-1 and an application requiring heating. |
| Application Requiring Heating | An application requiring heating may comprise an application requiring heating, or a heat sink, or a combination thereof. An application requiring heating may remove heat from a liquid. An application requiring heating may have control over when, or if, or how much heat may be removed from a liquid. An application requiring heating may have control over the temperature which heat is supplied to said application requiring heating |
| L-12 | L-12 may comprise L-11 after heat exchange with an application requiring heating. In some embodiments, L-12 may be at a lower temperature than L-11 due to the heat removed by an application requiring heating. In some |

-continued

FIGS. 36A, 36B

| ID | Description |
|---|---|
| | embodiments, L-12 may be at a lower temperature than L-11 due to the heat removed by an application requiring heating. L-12 may be transferred between an application requiring heating and V-2. |
| V-2 | V-2 may comprise a process for flow control, or flow directing, or a combination thereof. V-2 may direct and/or merge L-10 and/or L-12 to form L-13, or recirculate, or a combination thereof. |
| L-13 | L-13 may comprise L-10, or L-12, or a combination thereof. L-13 may comprise a liquid-liquid phase transition liquid comprising at least a portion a single liquid phase combined solution. L-13 may comprise a liquid-liquid phase transition liquid with at least a partially expended exothermic enthalpy of liquid-liquid phase transition. L-13 may be transferred between V-2 and Heat Exchanger #2. |
| Location #1 | Location #1 may comprise a 'regeneration portion' of the process, wherein, for example, heat is added and/or stored in the enthalpy of liquid-liquid phase transition of a liquid-liquid phase transition liquid. |
| Location #2 | Location #2 may comprise a 'heat receiving portion' of the process, wherein, for example, the latent enthalpy of liquid-liquid phase transition of a liquid-liquid phase transition liquid is converted to heat to enable, for example, adiabatic heating and/or to supply heat to an application requiring heating. |

In an example embodiment of FIG. 36A, for purposes of example, example temperatures may be the following:
- L-1: 20° C.
- L-2: 116° C.
- LL-1: 125° C.
- L-3: 125° C.
- L-4: 125° C.
- L-5: 22° C.
- L-6: 22° C.
- L-7: 50° C.
- L-8: 50° C.
- L-9: 60° C.
- L-10: 60° C.
- L-11:
- L-12:
- L-13:
  - For example:
    - 60° C. in portion of pipe or other transfer closest to V-1 or the portion of L-13 matching the temperature of L-10 and/or L-9
    - 52° C. in Heat Exchanger #2, resulting in the temperatures of L-7 and L-8
    - Note: If Location #2 or the heat transfer process is undergoing adiabatic heating at a temperature below a liquid-liquid phase transition enthalpy of liquid-liquid phase transition temperature range, the temperature will likely increase such that, at any given point, the temperature of L-9 may be greater than the temperature of L-10 and the temperature of L-10 may be greater than L-13.
  - Or for example, one or more or a combination of the following:
    - If the process is undergoing adiabatic heating, L-13 may possess a different temperature depending on where a given portion of L-13 is in the transit between V-2 and Heat Exchanger #2
    - If the process is undergoing adiabatic cooling, L-13 may possess a different temperature depending on where a given portion of L-13 is in the transit between V-2 and Heat Exchanger #2
    - If the rate of heat removal or heat addition changes, L-13 may possess a different temperature depending on where a given portion of L-13 is in the transit between V-2 and Heat Exchanger #2
    - At least a portion of L-13 may be at the same temperature as L-10, or L-12, or a solution of L-10 mixed with L-12, or a combination thereof
    - If the heat removed from the heat transfer medium before L-13 is equal to the enthalpy of liquid-liquid phase transition minus heat equivalent to the delta-T of Heat Exchanger #2, then the temperature of at least a portion of L-13 may be equal to the temperature of L-7 and/or L-8
    - If no heat is removed or the process is undergoing adiabatic heating, the temperature of L-13 may be equal to the temperature of the molecules of L-13 when said molecules comprised L-7 or L-8 or both plus the adiabatic temperature change of the enthalpy of liquid-liquid phase transition In an example embodiment of FIG. 36B, for purposes of example, example temperatures may be the following:
- L-1: 20° C.
- L-2: 116° C.
- LL-1: 125° C.
- L-3: 125° C.
- L-4: 125° C.
- L-5: 22° C.
- L-6: 22° C.
- L-7: 111° C.
- L-8: 111° C.
- L-9: 115° C. (may comprise a multi-liquid phase mixture with latent exothermic enthalpy of liquid-liquid phase transition)
- L-10:
- L-11: 115° C. (may comprise a multi-liquid phase mixture with latent exothermic enthalpy of liquid-liquid phase transition)
- L-12: 113° C.
- L-13:
  - For example: 113° C.
  - Or for example, one or more or a combination of the following:
    - If the process is undergoing adiabatic heating, L-13 may possess a different temperature depending on where a given portion of L-13 is in the transit between V-2 and Heat Exchanger #2
    - If the process is undergoing adiabatic cooling, L-13 may possess a different temperature depending on where a given portion of L-13 is in the transit between V-2 and Heat Exchanger #2

If the rate of heat removal or heat addition changes, L-13 may possess a different temperature depending on where a given portion of L-13 is in the transit between V-2 and Heat Exchanger #2

At least a portion of L-13 may be at the same temperature as L-10, or L-12, or a solution of L-10 mixed with L-12, or a combination thereof If the heat removed from the heat transfer medium before L-13 is equal to the enthalpy of liquid-liquid phase transition minus heat equivalent to the delta-T of Heat Exchanger #2, then the temperature of at least a portion of L-13 may be equal to the temperature of L-7 and/or L-8

If no heat is removed or the process is undergoing adiabatic heating, the temperature of L-13 may be equal to the temperature of the molecules of L-13 when said molecules comprised L-7 or L-8 or both plus the adiabatic temperature change of the enthalpy of liquid-liquid phase transition In some embodiments, boiling point of one or more reagents in a heat transfer medium or liquid-liquid phase transition liquid or the liquid-liquid phase transition liquid itself or a combination thereof at atmospheric pressure may be less than one or more temperatures in Location #1 and/or Location #2. In some embodiments, to for example prevent boiling, the pressure inside Location #1 and/or Location #2 may be greater than the pressure of the liquids transferring between Location #1 and/or Location #2, such as at least a portion of L-1, L-5, and L-6 in FIGS. 36A and 36B. For example, in some embodiments, Location #1 may operate at a pressure of 2 atmospheres and Location #2 may operate at a pressure of 1.8 atmospheres, while a portion of the liquids transferring between Location #1 and/or Location #2 may be at a pressure near atmospheric pressure. An appropriate operating pressure may be achieved or maintained in Location #1 and/or Location #2 by, for example, employing a pump, or a power recovery generator or power exchanger, a flow control valve, or a combination thereof. For example, in some embodiments, L-1 may be pressurized to an appropriate pressure using a pump before entering Heat Exchanger #1. For example, in some embodiments, pressure and/or power may be recovered from L-5 and L-6 by a power recovery or pressure recovery process before L-5 and/or L-6 exit Location #1. For example, in some embodiments, said recovered pressure and/or power may be provided to said pump employed to pressurized L-1.

In some embodiments, a liquid-liquid phase transition liquid in a regeneration portion or Location #1 may be heated to a temperature above a liquid-liquid phase transition temperature range to, for example, including, but not limited to, maximize latent heat stored in a liquid-liquid phase transition, or prevent or minimize enthalpies of liquid-liquid phase transition from occurring in one or more of the two or more non-contiguous liquid phases in the process, or a combination thereof.

In some embodiments, the regeneration and/or heat receiving may be conducted at a high temperature and/or high pressure, while the latent heat may be stored at a low temperature and/low pressure. Being able to store high quality heat high temperature heat with a fluid stored at a low pressure and low temperature may enable the use of a low cost storage tank and/or a large volume storage tank for the thermal storage of medium or high temperature heat. It may also enable the use of low cost liquid-liquid phase transition liquids. For example, a liquid-liquid phase transition liquid may comprise low cost reagents which may be volatile at high temperatures, such as, for example, including, but not limited to, water or organic solvents or inorganic solvents or a combination thereof.

Pressures in at least a portion of Location #1 or Location #2 may be greater than or equal to one or more or a combination of the following: 0.8 atm, or 1 atm, or 1.5 atm, or 2 atm, or 3 atm, or 4 atm, or 5 atm, or 6 atm, or 7 atm, or 8 atm, or 9 atm, or 10 atm, or 11 atm, or 12 atm, or 13 atm, or 14 atm, or 15 atm, or 16 atm, or 17 atm, or 18 atm, or 19 atm, or 20 atm, or 21 atm, or 22 atm, or 23 atm, or 24 atm, or 25 atm, or 30 atm, or 40 atm, or 50 atm, or 60 atm, or 70 atm, or 80 atm, or 90 atm, or 100 atm, or 150 atm, or 200 atm, or 250 atm, or 500 atm, or 750 atm, or 1000 atm, or 5000 atm, or 10000 atm.

In some embodiments, instead of bypassing an application requiring heating, the process may transfer a liquid below a desired temperature to an application requiring heating, although an application requiring heating may be designed to not remove or minimal removal heat from said liquid until said liquid reaches a desired temperature. An application requiring heating avoiding or minimizing the removal of heat may be effectively similar to 'bypassing' an application requiring heating by allowing a liquid to partially or fully undergo adiabatic heating until, for example, said liquid reaches a desired temperature.

Figure 37A:
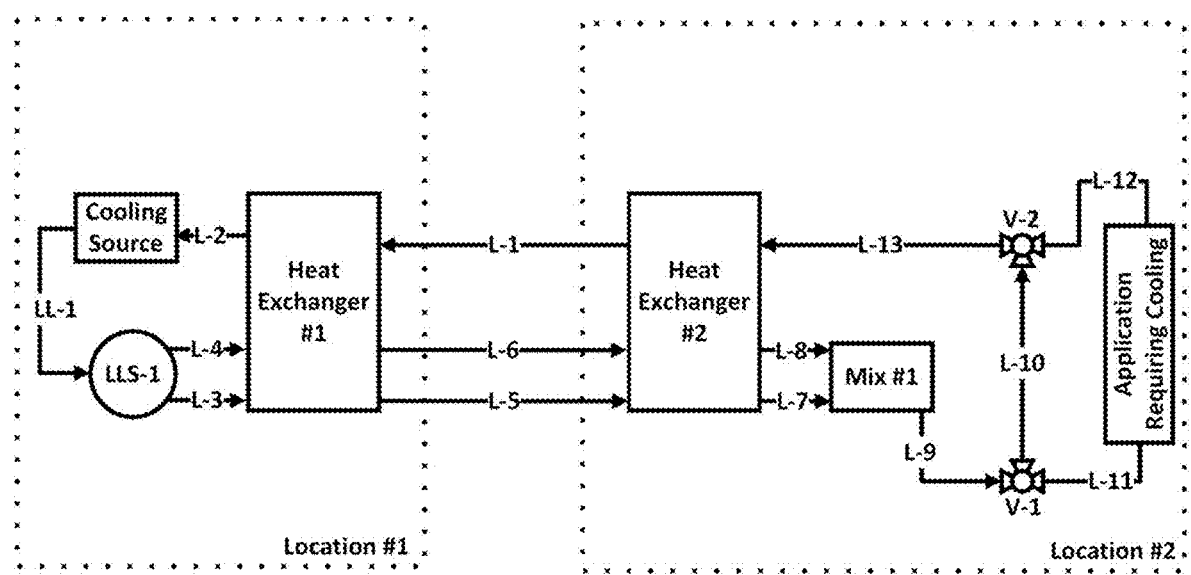
FIG. 37A: A district cooling process employing a liquid-liquid phase transition liquid heat transfer medium with heat transfer independent of distance and/or temperature of heat transfer medium during transfer. The figure shows the embodiment undergoing adiabatic cooling.
Figure 37B:
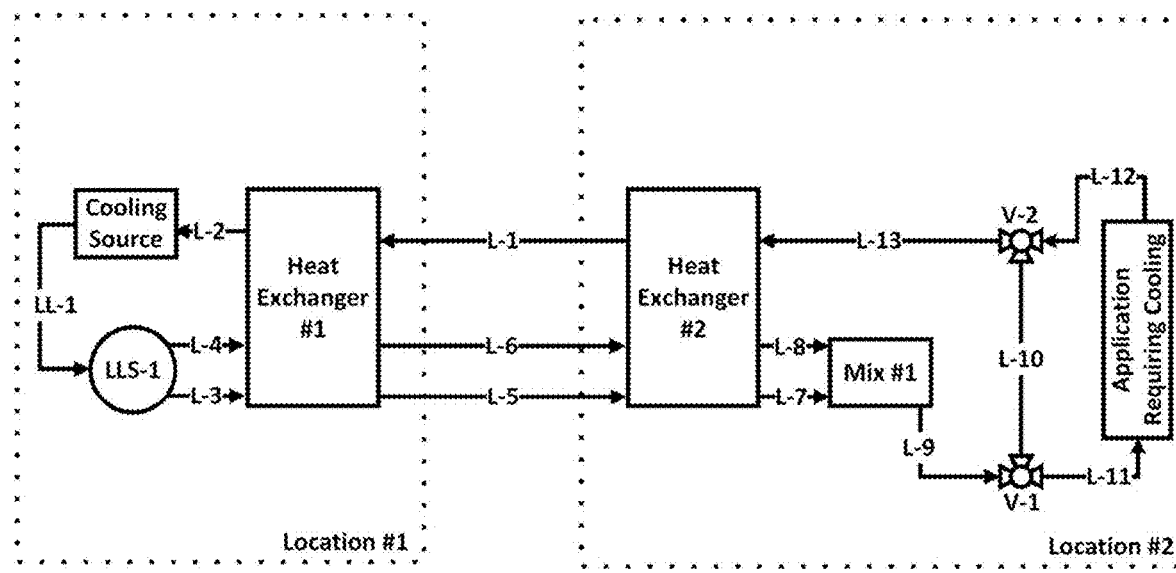
FIG. 37B: A district cooling process employing a liquid-liquid phase transition liquid heat transfer medium with heat transfer independent of distance and/or temperature of heat transfer medium during transfer. The figure shows the embodiment cooling an application requiring heating.

| FIGS. 37A, 37B | |
|---|---|
| ID | Description |
| L-1 | L-1 may comprise a liquid-liquid phase transition liquid comprising at least a portion a single liquid phase combined solution. L-1 may be at a temperature above a liquid-liquid phase transition temperature range. L-1 may comprise a liquid-liquid phase transition liquid with at least a partially expended endothermic enthalpy of liquid-liquid phase transition. L-1 may be at a warmer temperature than one or more liquids in Location #1 and/or Location #2. L-1 may be transferred between Location #2 and Location #1. L-1 may comprise L-13 after counter current heat exchanger with L-5 and L-6. |
| Heat Exchanger #1 | Heat Exchanger #1 may comprise a countercurrent heat exchanger which may heat exchange a 'warm' single steam liquid with 'cold' countercurrent streams comprising two or more non-contiguously separate liquid streams. Heat Exchanger #1 may recover at least a portion of the specific heat or heat capacity or non-latent heat of the liquid-liquid phase transition liquid to, for example, minimize net energy consumption related to cooling down or heating up a liquid-liquid phase transition liquid and maximize the proportion of 'cooling' stored in the latent heat of an enthalpy of liquid-liquid phase transition. |
| L-2 | L-2 may comprise a liquid-liquid phase transition liquid comprising at least a portion a single liquid phase combined solution. L-2 may comprise a pre-cooled |

| | FIGS. 37A, 37B |
|---|---|
| ID | Description |
| | liquid-liquid phase transition liquid. In some embodiments, L-2 may be at a temperature adjacent to or overlapping with an enthalpy of liquid-liquid phase transition temperature range. L-2 may comprise a multi-liquid phase mixture which may have underwent at least a portion of an exothermic liquid-liquid phase transition during a heat exchange with L-3 and L-4. L-2 may comprise a multi-liquid phase mixture which may have underwent at least a portion of an exothermic liquid-liquid phase transition, although L-2 may possess additional latent exothermic liquid-liquid phase transition or may be at a temperature within a liquid-liquid phase transition temperature range, although may not be at or below the lower end limit of a liquid-liquid phase transition temperature range, or a combination thereof. |
| Cooling Source | Cooling source may comprise a cooling source or application requiring heat or both. May comprise a process removing heat from a liquid-liquid phase transition liquid. May comprise a process to cool a liquid-liquid phase transition liquid to a temperature within or below a liquid-liquid phase transition temperature range to enable or facilitate an exothermic liquid-liquid phase transition. May comprise a process to remove heat or provide energy or both to facilitate the formation of an exothermic liquid-liquid phase transition in a liquid-liquid phase transition liquid. |
| LL-1 | LL-1 may comprise a liquid-liquid phase transition liquid comprising a multi-liquid phase mixture which may comprise two or more liquid phases. LL-1 may comprise a liquid-liquid phase transition liquid below at least a portion of a liquid-liquid phase transition temperature range. LL-1 may comprise a liquid-liquid phase transition liquid below at least a portion of a UCST liquid-liquid phase transition temperature range. |
| LLS-1 | LLS-1 may comprise a process for separating two or more liquid phases or a liquid-liquid separation device. LLS-1 may comprise a centrifuge, or a decanter, or a coalescer, or a separation process described herein, or liquid-liquid separation processes known in the art, or a combination thereof. |
| L-3 | L-3 may comprise a liquid phase or reagents or a combination thereof of a liquid-liquid phase transition liquid. L-3 may comprise a liquid phase separated from a liquid-liquid phase transition liquid. L-3 may comprise a liquid phase of a liquid-liquid phase transition liquid, which may have been separated from said liquid-liquid phase transition liquid at a temperature below at least a portion of a liquid-liquid phase transition temperature range. The liquid-liquid phase transition liquid from which L-3 may have been separated may comprise two or more liquid phases and/or may comprise two or more liquid phases when at a temperature below at least a portion of a liquid-liquid phase transition temperature range. In some embodiments, at least a portion of L-3 may be non-contiguously separate from L-4. |
| L-4 | L-4 may comprise a liquid phase or reagents or a combination thereof of a liquid-liquid phase transition liquid. L-4 may comprise a liquid phase separated from a liquid-liquid phase transition liquid. L-4 may comprise a liquid phase of a liquid-liquid phase transition liquid, which may have been separated from said liquid-liquid phase transition liquid at a temperature below at least a portion of a liquid-liquid phase transition temperature range. The liquid-liquid phase transition liquid from which L-4 may have been separated may comprise two or more liquid phases and/or may comprise two or more liquid phases when at a temperature below at least a portion of a liquid-liquid phase transition temperature range. In some embodiments, at least a portion of L-4 may be non-contiguously separate from L-3. |
| L-5 | L-5 may comprise L-3 after a counter current heat exchanger with L-1. L-5 may comprise a liquid phase or reagents or a combination thereof of a liquid-liquid phase transition liquid. L-5 may be at a warmer temperature than one or more liquids in Location #1 and/or Location #2. L-5 may be transferred between Location #1 and Location #2. |
| L-6 | L-6 may comprise L-4 after a counter current heat exchanger with L-1. L-6 may comprise a liquid phase or reagents or a combination thereof of a liquid-liquid phase transition liquid. L-6 may be at a warmer temperature than one or more liquids in Location #1 and/or Location #2. L-6 may be transferred between Location #1 and Location #2. |
| Heat Exchanger #2 | Heat Exchanger #2 may comprise a countercurrent heat exchanger which may heat exchange a 'cold' single steam liquid with 'warm' countercurrent streams comprising two or more non-contiguously separate liquid streams. Heat Exchanger #2 may recover at least a portion of the specific heat or heat capacity or non-latent heat of the liquid-liquid phase transition liquid to, for example, minimize net energy consumption related to cooling down or heating up a liquid-liquid phase transition liquid, or maximize the proportion of 'cold' stored in the latent heat of an enthalpy of liquid-liquid phase transition provided to an application requiring cooling, or enable the liquid-liquid phase transition liquid to decrease to or operate at a temperature desired for an application requiring cooling, or enable the liquid-liquid phase transition liquid to decrease to or operate at a temperature near or adjacent to at least a portion of the limits of an enthalpy of liquid-liquid phase transition temperature range. |

-continued

| | FIGS. 37A, 37B |
|---|---|
| ID | Description |
| L-7 | L-7 may comprise L-5 after a countercurrent heat exchange with L-13. L-7 may comprise a liquid phase or reagents or a combination thereof of a liquid-liquid phase transition liquid. In some embodiments, L-7 may be at a temperature adjacent to or overlapping with an enthalpy of liquid-liquid phase transition temperature range of the liquid-liquid phase transition liquid which may form if L-7 and L-8 are mixed. |
| L-8 | L-8 may comprise L-6 after a countercurrent heat exchange with L-13. L-8 may comprise a liquid phase or reagents or a combination thereof of a liquid-liquid phase transition liquid. In some embodiments, L-8 may be at a temperature adjacent to or overlapping with an enthalpy of liquid-liquid phase transition temperature range of the liquid-liquid phase transition liquid which may form if L-7 and L-8 are mixed. |
| Mix #1 | Mix #1 may comprise a process for combining L-7 and L-8. L-7 and L-8 may combine in Mix #1 to form an endothermic liquid-liquid phase transition and/ or at least a portion of a single liquid phase combined solution, such as L-9. Mix #1 may be at least partially insulated to enable said endothermic liquid-liquid phase transition to be conducted as an adiabatic process. The temperature of L-9 may be less than the temperature of L-7 and L-8 due to, for example, adiabatic temperature change. Mix #1 may comprise one or more or a combination of active and/or passive mixing processes described herein or known in the art. In some embodiments, Mix #1 may mix L-7 and L-8 to form a multi-liquid phase solution at or below a portion of a liquid-liquid phase transition temperature range. |
| L-9 | L-9 may comprise at least a portion a single liquid phase combined solution. In some embodiments, L-9 may be at a temperature equal to about the adiabatic temperature change minus the mean temperature of L-7 and L-8. L-9 may be transferred from Mix #1 to V-1. In some embodiments, L-9 may comprise a multi-liquid phase mixture which may later undergo, for example, at least a portion of endothermic liquid-liquid phase transition in a heat exchange with an application requiring cooling. In some embodiments, L-9 may comprise a multi-liquid phase mixture with latent endothermic enthalpy of liquid-liquid phase transition. |
| V-1 | V-1 may comprise a process for flow control, or flow directing, or a combination thereof. If, for example, L-9 is at or below a desired temperature for cooling an application requiring cooling and an application requiring cooling currently requires cooling, V-1 may transfer L-9 (which may comprise L-11 upon transfer) to said application requiring cooling. If, for example, L-9 is at or below a desired temperature for cooling an application requiring cooling and an application requiring cooling currently does not require cooling, V-1 may transfer L-9 (which may comprise L-11 upon transfer) to said application requiring cooling or V-1 may transfer L-9 (which may comprise L-10 upon transfer) to V-2 to bypass an application requiring cooling, or a combination thereof. If, for example, L-9 is above a desired temperature for cooling an application requiring cooling, V-1 may transfer L-9 (which may comprise L-10 upon transfer) to V-2 to bypass an application requiring cooling and/or enable adiabatic cooling. |
| L-10 | L-10 may comprise L-9 bypassing an application requiring cooling. L-10 may be transferred between V-1 and V-2. Bypassing, as represented by L-10, may enable adiabatic cooling by preventing or minimizing the removal of heat from a liquid-liquid phase transition liquid, which may enable the liquid-liquid phase transition liquid to decrease in temperature due to, for example, at least a portion of adiabatic cooling and/or a decrease in temperature to reach a desired temperature for an application requiring cooling. |
| L-11 | L-11 may comprise L-9 being transferred to an application requiring cooling. In some embodiments, L-12 may be at a higher temperature than L-11 due to the heat added by an application requiring cooling. In some embodiments, L-12 may be at a higher temperature than L-11 due to the heat added by an application requiring cooling. In some embodiments, L-11 may comprise a multi-liquid phase mixture which may undergo, for example, at least a portion of endothermic liquid-liquid phase transition in heat exchange with an application requiring cooling. L-11 may be transferred between V-1 and an application requiring cooling. |
| Application Requiring Cooling | An application requiring cooling may comprise an application requiring cooling, or a heat source, or a combination thereof. An application requiring cooling may add heat to a liquid. An application requiring cooling may have control over when, or if, or how much heat may be added to a liquid. An application requiring cooling may have control over the temperature which heat is removed from said application requiring cooling. |
| L-12 | L-12 may comprise L-11 after heat exchange with an application requiring cooling. In some embodiments, L-12 may be at a higher temperature than L-11 due to the heat added by an application requiring cooling. In some embodiments, L-12 may be at a higher temperature than L-11 due to the heat added by an application requiring cooling. L-12 may be transferred between an application requiring cooling and V-2. |

-continued

FIGS. 37A, 37B

| ID | Description |
|---|---|
| V-2 | V-2 may comprise a process for flow control, or flow directing, or a combination thereof. V-2 may direct and/or merge L-10 and/or L-12 to form L-13, or recirculate, or a combination thereof. |
| L-13 | L-13 may comprise L-10, or L-12, or a combination thereof. L-13 may comprise a liquid-liquid phase transition liquid comprising at least a portion a single liquid phase combined solution. L-13 may comprise a liquid-liquid phase transition liquid with at least a partially expended exothermic enthalpy of liquid-liquid phase transition. L-13 may be transferred between V-2 and Heat Exchanger #2. |
| Location #1 | Location #1 may comprise a 'regeneration portion' of the process, wherein, for example, 'cooling' is stored in the enthalpy of liquid-liquid phase transition of a liquid-liquid phase transition liquid. |
| Location #2 | Location #2 may comprise a 'cooling portion' of the process, wherein, for example, the latent enthalpy of liquid-liquid phase transition of a liquid-liquid phase transition liquid is converted to absorb heat to enable, for example, adiabatic cooling and/or to remove heat from an application requiring cooling. |

In an example embodiment of FIG. 36A, for purposes of example, example temperatures may be the following:
- L-1: 40° C.
- L-2: 9° C.
- LL-1: 1° C.
- L-3: 1° C.
- L-4: 1° C.
- L-5: 38° C.
- L-6: 38° C.
- L-7: 23° C.
- L-8: 23° C.
- L-9: 13° C.
- L-10: 13° C.
- L-11:
- L-12:
- L-13:
  - For example:
    - 13° C. in portion of pipe or other transfer closest to V-1 or the portion of L-13 matching the temperature of L-10 and/or L-9
    - 21° C. in Heat Exchanger #2, resulting in the temperatures of L-7 and L-8
    - Note: If Location #2 or the heat transfer process is undergoing adiabatic cooling at a temperature above a liquid-liquid phase transition enthalpy of liquid-liquid phase transition temperature range, the temperature will likely increase such that, at any given point, the temperature of L-9 may be less than the temperature of L-10 and the temperature of L-10 may be less than L-13.
  - Or for example, one or more or a combination of the following:
    - If the process is undergoing adiabatic cooling, L-13 may possess a different temperature depending on where a given portion of L-13 is in the transit between V-2 and Heat Exchanger #2
    - If the process is undergoing adiabatic heating, L-13 may possess a different temperature depending on where a given portion of L-13 is in the transit between V-2 and Heat Exchanger #2
    - If the rate of heat removal or heat addition changes, L-13 may possess a different temperature depending on where a given portion of L-13 is in the transit between V-2 and Heat Exchanger #2
    - At least a portion of L-13 may be at the same temperature as L-10, or L-12, or a solution of L-10 mixed with L-12, or a combination thereof
    - If the heat added to the heat transfer medium before L-13 is equal to the enthalpy of liquid-liquid phase transition plus heat equivalent to the delta-T of Heat Exchanger #2, then the temperature of at least a portion of L-13 may be equal to the temperature of L-7 and/or L-8
    - If no heat is added or the process is undergoing adiabatic cooling, the temperature of L-13 may be equal to the temperature of the molecules of L-13 when said molecules comprised L-7 or L-8 or both minus the adiabatic temperature change of the enthalpy of liquid-liquid phase transition In an example embodiment of FIG. 36B, for purposes of example, example temperatures may be the following:
- L-1: 40° C.
- L-2: 9° C.
- LL-1: 1° C.
- L-3: 1° C.
- L-4: 1° C.
- L-5: 38° C.
- L-6: 38° C.
- L-7: 13° C.
- L-8: 13° C.
- L-9: 10° C. (may comprise a multi-liquid phase mixture with latent endothermic enthalpy of liquid-liquid phase transition)
- L-10:
- L-11: 10° C. (may comprise a multi-liquid phase mixture with latent endothermic enthalpy of liquid-liquid phase transition)
- L-12: 11° C.
- L-13:
  - For example: 11° C.
  - Or for example, one or more or a combination of the following:
    - If the process is undergoing adiabatic cooling, L-13 may possess a different temperature depending on where a given portion of L-13 is in the transit between V-2 and Heat Exchanger #2
    - If the process is undergoing adiabatic heating, L-13 may possess a different temperature depending on where a given portion of L-13 is in the transit between V-2 and Heat Exchanger #2
    - If the rate of heat removal or heat addition changes, L-13 may possess a different temperature depending on where a given portion of L-13 is in the transit between V-2 and Heat Exchanger #2

At least a portion of L-13 may be at the same temperature as L-10, or L-12, or a solution of L-10 mixed with L-12, or a combination thereof If the heat added to the heat transfer medium before L-13 is equal to the enthalpy of liquid-liquid phase transition plus heat equivalent to the delta-T of Heat Exchanger #2, then the temperature of at least a portion of L-13 may be equal to the temperature of L-7 and/or L-8

If no heat is added or the process is undergoing adiabatic cooling, the temperature of L-13 may be equal to the temperature of the molecules of L-13 when said molecules comprised L-7 or L-8 or both minus the adiabatic temperature change of the enthalpy of liquid-liquid phase transition In some embodiments, a liquid-liquid phase transition liquid in a regeneration portion or Location #1 may be cooled to a temperature below a liquid-liquid phase transition temperature range to, for example, including, but not limited to, maximize latent heat stored in a liquid-liquid phase transition, or prevent or minimize enthalpies of liquid-liquid phase transition from occurring in one or more of the two or more non-contiguous liquid phases in the process, or a combination thereof.

In some embodiments, instead of bypassing an application requiring cooling, the process may transfer a liquid below a desired temperature to an application requiring cooling, although an application requiring cooling may be designed to not add or minimally add heat to said liquid until said liquid reaches a desired temperature. An application requiring cooling avoiding or minimizing the addition of heat may be effectively similar to 'bypassing' an application requiring cooling by allowing a liquid to partially or fully undergo adiabatic cooling until, for example, said liquid reaches a desired temperature.

| FIGS. 38A-E | |
|---|---|
| ID | Description |
| L-1 | L-1 may comprise a liquid-liquid phase transition liquid comprising at least a portion a single liquid phase combined solution. L-1 may be at a temperature below a liquid-liquid phase transition temperature range. L-1 may comprise a liquid-liquid phase transition liquid with at least a partially expended exothermic enthalpy of liquid-liquid phase transition. L-1 may be at a colder temperature than one or more liquids in Location #1 and/or Location #2. L-1 may be transferred between Location #2 and Storage B. L-1 may comprise L-13 after counter current heat exchanger with L-14 and L-15. |
| Storage B | Storage B may comprise one or more tanks or a storage reservoir to store and/or provide L-1. |
| L-16 | L-16 may comprise liquid transferred from Storage B to Heat Exchanger #1. |
| Heat Exchanger #1 | Heat Exchanger #1 may comprise a countercurrent heat exchanger which may heat exchange a 'cold' single steam liquid with 'warm' countercurrent streams comprising two or more non-contiguously separate liquid streams. Heat Exchanger #1 may recover at least a portion of the specific heat or heat capacity or non-latent heat of the liquid-liquid phase transition liquid to, for example, minimize net energy consumption related to heating up or cooling down a liquid-liquid phase transition liquid and maximize the proportion of heat stored in the latent heat of an enthalpy of liquid-liquid phase transition. |
| L-2 | L-2 may comprise a liquid-liquid phase transition liquid comprising at least a portion a single liquid phase combined solution. L-2 may comprise a pre-heated liquid-liquid phase transition liquid. In some embodiments, L-2 may be at a temperature adjacent to or overlapping with an enthalpy of liquid-liquid phase transition temperature range. L-2 may comprise a multi-liquid phase mixture which may have underwent at least a portion of an endothermic liquid-liquid phase transition during a heat exchange with L-3 and L-4. L-2 may comprise a multi-liquid phase mixture which may have underwent at least a portion of an endothermic liquid-liquid phase transition, although L-2 may possess additional latent endothermic liquid-liquid phase transition or may be at a temperature within a liquid-liquid phase transition temperature range, although, in some embodiments may not be at or above the higher end limit of a liquid-liquid phase transition temperature range, or a combination thereof. |
| Heat Source | Heat source may comprise a heat source or application requiring cooling or both. May comprise a process providing heat to a liquid-liquid phase transition liquid. May comprise a process to heat a liquid-liquid phase transition liquid to a temperature within or above a liquid-liquid phase transition temperature range to enable or facilitate an endothermic liquid-liquid phase transition. May comprise a process to provide heat or energy or both to facilitate the formation of an endothermic liquid-liquid phase transition in a liquid-liquid phase transition liquid. |
| LL-1 | LL-1 may comprise a liquid-liquid phase transition liquid comprising a multi-liquid phase mixture which may comprise two or more liquid phases. LL-1 may comprise a liquid-liquid phase transition liquid above at least a portion of a liquid-liquid phase transition temperature range. LL-1 may comprise a liquid-liquid phase transition liquid above at least a portion of a LCST liquid-liquid phase transition temperature range. |
| LLS-1 | LLS-1 may comprise a process for separating two or more liquid phases or a liquid-liquid separation device. LLS-1 may comprise a centrifuge, or a decanter, or a coalescer, or a separation process described herein, or liquid-liquid separation processes known in the art, or a combination thereof. |
| L-3 | L-3 may comprise a liquid phase or reagents or a combination thereof of a liquid-liquid phase transition liquid. L-3 may comprise a liquid phase separated from a liquid-liquid phase transition liquid. L-3 may comprise a liquid phase of |

| ID | Description |
|---|---|
| | a liquid-liquid phase transition liquid, which may have been separated from said liquid-liquid phase transition liquid at a temperature above at least a portion of a liquid-liquid phase transition temperature range. The liquid-liquid phase transition liquid from which L-3 may have been separated may comprise two or more liquid phases and/or may comprise two or more liquid phases when at a temperature above at least a portion of a liquid-liquid phase transition temperature range. In some embodiments, at least a portion of L-3 may be non-contiguously separate from L-4. |
| L-4 | L-4 may comprise a liquid phase or reagents or a combination thereof of a liquid-liquid phase transition liquid. L-4 may comprise a liquid phase separated from a liquid-liquid phase transition liquid. L-4 may comprise a liquid phase of a liquid-liquid phase transition liquid, which may have been separated from said liquid-liquid phase transition liquid at a temperature above at least a portion of a liquid-liquid phase transition temperature range. The liquid-liquid phase transition liquid from which L-4 may have been separated may comprise two or more liquid phases and/or may comprise two or more liquid phases when at a temperature above at least a portion of a liquid-liquid phase transition temperature range. In some embodiments, at least a portion of L-4 may be non-contiguously separate from L-3. |
| L-5 | L-5 may comprise L-3 after a counter current heat exchanger with L-1. L-5 may comprise a liquid phase or reagents or a combination thereof of a liquid-liquid phase transition liquid. L-5 may be at a colder temperature than one or more liquids in Location #1 and/or Location #2. L-5 may be transferred between Location #1 and Storage A. |
| L-6 | L-6 may comprise L-4 after a counter current heat exchanger with L-1. L-6 may comprise a liquid phase or reagents or a combination thereof of a liquid-liquid phase transition liquid. L-6 may be at a colder temperature than one or more liquids in Location #1 and/or Location #2. L-6 may be transferred between Location #1 and Storage A. |
| Storage A | Storage A may comprise one or more storage tanks or a storage reservoir to store and/or provide L-5 and L-6. Storage A may store L-5 and L-6 as non-contiguously separate liquid phases. Storage A may store L-5 and L-6 as non-contiguously separate liquid phases with a floating barrier between L-5 and L-6. Storage A may store L-5 and L-6 as non-contiguously separate liquid phases in two separate tanks. In some embodiments, Storage A may store L-5 and L-6 at about the same temperature. |
| L-14 | L-14 may comprise liquid transferred from Storage A to Heat Exchanger #2. L-14 may be the same composition as L-6. |
| L-15 | L-15 may comprise liquid transferred from Storage A to Heat Exchanger #2. L-15 may be the same composition as L-5. |
| Heat Exchanger #2 | Heat Exchanger #2 may comprise a countercurrent heat exchanger which may heat exchange a 'warm' single steam liquid with 'cold' countercurrent streams comprising two or more non-contiguously separate liquid streams. Heat Exchanger #2 may recover at least a portion of the specific heat or heat capacity or non-latent heat of the liquid-liquid phase transition liquid to, for example, minimize net energy consumption related to heating up or cooling down a liquid-liquid phase transition liquid, or maximize the proportion of heat stored in the latent heat of an enthalpy of liquid-liquid phase transition provided to an application requiring heating, or enable the liquid-liquid phase transition liquid to rise to or operate at a temperature desired for an application requiring heating, or enable the liquid-liquid phase transition liquid to rise to or operate at a temperature near or adjacent to at least a portion of the limits of an enthalpy of liquid-liquid phase transition temperature range. |
| L-7 | L-7 may comprise L-15 after a countercurrent heat exchange with L-13. L-7 may comprise a liquid phase or reagents or a combination thereof of a liquid-liquid phase transition liquid. In some embodiments, L-7 may be at a temperature adjacent to or overlapping with an enthalpy of liquid-liquid phase transition temperature range of the liquid-liquid phase transition liquid which may form if L-7 and L-8 are mixed. |
| L-8 | L-8 may comprise L-14 after a countercurrent heat exchange with L-13. L-8 may comprise a liquid phase or reagents or a combination thereof of a liquid-liquid phase transition liquid. In some embodiments, L-8 may be at a temperature adjacent to or overlapping with an enthalpy of liquid-liquid phase transition temperature range of the liquid-liquid phase transition liquid which may form if L-7 and L-8 are mixed. |
| Mix #1 | Mix #1 may comprise a process for combining L-7 and L-8. L-7 and L-8 may combine in Mix #1 to form an exothermic liquid-liquid phase transition and/or at least a portion of a single liquid phase combined solution, such as L-9. Mix #1 may be at least partially insulated to enable said exothermic liquid-liquid phase transition to be conducted as an adiabatic process. The temperature of L-9 may be greater than the temperature of L-7 and L-8 due to, for example, adiabatic temperature change. Mix #1 may comprise one or more or a |

-continued

FIGS. 38A-E

| ID | Description |
|---|---|
| | combination of active and/or passive mixing processes described herein or known in the art. In some embodiments, Mix #1 may mix L-7 and L-8 to form a multi-liquid phase solution at or above a portion of a liquid-liquid phase transition temperature range. |
| L-9 | L-9 may comprise at least a portion a single liquid phase combined solution. In some embodiments, L-9 may be at a temperature equal to about the adiabatic temperature change plus the mean temperature of L-7 and L-8. L-9 may be transferred from Mix #1 to V-1. In some embodiments, L-9 may comprise a multi-liquid phase mixture which may later undergo, for example, at least a portion of exothermic liquid-liquid phase transition in a heat exchange with an application requiring heating. In some embodiments, L-9 may comprise a multi-liquid phase mixture with latent exothermic enthalpy of liquid-liquid phase transition. |
| V-1 | V-1 may comprise a process for flow control, or flow directing, or a combination thereof. If, for example, L-9 is at or above a desired temperature for heating an application requiring heating and an application requiring heating currently requires heating, V-1 may transfer L-9 (which may comprise L-11 upon transfer) to said application requiring heating. If, for example, L-9 is at or above a desired temperature for heating an application requiring heating and an application requiring heating currently does not require heating, V-1 may transfer L-9 (which may comprise L-11 upon transfer) to said application requiring heating or V-1 may transfer L-9 (which may comprise L-10 upon transfer) to V-2 to bypass an application requiring heating, or a combination thereof. If, for example, L-9 is below a desired temperature for heating an application requiring heating, V-1 may transfer L-9 (which may comprise L-10 upon transfer) to V-2 to bypass an application requiring heating and/or enable adiabatic heating. |
| L-10 | L-10 may comprise L-9 bypassing an application requiring heating. L-10 may be transferred between V-1 and V-2. Bypassing, as represented by L-10, may enable adiabatic heating by preventing or minimizing the removal of heat from a liquid-liquid phase transition liquid, which may enable the liquid-liquid phase transition liquid to rise in temperature due to, for example, at least a portion of adiabatic heating and/or rise in temperature to reach a desired temperature for an application requiring heating. |
| L-11 | L-11 may comprise L-9 being transferred to an application requiring heating. In some embodiments, L-12 may be at a lower temperature than L-11 due to the heat removed by an application requiring heating. In some embodiments, L-12 may be at a lower temperature than L-11 due to the heat removed by an application requiring heating. In some embodiments, L-11 may comprise a multi-liquid phase mixture which may undergo, for example, at least a portion of exothermic liquid-liquid phase transition in heat exchange with an application requiring heating. L-11 may be transferred between V-1 and an application requiring heating. |
| Application Requiring Heating | An application requiring heating may comprise an application requiring heating, or a heat sink, or a combination thereof. An application requiring heating may remove heat from a liquid. An application requiring heating may have control over when, or if, or how much heat may be removed from a liquid. An application requiring heating may have control over the temperature which heat is supplied to said application requiring heating |
| L-12 | L-12 may comprise L-11 after heat exchange with an application requiring heating. In some embodiments, L-12 may be at a lower temperature than L-11 due to the heat removed by an application requiring heating. In some embodiments, L-12 may be at a lower temperature than L-11 due to the heat removed by an application requiring heating. L-12 may be transferred between an application requiring heating and V-2. |
| V-2 | V-2 may comprise a process for flow control, or flow directing, or a combination thereof. V-2 may direct and/or merge L-10 and/or L-12 to form L-13, or recirculate, or a combination thereof. |
| L-13 | L-13 may comprise L-10, or L-12, or a combination thereof. L-13 may comprise a liquid-liquid phase transition liquid comprising at least a portion a single liquid phase combined solution. L-13 may comprise a liquid-liquid phase transition liquid with at least a partially expended exothermic enthalpy of liquid-liquid phase transition. L-13 may be transferred between V-2 and Heat Exchanger #2. |
| Location #1 | Location #1 may comprise a 'regeneration portion' of the process, wherein, for example, heat is added and/or stored in the enthalpy of liquid-liquid phase transition of a liquid-liquid phase transition liquid. |
| Location #2 | Location #2 may comprise a 'heat receiving portion' of the process, wherein, for example, the latent enthalpy of liquid-liquid phase transition of a liquid-liquid phase transition liquid is converted to heat to enable, for example, adiabatic heating and/or to supply heat to an application requiring heating. |

Figure 38A:
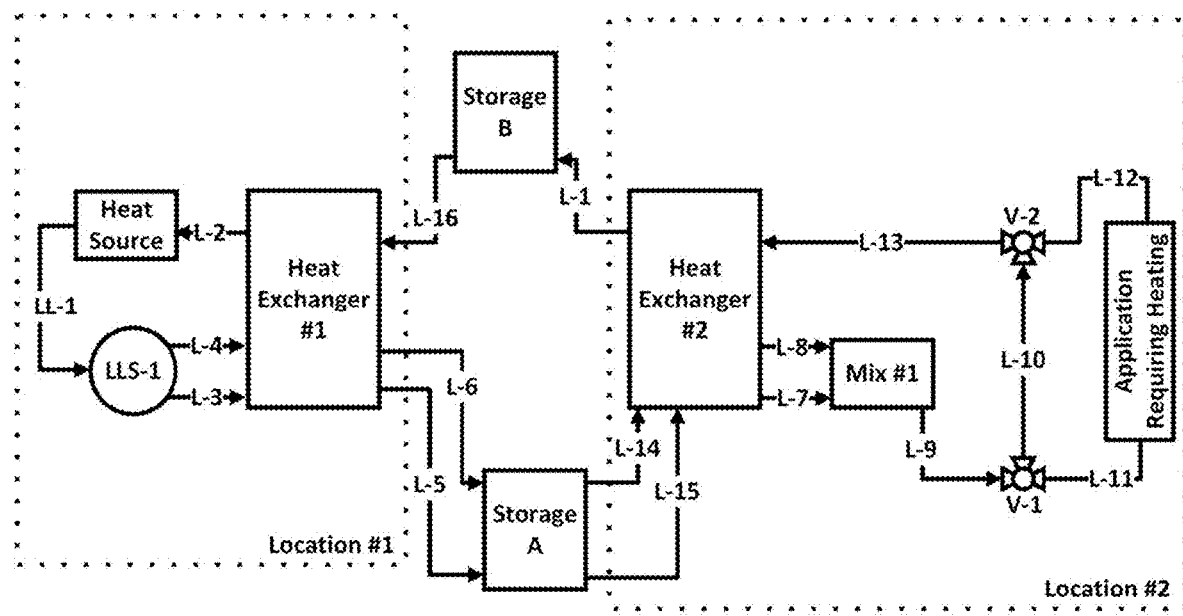
FIG. 38A: A thermal storage process employing a liquid-liquid phase transition liquid heat transfer medium with thermal storage and/or heat transfer independent of distance and/or temperature of heat transfer medium during transfer. The figure shows the embodiment undergoing adiabatic heating.
Figure 38B:
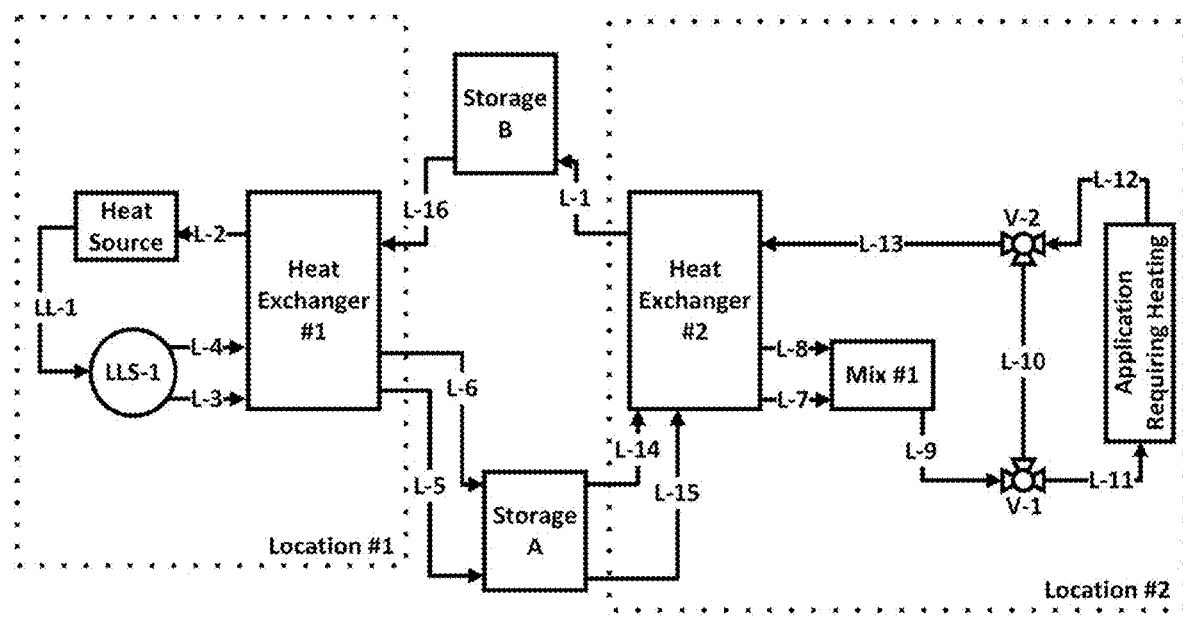
FIG. 38B: A thermal storage process employing a liquid-liquid phase transition liquid heat transfer medium with thermal storage and/or heat transfer independent of distance and/or temperature of heat transfer medium during transfer. The figure shows the embodiment providing heat to an application requiring heating.
Figure 38C:
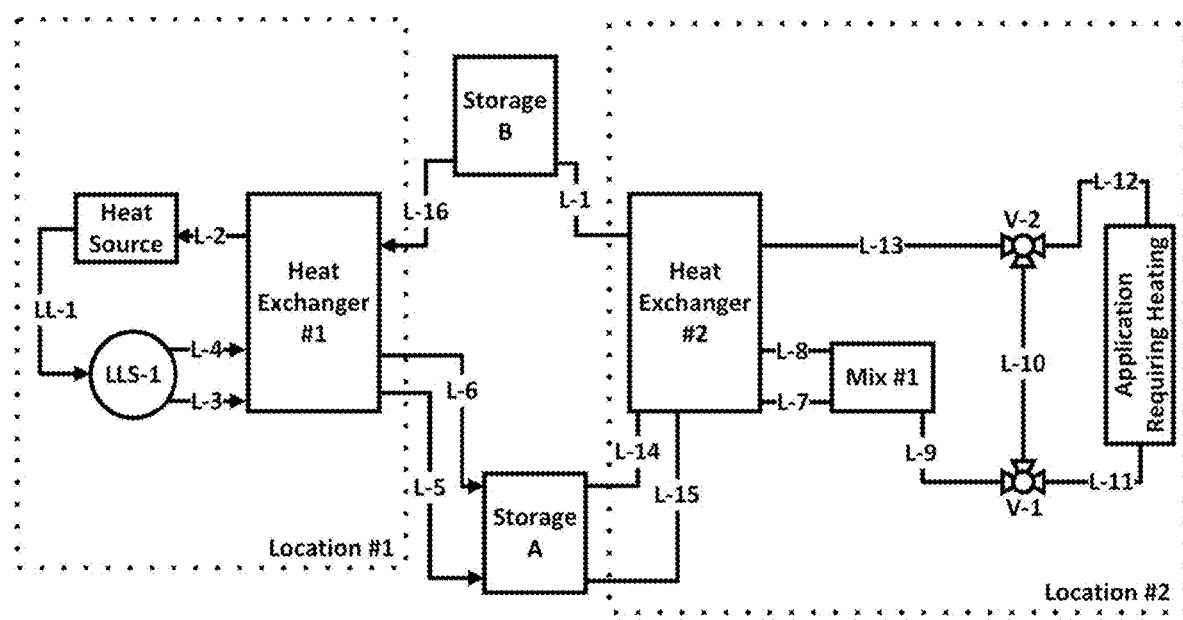
FIG. 38C: A thermal storage process employing a liquid-liquid phase transition liquid heat transfer medium with thermal storage and/or heat transfer independent of distance and/or temperature of heat transfer medium during transfer. The figure shows the embodiment with thermal storage charging, storing heat.
Figure 38D:
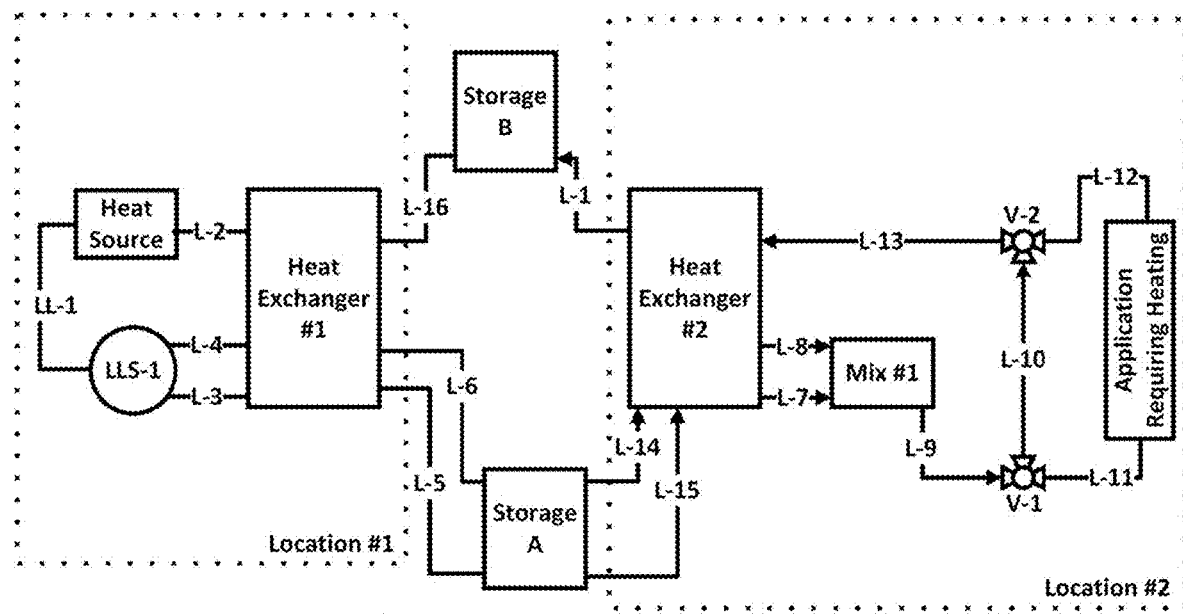
FIG. 38D: A thermal storage process employing a liquid-liquid phase transition liquid heat transfer medium with thermal storage and/or heat transfer independent of distance and/or temperature of heat transfer medium during transfer. The figure shows the embodiment with thermal storage discharging and Location #2 undergoing adiabatic heating.
Figure 38E:
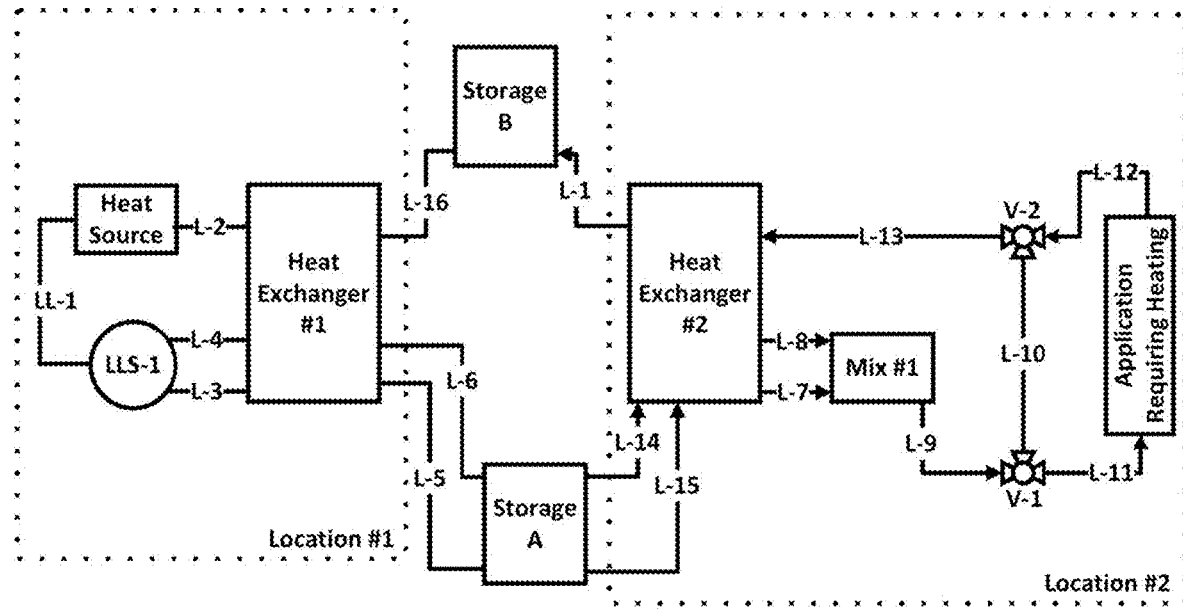
FIG. 38E: A thermal storage process employing a liquid-liquid phase transition liquid heat transfer medium with thermal storage and/or heat transfer independent of distance and/or temperature of heat transfer medium during transfer. The figure shows the embodiment with thermal storage discharging and providing heat to an application requiring heating.

In an example embodiment of FIG. 38A, for purposes of example, example temperatures may be the following:

L-1: 20° C.
Storage B: 20° C.
L-16: 20° C.
L-2: 116° C.
LL-1: 125° C.
L-3: 125° C.
L-4: 125° C.
L-5: 22° C.
L-6: 22° C.
Storage A: 22° C.
L-14: 22° C.
L-15:22° C.
L-7: 50° C.
L-8: 50° C.
L-9: 60° C.
L-10: 60° C.
L-11:
L-12:
L-13:
  For example:
    60° C. in portion of pipe or other transfer closest to V-1 or the portion of L-13 matching the temperature of L-10 and/or L-9
    52° C. in Heat Exchanger #2, resulting in the temperatures of L-7 and L-8
    Note: If Location #2 or the heat transfer process is undergoing adiabatic heating at a temperature below a liquid-liquid phase transition enthalpy of liquid-liquid phase transition temperature range, the temperature will likely increase such that, at any given point, the temperature of L-9 may be greater than the temperature of L-10 and the temperature of L-10 may be greater than L-13.
  Or for example, one or more or a combination of the following:
    If the process is undergoing adiabatic heating, L-13 may possess a different temperature depending on where a given portion of L-13 is in the transit between V-2 and Heat Exchanger #2
    If the process is undergoing adiabatic cooling, L-13 may possess a different temperature depending on where a given portion of L-13 is in the transit between V-2 and Heat Exchanger #2
    If the rate of heat removal or heat addition changes, L-13 may possess a different temperature depending on where a given portion of L-13 is in the transit between V-2 and Heat Exchanger #2
    At least a portion of L-13 may be at the same temperature as L-10, or L-12, or a solution of L-10 mixed with L-12, or a combination thereof
    If the heat removed from the heat transfer medium before L-13 is equal to the enthalpy of liquid-liquid phase transition minus heat equivalent to the delta-T of Heat Exchanger #2, then the temperature of at least a portion of L-13 may be equal to the temperature of L-7 and/or L-8
    If no heat is removed or the process is undergoing adiabatic heating, the temperature of L-13 may be equal to the temperature of the molecules of L-13 when said molecules comprised L-7 or L-8 or both plus the adiabatic temperature change of the enthalpy of liquid-liquid phase transition In an example embodiment of FIG. 38B, for purposes of example, example temperatures may be the following:

L-1:20° C.
Storage B: 20° C.
L-16: 20° C.
L-2: 116° C.
LL-1: 125° C.
L-3: 125° C.
L-4: 125° C.
L-5: 22° C.
L-6: 22° C.
Storage A: 22° C.
L-14: 22° C.
L-15:22° C.
L-7: 111° C.
L-8: 111° C.
L-9: 115° C. (may comprise a multi-liquid phase mixture with latent exothermic enthalpy of liquid-liquid phase transition)
L-10:
L-11: 115° C. (may comprise a multi-liquid phase mixture with latent exothermic enthalpy of liquid-liquid phase transition)
L-12: 113° C.
L-13:
  For example: 113° C.
  Or for example, one or more or a combination of the following:
    If the process is undergoing adiabatic heating, L-13 may possess a different temperature depending on where a given portion of L-13 is in the transit between V-2 and Heat Exchanger #2
    If the process is undergoing adiabatic cooling, L-13 may possess a different temperature depending on where a given portion of L-13 is in the transit between V-2 and Heat Exchanger #2
    If the rate of heat removal or heat addition changes, L-13 may possess a different temperature depending on where a given portion of L-13 is in the transit between V-2 and Heat Exchanger #2
    At least a portion of L-13 may be at the same temperature as L-10, or L-12, or a solution of L-10 mixed with L-12, or a combination thereof
    If the heat removed from the heat transfer medium before L-13 is equal to the enthalpy of liquid-liquid phase transition minus heat equivalent to the delta-T of Heat Exchanger #2, then the temperature of at least a portion of L-13 may be equal to the temperature of L-7 and/or L-8
    If no heat is removed or the process is undergoing adiabatic heating, the temperature of L-13 may be equal to the temperature of the molecules of L-13 when said molecules comprised L-7 or L-8 or both plus the adiabatic temperature change of the enthalpy of liquid-liquid phase transition

| FIGS. 39A-E | |
|---|---|
| ID | Description |
| L-1 | L-1 may comprise a liquid-liquid phase transition liquid comprising at least a portion a single liquid phase combined solution. L-1 may be at a temperature above a liquid-liquid phase transition temperature range. L-1 may comprise a liquid-liquid phase transition liquid with at least a partially expended endothermic enthalpy of liquid-liquid phase transition. L-1 may be at a warmer temperature than one or more liquids in Location #1 and/or Location #2. L-1 may be transferred between Location #2 and Storage B. L-1 may comprise L-13 after counter current heat exchanger with L-14 and L-15. |
| Storage B | Storage B may comprise one or more tanks or a storage reservoir to store and/or provide L-1. |
| L-16 | L-16 may comprise liquid transferred from Storage B to Heat Exchanger #1. |
| Heat Exchanger #1 | Heat Exchanger #1 may comprise a countercurrent heat exchanger which may heat exchange a 'warm' single steam liquid with 'cold' countercurrent streams comprising two or more non-contiguously separate liquid streams. Heat Exchanger #1 may recover at least a portion of the specific heat or heat capacity or non-latent heat of the liquid-liquid phase transition liquid to, for example, minimize net energy consumption related to cooling down or heating up a liquid-liquid phase transition liquid and maximize the proportion of 'cooling' stored in the latent heat of an enthalpy of liquid-liquid phase transition. |
| L-2 | L-2 may comprise a liquid-liquid phase transition liquid comprising at least a portion a single liquid phase combined solution. L-2 may comprise a pre-cooled liquid-liquid phase transition liquid. In some embodiments, L-2 may be at a temperature adjacent to or overlapping with an enthalpy of liquid-liquid phase transition temperature range. L-2 may comprise a multi-liquid phase mixture which may have underwent at least a portion of an exothermic liquid-liquid phase transition during a heat exchange with L-3 and L-4. L-2 may comprise a multi-liquid phase mixture which may have underwent at least a portion of an exothermic liquid-liquid phase transition, although L-2 may possess additional latent exothermic liquid-liquid phase transition or may be at a temperature within a liquid-liquid phase transition temperature range, although may not be at or below the lower end limit of a liquid-liquid phase transition temperature range, or a combination thereof. |
| Cooling Source | Cooling source may comprise a cooling source or application requiring heat or both. May comprise a process removing heat from a liquid-liquid phase transition liquid. May comprise a process to cool a liquid-liquid phase transition liquid to a temperature within or below a liquid-liquid phase transition temperature range to enable or facilitate an exothermic liquid-liquid phase transition. May comprise a process to remove heat or provide energy or both to facilitate the formation of an exothermic liquid-liquid phase transition in a liquid-liquid phase transition liquid. |
| LL-1 | LL-1 may comprise a liquid-liquid phase transition liquid comprising a multi-liquid phase mixture which may comprise two or more liquid phases. LL-1 may comprise a liquid-liquid phase transition liquid below at least a portion of a liquid-liquid phase transition temperature range. LL-1 may comprise a liquid-liquid phase transition liquid below at least a portion of a UCST liquid-liquid phase transition temperature range. |
| LLS-1 | LLS-1 may comprise a process for separating two or more liquid phases or a liquid-liquid separation device. LLS-1 may comprise a centrifuge, or a decanter, or a coalescer, or a separation process described herein, or liquid-liquid separation processes known in the art, or a combination thereof. |
| L-3 | L-3 may comprise a liquid phase or reagents or a combination thereof of a liquid-liquid phase transition liquid. L-3 may comprise a liquid phase separated from a liquid-liquid phase transition liquid. L-3 may comprise a liquid phase of a liquid-liquid phase transition liquid, which may have been separated from said liquid-liquid phase transition liquid at a temperature below at least a portion of a liquid-liquid phase transition temperature range. The liquid-liquid phase transition liquid from which L-3 may have been separated may comprise two or more liquid phases and/or may comprise two or more liquid phases when at a temperature below at least a portion of a liquid-liquid phase transition temperature range. In some embodiments, at least a portion of L-3 may be non-contiguously separate from L-4. |
| L-4 | L-4 may comprise a liquid phase or reagents or a combination thereof of a liquid-liquid phase transition liquid. L-4 may comprise a liquid phase separated from a liquid-liquid phase transition liquid. L-4 may comprise a liquid phase of a liquid-liquid phase transition liquid, which may have been separated from said liquid-liquid phase transition liquid at a temperature below at least a portion of a liquid-liquid phase transition temperature range. The liquid-liquid phase transition liquid from which L-4 may have been separated may comprise two or more liquid phases and/or may comprise two or more liquid phases when at a temperature below at least a portion of a liquid-liquid phase transition temperature range. In some embodiments, at least a portion of L-4 may be non-contiguously separate from L-3. |
| L-5 | L-5 may comprise L-3 after a counter current heat exchanger with L-16. L-5 may comprise a liquid phase or reagents or a combination thereof of a liquid-liquid phase transition liquid. L-5 may be at a warmer temperature than one or more liquids in Location #1 and/or Location #2. L-5 may be transferred between Location #1 and Storage A. |

-continued

FIGS. 39A-E

| ID | Description |
|---|---|
| L-6 | L-6 may comprise L-4 after a counter current heat exchanger with L-16. L-6 may comprise a liquid phase or reagents or a combination thereof of a liquid-liquid phase transition liquid. L-6 may be at a warmer temperature than one or more liquids in Location #1 and/or Location #2. L-6 may be transferred between Location #1 and Storage A. |
| Storage A | Storage A may comprise one or more storage tanks or a storage reservoir to store and/or provide L-5 and L-6. Storage A may store L-5 and L-6 as non-contiguously separate liquid phases. Storage A may store L-5 and L-6 as non-contiguously separate liquid phases with a floating barrier between L-5 and L-6. Storage A may store L-5 and L-6 as non-contiguously separate liquid phases in two separate tanks. In some embodiments, Storage A may store L-5 and L-6 at about the same temperature. |
| L-14 | L-14 may comprise liquid transferred from Storage A to Heat Exchanger #2. L-14 may be the same composition as L-6. |
| L-15 | L-15 may comprise liquid transferred from Storage A to Heat Exchanger #2. L-15 may be the same composition as L-5. |
| Heat Exchanger #2 | Heat Exchanger #2 may comprise a countercurrent heat exchanger which may heat exchange a 'cold' single steam liquid with 'warm' countercurrent streams comprising two or more non-contiguously separate liquid streams. Heat Exchanger #2 may recover at least a portion of the specific heat or heat capacity or non-latent heat of the liquid-liquid phase transition liquid to, for example, minimize net energy consumption related to cooling down or heating up a liquid-liquid phase transition liquid, or maximize the proportion of 'cold' stored in the latent heat of an enthalpy of liquid-liquid phase transition provided to an application requiring cooling, or enable the liquid-liquid phase transition liquid to decrease to or operate at a temperature desired for an application requiring cooling, or enable the liquid-liquid phase transition liquid to decrease to or operate at a temperature near or adjacent to at least a portion of the limits of an enthalpy of liquid-liquid phase transition temperature range. |
| L-7 | L-7 may comprise L-15 after a countercurrent heat exchange with L-13. L-7 may comprise a liquid phase or reagents or a combination thereof of a liquid-liquid phase transition liquid. In some embodiments, L-7 may be at a temperature adjacent to or overlapping with an enthalpy of liquid-liquid phase transition temperature range of the liquid-liquid phase transition liquid which may form if L-7 and L-8 are mixed. |
| L-8 | L-8 may comprise L-14 after a countercurrent heat exchange with L-13. L-8 may comprise a liquid phase or reagents or a combination thereof of a liquid-liquid phase transition liquid. In some embodiments, L-8 may be at a temperature adjacent to or overlapping with an enthalpy of liquid-liquid phase transition temperature range of the liquid-liquid phase transition liquid which may form if L-7 and L-8 are mixed. |
| Mix #1 | Mix #1 may comprise a process for combining L-7 and L-8. L-7 and L-8 may combine in Mix #1 to form an endothermic liquid-liquid phase transition and/or at least a portion of a single liquid phase combined solution, such as L-9. Mix #1 may be at least partially insulated to enable said endothermic liquid-liquid phase transition to be conducted as an adiabatic process. The temperature of L-9 may be less than the temperature of L-7 and L-8 due to, for example, adiabatic temperature change. Mix #1 may comprise one or more or a combination of active and/or passive mixing processes described herein or known in the art. In some embodiments, Mix #1 may mix L-7 and L-8 to form a multi-liquid phase solution at or below a portion of a liquid-liquid phase transition temperature range. |
| L-9 | L-9 may comprise at least a portion a single liquid phase combined solution. In some embodiments, L-9 may be at a temperature equal to about the adiabatic temperature change minus the mean temperature of L-7 and L-8. L-9 may be transferred from Mix #1 to V-1. In some embodiments, L-9 may comprise a multi-liquid phase mixture which may later undergo, for example, at least a portion of endothermic liquid-liquid phase transition in a heat exchange with an application requiring cooling. In some embodiments, L-9 may comprise a multi-liquid phase mixture with latent endothermic enthalpy of liquid-liquid phase transition. |
| V-1 | V-1 may comprise a process for flow control, or flow directing, or a combination thereof. If, for example, L-9 is at or below a desired temperature for cooling an application requiring cooling and an application requiring cooling currently requires cooling, V-1 may transfer L-9 (which may comprise L-11 upon transfer) to said application requiring cooling. If, for example, L-9 is at or below a desired temperature for cooling an application requiring cooling and an application requiring cooling currently does not require cooling, V-1 may transfer L-9 (which may comprise L-11 upon transfer) to said application requiring cooling or V-1 may transfer L-9 (which may comprise L-10 upon transfer) to V-2 to bypass an application requiring cooling, or a combination thereof. If, for example, L-9 is above a desired temperature for cooling an application requiring cooling, V-1 may transfer L-9 (which may comprise L-10 upon transfer) to V-2 to bypass an application requiring cooling and/or enable adiabatic cooling. |

FIGS. 39A-E

| ID | Description |
|---|---|
| L-10 | L-10 may comprise L-9 bypassing an application requiring cooling. L-10 may be transferred between V-1 and V-2. Bypassing, as represented by L-10, may enable adiabatic cooling by preventing or minimizing the removal of heat from a liquid-liquid phase transition liquid, which may enable the liquid-liquid phase transition liquid to decrease in temperature due to, for example, at least a portion of adiabatic cooling and/or a decrease in temperature to reach a desired temperature for an application requiring cooling. |
| L-11 | L-11 may comprise L-9 being transferred to an application requiring cooling. In some embodiments, L-12 may be at a higher temperature than L-11 due to the heat added by an application requiring cooling. In some embodiments, L-12 may be at a higher temperature than L-11 due to the heat added by an application requiring cooling. In some embodiments, L-11 may comprise a multi-liquid phase mixture which may undergo, for example, at least a portion of endothermic liquid-liquid phase transition in heat exchange with an application requiring cooling. L-11 may be transferred between V-1 and an application requiring cooling. |
| Application Requiring Cooling | An application requiring cooling may comprise an application requiring cooling, or a heat source, or a combination thereof. An application requiring cooling may add heat to a liquid. An application requiring cooling may have control over when, or if, or how much heat may be added to a liquid. An application requiring cooling may have control over the temperature which heat is removed from said application requiring cooling. |
| L-12 | L-12 may comprise L-11 after heat exchange with an application requiring cooling. In some embodiments, L-12 may be at a higher temperature than L-11 due to the heat added by an application requiring cooling. In some embodiments, L-12 may be at a higher temperature than L-11 due to the heat added by an application requiring cooling. L-12 may be transferred between an application requiring cooling and V-2. |
| V-2 | V-2 may comprise a process for flow control, or flow directing, or a combination thereof. V-2 may direct and/or merge L-10 and/or L-12 to form L-13, or recirculate, or a combination thereof. |
| L-13 | L-13 may comprise L-10, or L-12, or a combination thereof. L-13 may comprise a liquid-liquid phase transition liquid comprising at least a portion a single liquid phase combined solution. L-13 may comprise a liquid-liquid phase transition liquid with at least a partially expended exothermic enthalpy of liquid-liquid phase transition. L-13 may be transferred between V-2 and Heat Exchanger #2. |
| Location #1 | Location #1 may comprise a 'regeneration portion' of the process, wherein, for example, 'cooling' is stored in the enthalpy of liquid-liquid phase transition of a liquid-liquid phase transition liquid. |
| Location #2 | Location #2 may comprise a 'cooling portion' of the process, wherein, for example, the latent enthalpy of liquid-liquid phase transition of a liquid-liquid phase transition liquid is converted to absorb heat to enable, for example, adiabatic cooling and/or to remove heat from an application requiring cooling. |

Figure 39A:
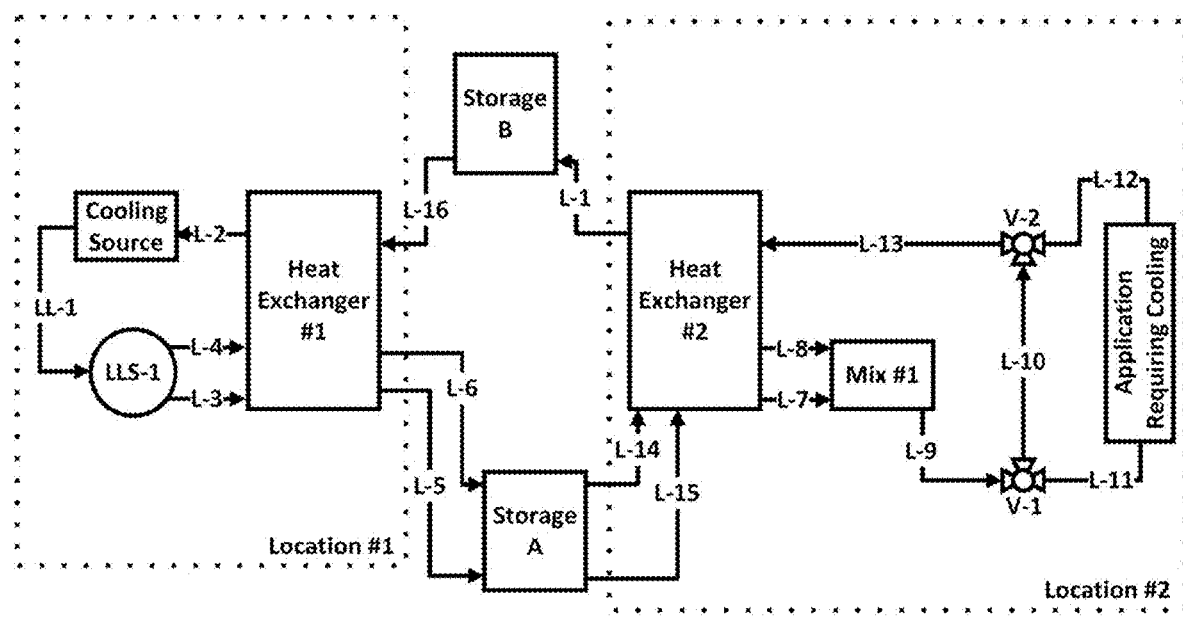
FIG. 39A: A thermal storage process employing a liquid-liquid phase transition liquid heat transfer medium with thermal storage and/or heat transfer independent of distance and/or temperature of heat transfer medium during transfer. The figure shows the embodiment undergoing adiabatic cooling.

In an example embodiment of FIG. 39A, for purposes of example, example temperatures may be the following:
L-1: 40° C.
L-16: 40° C.
Storage B: 40° C.
L-2: 9° C.
LL-1: 1° C.
L-3: 1° C.
L-4: 1° C.
L-5: 38° C.
L-6: 38° C.
Storage A: 38° C.
L-14: 38° C.
L-15: 38° C.
L-7: 23° C.
L-8: 23° C.
L-9: 13° C.
L-10: 13° C.
L-11:
L-12:
L-13:
For example:
13° C. in portion of pipe or other transfer closest to V-1 or the portion of L-13 matching the temperature of L-10 and/or L-9

21° C. in Heat Exchanger #2, resulting in the temperatures of L-7 and L-8

Note: If Location #2 or the heat transfer process is undergoing adiabatic cooling at a temperature above a liquid-liquid phase transition enthalpy of liquid-liquid phase transition temperature range, the temperature will likely increase such that, at any given point, the temperature of L-9 may be less than the temperature of L-10 and the temperature of L-10 may be less than L-13.

Or for example, one or more or a combination of the following:
- If the process is undergoing adiabatic cooling, L-13 may possess a different temperature depending on where a given portion of L-13 is in the transit between V-2 and Heat Exchanger #2
- If the process is undergoing adiabatic heating, L-13 may possess a different temperature depending on where a given portion of L-13 is in the transit between V-2 and Heat Exchanger #2
- If the rate of heat removal or heat addition changes, L-13 may possess a different temperature depending on where a given portion of L-13 is in the transit between V-2 and Heat Exchanger #2

At least a portion of L-13 may be at the same temperature as L-10, or L-12, or a solution of L-10 mixed with L-12, or a combination thereof If the heat added to the heat transfer medium before L-13 is equal to the enthalpy of liquid-liquid phase transition plus heat equivalent to the delta-T of Heat Exchanger #2, then the temperature of at least a portion of L-13 may be equal to the temperature of L-7 and/or L-8

Figure 39B:
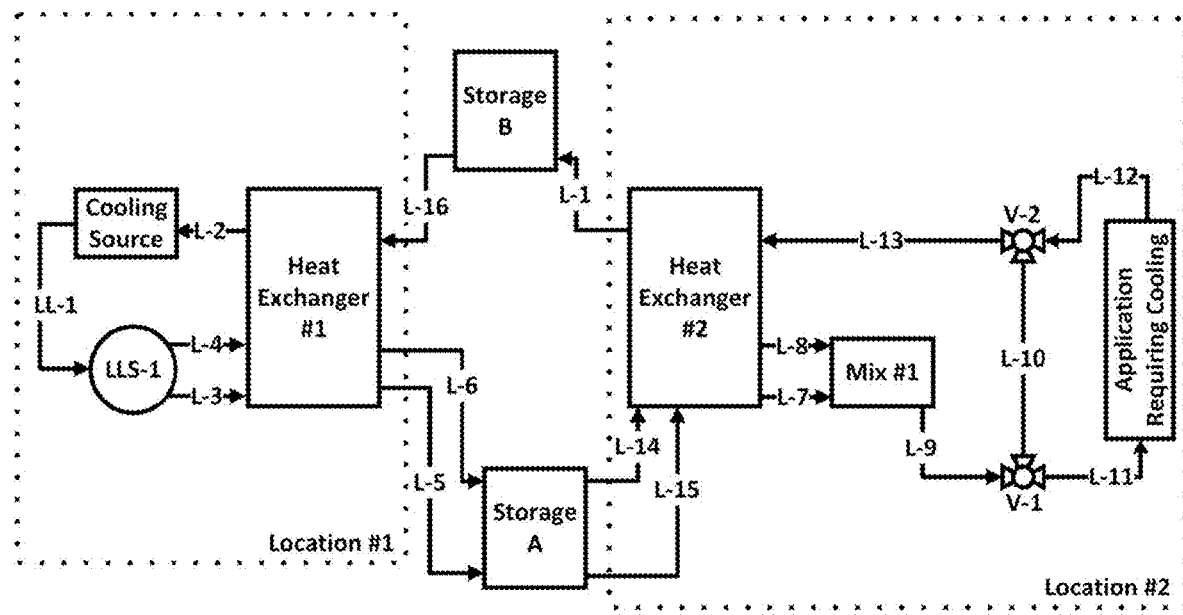
FIG. 39B: A thermal storage process employing a liquid-liquid phase transition liquid heat transfer medium with thermal storage and/or heat transfer independent of distance and/or temperature of heat transfer medium during transfer. The figure shows the embodiment providing cooling to an application requiring cooling.
Figure 39C:
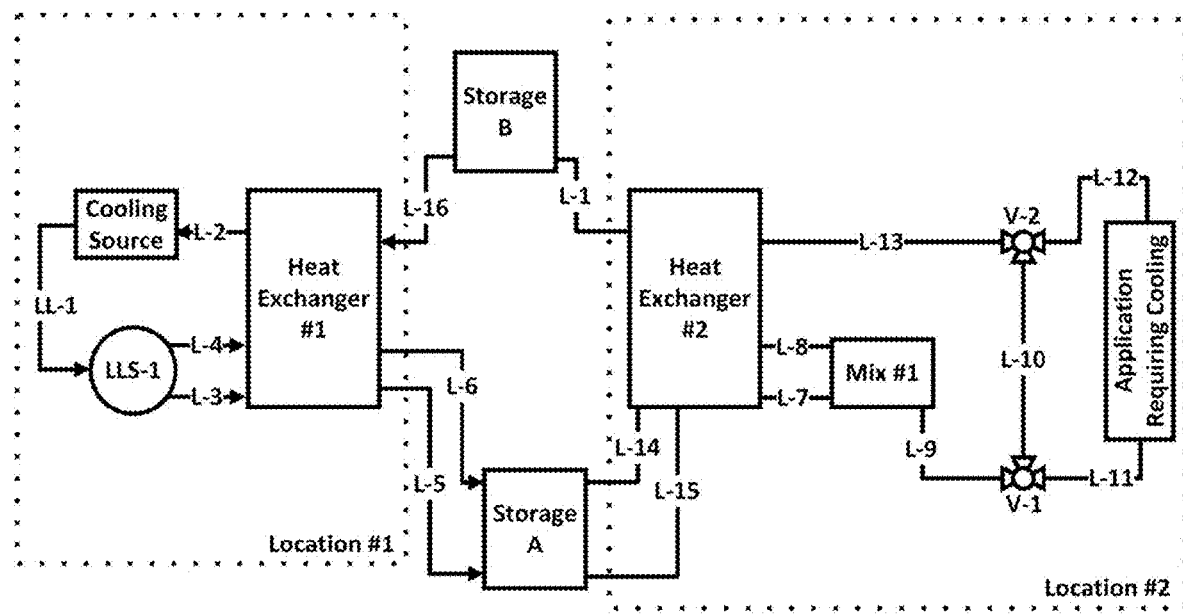
FIG. 39C: A thermal storage process employing a liquid-liquid phase transition liquid heat transfer medium with thermal storage and/or heat transfer independent of distance and/or temperature of heat transfer medium during transfer. The figure shows the embodiment with thermal storage charging, storing 'cold'.
Figure 39D:
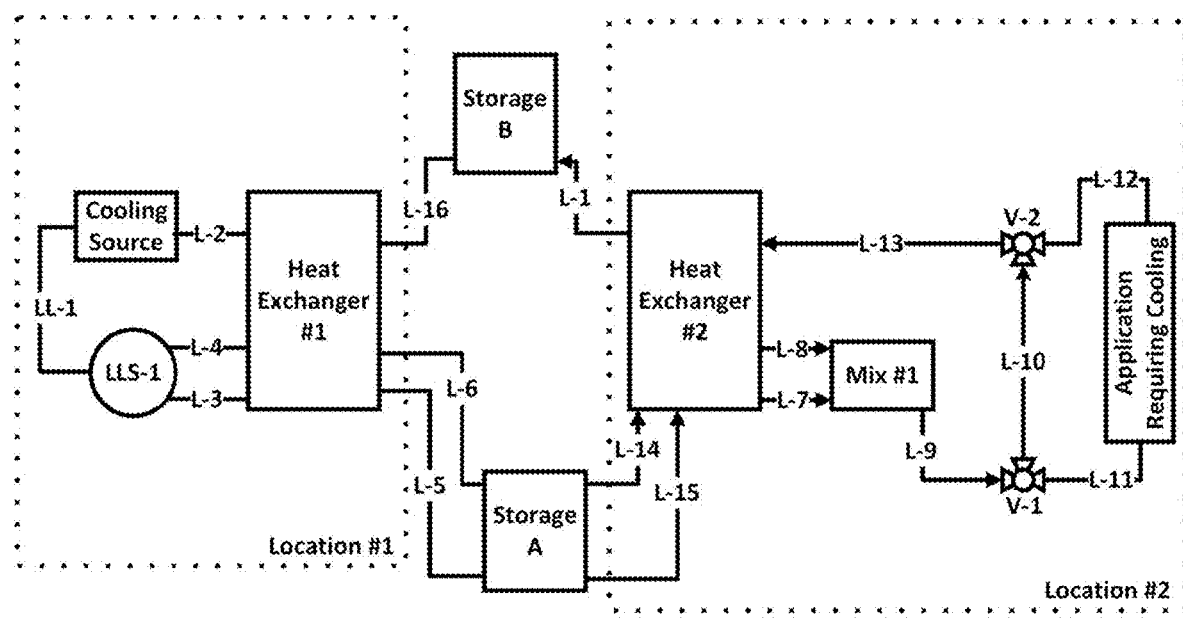
FIG. 39D: A thermal storage process employing a liquid-liquid phase transition liquid heat transfer medium with thermal storage and/or heat transfer independent of distance and/or temperature of heat transfer medium during transfer. The figure shows the embodiment with thermal storage discharging and Location #2 undergoing adiabatic cooling.
Figure 39E:
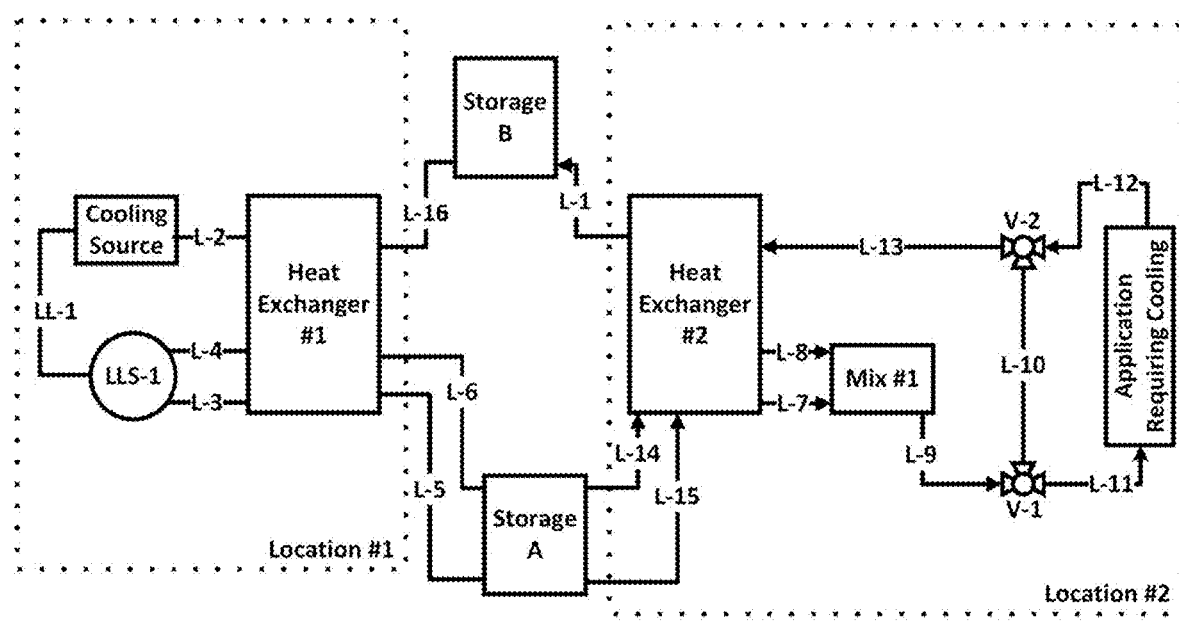
FIG. 39E: A thermal storage process employing a liquid-liquid phase transition liquid heat transfer medium with thermal storage and/or heat transfer independent of distance and/or temperature of heat transfer medium during transfer. The figure shows the embodiment with thermal storage discharging and providing cooling to an application requiring cooling.

If no heat is added or the process is undergoing adiabatic cooling, the temperature of L-13 may be equal to the temperature of the molecules of L-13 when said molecules comprised L-7 or L-8 or both minus the adiabatic temperature change of the enthalpy of liquid-liquid phase transition In an example embodiment of FIG. 39B, for purposes of example, example temperatures may be the following:

L-1: 40° C.
L-16: 40° C.
Storage B: 40° C.
L-2: 9° C.
LL-1: 1° C.
L-3: 1° C.
L-4: 1° C.
L-5: 38° C.
L-6: 38° C.
Storage A: 38° C.
L-14: 38° C.
L-15: 38° C.
L-7: 13° C.
L-8: 13° C.
L-9: 10° C. (may comprise a multi-liquid phase mixture with latent endothermic enthalpy of liquid-liquid phase transition)
L-10:
L-11: 10° C. (may comprise a multi-liquid phase mixture with latent endothermic enthalpy of liquid-liquid phase transition)
L-12: 11° C.
L-13:
  For example: 11° C.
  Or for example, one or more or a combination of the following:
    If the process is undergoing adiabatic cooling, L-13 may possess a different temperature depending on where a given portion of L-13 is in the transit between V-2 and Heat Exchanger #2
    If the process is undergoing adiabatic heating, L-13 may possess a different temperature depending on where a given portion of L-13 is in the transit between V-2 and Heat Exchanger #2
    If the rate of heat removal or heat addition changes, L-13 may possess a different temperature depending on where a given portion of L-13 is in the transit between V-2 and Heat Exchanger #2
    At least a portion of L-13 may be at the same temperature as L-10, or L-12, or a solution of L-10 mixed with L-12, or a combination thereof
    If the heat added to the heat transfer medium before L-13 is equal to the enthalpy of liquid-liquid phase transition plus heat equivalent to the delta-T of Heat Exchanger #2, then the temperature of at least a portion of L-13 may be equal to the temperature of L-7 and/or L-8
    If no heat is added or the process is undergoing adiabatic cooling, the temperature of L-13 may be equal to the temperature of the molecules of L-13 when said molecules comprised L-7 or L-8 or both minus the adiabatic temperature change of the enthalpy of liquid-liquid phase transition In some embodiments, Storage A and Storage B may comprise the same tank. For example, in some embodiments, Storage A and Storage B may comprise the same tank, wherein each liquid or liquid phase comprises a liquid layer within the tank. For example, in some embodiments, Storage A and Storage B may comprise the same tank, wherein each liquid or liquid phase comprises a liquid layer within the tank, wherein each liquid layer is separated by a floating barrier. Storage A and Storage B may comprise the same tank, wherein each liquid phase has a different density. For example, L-5 may possess a different density than L-6 and L-5 and L-6 both possess different densities than L-1. For example, in some embodiments, within a tank, L-1 may comprise a middle layer, L-5 may comprise a bottom layer, and L-6 may comprise a top layer.

In some embodiments, charging of a thermal storage tank may involve removing liquid from Storage B (L-16), regenerating said liquid's enthalpy of liquid-liquid phase transition in Location #1 to form L-5 and L-6, and storing L-5 and L-6 in Storage A. In some embodiments, discharging of a thermal storage tank may involve removing liquid phases from Storage A (L-14 and L-15), releasing or absorbing heat due to the releasing at least a portion of the enthalpy of liquid-liquid phase transition in Location #2 to form L-1, and storing L-1 in Storage B.

Example Step-by-Step Descriptions

Figure 16:
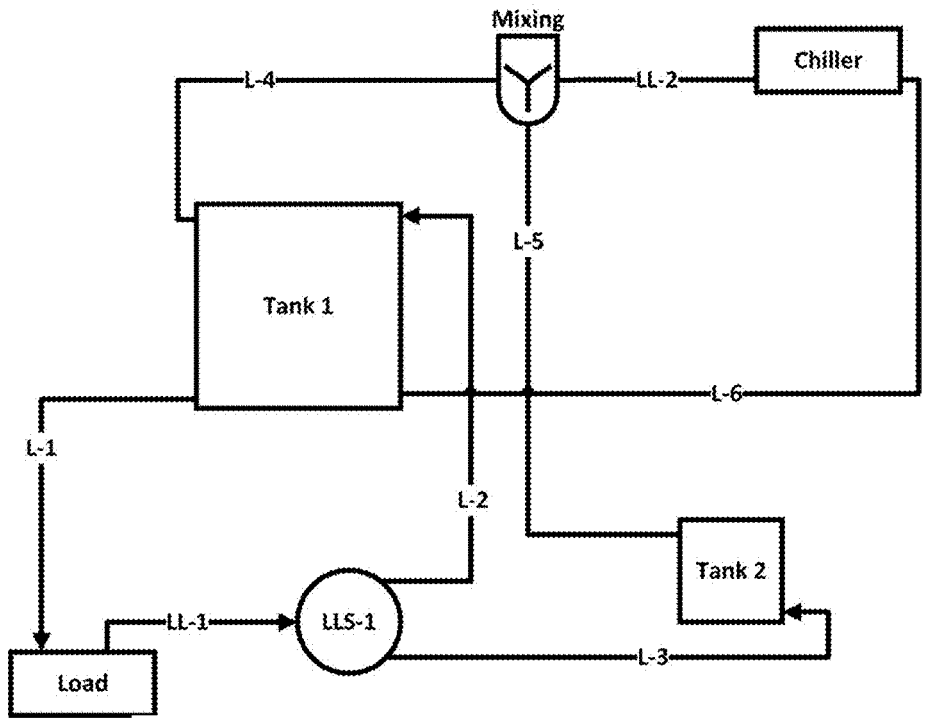
FIG. 16: A thermal storage process with two liquid phases stored in one tank and another liquid phase stored in a separate tank and a warm liquid as a top layer.
Figure 17:
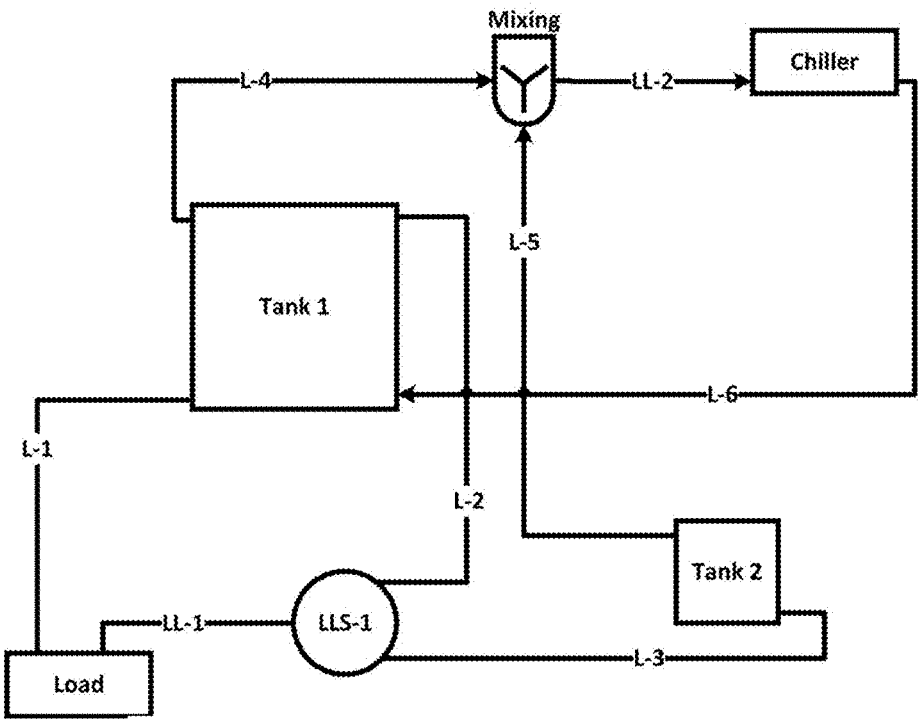
FIG. 17: A thermal storage process with two liquid phases stored in one tank and another liquid phase stored in a separate tank and a warm liquid as a top layer.
Figure 18:
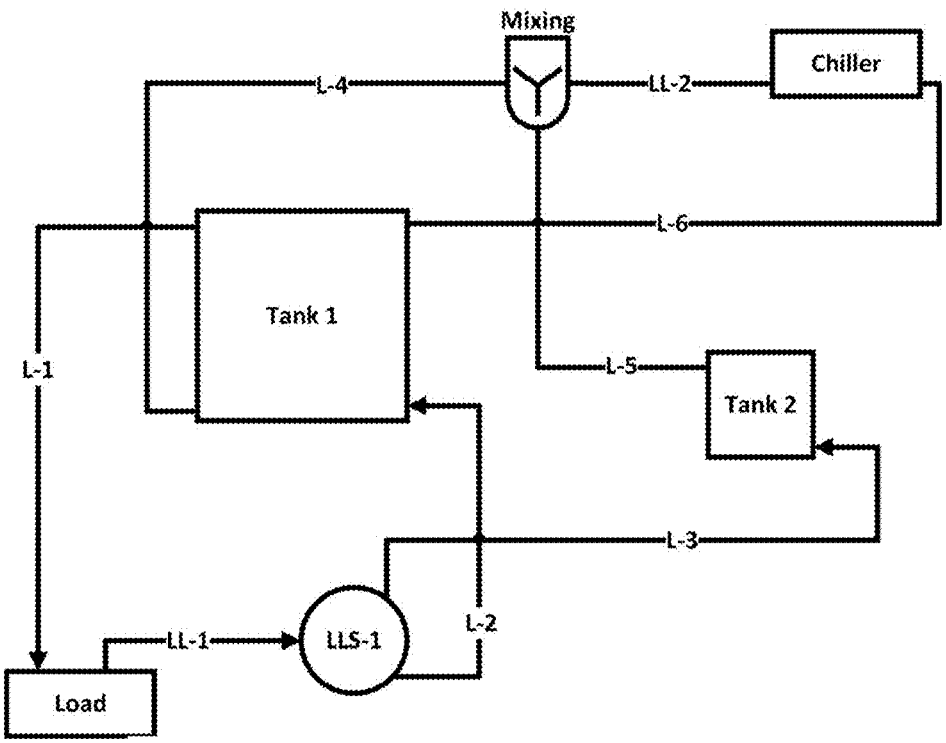
FIG. 18: A thermal storage process with two liquid phases stored in one tank and another liquid phase stored in a separate tank and a warm liquid as a bottom layer.
Figure 19:
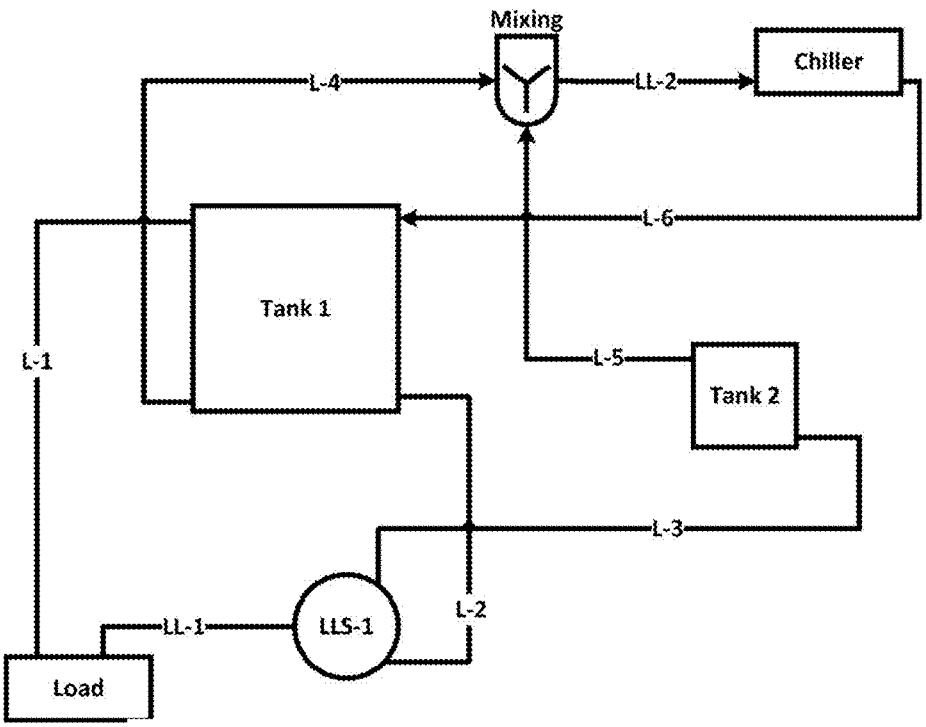
FIG. 19: A thermal storage process with two liquid phases stored in one tank and another liquid phase stored in a separate tank and a warm liquid as a bottom layer.

Example Step-by-Step Description FIG. 16 and FIG. 18, Discharging:

1) Absorbing Heat from Load: A 'supply' temperature or relatively cold combined liquid-liquid phase transition solution (L-1), which may be transferred from a thermal storage tank, may be transferred to and/or heat exchanged with a thermal load ('Load'), which may comprise an application requiring cooling or an application requiring heating. In an application requiring cooling, L-1 may absorb heat during heat exchange with said 'Load', which may result in L-1 undergoing an endothermic liquid-liquid phase transition into a multi-liquid phase mixture or multi-liquid phase mixture with different liquid phases or a combination thereof (LL-1). LL-1 may exit the heat exchange with said Load at a 'return' temperature or a relatively warm temperature. In FIG. 16 and FIG. 17, L-1 may be the liquid phase which comprises the bottom layer. In FIG. 18 and FIG. 19, L-1 may be the liquid phase which comprise the top layer.

2) Liquid-Liquid Separation: LL-1 may be separated using a liquid-liquid separation device (LLS-1), which may include, but is not limited to, a decanter, a coalescer, a centrifuge, a liquid-liquid separation device described herein, a liquid-liquid separation device known in the art, or a combination thereof. LL-1 may be separated into, at least in part, its constituent liquid phases. For example, LL-1 may be separated into two separate liquid streams (L-2 and L-3) which each may comprise mostly one of two or more constituent liquid phases. LLS-1 may be separated into contiguously separate or non-contiguously separate liquid streams. In FIGS. 16 and 18, the separated liquid phases may exit LLS-1 as non-contiguously separate liquid phases.

3) Storage of Constituent Liquid Phases in Tank 1 and Tank 2: L-2 may comprise one distinct liquid phase and L-3 may comprise another liquid phase distinct from L-2. For example, L-2 may comprise a mostly water liquid phase, which may be stored in a main thermal storage tank. L-3 may comprise a mostly non-water liquid phase, which may be stored in a separate thermal storage tank. In FIG. 16 and FIG. 17, L-2/L-4 may be the liquid phase which comprises the top layer. In FIG. 18 and FIG. 19, L-2/L-4 may be the liquid phase which comprise the bottom layer.

Example Step-by-Step Description FIG. 17 and FIG. 19, Charging:

1) Mixing: L-4, which may comprise mostly water liquid, may be transferred from Tank 1 to 'Mixing'. L-5, which may comprise mostly non-water liquid, may be transferred from Tank 2 to 'Mixing'. 'Mixing' may involve mixing L-4 and L-5 into a liquid-liquid mixture (LL-2). Mixing may comprise a liquid-liquid mixing device, which may include, but is not limited to, liquid-liquid mixing devices described herein, or liquid-liquid mixing devices known in the art, or a combination thereof. LL-2 be a liquid-liquid mixture or dispersed liquid-liquid mixture because it may exist at a temperature above a LCST or below a UCST or a combination thereof liquid-liquid phase transition. LL-2 may be transferred to 'Chiller'.
2) Supply Heat to Chiller/Chilling Liquid: LL-2, which may comprise a relatively warm or return temperature liquid-liquid mixture, may be heat exchanged with a cooling source or heat absorbing source or a chiller ('Chiller'). As LL-2 is cooled or heat is removed from LL-2, LL-2 may undergo an exothermic liquid-liquid phase transition into at a least a portion combined solution or a single liquid phase combined solution or a solution of different liquid phases, or a combination thereof (L-6). L-6 may exist at a relatively cold or 'supply' temperature.
3) Storage of Liquid in Tank 1: L-6 may be transferred to Tank 1. In FIG. 16 and FIG. 17, L-6 may be the liquid phase which comprises a bottom layer. In FIG. 18 and FIG. 19, L-6 may be the liquid phase which comprises a top layer.

Figure 20:
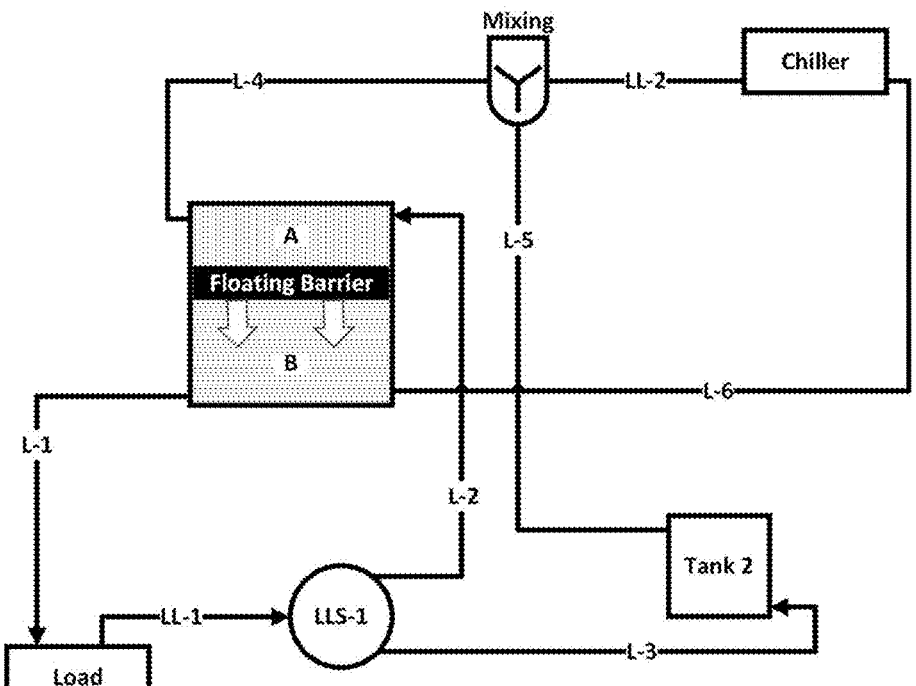
FIG. 20: A thermal storage process with two liquid phases stored in one tank and another liquid phase stored in a separate tank and a warm liquid as a top layer with a floating barrier between two liquid phases in one of the tanks.
Figure 21:
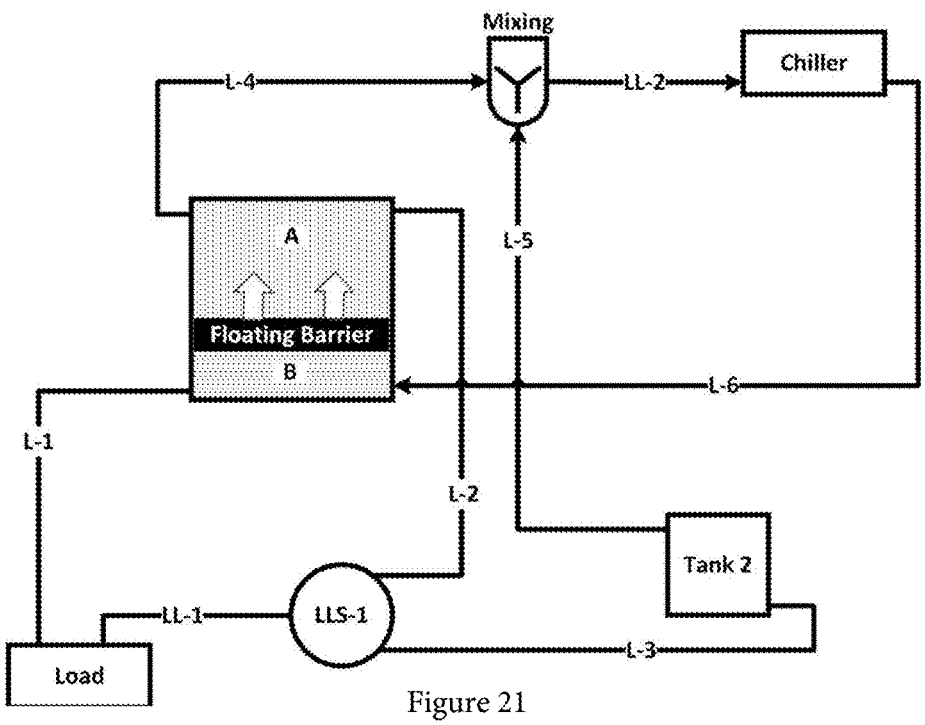
FIG. 21: A thermal storage process with two liquid phases stored in one tank and another liquid phase stored in a separate tank and a warm liquid as a top layer with a floating barrier between two liquid phases in one of the tanks.

Example Step-by-Step Description FIG. 20 and FIG. 22, Discharging:

1) Absorbing Heat from Load: A 'supply' temperature or relatively cold combined liquid-liquid phase transition solution (L-1), which may be transferred from a thermal storage tank, may be transferred to and heat exchanged with a thermal load ('Load'), which may comprise an application requiring cooling or an application requiring heating. In an application requiring cooling, L-1 may absorb heat during heat exchange with 'Load', which may result in L-1 undergoing an endothermic liquid-liquid phase transition into a multi-liquid phase mixture or multi-liquid phase mixture with different liquid phases or a combination thereof (LL-1). LL-1 may exit the heat exchange with said Load at a 'return' temperature or a relatively warm temperature. In FIG. 20 and FIG. 21, L-1 may be the liquid phase which comprises the bottom layer and may be separated from the top layer by a floating barrier or a liquid-liquid interface or a combination thereof. In FIG. 22 and FIG. 23, L-1 may be the liquid phase which comprises the top layer and may be separated from the bottom layer by a floating barrier or a liquid-liquid interface or a combination thereof.
2) Liquid-Liquid Separation: LL-1 may be separated using a liquid-liquid separation device (LLS-1), which may include, but is not limited to, a decanter, a coalescer, a centrifuge, a liquid-liquid separation device described herein, a liquid-liquid separation device known in the art, or a combination thereof. LL-1 may be separated into, at least in part, its constituent liquid phases. For example, LL-1 may be separated into two separate liquid streams (L-2 and L-3) which each may comprise mostly one of two or more constituent liquid phases. LLS-1 may be separated into contiguously separate or non-contiguously separate liquid streams. In FIGS. 20 and 21, the separated liquid phases may exit LLS-1 as non-contiguously separate liquid phases.
3) Storage of Constituent Liquid Phases in Tank 1 and Tank 2: L-2 may comprise one distinct liquid phase and L-3 may comprise another liquid phase distinct from L-2. For example, L-2 may comprise a mostly water liquid phase, which may be stored in a main thermal storage tank. L-3 may comprise a mostly non-water liquid phase, which may be stored in a separate thermal storage tank. In FIG. 20 and FIG. 21, L-2/L-4 may be a liquid phase which comprises the top layer. In FIG. 22 and FIG. 23, L-2/L-4 may be a liquid phase which comprises the bottom layer.

Example Step-by-Step Description FIG. 21 and FIG. 23, Charging:

1) Mixing: L-4, which may comprise mostly water liquid, may be transferred from Tank 1 to 'Mixing'. L-5, which may comprise mostly non-water liquid, may be transferred from Tank 2 to 'Mixing'. 'Mixing' may involve mixing L-4 and L-5 into a liquid-liquid mixture (LL-2). Mixing may comprise a liquid-liquid mixing device, which may include, but is not limited to, liquid-liquid mixing devices described herein, or liquid-liquid mixing devices known in the art, or a combination thereof. LL-2 be a liquid-liquid mixture or dispersed liquid-liquid mixture because it may exist at a temperature above a LCST or below a UCST or a combination thereof liquid-liquid phase transition. LL-2 may be transferred to 'Chiller'.
2) Supply Heat to Chiller/Chilling Liquid: LL-2, which may comprise a relatively warm or return temperature liquid-liquid mixture, may be heat exchanged with a cooling source or heat absorbing source or a chiller ('Chiller'). As LL-2 is cooled or heat is removed from LL-2, LL-2 may undergo an exothermic liquid-liquid phase transition into at a least a portion combined solution or a single liquid phase combined solution or a solution of different liquid phases, or a combination thereof (L-6). L-6 may exist at a relatively cold or 'supply' temperature.
3) Storage of Liquid in Tank 1: L-6 may be transferred to Tank 1. In FIG. 20 and FIG. 21, L-6 may be the liquid phase which comprises a bottom layer. In FIG. 22 and FIG. 23, L-6 may be the liquid phase which comprises a top layer.

Example Step-by-Step Description FIG. 24 and FIG. 26, Discharging:

1) Absorbing Heat from Load: A 'supply' temperature or relatively cold combined liquid-liquid phase transition solution (L-1), which may be transferred from a thermal storage tank, may be transferred to and heat exchanged with a thermal load ('Load'), which may comprise an application requiring cooling or an application requiring heating. In an application requiring cooling, L-1 may absorb heat during heat exchange with 'Load', which may result in L-1 undergoing an endothermic liquid-liquid phase transition into a multi-liquid phase mixture or multi-liquid phase mixture with different liquid phases or a combination thereof (LL-1). LL-1 may exit the heat exchange with said Load at a 'return' temperature or a relatively warm temperature. In FIGS. 24-27, L-1/L-6 comprises Liquid 'B', which may comprise a layer of middle density or a liquid layer which may be in the middle of the thermal storage unit.

2) Liquid-Liquid Separation: LL-1 may be separated using a liquid-liquid separation device (LLS-1), which may include, but is not limited to, a decanter, a coalescer, a centrifuge, a liquid-liquid separation device described herein, a liquid-liquid separation device known in the art, or a combination thereof. LL-1 may be separated into, at least in part, its constituent liquid phases. For example, LL-1 may be separated into two separate liquid streams (L-2 and L-3) which each may comprise mostly one of two or more constituent liquid phases. LLS-1 may be separated into contiguously separate or non-contiguously separate liquid streams. In FIGS. 24-27, the separated liquid phases may exit LLS-1 as non-contiguously separate liquid phases.

Figure 9A:
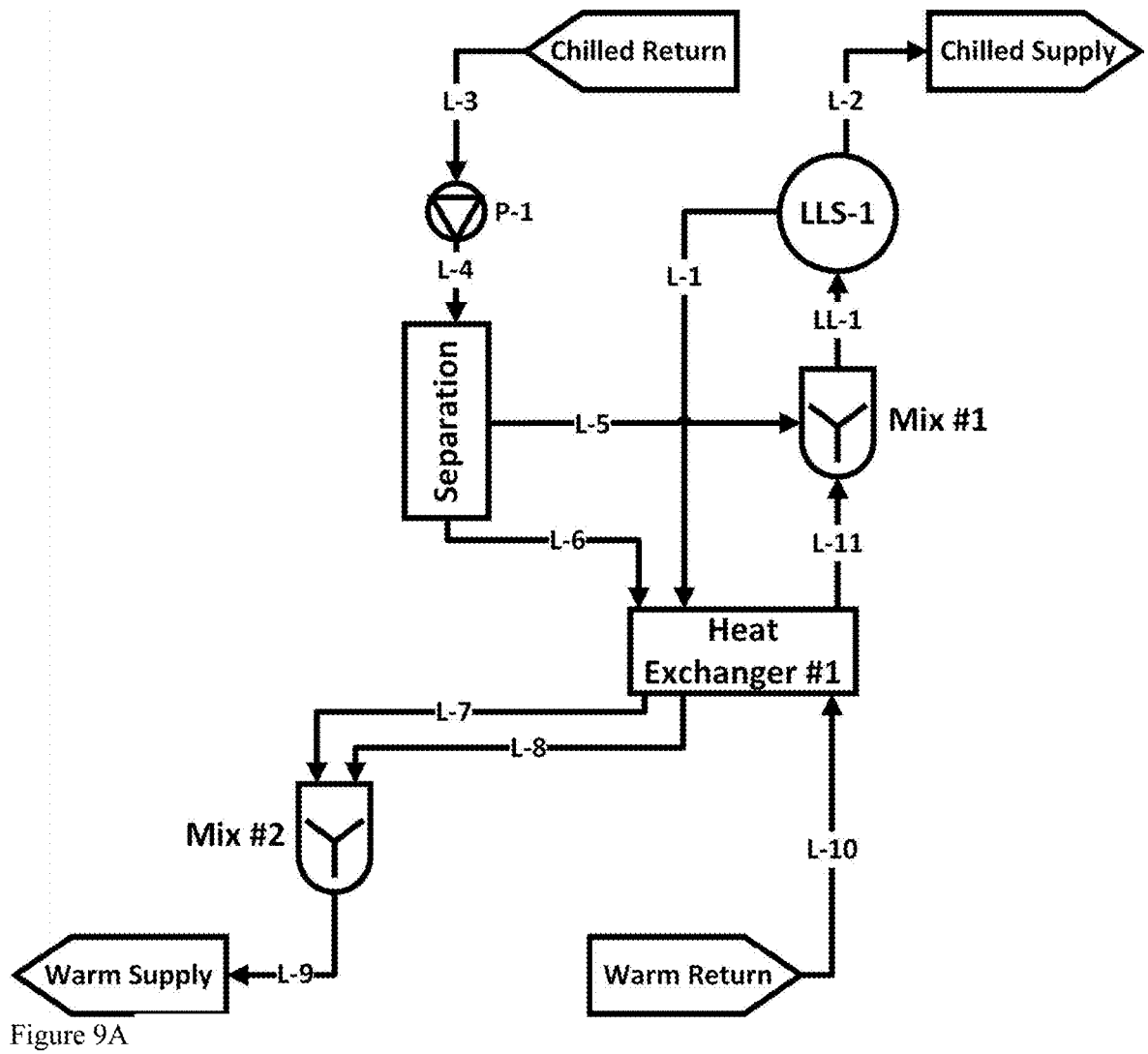
FIG. 9A: Liquid-Liquid Phase Transition Refrigeration Cycle with Liquid-Liquid Separation Before One Heat Exchange and One Liquid Phase Heat Exchanging in Chilling Application.
Figure 9B:
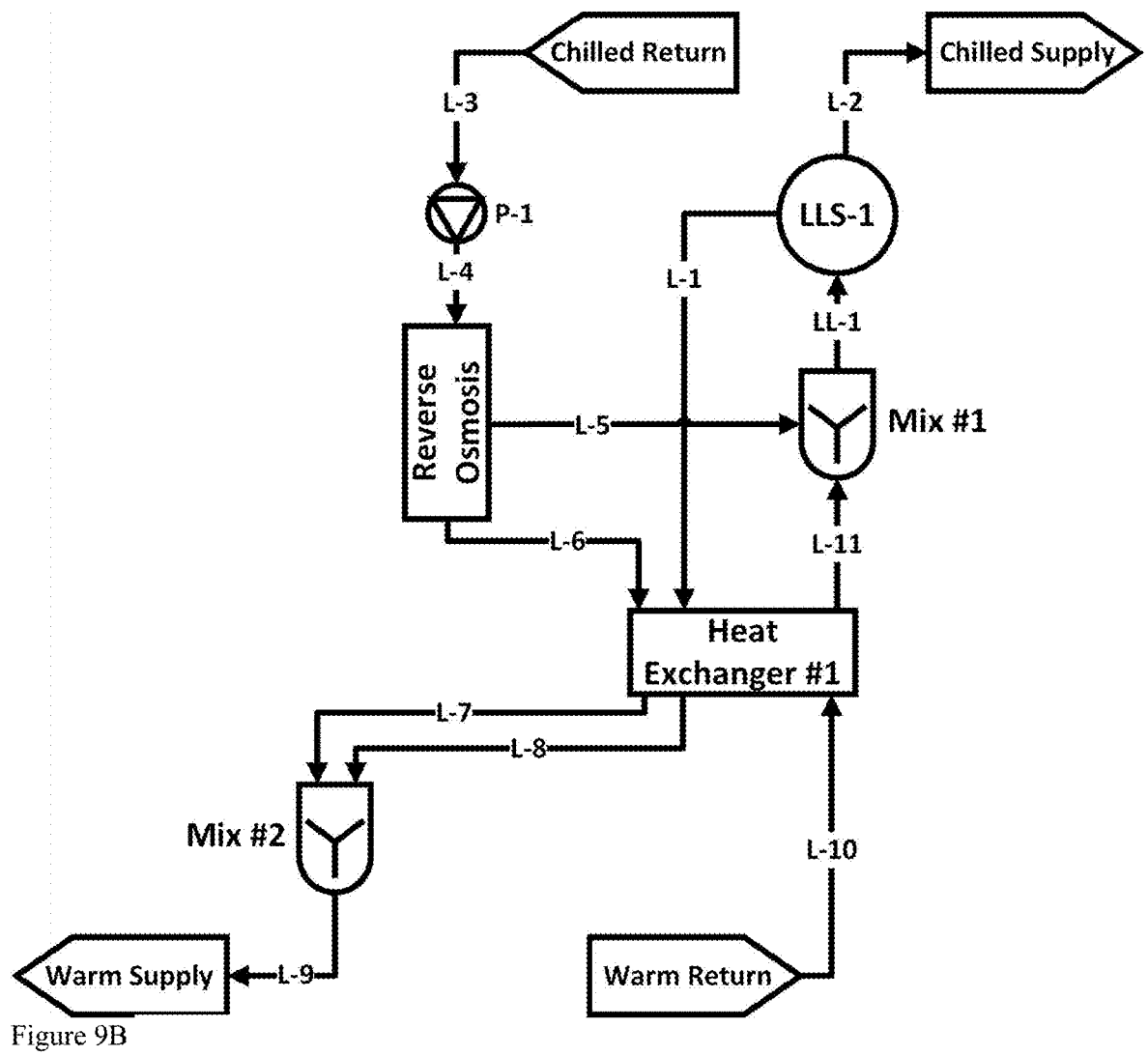
FIG. 9B: Liquid-Liquid Phase Transition Refrigeration Cycle with Liquid-Liquid Separation Before One Heat Exchange and One Liquid Phase Heat Transfer in Chilling Application
Figure 10A:
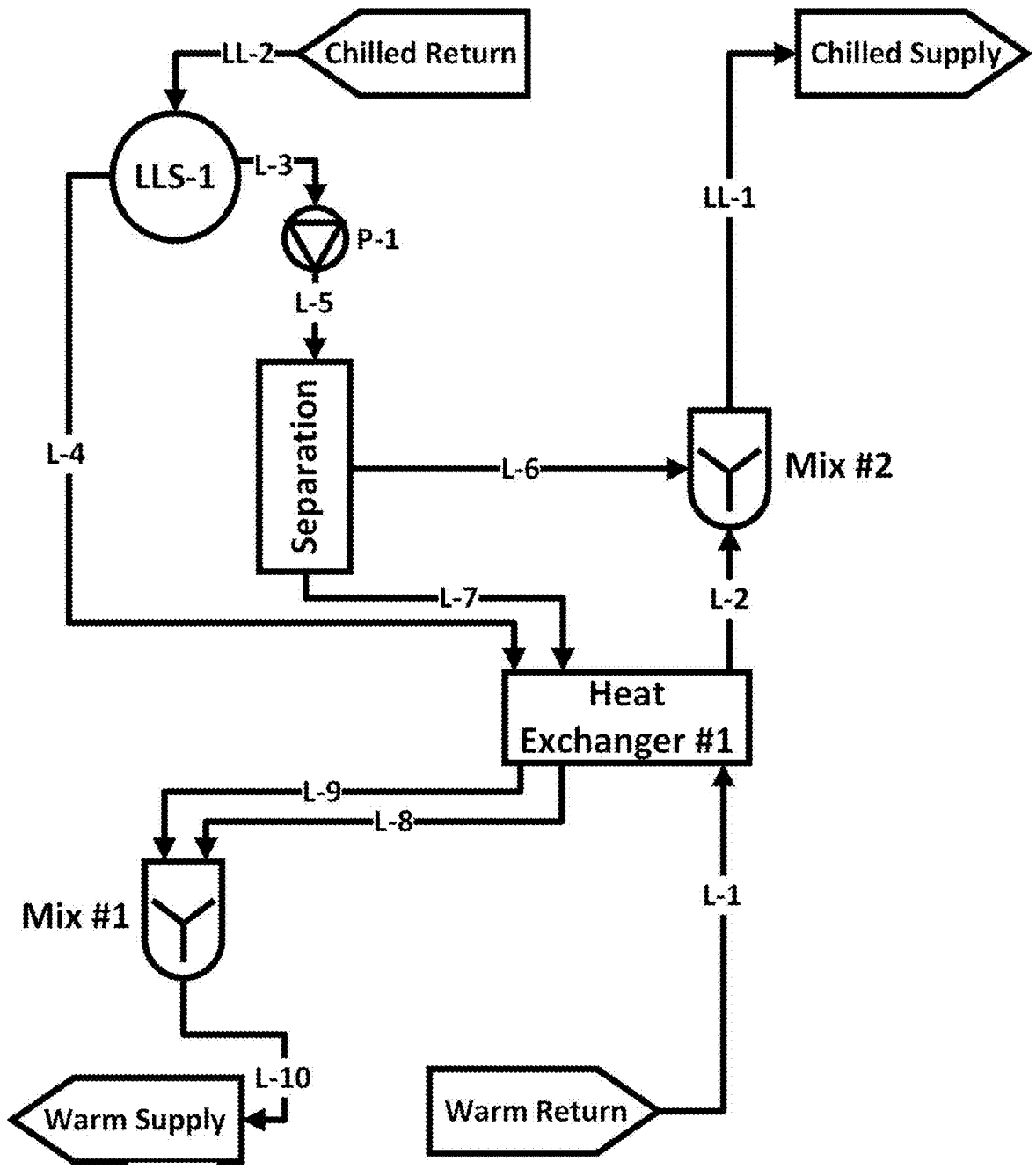
FIG. 10A: Liquid-Liquid Phase Transition Refrigeration Cycle with Heat Transfer Supply and Return.
Figure 10B:
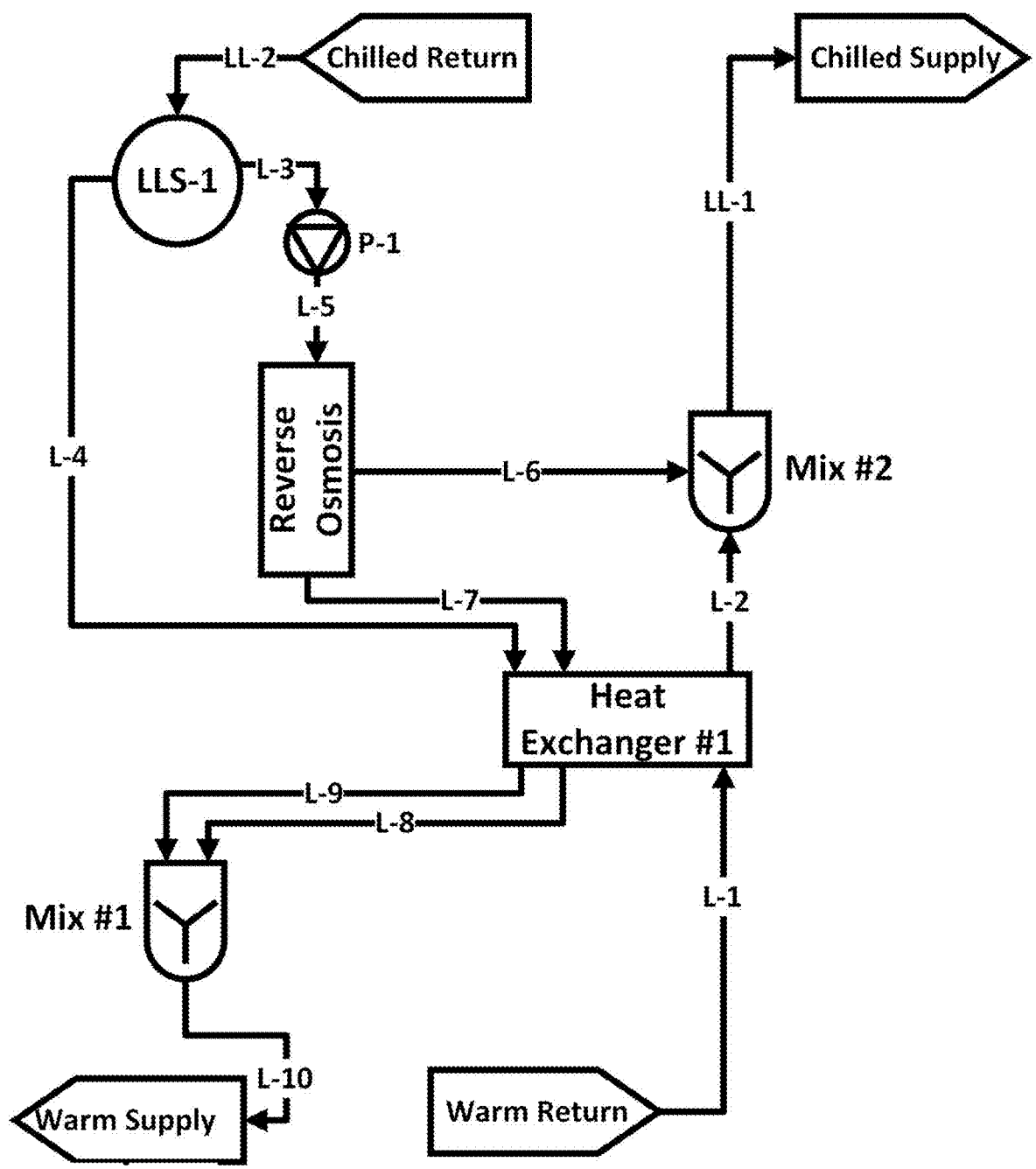
FIG. 10B: Liquid-Liquid Phase Transition Refrigeration Cycle with Heat Transfer Supply and Return.

3) Storage of Constituent Liquid Phases in Tank 1: L-2 may be stored as Liquid 'A' in FIGS. 9 and 10, and L-2 may be stored as Liquid 'C' in FIGS. 11 and 12. L-3 may be stored as Liquid 'C' in FIGS. 24 and 25, and L-2 may be stored as Liquid 'A' in FIGS. 26 and 27. FIGS. 24-27 may store the separated liquid phases from step '2)' as separate liquid layers in the same tank, rather than in separate tanks. The liquid layers may be further separated by barriers, as shown in, for example, FIGS. 24-27.

Example Step-by-Step Description FIG. 25 and FIG. 27, Charging:

1) Mixing: L-4 may be transferred from a top layer of Tank 1 to 'Mixing'. L-5 may be transferred from a bottom layer of Tank 1 to 'Mixing'. 'Mixing' may involve mixing L-4 and L-5 into a liquid-liquid mixture (LL-2). Mixing may comprise a liquid-liquid mixing device, which may include, but is not limited to, liquid-liquid mixing devices described herein, or liquid-liquid mixing devices known in the art, or a combination thereof. LL-2 be a liquid-liquid mixture or dispersed liquid-liquid mixture because it may exist at a temperature above a LCST or below a UCST or a combination thereof liquid-liquid phase transition. LL-2 may be transferred to 'Chiller'.

2) Supply Heat to Chiller/Chilling Liquid: LL-2, which may comprise a relatively warm or return temperature liquid-liquid mixture, may be heat exchanged with a cooling source or heat absorbing source or a chiller ('Chiller'). As LL-2 is cooled or heat is removed from LL-2, LL-2 may undergo an exothermic liquid-liquid phase transition into at least a portion combined solution or a single liquid phase combined solution or a solution of different liquid phases, or a combination thereof (L-6). L-6 may exist at a relatively cold or 'supply' temperature.

3) Storage of Liquid in Tank 1: L-6 may be transferred to Tank 1 and may be stored as Liquid 'B'.

EXAMPLE EXEMPLARY EMBODIMENTS

A process for increasing the heat carrying capacity or heat transfer capacity of a heat transfer medium comprising:
  Cooling a liquid-liquid phase transition liquid below a LCST to form a single liquid phase combined solution
  Forming at least a portion of ice by freezing liquid water
  Combining said ice with said single liquid phase combined solution to form a slurry
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid comprising at least a portion water below a LCST to form a single liquid phase combined solution
  Further cooling said single liquid phase combined solution to form at least a portion of ice in a slurry with said single liquid phase combined solution
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid below a LCST to form a single liquid phase combined solution
  Forming at least a portion of solid phase by freezing a solid-liquid phase change material
  Combining said solid phase with said single liquid phase combined solution to form a slurry
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid comprising at least a portion solid-liquid phase change material below a LCST to form a single liquid phase combined solution
  Further cooling the solution to form at least a portion of solid phase in a slurry with said single liquid phase combined solution
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid comprising at least a portion water below a UCST to form a multi-liquid phase mixture
  Further cooling said multi-liquid phase mixture to form at least a portion of ice in a slurry with said single liquid phase combined solution
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid comprising at least a portion water below a UCST to form a multi-liquid phase mixture
  Further cooling said multi-liquid phase mixture to form at least a portion of ice in a slurry with said single liquid phase combined solution
  Transferring and/or heat exchanging said slurry to and/or with an application requiring cooling A process for increasing the heat carrying capacity or heat transfer capacity of a heat transfer medium comprising:
  Cooling a liquid-liquid phase transition liquid comprising at least a portion water below a UCST to form a multi-liquid phase mixture Separating a mostly aqueous liquid phase from a mostly non-aqueous liquid phase Further cooling said mostly aqueous liquid phase to form at least a portion of ice Mixing said mostly aqueous liquid phase, or ice, or mostly non-aqueous phase to form a multi-liquid phase slurry Transferring and/or heat exchanging said multi-liquid phase slurry to and/or with an application requiring cooling A heat transfer medium comprising:
   A mixture comprising a liquid-liquid phase transition liquid and ice
   Wherein the liquid-liquid phase transition liquid has an enthalpy of liquid-liquid phase transition between 0-20° C.
   and
   Wherein said enthalpy of liquid-liquid phase transition is greater than 10 kJ per kilogram of solution A heat transfer medium comprising:
   A mixture comprising a liquid-liquid phase transition liquid and ice
   Wherein the liquid-liquid phase transition liquid has an enthalpy of liquid-liquid phase transition greater than, or less than, or overlapping with, or a combination thereof the melting point of said ice
   and
   Wherein said enthalpy of liquid-liquid phase transition is greater than 10 kJ per kilogram of solution A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   and
   Wherein said enthalpy of liquid-liquid phase transition is greater than 10 kJ per kilogram of solution A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   and
   Wherein said enthalpy of liquid-liquid phase transition is greater than_kJ per kilogram of solution A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   And
   Wherein said enthalpy of liquid-liquid phase transition is greater than 10 kJ per kilogram of solution
   And
   Wherein said solid-liquid phase change material is soluble in said liquid-liquid phase transition liquid A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   And
   Wherein said enthalpy of liquid-liquid phase transition is greater than 10 kJ per kilogram of solution
   And
   Wherein said solid-liquid phase change material is insoluble in said liquid-liquid phase transition liquid A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   And
   Wherein said enthalpy of liquid-liquid phase transition is greater than 10 kJ per kilogram of solution
   And
   Wherein said solid-liquid phase change material possesses limited solubility in at least one reagent in said liquid-liquid phase transition liquid at a temperature above a LCST A heat transfer medium comprising:
   A mixture comprising a liquid-liquid phase transition liquid and a solid-liquid phase change material
   Wherein the liquid-liquid phase transition liquid has an enthalpy of liquid-liquid phase transition at a temperature greater than, or less than, or overlapping with, or a combination thereof the melting point of said solid-liquid phase change material
   And
   Wherein said enthalpy of liquid-liquid phase transition is greater than 10 kJ per kilogram of solution
   And
   Wherein said solid-liquid phase change material possesses limited solubility in at least one reagent in said liquid-liquid phase transition liquid at a temperature below a UCST Independent Embodiment #1

1. A process for heat transfer comprising:
   Cooling a liquid-liquid phase transition liquid comprising two liquid phases below a liquid-liquid phase transition temperature range, forming an exothermic LCST liquid-liquid phase transition into a liquid-liquid phase transition liquid comprising one liquid phase
   Cooling said one liquid phase below a temperature of a solid-liquid phase change and forming a solid-liquid slurry
   Transferring said solid-liquid slurry to an application requiring cooling, a heat source, or both.

Dependent Embodiments Related to Independent Embodiment #1

2. The process of embodiment 1 wherein the solid-liquid phase change material comprises a reagent in the liquid-liquid phase transition liquid 3. The process of embodiment 1 wherein the solid-liquid phase change material is dissolved in at least one liquid phase of the liquid-liquid phase transition liquid when the solid-liquid phase transition material is at a liquid state
4. The process of embodiment 1 wherein the solid-liquid phase change material is insoluble in liquid-liquid phase transition liquid while at a liquid state
5. The process of embodiment 3 wherein the solid-liquid phase change material comprises water
6. The process of embodiment 4 wherein the solid-liquid phase change material comprises a paraffin, a hydrophobic polymer, or a combination thereof
7. The process of embodiment 4 wherein said liquid-liquid phase transition liquid comprising one liquid phase is in a multi-liquid phase mixture with a solid-liquid phase change material
8. The process of embodiment 1 wherein the phase transition temperature range of the liquid-liquid phase transition liquid overlaps with the solid-liquid phase change temperature of the solid-liquid phase change material
9. The process of embodiment 1 wherein the phase transition temperature range of the liquid-liquid phase transition liquid is adjacent to the solid-liquid phase change temperature of the solid-liquid phase change material
10. The process of embodiment 1 wherein the phase transition temperature range of the liquid-liquid phase transition liquid is significantly different from the solid-liquid phase change temperature of the solid-liquid phase change material
11. The process of embodiment 1 wherein the phase transition temperature of the liquid-liquid phase transition liquid is adjustable by adjusting the concentration of a reagent
12. The process of embodiment 1 further comprising an apparatus to separate a solid-liquid phase change liquid from the liquid-liquid phase transition liquid
13. The process of embodiment 1 further comprising an apparatus to add a solid-liquid phase change material to the liquid-liquid phase transition liquid
14. The process of embodiment 1 wherein the concentration of a solid-liquid phase change material is adjustable
15. The process of embodiment 14 wherein the concentration of a solid-liquid phase change material is adjusted in response to changes in the heat capacity requirements in the heat transfer process
16. The process of embodiment 1 wherein a solid-liquid phase change material of one freezing point is replaced with a solid-liquid phase change material of a different freezing point
17. The process of embodiment 16 wherein a solid-liquid phase change material of one freezing point is replaced with a solid-liquid phase change material of a different freezing point in response to changes in the operating temperatures in the heat transfer process
18. The process of embodiment 1 wherein the specific heat capacity of the solid-liquid slurry in the temperature range of the solid-liquid phase change is greater than the specific heat capacity of a water—ice slurry
19. The process of embodiment 1 wherein the freezing point of the solid-liquid phase change material is reduced by the presence of the liquid-liquid phase transition liquid
20. The process of embodiment 1 wherein the freezing point of the solid-liquid phase change material is practically unchanged due to the presence of the liquid-liquid phase transition liquid Independent Embodiment #2

21. A process for heat transfer comprising:
    Cooling a single liquid phase liquid-liquid phase transition liquid below a liquid-liquid phase transition temperature range, forming an exothermic UCST liquid-liquid phase transition into a two liquid phase solution
    Cooling said two liquid phase solution below a temperature of a solid-liquid phase change and forming a solid-liquid slurry
    Transferring said solid-liquid slurry to an application requiring cooling, a heat source, or both Independent Embodiment #3

22. A process for producing ice comprising:
    Mixing one liquid phase of a liquid-liquid phase transition liquid with another liquid phase of a liquid-liquid phase transition liquid to form an exothermic liquid-liquid phase transition
    Removing heat with a heat exchanger or heat sink
    Mixing the liquid-liquid phase transition liquid with a phase transition temperature adjustment reagent to form an endothermic liquid-liquid phase transition
    Wherein the endothermic liquid-liquid phase transition reduces the temperature to at or below the freezing point of water; and
    Wherein at least a portion of liquid water freezes to form ice Dependent Embodiments Related to Independent Embodiment #3

23. The process of embodiment 22 wherein said at least a portion of the liquid-liquid phase transition liquid comprises water
24. The process of embodiment 22 further comprising separating said ice from the remaining liquid
25. The process of embodiment 22 further comprising separating at least one liquid phase of a liquid-liquid phase transition liquid from another liquid phase of a liquid-liquid phase transition liquid after said endothermic liquid-liquid phase transition
26. The process of embodiment 25 further comprising removing at least a portion of the phase transition temperature adjustment reagent from at least one of said separated liquid phases Independent Embodiment #4

27. A process for producing ice comprising:
    Mixing said two non-contiguous liquid phases to form an endothermic liquid-liquid phase transition
    Wherein the endothermic liquid-liquid phase transition reduces the temperature to at or below the freezing point of water; and
    Wherein at least a portion of liquid water freezes to form ice Dependent Embodiments Related to Independent Embodiment #4:

28. The process of embodiment 27 wherein said at least a portion of the liquid-liquid phase transition liquid comprises water
29. The process of embodiment 27 further comprising separating said ice from the remaining liquid
30. The process of embodiment 27 further comprising a
    Adding a phase transition temperature adjustment reagent to a liquid-liquid phase transition liquid comprising one liquid phase to form an exothermic liquid-liquid phase transition and a mixture comprising two liquid phases
    Removing heat with a heat exchanger or heat sink
    Separating said mixture comprising two liquid phases into two non-contiguous liquid phases
    Removing at least a portion of said added phase transition temperature adjustment reagent from at least one of said two non-contiguous liquid phases

EXAMPLE EXEMPLARY EMBODIMENTS

Independent Embodiment #1

1. A process for thermal storage comprising:
    Charging a thermal storage reservoir by removing a 'warm' liquid from a thermal storage tank and adding a 'cold' liquid to the thermal storage tank
    Discharging a thermal storage reservoir by removing a 'cold' liquid from the thermal storage tank and adding a 'warm' liquid to the thermal storage tank
    Wherein said 'warm' liquid and said 'cold' liquid are layered within the tank; and
    Wherein said layering is due to a density difference; and
    Wherein said density difference is due to a difference in composition, or concentration, or both Dependent Embodiments Related to Independent Embodiment #1

2. The process of embodiment 1 wherein the concentration of a reagent in the 'cold' liquid is different from the concentration of a reagent in the 'warm' liquid
3. The process of embodiment 1 wherein the composition of the 'cold' liquid is different from the composition of the 'warm' liquid
4. The process of embodiment 1 wherein there is more than one 'cold' liquid
5. The process of embodiment 1 wherein there is more than one 'warm' liquid
6. The process of embodiment 4 wherein there are two cold liquids and one warm liquid
7. The process of embodiment 5 wherein there are two warm liquids and one cold liquid
8. The process of embodiment 6 wherein each cold liquid has a different density than the other cold liquid and wherein each cold liquid has a different density than the warm liquid
9. The process of embodiment 6 wherein the one warm liquid comprises the two cold liquids mixed into a single liquid phase combined solution above at least a portion of a UCST liquid-liquid phase transition temperature range
10. The process of embodiment 7 wherein each warm liquid has a different density than the other warm liquid and wherein each warm liquid has a different density than the cold liquid
11. The process of embodiment 7 wherein the one cold liquid comprises the two warm liquids mixed into a single liquid phase combined solution below at least a portion of a LCST liquid-liquid phase transition temperature range
12. The process of embodiment 1 wherein each liquid comprises a liquid phase of a liquid-liquid phase transition liquid
13. The process of embodiment 1 wherein the density of a layer is adjusted by adjusting the concentration of a reagent
14. The process of embodiment 1 wherein the cold liquid is the top layer
15. The process of embodiment 1 wherein the cold liquid is a middle layer between two other liquid layers Independent Embodiment #2

16. A process for thermal storage comprising:
    Charging a thermal storage reservoir by removing a 'cold' liquid from a thermal storage tank and adding a 'warm' liquid to the thermal storage tank
    Discharging a thermal storage reservoir by removing a 'warm' liquid from the thermal storage tank and adding a 'cold' liquid to the thermal storage tank
    Wherein said 'warm' liquid and said 'cold' liquid are stratified within the tank; and
    Wherein said stratification is due to a density difference; and
    Wherein said density difference is due to a difference in composition, or concentration, or both
17. The process of embodiment 16 wherein the concentration of a reagent in the 'cold' liquid is different from the concentration of a reagent in the 'warm' liquid
18. The process of embodiment 16 wherein the composition of the 'cold' liquid is different from the composition of the 'warm' liquid
19. The process of embodiment 16 wherein there is more than one 'cold' liquid
20. The process of embodiment 16 wherein there is more than one 'warm' liquid
21. The process of embodiment 19 wherein there are two cold liquids and one warm liquid
22. The process of embodiment 20 wherein there are two warm liquids and one cold liquid
23. The process of embodiment 21 wherein each cold liquid has a different density than the other cold liquid and wherein each cold liquid has a different density than the warm liquid
24. The process of embodiment 21 wherein the one warm liquid comprises the two cold liquids mixed into a single liquid phase combined solution above at least a portion of a UCST liquid-liquid phase transition temperature range
25. The process of embodiment 22 wherein each warm liquid has a different density than the other warm liquid and wherein each warm liquid has a different density than the cold liquid
26. The process of embodiment 22 wherein the one cold liquid comprises the two warm liquids mixed into a single liquid phase combined solution below at least a portion of a LCST liquid-liquid phase transition temperature range
27. The process of embodiment 16 wherein each liquid comprises a liquid phase of a liquid-liquid phase transition liquid 28. The process of embodiment 16 wherein the density of a layer is adjusted by adjusting the concentration of a reagent
29. The process of embodiment 16 wherein the cold liquid is the top layer
30. The process of embodiment 16 wherein the cold liquid is a middle layer between two other liquid layers
1. A process for thermal storage comprising:
   (a) providing a thermal storage reservoir with a first liquid having a first temperature and a second liquid having a lower temperature than the first liquid; wherein said first liquid and said second liquid are layered within the tank due to a difference in density between said first and second liquid and wherein said density difference is due to a difference in composition, concentration, or both;
   (b) charging the thermal storage reservoir by removing at least a portion of said first liquid and adding at least a portion of said second liquid wherein the added second liquid's temperature is lower than the first liquid; and
   (c) discharging the thermal reservoir by removing at least a portion of said second liquid and adding at least a portion of said first liquid wherein the added first liquid's temperature is higher than the second liquid.
2. The process of 1 which further comprises mixing at least one of the one or more additional liquids with a lower temperature than the first liquid with the second liquid above at least a portion of a UCST liquid-liquid phase transition temperature range such that a single liquid phase is formed comprising the at least one of the one or more additional liquids.
3. The process of 1 which further comprises mixing at least one of the one or more additional liquids with a higher temperature than the first liquid with the first liquid below at least a portion of a LCST liquid-liquid phase transition temperature range such that a single liquid phase is formed comprising the at least one of the one or more additional liquids.
1. A process for thermal storage comprising:
   (a) providing a thermal storage reservoir with a first liquid having a first temperature and a second liquid having a lower temperature than the first liquid;
wherein said first liquid and said second liquid are layered within the tank due to a difference in density between said first and second liquid and wherein said density difference is due to a difference in composition, concentration, or both;
   (b) charging the thermal storage reservoir by removing at least a portion of said second liquid and adding at least a portion of said first liquid wherein the added first liquid's temperature is higher than the second liquid; and
   (c) discharging the thermal reservoir by removing at least a portion of said first liquid and adding at least a portion of said second liquid wherein the added second liquid's temperature is lower than the first liquid.
2. The process of 1 which further comprises mixing at least one of the one or more additional liquids with a lower temperature than the first liquid with the second liquid above at least a portion of a UCST liquid-liquid phase transition temperature range such that a single liquid phase is formed comprising the at least one of the one or more additional liquids.
3. The process of 1 which further comprises mixing at least one of the one or more additional liquids with a higher temperature than the first liquid with the first liquid below at least a portion of a LCST liquid-liquid phase transition temperature range such that a single liquid phase is formed comprising the at least one of the one or more additional liquids.

A liquid phase thermal storage unit comprising:
A temperature stratified or thermocline thermal storage unit,
Wherein at least one liquid layer or liquid phase or liquid region comprises a 'cold' temperature liquid layer or liquid phase or liquid region, and
Wherein at least one liquid layer or liquid phase or liquid region comprises a 'warm' temperature liquid layer or liquid phase or liquid region,
Wherein said 'cold' temperature liquid layer or liquid phase or liquid region possesses a lower density than said 'warm' temperature liquid layer or liquid phase or liquid region
Wherein the liquid or liquids are stored in a container or vessel
Wherein at least one of said 'cold' temperature liquid layer or liquid phase or liquid region is located at a position above one or more other liquid layers or liquid phases or liquid regions
Wherein at least one of said 'warm' temperature liquid layer or liquid phase or liquid region is located at a position beneath one or more other liquid layers or liquid phases or liquid regions A liquid phase thermal storage unit comprising:
A temperature stratified or thermocline thermal storage unit comprising at least two liquid layers or liquid phases or liquid regions,
Wherein each liquid layer or liquid phase or liquid region possesses a different composition or concentration of reagents or both A liquid phase thermal storage unit comprising:
A temperature stratified or thermocline thermal storage unit comprising at least two liquid layers or liquid phases or liquid regions,
Wherein the difference in density between liquid layers or liquid phases or liquid regions is due to each liquid layer or liquid phase or liquid region possessing a different composition or concentration of reagents or both A liquid phase thermal storage unit comprising:
A temperature stratified or thermocline thermal storage unit,
Wherein the thermocline or temperature stratification is due to liquid phases possessing different densities due to possessing different compositions, or possessing different reagents concentrations, or possessing different temperatures, or a combination thereof A liquid phase thermal storage unit comprising:
A temperature stratified or thermocline thermal storage unit,
Wherein each liquid layer is separated by a barrier
Wherein said barrier comprises a floating barrier
Wherein said barrier comprises floating balls, a floating liner, a floating sheet, a perforated sheet, a hydrophobic surface, a hydrophilic surface, a liquid, a solid of an engineered density, a liquid of an engineered density, an insoluble liquid, a material, or a combination thereof Wherein said barrier is moved mechanically movable
Wherein said barrier is hydraulically movable
A liquid phase thermal storage unit comprising:
A temperature stratified or thermocline thermal storage unit,
Wherein layers are separated by a defined liquid-liquid barrier Wherein at least one layer may be at least in part hydrophobic and one layer may be at least in part hydrophilic
A liquid phase thermal storage unit comprising:
A temperature stratified or thermocline thermal storage unit,
Wherein stratification or layering is due to different densities or concentrations or compositions or solubility or hydrophobicity or hydrophilicity or a combination thereof
Wherein layers are contacted or separated by a defined liquid-liquid interface
Wherein mixing between layers is minimized due to surface tension
Wherein mixing between layers is minimized due to solubility
Wherein mixing between layers is minimized due to temperature driven solubility
Wherein mixing is minimized due to a barrier
A method for enabling transport of heat independent of temperature during transport Higher temperature phase transition than the temperature of district heating network for higher temperature phase transition.
A system for heat or 'cool' transfer comprising an input stream and an output stream, wherein the output stream is a liquid-liquid phase transitioned version of the input stream, comprising:
An input liquid stream
Wherein said input stream is preheated in a heat exchange with one or more of the two or more separate liquid phase output streams
Wherein said preheated input liquid stream is further heated to above a phase transition temperature, forming a hot multi-liquid phase mixture in a liquid-liquid phase transition Separating at least a portion of the two or more liquid phases in said hot multi-liquid phase mixture into separate non-contiguous streams
Wherein said non-contiguously separated streams comprise said two or more liquid phase output stream before heat exchange with said input liquid stream
Wherein said non-contiguously separated streams are heat exchanged with said input liquid stream
Wherein one of said non-contiguously separated streams is heat exchanged with said input liquid stream, and another of said non-contiguously separated streams is not heat exchanged with the input liquid stream or remains at or above the temperature of phase transition after exiting the heat exchange system
Wherein said non-contiguously separated streams are transported in a pipe network
Wherein said non-contiguously separated streams are transported in a pipe or pipe network
Wherein said non-contiguously separated streams are transported to an application requiring heating and mixed before or at an application requiring heating to release the enthalpy of phase transition
Wherein said non-contiguously separated streams are transported to an application requiring heating in a pipe network and mixed before or at an application requiring heating to supply heat to an application requiring heating at a higher temperature than the temperature of liquid transported in the pipe network
Wherein said non-contiguously separated streams are transported to an application requiring heating and mixed before or at an application requiring heating to supply heat in both the form of specific heat capacity and the enthalpy of phase transition
A system for heat or 'cool' transfer comprising an input stream and an output stream, wherein the output stream is a liquid-liquid phase transitioned version of the input stream, comprising:
An input liquid stream
Wherein said input stream is precooled in a heat exchange with one or more of the two or more separate liquid phase output streams
Wherein said precooled input liquid stream is further cooled to below a phase transition temperature, forming a cold multi-liquid phase mixture in a liquid-liquid phase transition Separating at least a portion of the two or more liquid phases in said cold multi-liquid phase mixture into separate non-contiguous streams
Wherein said non-contiguously separated streams comprise said two or more liquid phase output stream before heat exchange with said input liquid stream
Wherein said non-contiguously separated streams are heat exchanged with said input liquid stream
Wherein one of said non-contiguously separated streams is heat exchanged with said input liquid stream, and another of said non-contiguously separated streams is not heat exchanged with the input liquid stream or remains at or above the temperature of phase transition after exiting the heat exchange system
Wherein said non-contiguously separated streams are transported in a pipe network
Wherein said non-contiguously separated streams are transported in a pipe or pipe network
Wherein said non-contiguously separated streams are transported to an application requiring heating and mixed before or at an application requiring cooling to release the enthalpy of phase transition
Wherein said non-contiguously separated streams are transported to an application requiring cooling in a pipe network and mixed before or at an application requiring cooling to supply heat removal or 'cooling' to an application requiring cooling at a lesser temperature than the temperature of liquid transported in the pipe network
Wherein said non-contiguously separated streams are transported to an application requiring cooling and mixed before or at an application requiring cooling to supply 'cooling' or heat removal in both the form of specific heat capacity and the enthalpy of phase transition
Wherein operating the pipe network at a higher temperature than the liquid-liquid phase transition of the liquid-liquid phase transition liquid composition advantageously reduces the viscosity of the liquids relative to their viscosity at their phase transition temperature.
A heat transfer process comprising:
A heat transfer composition with a liquid-liquid phase transition;
A pipe for transferring said heat transfer liquid;
A mixing device to enable one or more liquid phases in the heat transfer liquid to be adequately dispersed when said heat transfer composition is at a multi-liquid phase state Wherein the mixing device may include, but is not limited to, one or more or a combination of the following: static mixer, baffles, stirred vessel, mechanical mixer, Wherein said adequately dispersed is defined by an average droplet size or particulate size of less than __ microns Wherein said adequately dispersed is defined by a droplet size or particulate density of greater than __ per cm3

Wherein said adequately dispersed is defined as sufficiently dispersed to prevent the accumulation of one or more liquid phases in one or more parts or sections of the heat transfer device Wherein said adequately dispersed is defined as sufficiently dispersed to prevent an unintentional complete layering of two or more liquid phases Wherein the temperature of the heat transfer liquid is Wherein the viscosity of the heat transfer liquid is Wherein a mixing device is located within a pumping device or is coupled with a pumping device A heat transfer process comprising:

A heat transfer liquid with a liquid-liquid phase transition;

A pipe for transferring said heat transfer liquid;

A mixing device to facilitate a liquid-liquid phase transition

Wherein said facilitating a liquid-liquid phase transition involves triggering a liquid-liquid phase transition at the temperature of liquid-liquid phase transition by means of motion Note: Liquid-liquid phase transitioning liquids generally requiring mixing or other form of agitation to initiate the liquid-liquid phase transition. Mixing or agitation is especially required in facilitating a liquid-liquid phase transition involving a transformation of a multi-liquid phase solution into a single liquid phase solution.

Wherein said facilitating a liquid-liquid phase transition involves facilitating a phase transition from a multi-liquid phase mixture to a single liquid phase solution Wherein said facilitating a liquid-liquid phase transition involves facilitating a phase transition from a single liquid phase solution to a multi-liquid phase mixture A method for increasing the efficiency of a chiller or increasing the heat transfer rate or capacity of a liquid heat transfer loop comprising:

Draining or otherwise removing at least a portion of water from the heat transfer loop interconnected with the evaporator side heat exchanger Replacing or substituting at least a portion of said water (or other heat transfer liquid) with a liquid-liquid phase transitioning liquid Where the liquid-liquid phase transitioning liquid enhances the heat transfer capacity per a unit of mass of heat transfer liquid by at least 20% compared to water Wherein said replacing further comprises Replacing or coating one or more or a combination of the following to ensure compatibility: pump, gaskets, piping, heat exchanger, adhesives Wherein a mixing device is added to ensure sufficient distribution of liquid components in a multi-liquid phase mixture Wherein the phase transition temperature is in a temperature range of at least 6-16 degrees C., or 7-15 degrees C., or 8-14 C, or 7-13 C, or 8-13 C, or 7-12 C, or 9-13 C, or 9-12 C Wherein heat transfer system can be operating while phase transitioning liquid is being added.

A method for increasing the efficiency of a chiller or increasing the heat transfer rate or capacity of a liquid heat transfer loop comprising:

Draining or otherwise removing at least a portion of water from the heat transfer loop interconnected with the evaporator side heat exchanger Replacing or substituting at least a portion of said water (or other heat transfer liquid) with an organic composition Wherein said organic composition, at an appropriate ratio to said water, forms a liquid-liquid phase transitioning composition Where said formed liquid-liquid phase transitioning composition the heat transfer capacity per a unit of mass of liquid by at least 20% compared to water Wherein said replacing or substituting involves adding said organic composition to said water Wherein the heat transfer system can be operating while the organic composition is being added Notes Note: The enthalpy of liquid-liquid phase transition may vary for a given liquid. For example, if a liquid-liquid phase transition liquid is only heated or cooled through a portion of an enthalpy of liquid-liquid phase transition temperature range, the enthalpy of liquid-liquid phase transition experienced by said liquid-liquid phase transition liquid may be less than if said liquid-liquid phase transition liquid is heated or cooled through an entire enthalpy of liquid-liquid phase transition temperature range.

Note: In some embodiments, such as the embodiments shown in FIGS. 36A and 36B, the liquid-liquid phase transition temperature of a heat transfer liquid may be greater than the boiling point of one or more components of said heat transfer liquid. In some embodiments, the process may operate such that the regeneration portion, such as Location #1, is Note: Some embodiments, such as the embodiments shown in FIGS. 36A and 36B, may enable the storage and/or transfer of heat significantly above the boiling point of a liquid. Some embodiments, such as the embodiments shown in FIGS. 36A and 36B, may enable the storage of heat significantly above the boiling point of a liquid. Significantly above a boiling point of a liquid may comprise a temperature equal to or greater than the boiling point of a liquid plus 10° K, or 20° K, or 30° K, or 40° K, or 50° K, or 60° K, or 70° K, or 80° K, or 90° K, or 100° K, or 200° K, or a combination thereof.

Note: In some embodiments, a 'chiller' may represent an application requiring heating and a 'load' may comprise a heat source.

Note: Some embodiments may involve a thermal storage system storing liquids of different densities as layers, wherein one or two or more liquids or liquid layers possesses about the same temperature, or different temperatures, or a temperature less than a liquid—liquid phase transition temperature range, or a temperature greater than a liquid-liquid temperature range, or a combination thereof. For example, in some embodiments, a process may involve heating a 'cold' LCST liquid-liquid phase transition liquid, and/or heating or further heating a LCST liquid-liquid phase transition liquid above a liquid-liquid phase transition temperature to form a multi-liquid phase mixture comprising two liquid phases, and/or separating said two liquid phases into two non-contiguously separate liquid streams, and/or cooling said two non-contiguously separate liquid streams (which may involve a counter current heat exchange with 'cold' LCST liquid-liquid phase change liquid), and/or storing said two non-contiguously separate liquid streams as at least two liquid layers in a thermal storage tank, and/or storing said two non-contiguously separate liquid streams as at least two liquid layers in a thermal storage tank wherein said two liquid layers are separate by a floating barrier or bladder, and/or storing said two non-contiguously separate liquid streams in at least two separate tanks. For example, the present example thermal storage process may discharge by removing at least a portion of the two liquid layers and employing said two liquid layers in a selective adiabatic heating process, such as 'Location #2' in FIGS. 36A and 36B. For example, said two liquid layers may comprise L-5 and L-6 in Location #2 of FIGS. 36A and 36B. For example, L-1 in FIGS. 36A and 36B may comprise said 'cold' LCST liquid-liquid phase change liquid. It is important to note the two non-contiguous liquid phases stored in the present example may be stored at a temperature below at least a portion of a LCST of the liquid-liquid phase transition liquid comprising said two non-contiguous liquid phases.

Note: Some embodiments may involve a thermal storage system storing liquids of different densities as layers, wherein one or two or more liquids or liquid layers possesses about the same temperature, or different temperatures, or a temperature less than a liquid—liquid phase transition temperature range, or a temperature greater than a liquid-liquid temperature range, or a combination thereof. For example, in some embodiments, a process may involve cooling a 'warm' UCST liquid-liquid phase transition liquid, and/or cooling or further cooling a UCST liquid-liquid phase transition liquid below a liquid-liquid phase transition temperature to form a multi-liquid phase mixture comprising two liquid phases, and/or separating said two liquid phases into two non-contiguously separate liquid streams, and/or heating said two non-contiguously separate liquid streams (which may involve a counter current heat exchange with 'warm' UCST liquid-liquid phase transition liquid), and/or storing said two non-contiguously separate liquid streams as at least two liquid layers in a thermal storage tank, and/or storing said two non-contiguously separate liquid streams as at least two liquid layers in a thermal storage tank wherein said two liquid layers are separate by a floating barrier or bladder, and/or storing said two non-contiguously separate liquid streams in at least two separate tanks. For example, the present example thermal storage process may discharge by removing at least a portion of the two liquid layers and employing said two liquid layers in a selective adiabatic cooling process, such as 'Location #2' in FIGS. 37A and 37B. For example, said two liquid layers may comprise L-5 and L-6 in Location #2 of FIGS. 37A and 37B. For example, L-1 in FIGS. 37A and 37B may comprise said 'warm' UCST liquid-liquid phase transition liquid. It is important to note the two non-contiguous liquid phases stored in the present example may be stored at a temperature above at least a portion of a UCST of the liquid-liquid phase transition liquid comprising said two non-contiguous liquid phases. Note: A thermal storage reservoir may be the same as a thermal storage tank. In some embodiments, a thermal storage reservoir may comprise one or more thermal storage tanks.

Note: In some embodiments, removing a liquid from a thermal storage reservoir may be conducted simultaneously to adding a liquid to a thermal storage reservoir.

Note: In some embodiments, removing a liquid from a thermal storage reservoir may be conducted simultaneously to adding a liquid to a thermal storage reservoir. In some embodiments, the rate of removing a liquid to a thermal storage reservoir may be different from the rate of simultaneously adding a liquid to a thermal storage reservoir.

Note: In some embodiments, removing a liquid from a thermal storage reservoir may be conducted at a different time than adding a liquid to a thermal storage reservoir. For example, a liquid may be added to a thermal storage reservoir, and then, at a future time, the same liquid may be removed from a thermal storage reservoir. For example, a liquid may be removed from a thermal storage reservoir, and then, at a future time, the same liquid may be added to a thermal storage reservoir. For example, a liquid may be removed from a thermal storage reservoir, and then, at a future time, a different liquid may be added to a thermal storage reservoir. For example, a liquid may be added to a thermal storage reservoir, and then, at a future time, a different liquid may be removed from a thermal storage reservoir.

Note: Pumps and/or other fluid handling devices or processes may be employed.

Note: Some embodiments may involve producing food or beverage products, or cooling food or beverage products, or heating food or beverage products or a combination thereof.

Note: Some embodiments may involve producing ice crème, or slurries, or slushing, or lemonade, or icy lemonade, or sugar water, or a combination thereof.

Note: Example separation processes or separation systems and/or methods may include, but are not limited to, one or more or a combination of the following: a membrane based process, or reverse osmosis, or nanofiltration, or ultrafiltration, or organic solvent nanofiltration, or electrodialysis, or intercalation, or lithium intercalation, or sodium intercalation, or alkali intercalation, or alkaline earth intercalation, or high pressure reverse osmosis, or DTRO, or distillation, or vapor compression distillation, or cryposeparation, or host-guest chemistry, or freezing separation, or solid-liquid separation, or cryodesalination, or forward osmosis, or membrane distillation, or vacuum distillation, or extraction, or liquid-liquid separation, or liquid-solid separation, or evaporation, or chemical reaction, or destructive distillation, or absorption, or adsorption, or ion exchange, or density based separation, or viscosity based separation, or size based separation, or hydrophilicity—hydrophilicity based separation, or coalescing, or decanting, or centrifuge, or filtration, or static charge based separation, or charge based separation, or electromagnetic separation, or binary distillation, or azeotrope distillation, or membrane distillation, or mechanical or vapor compression, or hybrid systems, or flash distillation, or multistage flash distillation, or multieffect distillation, or extractive distillation, or switchable solvent, or reverse osmosis, or nanofiltration, or organic solvent nanofiltration, or ultrafiltration, or microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

Note: An application requiring heating may include, but is not limited to, one or more or a combination of the following: space heating, or water heating, or process heating, or chemical heating, or industrial heating, or building heating, or residential heating, or deicing, or radiant heating, or cooking, or heating for energy storage, or heating for a compressed air or compressed gas energy storage system, or power generating heating, or long distance heat transfer, or heating for gas separation, or air heating, or HVAC, or heating for CO2 capture, or heating for separations, or heating for desalination.

Note: An application requiring cooling may include, but is not limited to, one or more or a combination of the following: space heating, or water heating, or water freezing, or cryodesalination, or chilling, or process cooling, or chemical cooling, or industrial cooling, or building cooling, or residential cooling, or cooling, or radiant cooling, or food storage, or cold chain, or cooling for energy storage, or cooling for a compressed air or compressed gas energy storage system, or cooling generating heating, or cooling long distance heat transfer, or air conditioning, or cooling air, or HVAC or cooling for gas separation, or condensing, or desalination, or cooling for CO2 capture, or cooling for separations, or cooling for desalination.

Note: Solid-liquid phase change materials or solid-liquid phase change materials may include, but are not limited to, one or more or a combination of the following: water, ice, wax, parrafin, oil, polyethylene glycol, polypropylene glycol, PCM, phase change material, sugar alcohol, lipids, organic PCM, inorganic PCM, nanocomposite, lauric acid, aromatic, fatty acid, eutectic, PureTemp, Paraffin wax (liquid), Paraffin wax (solid), Polyglycol E600 (liquid), PureTemp −37 PureTemp −23 PureTemp −21 PureTemp −17 PureTemp −15 PureTemp −12 PureTemp −5 PureTemp 1 PureTemp 4 PureTemp 6 PureTemp 8 PureTemp 12 PureTemp 15 PureTemp 18 PureTemp 20 PureTemp 23 PureTemp 24 PureTemp 25 PureTemp 27 PureTemp 28 PureTemp 29 PureTemp 33 PureTemp 35 PureTemp 37 PureTemp 48 PureTemp 53 PureTemp 58 PureTemp 60 PureTemp 63 PureTemp 68 PureTemp 103 PureTemp 151 Paraffin wax (liquid) Paraffin wax (solid) Polyglycol E600 (liquid) Polygycol E600 (solid) Plamitic acid (liquid) Plamitic acid (solid) Capric acid (liquid) Capric acid (solid) Caprylic acid (liquid) Caprylic acid (solid) Napthalene (liquid) Naphtalene (solid) Potassium flouride tetrahydrate Calcium chloride hexahydrate Butyl stearate Dodecanol Tech. grade octadecane Propyl palmitate 45/55 Capric-lauric acid Astorstat HA 17 Astorstat HA 18 RT26 RT27 Climsel C-21 Climsel C-18 Climsel C 7 Climsel C 10 Climsel C 21 Climsel C24 Climsel C28 Climsel C32 Climsel C48 Climsel C58 Climsel C70 STL27 TH29 E23 Paraffin, Formic acid Caprilic acid Glycerin p-Lattic acid Methyl palmitate Camphenilone Docasyl bromide Caprylone Phenol Heptadecanone 1-Cyclohexylooctadecane 4-Heptadacanone p-Joluidine Cyanamide Methyl eicosanate 3-Heptadecanone 2-Heptadecanone Hydrocinnamic acid Cetyl acid α-Nepthylamine Camphene O-Nitroaniline 9-Heptadecanone Thymol Methyl behenate Diphenyl amine p-Dichlorobenzene Oxolate Hypophosphoric acid O-Xylene dichloride β-Chloroacetic acid Chloroacetic acid Nitro napthalene Trimyristin Heptaudecanoic acid α-Chloroacetic acid Bee wax Bees wax Glyolic acid Glycolic acid p-Bromophenol Azobenzene Acrylic acid Dinto toluent (2,4) Phenylacetic acid Thiosinamine Bromcamphor Durene Benzylamine Methly brombrenzoate Alpha napthol Glautaric acid p-Xylene dichloride Catechol Quinone Actanilide Succinic anhydride Benzoic acid Stibene Benzamide Acetic acid Polyethylene glycol 600 Capric acid Eladic acid Lauric acid Pentadecanoic acid Tristearin Myristic acid Palmatic acid Stearic acid Acetamide Methyl fumarate Gallium-gallium antimony eutectic Gallium Cerrolow eutectic Bi—Cd—In eutectic Cerrobend eutectic Bi—Pb—In eutectic Bi—In eutectic Bi—Pb-tin eutectic Bi—Pb eutectic Butyl stearate Paraffin C16-C18 Capric-Lauric acid Dimethyl sabacate Polyglycol E600 Paraffin C13-C24 34% Mistiric acid+66% Capric Acid I-Dodecanol Paraffin C18 (45-55%) Vinyl stearate Capric acid RT 20 Climsel C23 Climsel C24 RT 26 STL 27 S27 RT 30 TH 29 Climsel C32 RT 32 DS 5000 DS 5007 DS 5030 DS 5001 DS 5008 DS 5029 RT −9 HC RT −4 RT 0 RT 2 HC RT 3 RT 3 HC RT 4 RT 5 RT 5 HC RT 6 RT 8 RT 9 RT 10 RT 10 HC RT 11 HC RT 12 RT 15 RT 18 HC RT 21 RT 21 HC RT 22 HC RT 24 RT 25 RT 25 HC RT 27 RT 28 HC RT 31 RT 35 RT 35 HC RT 42 RT 44 HC RT 47 RT 50 RT 52 RT 55 RT 58 RT 60 RT 62 RT 65 RT 70 HC RT 80 HC RT 82 RT 90 HC S117 S89 S83 S72 S70 S58 S50 S46 S44 S34 S32 S30 S27 S25 S23 S21 S19 S17 S15 S13 S10 S8 S7 A164 A155 A144 A133 A118 A95 A82 A70 A62 A60H A60H A58H A58 A55 A53H A53H A52 A50 A48 A46 A44 A43 A42 A40 A39 A37 A36 A32 A29 A28 A26 A25H A25 A24 A23 A22H A22 A17 A16 A15 A9 A8 A6 A4 A3 A2 E0 E-2 E-3 E-6 E-10 E-11 E-12 E-14 E-15 E-19 E-21 E-22 E-26 E-29 E-32 E-34 E-37 E-50 E-75 E-78 E-90 E-114 PCM-HS26N PCM-HS23N PCM-HS10N PCM-HS07N PCM-HS01P PCM-0M05P PCM-0M06P PCM-0M08P PCM-0M11P PCM-0M21P PCM-H22P PCM-HS24P PCM-HS29P PCM-OM32P PCM-OM35P PCM-HS34P PCM-OM37P PCM-OM46P PCM-OM48P PCM-OM53P PCM-OM65P PCM-HS89P MPCM −30 MPCM −30D MPCM −10 MPCM −10D MPCM 6 MPCM 6D MPCM 18 MPCM 18D MPCM 28 MPCM 28D MPCM28D-IR MPCM 37 MPCM 37D MPCM 43D MPCM 56D n-Dodecane n-Tridecane n-Tetradecane n-Pentadecane n-Hexadecane n-Heptadecane n-Octadecane n-Nonodecane n-Eicosane n-Heneicosane n-Docosane n-Tricosane n-Tetracosane n-Pentacosane n-Hexacosane n-Heptacosane n-Octacosane n-Butanoic acid n-Hexanoic acid n-Octanoic acid n-Decanoic acid n-Dodecanoic acid n-Tridecanoic acid n-Tetradecanoic acid n-Pentadecanoic acid n-Hexadecanoic acid n-Heptadecanoic acid n-Octadecanoic acid n-Nonadecanoic acid n-Eicosanoic acid n-Heneicosanoic acid n-Tricosanoic acid Lauric-palmistic Lauric-myristic Lauric-stearic Myristic-stearic Myristic-palmitic Palmitic-stearic Capric-lauric Capric-palmitic Capric-myristic Capric-stearic Glycerol trimysristate Glycerol triplamitate Glycerol tristearate Ethylenglycol distearate Erythritol tetrapalmitate Erythritol tetrastearate Galactitol hexapalmitate Galactitol hexastearate Tetradecyl tridecanoate Tetradecyl pentadcanoate Tetradecyl heptadecanoate Tetradecyl nonadecanoate Tetradecyl dodecanoate Tetradecyl tetradecanoate Tetradecyl hexadecanoate Tetradecyl octadecanoate Tetradecyl eicosanoate Didecyl carbonate Dodecyl carbonate Tetradecyl carbonate Hexadecyl carbonate Octadecyl carbonate Latest 29 T Latest 25 T Latest 20 T Latest 18 T Note: High enthalpy of liquid-liquid phase transition liquid-liquid phase transition liquids may possess, including, but not limited to, one or more or a combination of the following properties: a liquid-liquid phase transition, high enthalpy of liquid-liquid phase transition, non-toxic, non-volatile, non-flammable, low viscosity, tunable or adjustable liquid-liquid phase transition temperature, tunable or adjustable enthalpy of phase transition, tunable or adjustable liquid-liquid phase transition temperature, customizable liquid-liquid phase transition temperature, customizable enthalpy of phase transition temperature.

Note: A high enthalpy of liquid-liquid phase transition phase transition liquid-liquid phase transition liquid may comprise a liquid-liquid phase transition composition with an enthalpy of liquid-liquid phase transition greater than or equal to 1 kJ/kg, or 2 kJ/kg, or 3 kJ/kg, or 4 kJ/kg, or 5 kJ/kg, or 6 kJ/kg, or 7 kJ/kg, or 8 kJ/kg, or 9 kJ/kg, or 10 kJ/kg, or 11 kJ/kg, or 12 kJ/kg, or 13 kJ/kg, or 14 kJ/kg, or 15 kJ/kg, or 16 kJ/kg, or 17 kJ/kg, or 18 kJ/kg, or 19 kJ/kg, or 20 kJ/kg For example, a thermal storage system may store heat or 'cool' in the temperature range of a liquid-liquid phase transition, which, in some embodiments, may have an adjustable temperature range of enthalpy of phase transition or a broad temperature range of an enthalpy of phase transition or both. It is important to note thermal storage may also refer to thermal storage media, which may include heat transfer media and heat transfer applications.

A phase transition temperature, or phase change temperature, or a combination thereof may be less than, or equal to, or greater than or a combination thereof on or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

A concentration of one or more components (For Example: reagents) may include, but is not limited to, mass percentages of one or more components comprising greater than or equal to one or more or a combination of the following: 0.0001%, or 0.001%, or 0.01%, or 0.1%, or 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Example Further Notes

Note: Example definitions of the following terms: 'liquid layer', 'liquid phase', and 'liquid region'. It is important to note that said terms may be employed interchangeably. Although said terms may be employed interchangeably, said terms may be differentiated in, for example, the following ways:

Liquid Layer: A liquid layer may be defined by being a liquid comprising a different composition, concentration of one or more reagents, temperature, hydrophobicity, hydrophilicity, density, solubility properties, or a combination thereof than another liquid. A one layer may have defined properties which distinguish it from other layers or liquids, which may or may have been at one point or may be non-contiguously or may be continuously or a combination thereof in contact with each other.

Liquid Phase: A material at the physical state of a liquid. One liquid phase may be distinct from another liquid phase due to, for example, different composition, concentration of one or more reagents, temperature, hydrophobicity, hydrophilicity, solubility properties, density, or a combination thereof.

Liquid Region: In a container contain a liquid, a portion of the liquid may be distinct from a another portion of liquid based on, for example, different composition, concentration of one or more reagents, temperature, hydrophobicity, hydrophilicity, solubility properties, density, or a combination thereof. The location of one distinct portion of liquid may be defined as a liquid region, although may also be referred to as a liquid layer or liquid phase.

Note: Each link may be incorporated herein as a reference

Note: Liquid-liquid phase transitioning liquids may be sold or transported as the organic or otherwise non-water components. For example, when transported to the site of use, the customer or distributor or end user may follow instructions to mix the organic or otherwise non-water components (may be referred to as, for example, 'concentrate) with a certain amount of water or deionized water or deoxygenated water (for example: 1 part concentrate and three parts water). This may be advantageous because some liquids comprise mostly water by mass or volume. By transporting the concentrate instead of the liquid-liquid phase transition solution (concentrate mixed with an appropriate amount of water), the volume and/or mass of liquid transported may be reduced by, for example, including, but not limited to, one or more or a combination thereof: at least 40%, or at least 50%, or at least 60%, or at least 70%, or at least 80%, or at least 90%, or at least 95%. Reducing volume or mass of liquid transported may reduce the cost of shipping and the minimize shipping logistical challenges. Other instructions may involve cooling and/or mixing the concentration—water mixture such that it dissolves to form a single liquid phase solution before adding it to its application.

Note: A combined solution may phase transition into two or more liquid phases during transport. Ensuring a proper ratio of concentrate to water in an end use application may be challenging when the liquids comprise a multi-liquid phase mixture and the entire amount of liquid being transported is not required in the end use application. Said challenge may be addressed by transporting the concentrate liquid separate from water before introducing it to the end use application.

Note: May enable a stratified liquid tank with a liquid-liquid phase transitioning liquid. May be driven by the density of the constituent liquids rather than the change in density due to temperature, which may enable a more defined temperature stratification and/or reduce losses due to mixing between stratified temperature layers.

Note: In some embodiments, a 'Floating Barrier' may comprise a layer of an insoluble liquid. Said insoluble liquid may be insoluble in one or both of the liquid phases it is in contact with or separating. Said insoluble liquid may have a density engineered to be less dense than the density of a less dense liquid layer and engineered to be more dense than the density of a more dense liquid layer.

Note: L-2 and L-4 may have the same composition, L-1 and L-6 may have the same composition. L-1 and LL-1 may have same composition, but different liquid phases or distribution of reagents in liquid phases. LL-2 and L-6 may have same composition, but different liquid phases or distribution of reagents in liquid phases.

Note: Liquid 'B' and/or other liquid layers may be placed in at different heights or placements (e.g. bottom, middle, top), independent of their density, using, for example, barriers or other methods, if desired.

EXAMPLE EMBODIMENTS

Solid-Liquid-Liquid Phase Transition Process Embodiments

1. A process for heat transfer comprising:
cooling a liquid-liquid phase transition liquid comprising two liquid phases below an exothermic liquid-liquid phase transition temperature range to form a liquid-liquid phase transition liquid comprising one liquid phase;
cooling said one liquid phase below a temperature of a solid-liquid phase change to form a composition comprising a solid-liquid slurry; and
transferring at least a portion of said solid-liquid slurry to an application requiring cooling, a heat source, or both.

2. The process of embodiment 1 wherein the liquid-liquid phase transition liquid further comprises a solid-liquid phase change material.

3. The process of embodiment 2 wherein the solid-liquid phase change material is soluble in at least one liquid phase of the liquid-liquid phase transition liquid.

4. The process of embodiment 2 wherein the solid-liquid phase change material is insoluble in the liquid-liquid phase transition liquid while at a liquid state.

5. The process of embodiment 3 wherein the solid-liquid phase change material comprises water.

6. The process of embodiment 4 wherein the solid-liquid phase change material comprises a paraffin, a hydrophobic polymer, or a combination thereof.

7. The process of embodiment 4 wherein said liquid-liquid phase transition liquid comprising one liquid phase is in a multi-liquid phase mixture with the solid-liquid phase change material.

8. The process of embodiment 1 wherein the temperature of the solid-liquid phase change (1) is within the liquid-liquid phase transition temperature range, or (2) is adjacent to the liquid-liquid phase transition temperature range, or (3) is significantly different from the liquid-liquid phase transition temperature range.

9. The process of embodiment 1 which further comprises adjusting the liquid-liquid phase transition temperature range by changing a concentration of a reagent in the liquid-liquid phase transition liquid.

10. The process of embodiment 1 further comprising separating at least a portion of the solid-liquid slurry from the liquid-liquid phase transition liquid.

11. The process of embodiment 1 further comprising adding a solid-liquid phase change material to the liquid-liquid phase transition liquid.

12. The process of embodiment 2 further comprising adjusting the solid-liquid phase change material in response to a change in heat capacity.

13. The process of embodiment 2 further comprising replacing at least a portion of the solid-liquid phase change material with a second solid-liquid phase change material having a different freezing point.

14. The process of embodiment 13 wherein the replacing is in response to a change in an operating temperature.

15. The process of embodiment 1 wherein the specific heat capacity of the solid-liquid slurry is greater than the specific heat capacity of a water—ice slurry at the temperature of the solid-liquid phase change.

16. A process for heat transfer comprising:
cooling a liquid-liquid phase transition liquid comprising a single phase below an exothermic liquid-liquid phase transition temperature range to form a liquid-liquid phase transition liquid comprising two liquid phases;
cooling said liquid-liquid phase transition liquid comprising two liquid phases below a temperature of a solid-liquid phase change to form a composition comprising a solid-liquid slurry; and
transferring at least a portion of said solid-liquid slurry to an application requiring cooling, a heat source, or both.

17. A process for producing ice comprising:
mixing one liquid phase of a liquid-liquid phase transition liquid with another liquid phase of a liquid-liquid phase transition liquid to form an exothermic liquid-liquid phase transition;
removing heat; and
mixing the liquid-liquid phase transition liquid with a phase transition temperature adjustment reagent to form an endothermic liquid-liquid phase transition;
wherein said at least a portion of the liquid-liquid phase transition liquid comprises water and wherein the endothermic liquid-liquid phase transition reduces the temperature to about the freezing point of water or below to freeze at least a portion of liquid water to form ice.

18. The process of embodiment 17 further comprising separating at least a portion of said ice.

19. The process of embodiment 17 further comprising separating at least one liquid phase of a liquid-liquid phase transition liquid from another liquid phase of a liquid-liquid phase transition liquid after said endothermic liquid-liquid phase transition.

20. The process of embodiment 19 further comprising removing at least a portion of the phase transition temperature adjustment reagent from at least one of said separated liquid phases.

21. A process comprising:
mixing two non-contiguous liquid phases to form an endothermic liquid-liquid phase transition liquid wherein at least a portion of the endothermic liquid-liquid phase transition liquid comprises water; and
reducing the temperature to at or below the freezing point of water wherein at least a portion of liquid water freezes to form ice.

22. The process of embodiment 21 further comprising separating said ice from the remaining liquid.

23. The process of embodiment 21 further comprising:
adding a phase transition temperature adjustment reagent to the liquid-liquid phase transition liquid to form an exothermic liquid-liquid phase transition and a mixture comprising two liquid phases;
removing heat;
separating said mixture comprising two liquid phases into two non-contiguous liquid phases; and
removing at least a portion of said added phase transition temperature adjustment reagent.

Liquid-Liquid Phase Transition Thermal Storage Tanks with Composition Driven Stratification Embodiments 1. A process for thermal storage comprising:
   (a) providing a thermal storage reservoir with a first liquid having a first temperature and a second liquid having a lower temperature than the first liquid; wherein said first liquid and said second liquid are layered within the tank due to a difference in density between said first and second liquid and wherein said density difference is due to a difference in composition, concentration, or both;
   (b) charging the thermal storage reservoir by removing at least a portion of said first liquid and adding at least a portion of said second liquid wherein the added second liquid's temperature is lower than the first liquid; and
   (c) discharging the thermal reservoir by removing at least a portion of said second liquid and adding at least a portion of said first liquid wherein the added first liquid's temperature is higher than the second liquid.

2. The process of embodiment 1 wherein the added second liquid's temperature is different than the second liquid and the added first liquid's temperature is different than the first liquid.

3. The process of embodiment 1 wherein the first liquid and the second liquid each comprise a dissolved reagent and wherein the concentration of the dissolved reagent in the first liquid is different from the concentration of the dissolved reagent in the second liquid.

4. The process of embodiment 1 wherein the composition of the second liquid is different from the composition of the first liquid.

5. The process of embodiment 1 which further comprises employing one or more additional liquids with a lower temperature than the first liquid.

6. The process of embodiment 1 which further comprises employing one or more additional liquids with a higher temperature than the first liquid.

7. The process of embodiment 5 wherein each additional liquid has a different density than both the first liquid and the second liquid.

8. The process of embodiment 6 wherein each additional liquid has a different density than both the first liquid and the second liquid.

9. The process of embodiment 1 wherein each of the first liquid and the second liquid comprise a liquid phase of a liquid-liquid phase transition system.

10. The process of embodiment 1 which further comprises adjusting the density of said first liquid, of said second liquid, or both by adjusting the concentration of a dissolved reagent.

11. The process of embodiment 1 wherein said first liquid and said second liquid are layered within the tank such that the second liquid is layered above the first liquid.

12. The process of embodiment 1 wherein said first liquid and said second liquid are layered within the tank such that the first liquid is layered above the second liquid.

13. The process of embodiment 1 which further comprises employing at least one additional liquid wherein said first liquid and said second liquid are layered within the tank such that the second liquid is layered between the first liquid and the at least one additional layer.

14. The process of embodiment 1 which further comprises employing at least one additional liquid wherein said first liquid and said second liquid are layered within the tank such that the first liquid is layered between the second liquid and the at least one additional layer.

15. The process of embodiment 1 wherein said removing is conducted at a different time than said adding.

16. A process for thermal storage comprising:
   (a) providing a thermal storage reservoir with a first liquid having a first temperature and a second liquid having a lower temperature than the first liquid; wherein said first liquid and said second liquid are layered within the tank due to a difference in density between said first and second liquid and wherein said density difference is due to a difference in composition, concentration, or both;
   (b) charging the thermal storage reservoir by removing at least a portion of said second liquid and adding at least a portion of said first liquid wherein the added first liquid's temperature is higher than the second liquid; and
   (c) discharging the thermal reservoir by removing at least a portion of said first liquid and adding at least a portion of said second liquid wherein the added second liquid's temperature is lower than the first liquid.

17. The process of embodiment 16 wherein the added second liquid's temperature is different than the second liquid and the added first liquid's temperature is different than the first liquid.

18. The process of embodiment 17 wherein the first liquid and the second liquid each comprise a dissolved reagent and wherein the concentration of the dissolved reagent in the first liquid is different from the concentration of the dissolved reagent in the second liquid.

19. The process of embodiment 16 wherein the composition of the second liquid is different from the composition of the first liquid.

20. The process of embodiment 16 which further comprises employing one or more additional liquids with a lower temperature than the first liquid.

21. The process of embodiment 16 which further comprises employing one or more additional liquids with a higher temperature than the first liquid.

22. The process of embodiment 20 wherein each additional liquid has a different density than both the first liquid and the second liquid.

23. The process of embodiment 21 wherein each additional liquid has a different density than both the first liquid and the second liquid.

24. The process of embodiment 16 wherein each of the first liquid and the second liquid comprise a liquid phase of a liquid-liquid phase transition system.

25. The process of embodiment 16 which further comprises adjusting the density of said first liquid, of said second liquid, or both by adjusting the concentration of a dissolved reagent.

26. The process of embodiment 16 wherein said first liquid and said second liquid are layered within the tank such that the second liquid is layered above the first liquid.
27. The process of embodiment 16 wherein said first liquid and said second liquid are layered within the tank such that the first liquid is layered above the second liquid.
28. The process of embodiment 16 which further comprises employing at least one additional liquid wherein said first liquid and said second liquid are layered within the tank such that the second liquid is layered between the first liquid and the at least one additional layer.
29. The process of embodiment 16 which further comprises employing at least one additional liquid wherein said first liquid and said second liquid are layered within the tank such that the first liquid is layered between the second liquid and the at least one additional layer.
30. The process of embodiment 16 wherein said removing is conducted at a different time than said adding.

Selectively Adiabatic Liquid-Liquid Phase Transition Heat Transfer and/or Thermal Storage A selectively adiabatic process for cooling or heating comprising:
(a) heating or cooling a liquid-liquid phase transition liquid comprising one phase to a liquid-liquid phase transition temperature to form a liquid-liquid phase transition liquid comprising two or more liquid phases;
(b) heat exchanging said liquid-liquid phase transition liquid comprising two or more liquid phases;
(c) converting said liquid-liquid phase transition liquid comprising two or more liquid phases to a liquid-liquid phase transition liquid comprising one liquid phase with cooling or heating capacity;
(d) heat exchanging said liquid-liquid phase transition liquid comprising one liquid phase and then conducting step (e), step (f), or conducting both with a portion of said liquid-liquid phase transition liquid comprising one liquid phase;
(e) optionally repeating steps (a) to (d); and
(f) delivering said liquid-liquid phase transition liquid comprising one liquid phase with cooling or heating capacity to an application in need of cooling or heating.

The invention claimed is:

1. A process for heat transfer comprising:
cooling a liquid-liquid phase transition liquid comprising two liquid phases below an exothermic liquid-liquid phase transition temperature range to form a liquid-liquid phase transition liquid comprising one liquid phase;
cooling said one liquid phase below a temperature of a solid-liquid phase change to form a composition comprising a solid-liquid slurry; and
transferring at least a portion of said solid-liquid slurry to an application requiring cooling, a heat source, or both.

2. The process of claim 1 wherein the liquid-liquid phase transition liquid further comprises a solid-liquid phase change material.

3. The process of claim 2 wherein the solid-liquid phase change material is soluble in at least one liquid phase of the liquid-liquid phase transition liquid.

4. The process of claim 2 wherein the solid-liquid phase change material is insoluble in the liquid-liquid phase transition liquid while at a liquid state.

5. The process of claim 3 wherein the solid-liquid phase change material comprises water.

6. The process of claim 4 wherein the solid-liquid phase change material comprises a paraffin, a hydrophobic polymer, or a combination thereof.

7. The process of claim 4 wherein said liquid-liquid phase transition liquid comprising one liquid phase is in a multi-liquid phase mixture with the solid-liquid phase change material.

8. The process of claim 1 wherein the temperature of the solid-liquid phase change (1) is within the liquid-liquid phase transition temperature range, or (2) is adjacent to the liquid-liquid phase transition temperature range, or (3) is significantly different from the liquid-liquid phase transition temperature range.

9. The process of claim 1 which further comprises adjusting the liquid-liquid phase transition temperature range by changing a concentration of a reagent in the liquid-liquid phase transition liquid.

10. The process of claim 1 further comprising separating at least a portion of the solid-liquid slurry from the liquid-liquid phase transition liquid.

11. The process of claim 1 further comprising adding a solid-liquid phase change material to the liquid-liquid phase transition liquid.

12. The process of claim 2 further comprising adjusting the solid-liquid phase change material in response to a change in heat capacity.

13. The process of claim 2 further comprising replacing at least a portion of the solid-liquid phase change material with a second solid-liquid phase change material having a different freezing point.

14. The process of claim 13 wherein the replacing is in response to a change in an operating temperature.

15. The process of claim 1 wherein the specific heat capacity of the solid-liquid slurry is greater than the specific heat capacity of a water-ice slurry at the temperature of the solid-liquid phase change.

* * * * *